US012163081B2

(12) United States Patent
Hirschmann et al.

(10) Patent No.: US 12,163,081 B2
(45) Date of Patent: Dec. 10, 2024

(54) LIQUID-CRYSTAL MEDIUM

(71) Applicant: MERCK PATENT GMBH, Darmstadt (DE)

(72) Inventors: Harald Hirschmann, Darmstadt (DE); Sabine Schoen, Darmstadt (DE); Philipp Wucher, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 18/204,621

(22) Filed: Jun. 1, 2023

(65) Prior Publication Data

US 2023/0392077 A1 Dec. 7, 2023

(30) Foreign Application Priority Data

Jun. 2, 2022 (EP) .................................... 22176907

(51) Int. Cl.
*G02F 1/1333* (2006.01)
*C09K 19/34* (2006.01)

(52) U.S. Cl.
CPC ................................ *C09K 19/3491* (2013.01)

(58) Field of Classification Search
CPC ................ C09K 19/04; C09K 19/0403; C09K 19/0477; C09K 19/30; G02F 1/1333; G02F 1/13712
See application file for complete search history.

(56) References Cited

U.S. PATENT DOCUMENTS

| | | | | |
|---|---|---|---|---|
| 8,168,081 | B2 * | 5/2012 | Klasen-Memmer ... | C09K 19/12 252/299.61 |
| 10,519,377 | B1 * | 12/2019 | Xing .................. | C09K 19/3066 |
| 2021/0301205 | A1 * | 9/2021 | Zhang ................ | C09K 19/3003 |
| 2023/0272282 | A1 * | 8/2023 | Hirschmann ...... | C09K 19/3491 252/299.61 |

FOREIGN PATENT DOCUMENTS

| | | | | |
|---|---|---|---|---|
| CN | 104591983 A | * | 5/2015 | ............. C09K 19/42 |
| CN | 107523314 B | | 9/2019 | |
| CN | 113354607 A | | 9/2021 | |

OTHER PUBLICATIONS

Office Action in corresponding EP23176251 dated Sep. 22, 2023 (pp. 1-6).

* cited by examiner

*Primary Examiner* — Geraldina Visconti
(74) *Attorney, Agent, or Firm* — Millen, White, Zelano & Branigan; Csaba Henter

(57) ABSTRACT

A liquid-crystal (LC) medium based on a mixture of polar compounds, its use for optical, electro-optical and electronic purposes, in particular in LC displays, especially in LC displays of the vertically aligned mode, to an LC display of the vertically aligned mode containing the LC medium, especially an energy-saving LC display and a process of manufacturing the LC display.

19 Claims, No Drawings

LIQUID-CRYSTAL MEDIUM

The present invention relates to a liquid-crystal (LC) medium based on a mixture of polar compounds, to its use for optical, electro-optical and electronic purposes, in particular in LC displays, especially in LC displays of the vertically aligned mode, to an LC display of the vertically aligned mode comprising the LC medium, especially an energy-saving LC display and to a process of manufacturing the LC display.

The popularity of 8K and gaming monitors leads to an increased need for LC display (LCD) panels having higher refresh rates and thus for LC media having faster response times. Many of these LCD panels are using display modes wherein the LC molecules are aligned substantially perpendicular or slightly tilted relative to the electrode surface in the switched-off state.

Thus, so-called VA ("vertically aligned") displays are known which have a broad viewing angle and fast response times. The LC cell of a VA display contains a layer of an LC medium between two transparent electrodes, where the LC medium usually has a negative value of the dielectric anisotropy (Δε). In the switched-off state, the molecules of the LC layer are aligned perpendicular to the electrode surfaces (homeotropically) or have a tilted homeotropic alignment. On application of a voltage to the two electrodes, a realignment of the LC molecules parallel to the electrode surfaces takes place.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Also known are so-called IPS ("in-plane switching") displays, which contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favourable director orientation that has less tilt and more twist orientation compared to the LC medium with positive dielectric anisotropy, as a result of which these displays have a higher transmission.

Furthermore VA displays have been disclosed which use an alignment layer that is prepared by photoalignment, also known as $UV^2A$ mode (see e.g. Q. Tang et al., SID Symposium Digest of Technical Papers 2018, 414-417). These displays utilize an alignment layer prepared from crosslinkable and photoorientable monomers or prepolymers, e.g. cinnamate chromophores which are irradiated obliquely with linearly polarized UV light. As a result a crosslinked alignment layer is formed which induces uniaxial alignment with a pretilt angle in the LC molecules close to its surface. By changing the irradiation direction a multidomain configuration with different pretilt directions can be obtained.

However, the use of LC media with negative dielectric anisotropy in VA or FFS displays has also several drawbacks. For example, they have a significantly lower reliability compared to LC media with positive dielectric anisotropy.

The term "reliability" as used hereinafter means the quality of the performance of the display during time and with different stress loads, such as light load, temperature, humidity, or voltage which cause display defects such as image sticking (area and line image sticking), mura, yogore etc. and which are known to the skilled person in the field of LC displays. As a standard parameter for categorising the reliability usually the voltage holding ration (VHR) value is used, which is a measure for maintaining a constant electrical voltage in a test display. The higher the VHR value, the better the reliability of the LC medium.

The reduced reliability of an LC medium with negative dielectric anisotropy in a VA or FFS display can be explained by an interaction of the LC molecules with the polyimide of the alignment layer, as a result of which ions are extracted from the polyimide alignment layer, and wherein LC molecules with negative dielectric anisotropy do more effectively extract such ions.

This results in new requirements for LC media to be used in VA or FFS displays. In particular, the LC medium has to show a high reliability and a high VHR value after UV exposure. Further requirements are a high specific resistance, a large working-temperature range, short response times even at low temperatures, a low threshold voltage, a multiplicity of grey levels, high contrast and a broad viewing angle, and reduced image sticking.

Thus, in displays known from prior art often the undesired effect of so-called "image sticking" or "image burn" is observed, wherein the image produced in the LC display by temporary addressing of individual pixels still remains visible even after the electric field in these pixels has been switched off, or after other pixels have been addressed.

This "image sticking" can occur on the one hand if LC media having a low VHR are used. The UV component of daylight or the backlight can cause undesired decomposition reactions of the LC molecules therein and thus initiate the production of ionic or free-radical impurities. These may accumulate, in particular, at the electrodes or the alignment layers, where they may reduce the effective applied voltage.

Another problem observed in prior art is that LC media for use in displays, including but not limited to VA and FFS displays, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation but also to visible light from the backlight of a display, that usually does not emit UV light.

It is therefore an object of the present invention to provide improved LC media for use in VA-, IPS- or FFS displays, which do not exhibit the disadvantages described above or only do so to a small extent and have improved properties. A further object of the invention is to provide VA-, IPS- and FFS displays with good transmission, high reliability, a VHR value especially after backlight exposure, a high specific resistance, a large working-temperature range, short response times even at low temperatures, a low threshold voltage, a multiplicity of grey levels, high contrast and a broad viewing angle, and reduced image sticking.

It was found that one or more of these objects could be achieved by providing an LC medium as disclosed and claimed hereinafter.

The invention thus relates to an LC medium having negative dielectric anisotropy and comprising one or more compounds of formula IA

IA

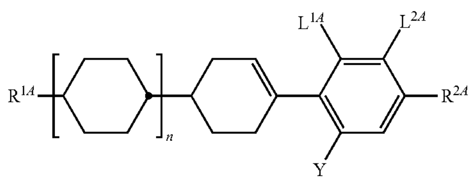

in which the individual radicals, on each occurrence identically or differently, and each, independently of one another, have the following meaning:

$R^{1A}$ an alkyl or alkoxy group having 1 to 12, preferably 1 to 6 C atoms, wherein one or more non-adjacent $CH_2$-groups are replaced by cyclopropyl, cyclobutyl or cyclopentyl, $R^{2A}$ straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

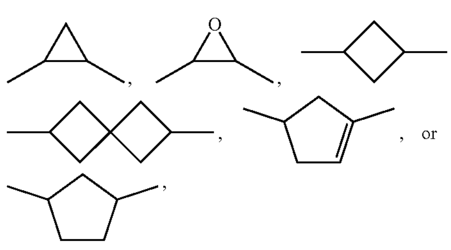

in such a manner that O- and/or S-atoms are not directly connected with each other, and wherein one or more H atoms are each optionally replaced by F or Cl, preferably alkyl or alkoxy having 1 to 6 C atoms, $L^{1A}$, $L^{2A}$ F, Cl, $CF_3$ or $CHF_2$, Y H, F, Cl, $CF_3$, $CHF_2$ or $CH_3$, preferably H or $CH_3$, particularly preferably H, n 0 or 1.

The invention further relates to the use of the LC medium as described above and below in LC displays, preferably in LC displays of the VA, IPS, FFS, UB-FFS or $UV^2A$ mode.

The invention furthermore relates to a process for preparing an LC medium as described above and below, comprising the steps of mixing one or more compounds of formula IA with one or more compounds of formula II or other compounds as described below and optionally with further LC compounds and/or additives.

The invention furthermore relates to an LC display comprising an LC medium according to the invention as described above and below, preferably an LC display of the VA, IPS, FFS, UB-FFS or $UV^2A$ mode.

The invention furthermore relates to a process for manufacturing an LC display as described above and below, comprising the steps of filling or otherwise providing an LC medium as described above and below between the substrates of the display.

The LC media according to the present invention show one or more of the following advantageous properties when used in LC displays:

- high transmittance,
- high contrast ratio,
- reduced image sticking,
- reduced ODF mura,
- reduced rotational viscosity,
- high reliability and high VHR value after UV exposure and/or heat treatment,
- fast response times,
- a favourably low ratio of rotational viscosity to the splay elastic constant $\gamma_1/K_1$, which contributes to improved switching behaviour especially at low driving voltages and is useful to enable energy-saving displays
- a low threshold voltage which is useful to enable energy-saving displays.

It was surprisingly found that the LC media according to the present invention show a favourable combination of low rotational viscosity, high birefringence and high average elastic constant $K_{avg}$. A low rotational viscosity and high birefringence enable to achieve fast LC media mixtures suitable for very small cell gaps. On the other hand an increased $K_{avg}$ enables the realisation of a low scattering parameter and thereby a high contrast ratio. Moreover, in terms of reliability the LC media according to the present invention show high VHR values and less or no undesired mura effects such as edge mura.

An alkenyl group in the compounds of the LC medium as disclosed below is not considered to be within the meaning of the term "polymerizable group" as used herein. The conditions for the polymerization of the polymerizable compounds of the LC medium are preferably selected such that alkenyl substituents do not participate in the polymerization reaction. Preferably the LC media disclosed and claimed in the present application do not contain an additive that initiates or enhances the participation of the alkenyl group in a polymerization reaction.

Unless stated otherwise, the compounds as disclosed above and below, except for the chiral dopants, are preferably selected from achiral compounds.

As used herein, the expression "UV light having a wavelength of" followed by a given range of wavelengths (in nm), or by a given lower or upper wavelength limit (in nm), means that the UV emission spectrum of the respective radiation source has an emission peak, which is preferably the highest peak in the respective spectrum, in the given wavelength range or above the given lower wavelength limit or below the given upper wavelength limit and/or that the UV absorption spectrum of the respective chemical compound has a long or short wavelength tail that extends into the given wavelength range or above the given lower wavelength limit or below the given upper wavelength limit.

As used herein, the term "substantially transmissive" means that the filter transmits a substantial part, preferably at least 50% of the intensity, of incident light of the desired wavelength(s). As used herein, the term "substantially blocking" means that the filter does not transmit a substantial part, preferably at least 50% of the intensity, of incident light of the undesired wavelengths. As used herein, the term "desired (undesired) wavelength" e.g. in case of a band pass filter means the wavelengths inside (outside) the given range of λ, and in case of a cut-off filter means the wavelengths above (below) the given value of λ.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display), and will be understood to be inclusive of "pretilt" and "pretilt angle". The tilt angle here denotes the average angle (<90°) between the longitudinal molecular axes of the LC molecules (LC director) and the surface of the plane-parallel outer plates which form the LC cell. A low absolute value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

An SA-VA display according to the present invention will be of the polymer stabilised mode as it contains, or is manufactured by use of, an LC medium containing RMs like those described below. Consequently as used herein, the term "SA-VA display" when referring to a display according to the present invention will be understood to refer to a polymer stabilised SA-VA display even if not explicitly mentioned.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

Above and below,

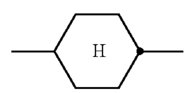

denotes a trans-1,4-cyclohexylene ring, and

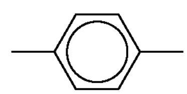

denotes a 1,4-phenylene ring.

In a group

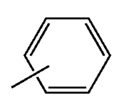

the single bond shown between the two ring atoms can be attached to any free position of the benzene ring.

If in the formulae shown above and below a terminal group like $R^{1A, 2A}$, $R^1$, $R^2$, $R^{11, 12, 13}$, $R^{21,22}$, $R^{31, 32}$, $R^{41,42}$, $R^{51,52}$, $R^{61,62}$, $R^{71,72}$, $R^{81,82,83}$, $R^Q$, $R^0$, R, $R^M$, $R^S$, $R^{S1,S2,S3,S4}$ or L denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

If one of the aforementioned terminal groups denotes an alkyl radical wherein one or more $CH_2$ groups are replaced by S, this may be straight-chain or branched. It is preferably straight-chain, has 1, 2, 3, 4, 5, 6 or 7 C atoms and accordingly preferably denotes thiomethyl, thioethyl, thiopropyl, thiobutyl, thiopentyl, thiohexyl or thioheptyl.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If one of the aforementioned terminal groups denotes an alkoxy or oxaalkyl group it may also contain one or more additional oxygen atoms, provided that oxygen atoms are not linked directly to one another.

If one of the aforementioned terminal groups denotes an alkyl radical in which one $CH_2$ group has been replaced by —CH═CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If one of the aforementioned terminal groups denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In another preferred embodiment, one or more of the aforementioned terminal groups, like $R^{1A, 2A}$, $R^1$, $R^2$, $R^{11,12,13}$, $R^{31,32}$, $R^{41,42}$, $R^{51,52}$, $R^{61,62}$, $R^{71,72}$, $R^{81,82,83}$, $R^Q$, $R^0$, R, $R^M$, $R^S$, $R^{S1,S2,S3,S4}$ or L are selected from the group consisting of

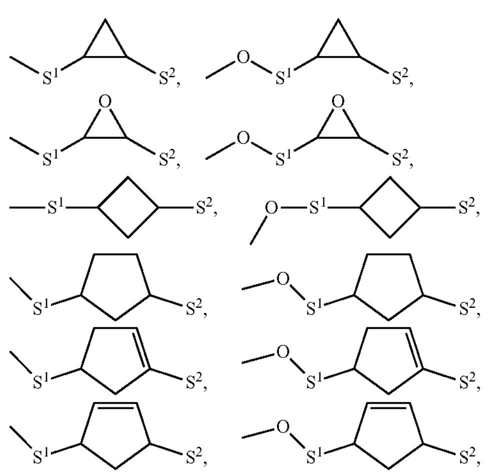

—$S^1$—F, —O—$S_1$—F, —O—$S_1$—O—$S_2$, wherein $S_1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

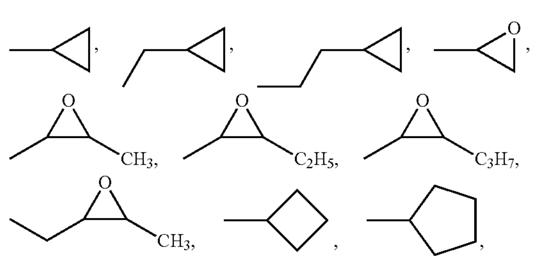

-continued

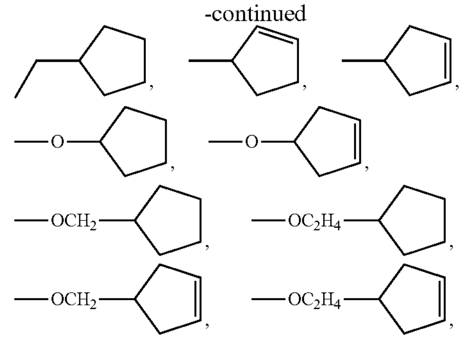

—$O(CH_2)OCH_3$, —$O(CH_2)_3OCH_3$, —$O(CH_2)_4OCH_3$, —$O(CH_2)_2F$, —$O(CH_2)_3F$, —$O(CH_2)_4F$.

Halogen is preferably F or Cl, very preferably F.

The group —$CR^0$═$CR^{00}$— is preferably —CH═CH—.

—CO—, —C(═O)— and —C(O)— denote a carbonyl group, i.e.

Preferred substituents L, are, for example, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

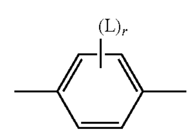

is preferably

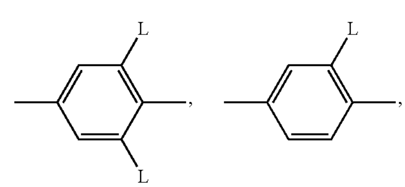

-continued

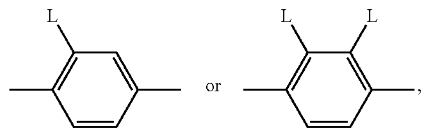

in which L has one of the meanings indicated above.

In the compounds of formula IA and its subformulae, $R^{2A}$ preferably denotes alkoxy with 1, 2, 3, 4, 5 or 6 C atoms, very preferably ethoxy.

In the compounds of formula IA $L^{1A}$ and $L^{2A}$ preferably denote F or Cl, very preferably F.

In the compounds of formula IA Y preferably denotes H or $CH_3$, very preferably H.

In the compounds of formula IA $R^{1A}$ is preferably selected from the following groups:

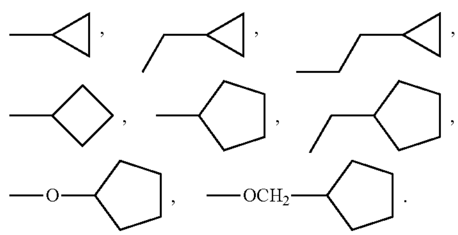

Preferred compounds of formula IA are those selected from the group consisting of the following subformulae:

IA1

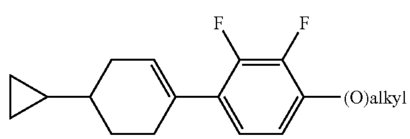

IA2

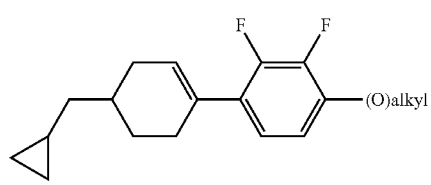

IA3

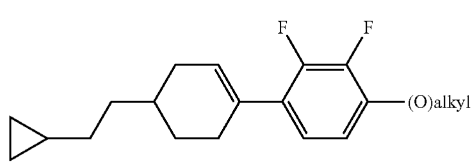

IA4

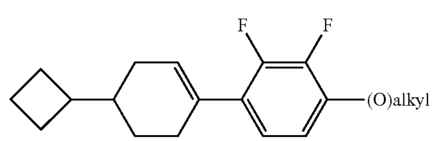

IA5

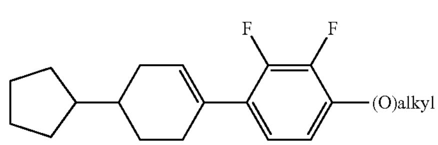

-continued

IA6

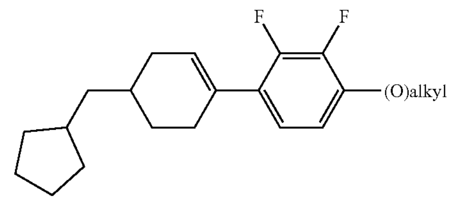

IA7

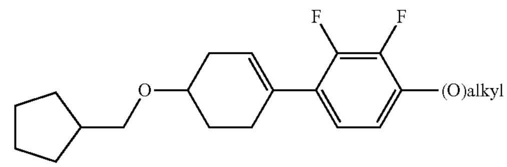

IA8

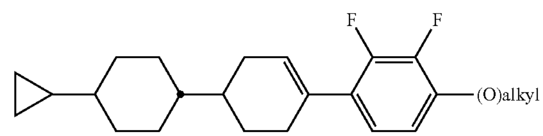

IA9

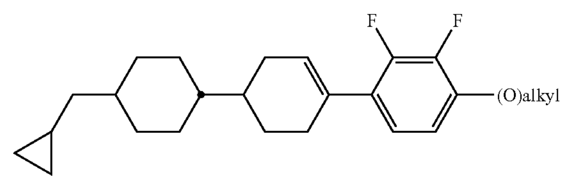

IA10

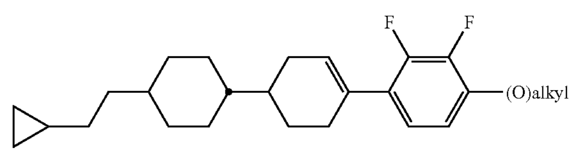

IA11

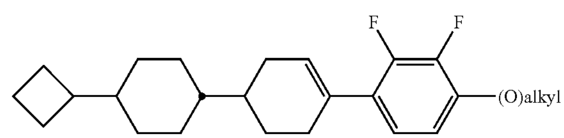

IA12

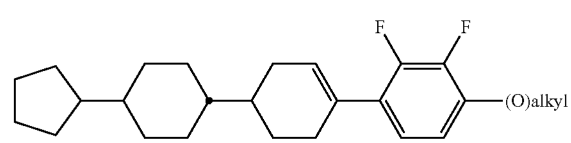

IA13

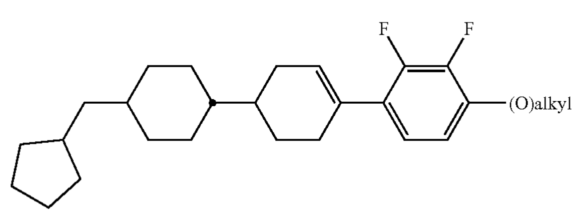

-continued

IA14

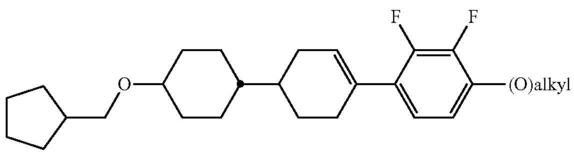

wherein (O) denotes an oxygen atom or a single bond and "alkyl" is an alkyl group with 1 to 6 C atoms, and (0)alkyl preferably denotes ethoxy.

Very preferred are the compounds of formula IA2, IA5, IA6, IA7, IA9, IA12, IA13 and IA14, most preferred the compounds of formula IA5 and IA12.

Preferably the total proportion of the compounds of formula IA or its subformulae in the LC medium is from 1 to 25%, very preferably from 2 to 20%, most preferably from 2 to 15% by weight.

Further preferred embodiments of the LC medium according to the present invention are listed below, including any combination thereof:

Preferably the LC medium further comprises one or more compounds of formula II,

II

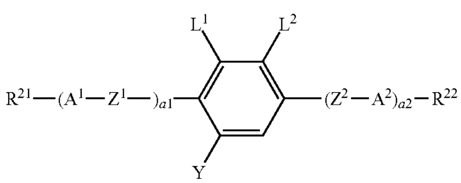

wherein the individual radicals, independently of each other and on each occurrence identically or differently, have the following meanings $R^{21}$ and $R^{22}$ H, straight chain, branched or cyclic alkyl or alkoxy having 1 to 20 C atoms, wherein one or more non-adjacent $CH_2$-groups are optionally replaced by —O—, —S—, —CO—, —CO—O—, —O—CO—, —O—CO—O—, $CR^0$═$CR^{00}$—, —C≡C—,

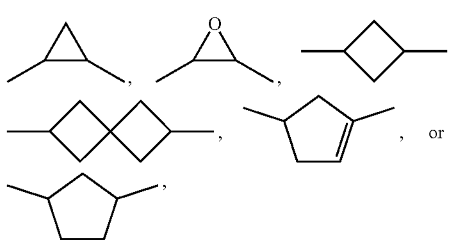

in such a manner that O- and/or S-atoms are not directly connected with each other, and wherein one or more H atoms are each optionally replaced by F, Cl, CN or $CF_3$, preferably alkyl or alkoxy having 1 to 6 C atoms, $R^0$, $R^{00}$ H or alkyl having 1 to 12 C atoms, $A^1$ and $A^2$ a group selected from the following formulae

A1

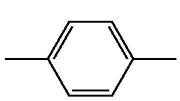

-continued

A2

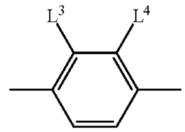

A3

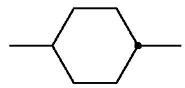

A4

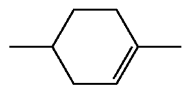

A5

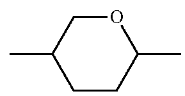

A6

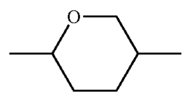

A7

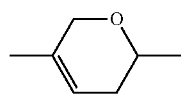

A8

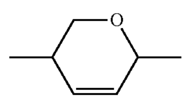

A9

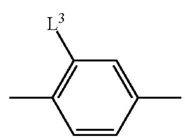

A10

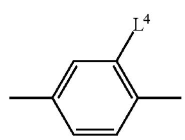

A11

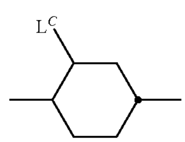

A12

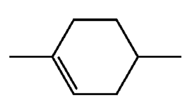

A13

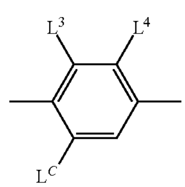

A14

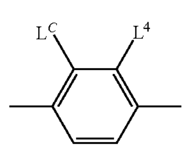

-continued

A15

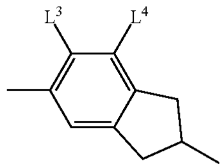

A16

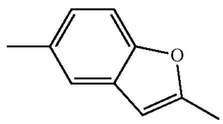

preferably from formulae A1, A2, A3, A4, A5, A6, A9 and A10, very preferably from formulae A1, A2, A3, A4, A5, A9 and A10, $Z^1$ and $Z^2$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$— or a single bond, preferably a single bond, $L^1$, $L^2$, $L^3$ and $L^4$ F, Cl, $OCF_3$, $CF_3$, $CH_3$, $CH_2F$ or $CHF_2$, preferably F or Cl, very preferably F, Y H, F, Cl, $CF_3$, $CHF_2$ or $CH_3$, preferably H or $CH_3$, very preferably H, $L^C$ $CH_3$ or $OCH_3$, preferably $CH_3$, a1 0, 1 or 2, a2 0 or 1.

Preferably the LC medium comprises one or more compounds of formula II selected from the group consisting of compounds of the formulae IIA, IIB, IIC and IID,

IIA

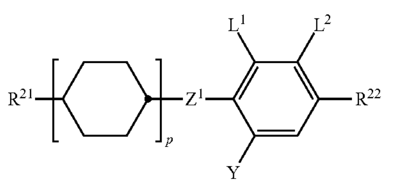

IIB

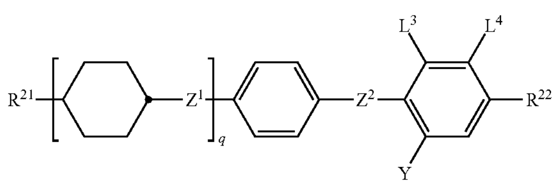

IIC

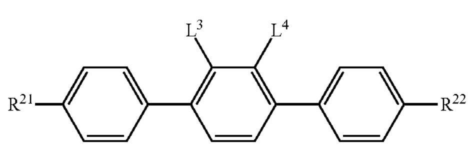

IID

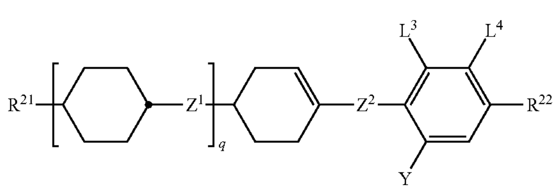

in which the individual radicals, on each occurrence identically or differently, and each, independently of one another, have the following meaning:

$R^{21}$, $R^{22}$ H, an alkyl, alkoxy or alkenyl radical having up to 15 C atoms which is unsubstituted or monosubstituted by F, Cl, CN or $CF_3$ and where, in addition, one or more $CH_2$ groups in these radicals may be replaced by —O—, —S—, —C≡C—, —$CF_2O$—, —$OCF_2$—, —OC—O—, —O—CO—

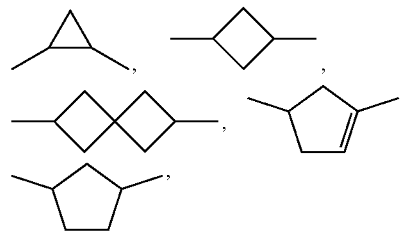

in such a way that O- and/or S-atoms are not linked directly to one another, $L^1$ to $L^4$ F, Cl, $CF_3$ or $CHF_2$, Y H, F, Cl, $CF_3$, $CHF_2$ or $CH_3$, preferably H or $CH_3$, particularly preferably H, $Z^1$, $Z^2$ a single bond, —$CH_2CH_2$—, —CH═CH—, —$CF_2O$—, —$OCF_2$—, —$CH_2O$—, —$OCH_2$—, —COO—, —OCO—, —$C_2F_4$—, —CF═CF—, —CH═$CHCH_2O$, p 0, 1 or 2, and q 0 or 1, wherein in formula IID, if $Z^1$ and $Z^2$ denote a single bond, then $R^{21}$ is different from cyclic alkyl or alkoxy.

Preferred compounds of the formulae IIA, IIB, IIC and IID are those wherein $R^{22}$ denotes an alkyl or alkoxy radical having up to 15 C atoms, and very preferably denotes $(O)C_vH_{2v+1}$ wherein (O) is an oxygen atom or a single bond and v is 1, 2, 3, 4, 5 or 6.

Further preferred compounds of the formulae IIA, IIB, IIC and IID are those wherein $R^{21}$ or $R^{22}$ denotes or contains a cycloalkyl or cycloalkoxy radical, preferably selected from the group consisting of

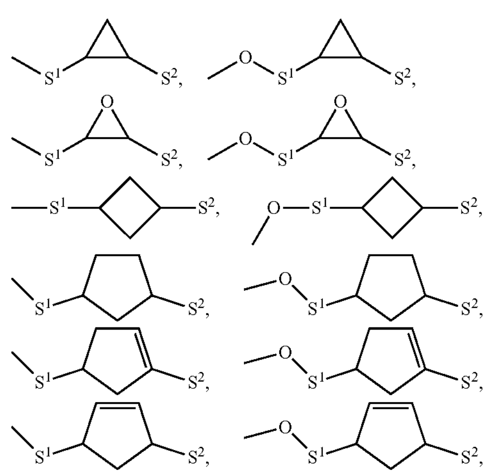

wherein $S^1$ is $C_{1-12}$-alkylene or $C_{2-12}$-alkenylene and $S^2$ is H, $C_{1-12}$-alkyl or $C_{2-12}$-alkenyl, and very preferably are selected from the group consisting of

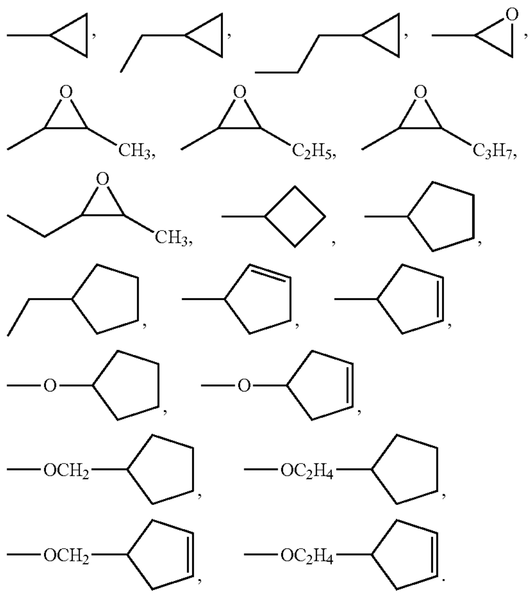
Further preferred compounds of the formulae IIA, IIB, IIC and IID are indicated below.
In a preferred embodiment the LC medium comprises one or more compounds of the formula IIA selected from the group consisting of the following formulae:
IIA-1
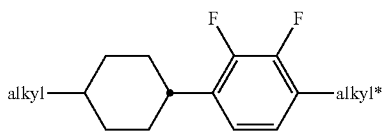
IIA-2
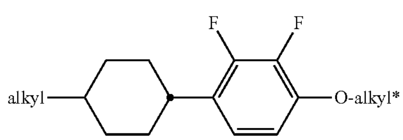
IIA-3
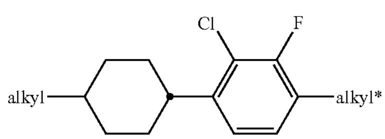
IIA-4
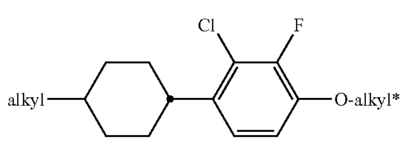
IIA-5
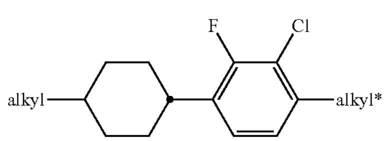
IIA-6
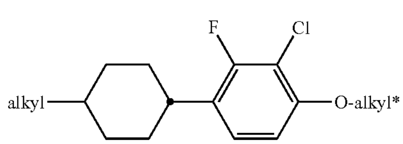
-continued
IIA-7
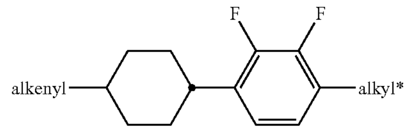
IIA-8
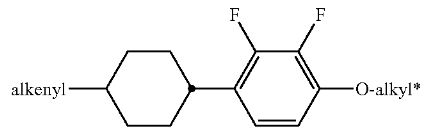
IIA-9
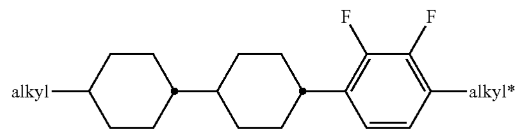
IIA-10
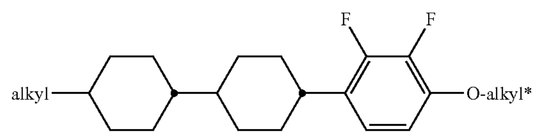
IIA-11
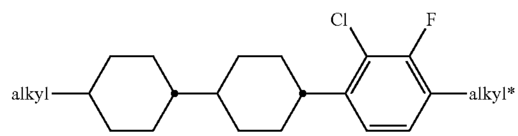
IIA-12
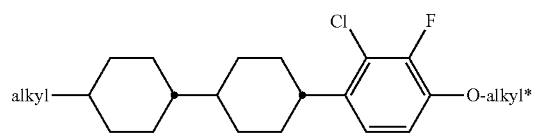
IIA-13
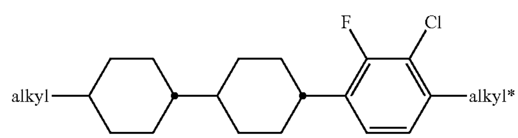
IIA-14
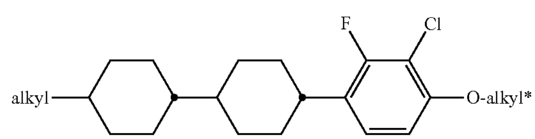
IIA-15
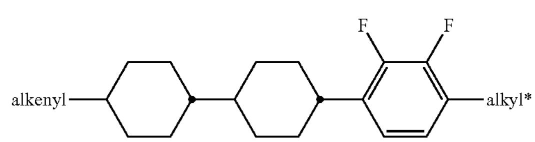
IIA-16
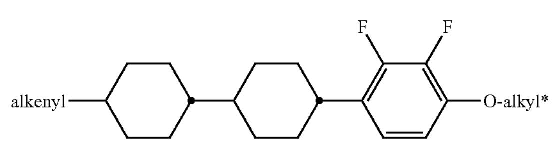

-continued
IIA-17
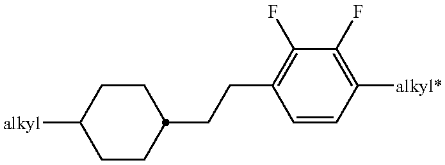
IIA-18
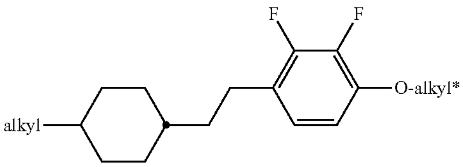
IIA-19
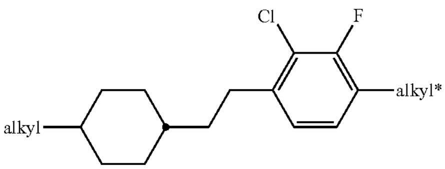
IIA-20
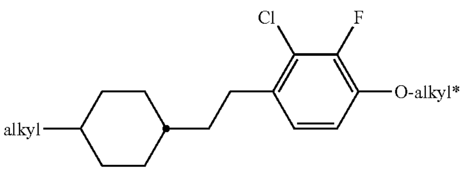
IIA-21
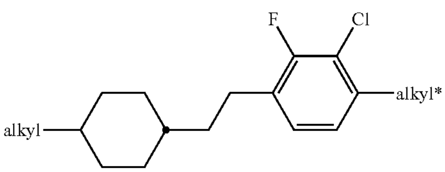
IIA-22
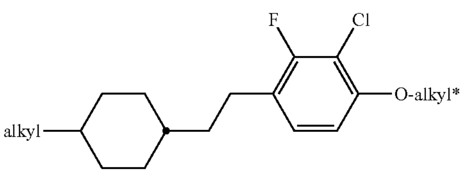
IIA-23
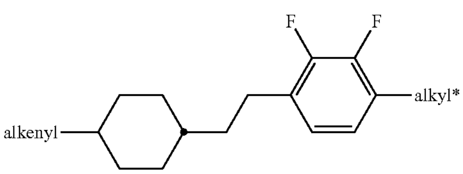
IIA-24
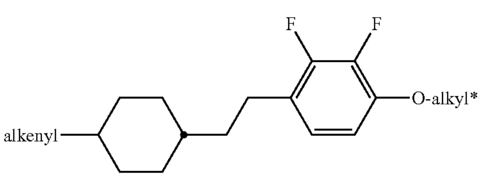
IIA-25
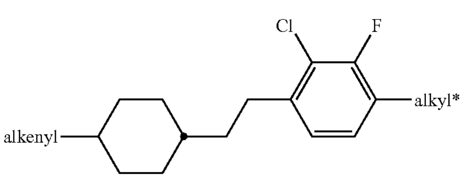
-continued
IIA-26
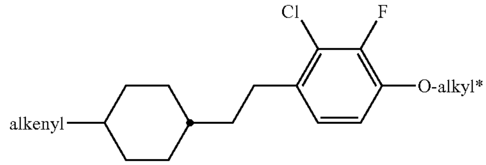
IIA-27
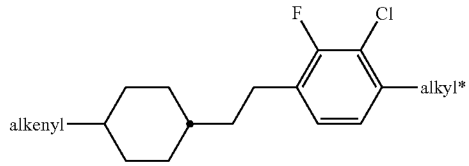
IIA-28
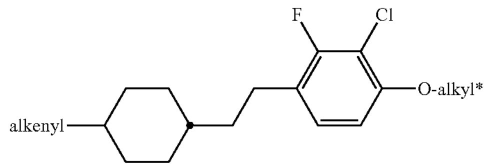
IIA-29
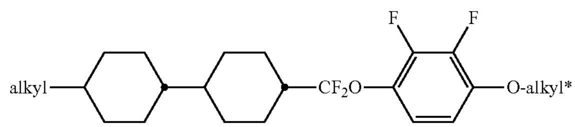
IIA-30
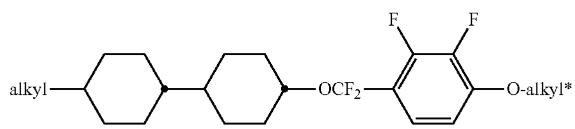
IIA-31
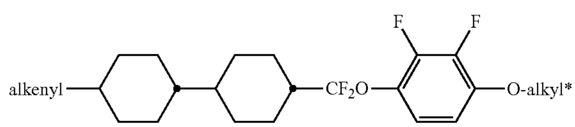
IIA-32
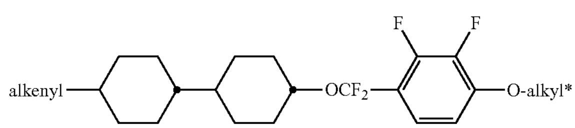
IIA-33
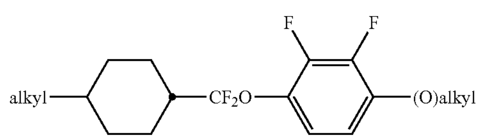
IIA-34
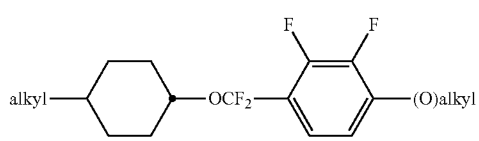

-continued
IIA-35
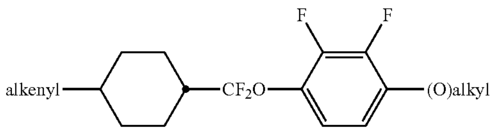
IIA-36
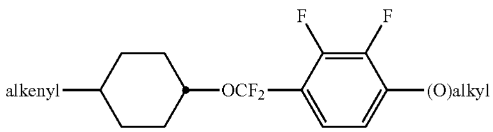
IIA-37
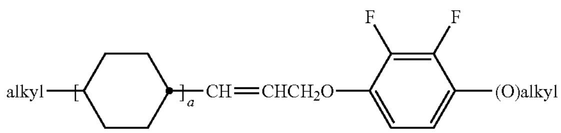
IIA-38
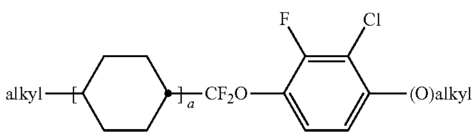
IIA-39
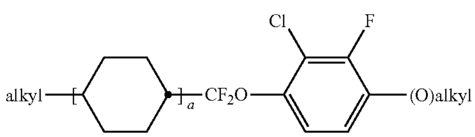
IIA-40
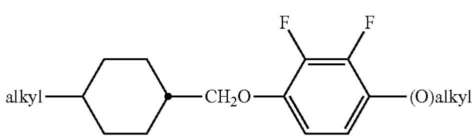
IIA-41
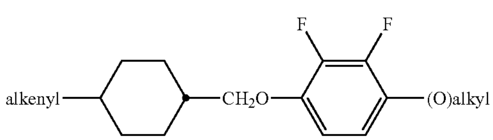
IIA-42
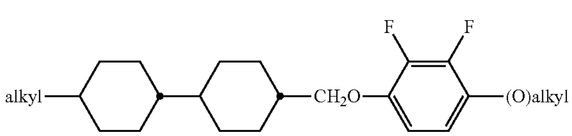
IIA-43
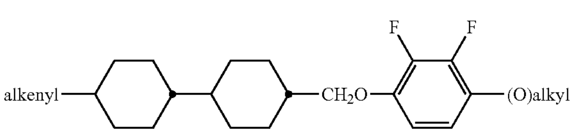
IIA-44
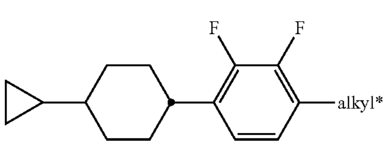
-continued
IIA-45
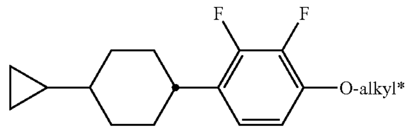
IIA-46
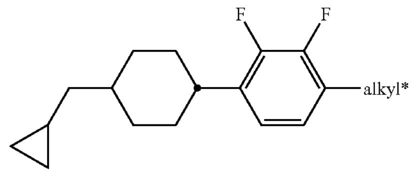
IIA-47
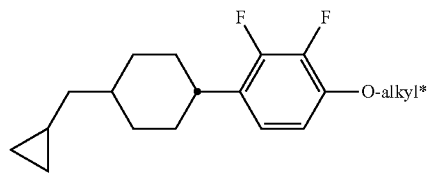
IIA-48
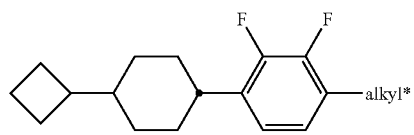
IIA-49
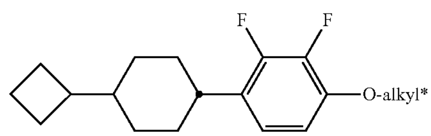
IIA-50
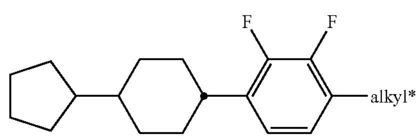
IIA-51
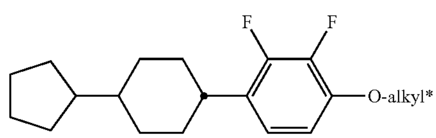
IIA-52
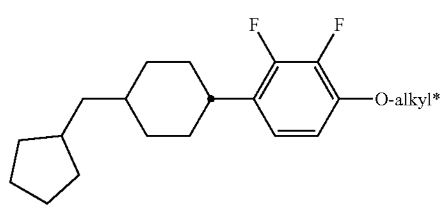
IIA-53
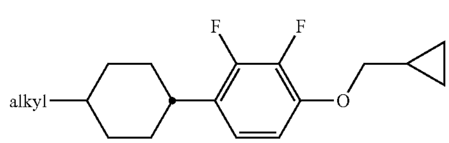
IIA-54
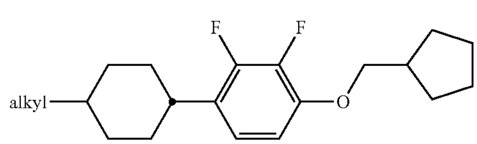

-continued
IIA-55
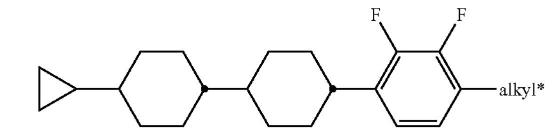
IIA-56
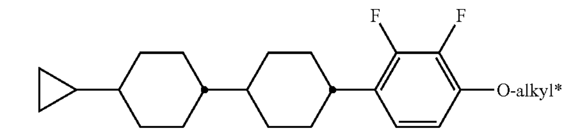
IIA-57
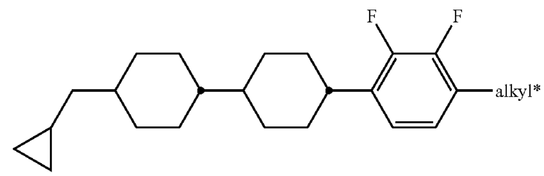
IIA-58
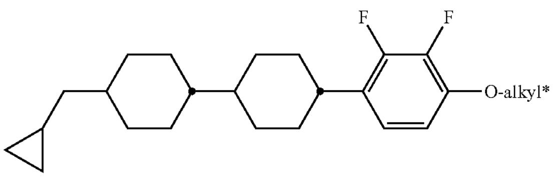
IIA-59
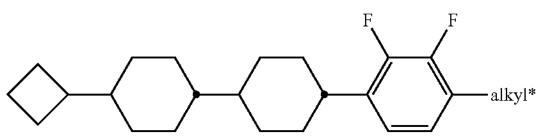
IIA-60
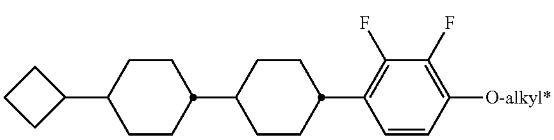
IIA-61
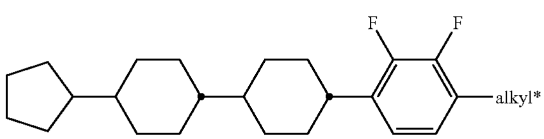
IIA-62
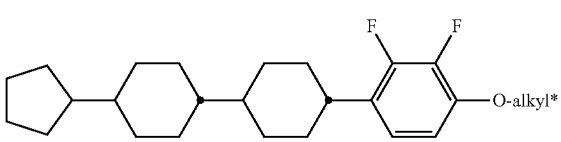
IIA-63
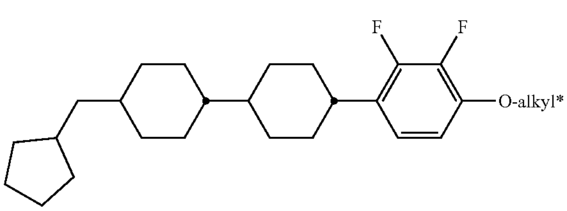
-continued
IIA-64
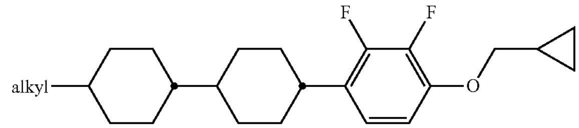
IIA-65
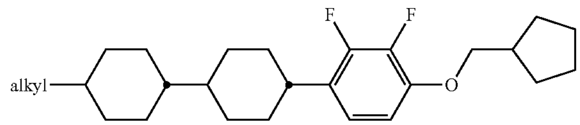
IIA-66
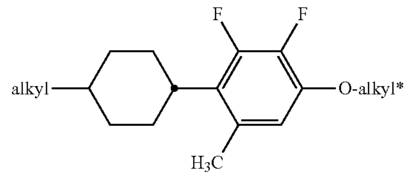
IIA-67
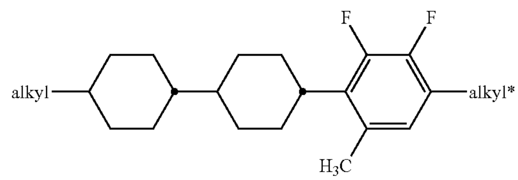
IIA-68
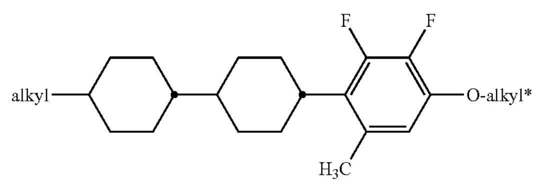
IIA-69
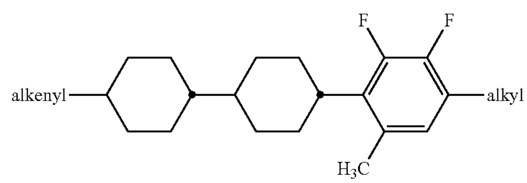
IIA-70
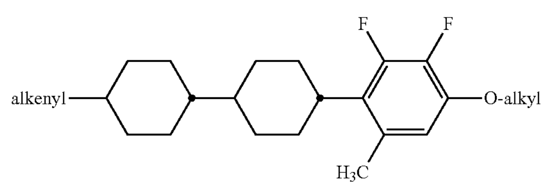
IIA-71
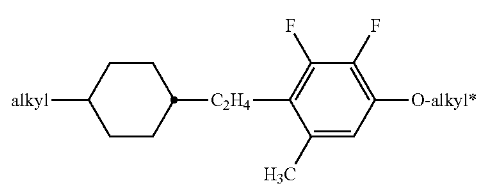

-continued

IIA-72

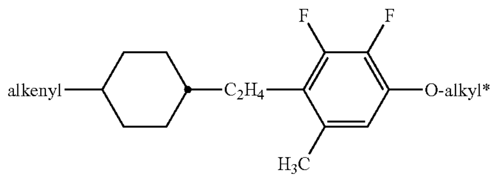

IIA-73

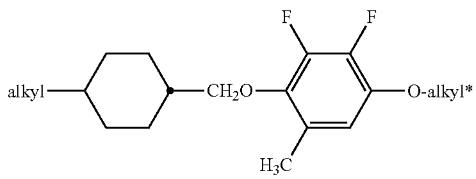

IIA-74

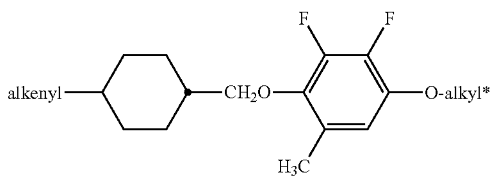

IIA-75

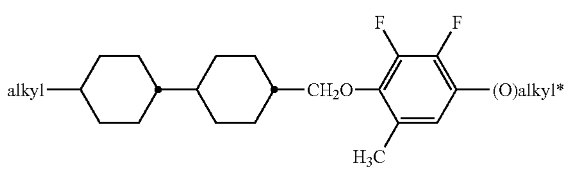

IIA-76

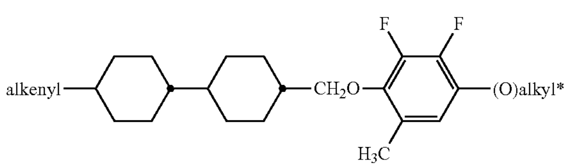

IIA-77

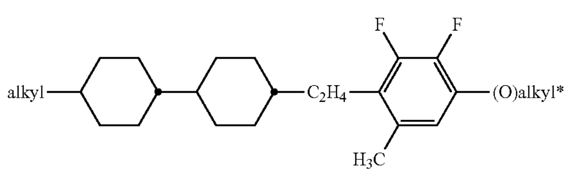

IIA-78

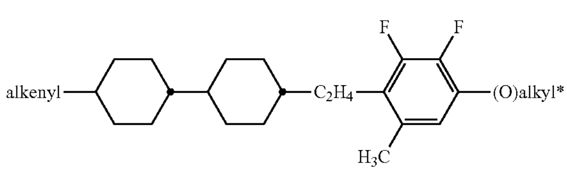

in which the index a denotes 1 or 2, alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond, and alkenyl preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred LC media according to the invention comprise one or more compounds selected from the group consisting of formulae IIA-2, IIA-8, IIA-10, IIA-16, II-18, IIA-40, IIA-41, IIA-42 and IIA-43.

In another preferred embodiment the LC medium comprises one or more compounds of the formula IIB selected from the group consisting of formulae IIB-1 to IIB-26,

IIB-1

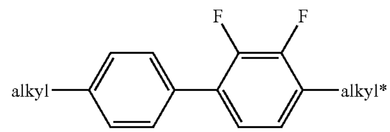

IIB-2

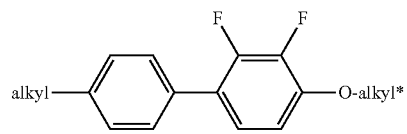

IIB-3

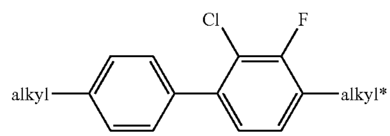

IIB-4

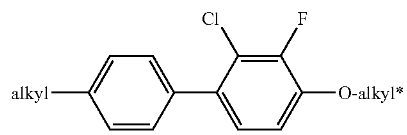

IIB-5

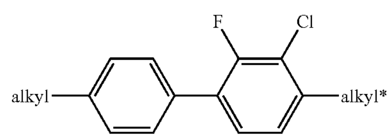

IIB-6

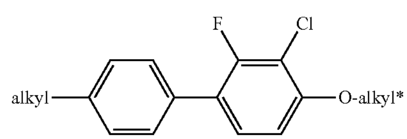

IIB-7

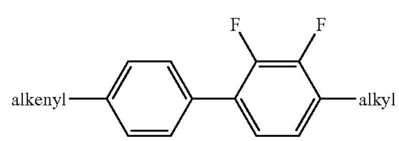

IIB-8

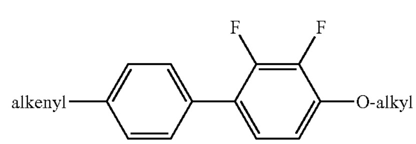

IIB-9

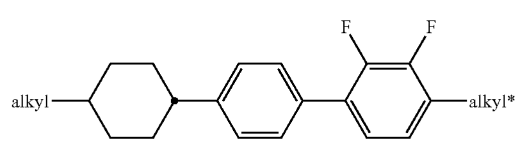

IIB-10

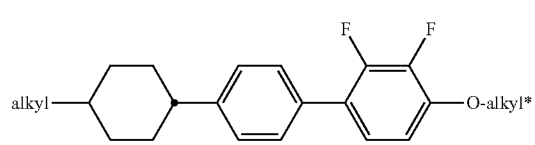

-continued
IIB-11
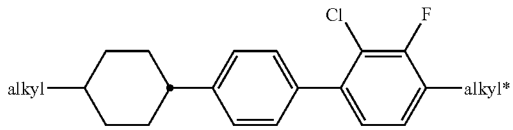
IIB-12
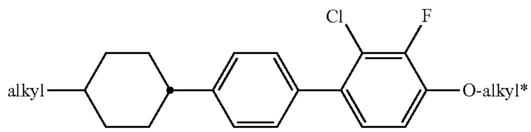
IIB-13
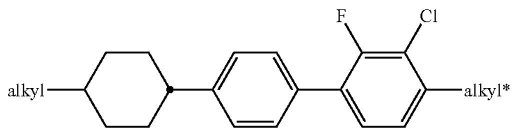
IIB-14
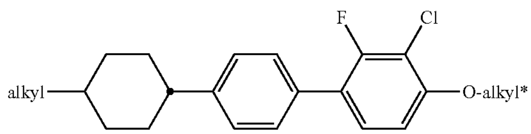
IIB-15
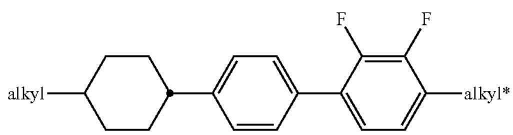
IIB-16
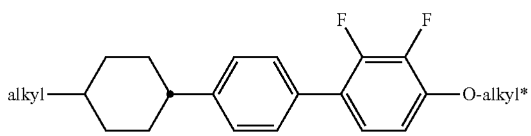
IIB-17
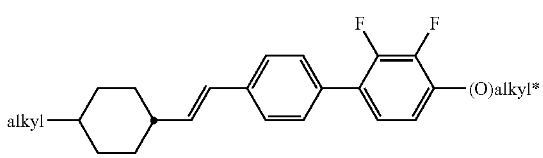
IIB-18
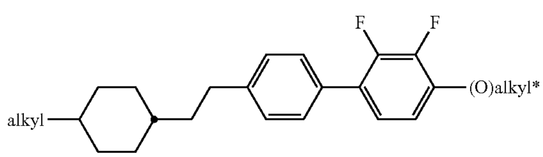
IIB-19
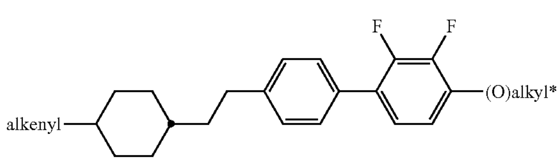
IIB-20
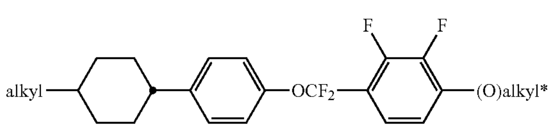
-continued
IIB-21
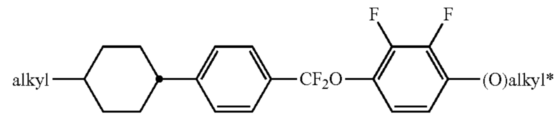
IIB-22
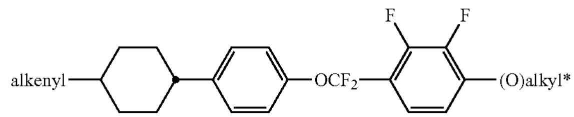
IIB-23
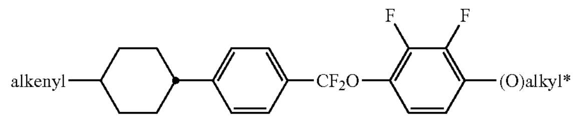
IIB-24
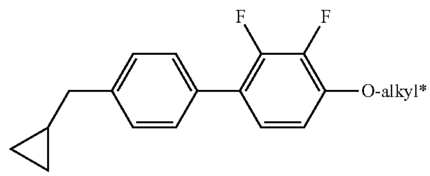
IIB-25
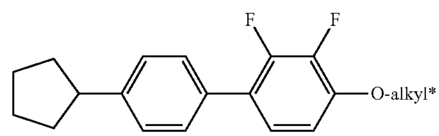
IB-26
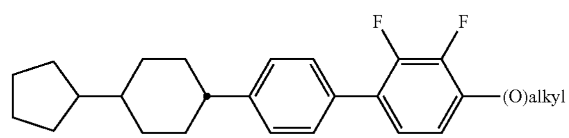
IIB-27
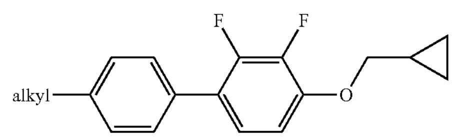
IIB-28
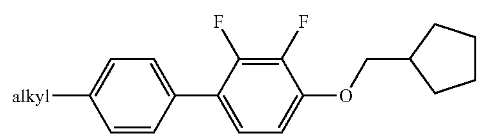
IIB-29
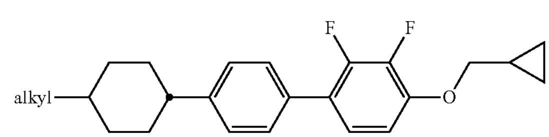
IIB-30
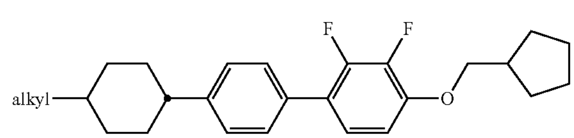
in which alkyl and alkyl* each, independently of one another, denote a straight-chain alkyl radical having 1-6 C atoms, alkenyl denotes a straight-chain alkenyl radical having 2-6 C atoms, and (O) denotes an oxygen atom or a single bond, and alkenyl preferably denotes $CH_2=CH—$, $CH_2=CHCH_2CH_2—$, $CH_3—CH=CH—$, $CH_3—CH_2—CH=CH—$, $CH_3—(CH_2)_2—CH=CH—$, $CH_3—(CH_2)_3—CH=CH—$ or $CH_3—CH=CH—(CH_2)_2—$.

Particularly preferred LC media according to the invention comprise one or more compounds selected from the group consisting of formulae IIB-2, IIB-10 and IIB-16.

In another preferred embodiment the LC medium comprises one or more compounds of the formula IIC selected from the formula IIC-1,

IIC-1

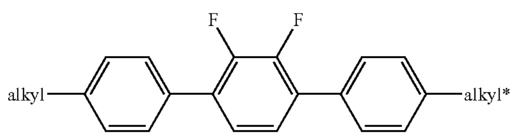

in which alkyl and alkyl* each, independently of one another, denote a straight-chain alkyl radical having 1-6 C atoms, preferably in amounts of 0.5% to 5% by weight, in particular 1% to 3% by weight.

In another preferred embodiment the LC medium comprises one or more compounds of the formula IID selected from the group consisting of the following formulae,

IID-1

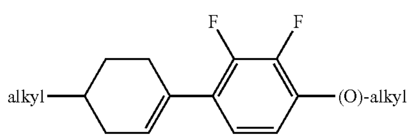

IID-2

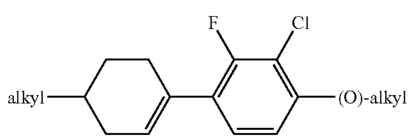

IID-3

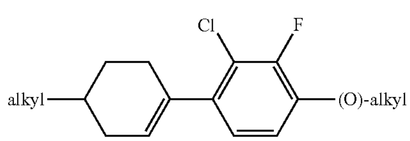

IID-4

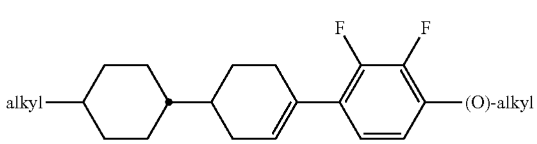

IID-5

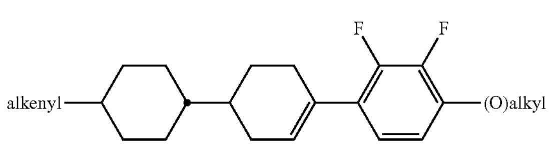

IID-6

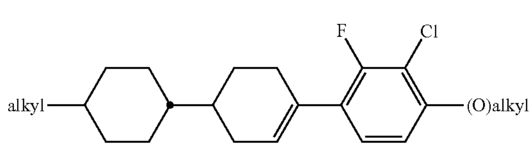

-continued

IID-7

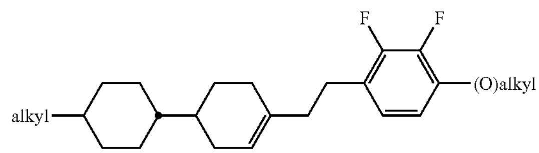

IID-8

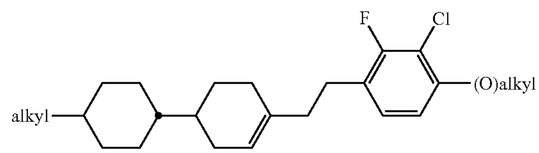

IID-9

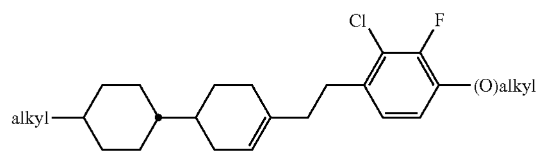

IID-10

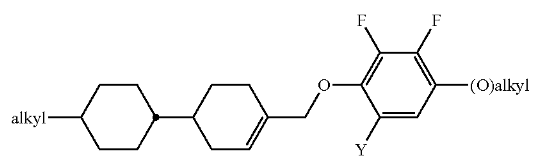

IID-11

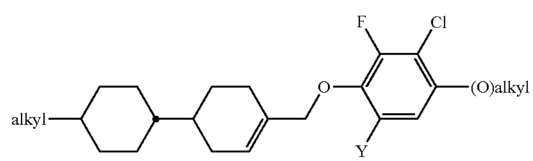

IID-12

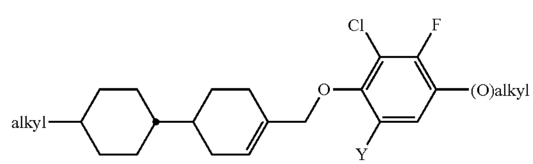

IID-13

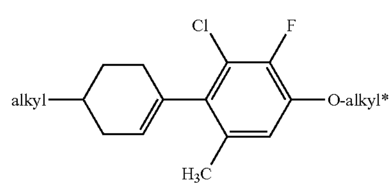

IID-14

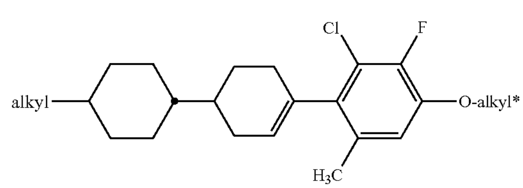

IID-15

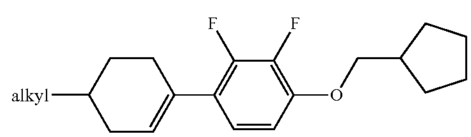

-continued

IID-16

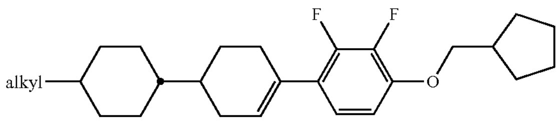

in which alkyl and alkyl* each, independently of one another, denote a straight-chain alkyl radical having 1-6 C atoms, alkenyl denotes a straight-chain alkenyl radical having 2-6 C atoms, (O) denotes an oxygen atom or a single bond, Y denotes H or $CH_3$ and alkenyl preferably denotes $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Particularly preferred LC media according to the invention comprise one or more compounds of the formula IID-1 and/or IID-4.

Very preferred compounds of the formula IID are compounds selected from the following subformulae,

IID-10-1

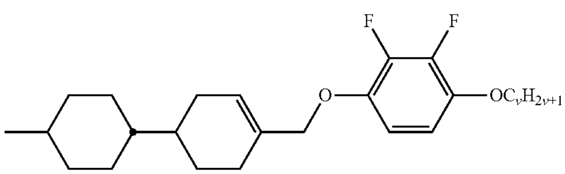

IID-10-2

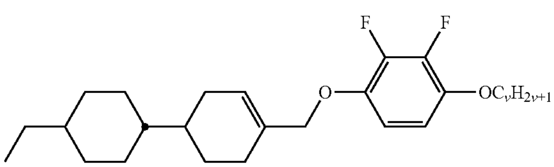

IID-10-3

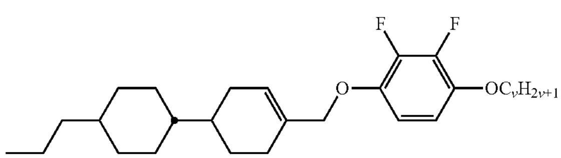

IID-10-4

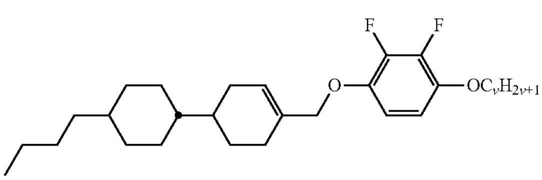

IID-10-5

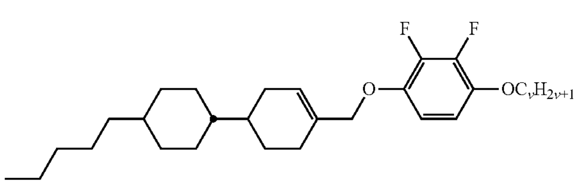

-continued

IID-10-6

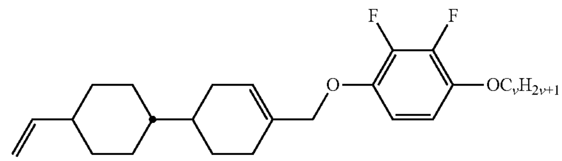

IID-10-7

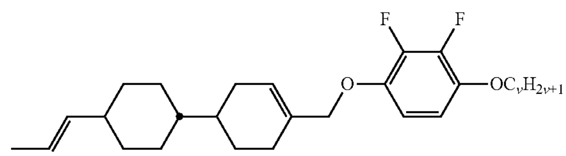

IID-10-8

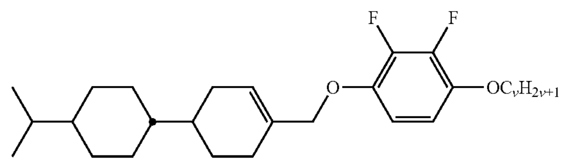

IID-10-9

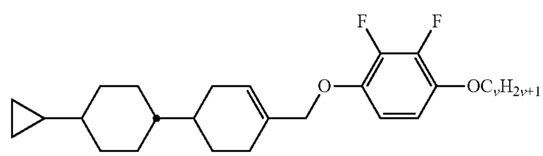

IID-10-10

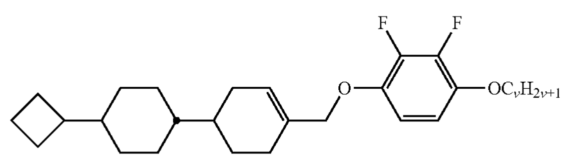

IID-10-11

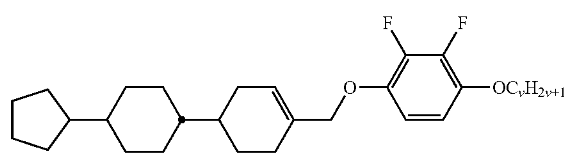

IID-10-12

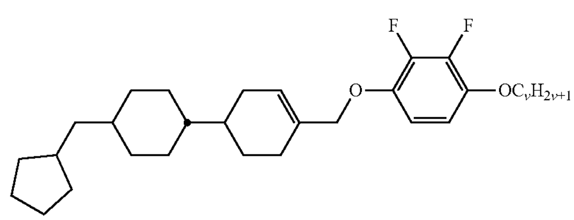

IID-10-13

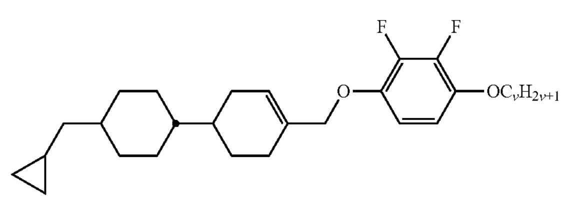

-continued
IID-10-14
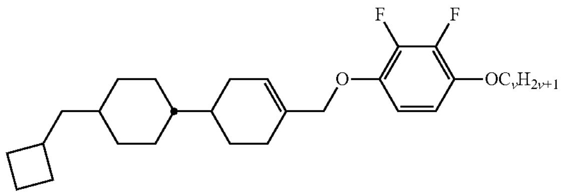
IID-10-15
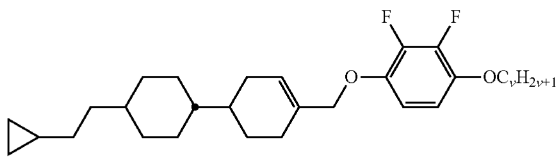
IID-10-16
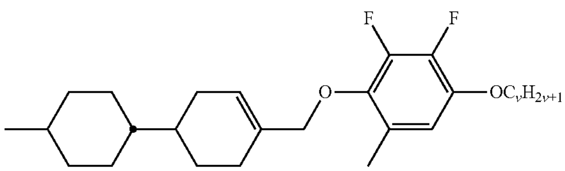
IID-10-17
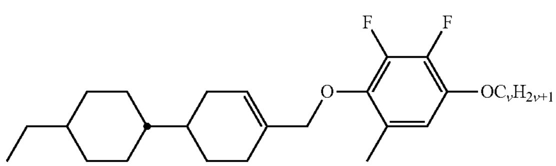
IID-10-18
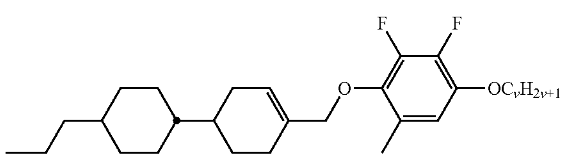
IID-10-19
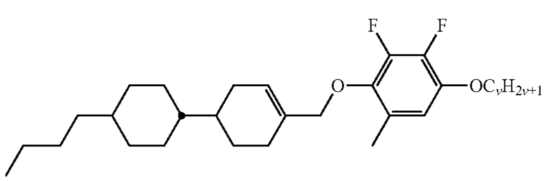
IID-10-20
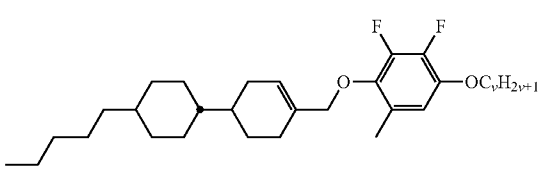
IID-10-21
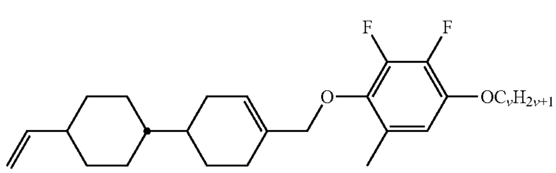
-continued
IID-10-22
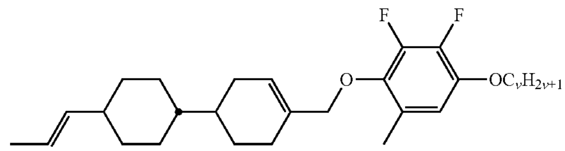
IID-10-23
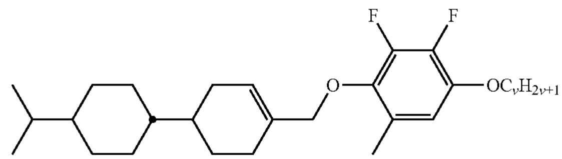
IID-10-24
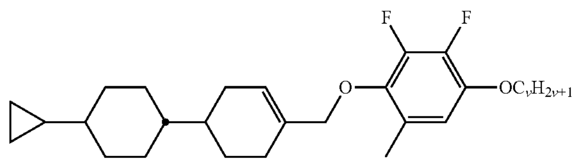
IID-10-25
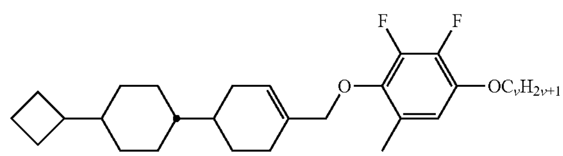
IID-10-26
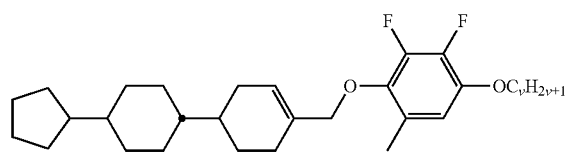
IID-10-27
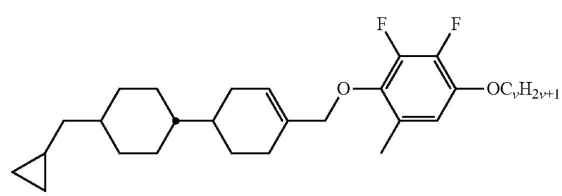
IID-10-28
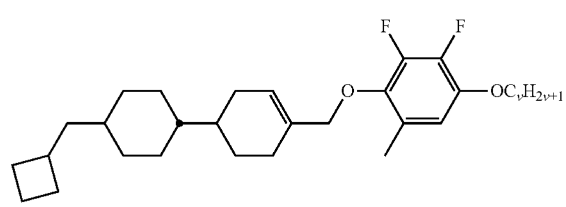
IID-10-29
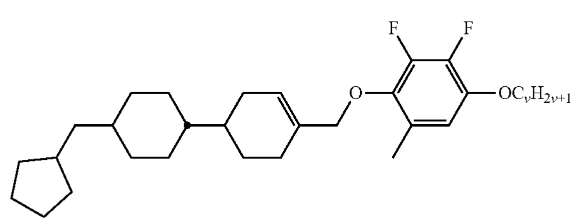

-continued
IID-10-30
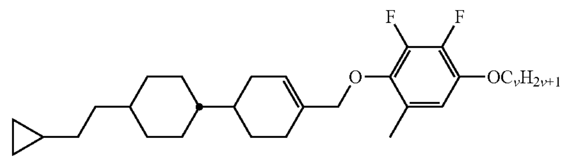
IID-10-31
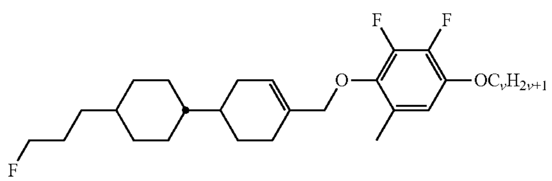
IID-10-32
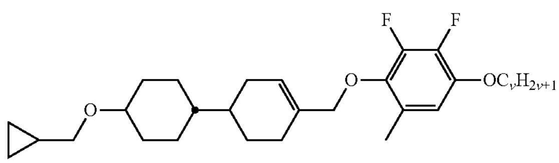
wherein v is 1, 2, 3, 4, 5 or 6.
In a preferred embodiment, the LC medium comprises one or more compounds of formula IID-10a
IID-10a
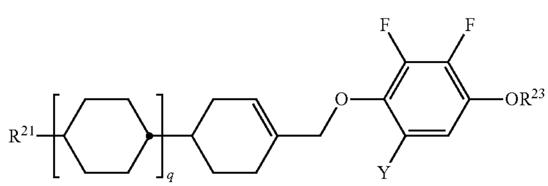
in which $R^{21}$, Y and q have the meanings given in formula IID, and $R^{23}$ is
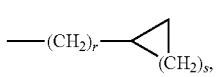
in which r is 0, 1, 2, 3, 4, 5 or 6 and s is 1, 2 or 3.
Preferred compounds of formula IID-10a are selected from the following subformulae:
IID-10a-1
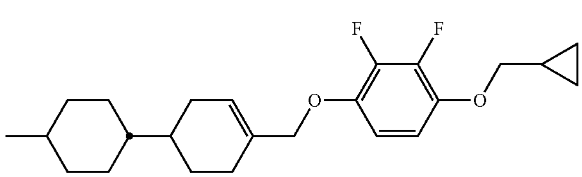
-continued
IID-10a-2
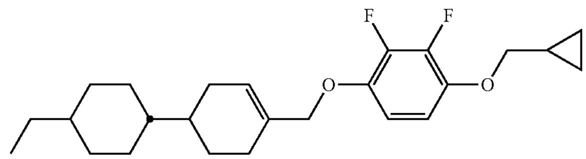
IID-10a-3
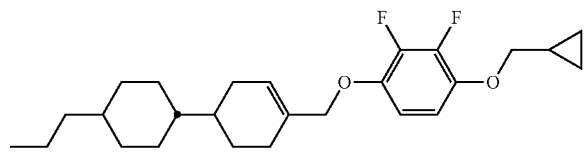
IID-10a-4
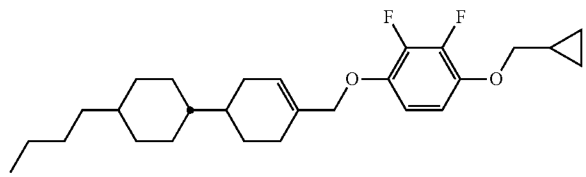
IID-10a-5
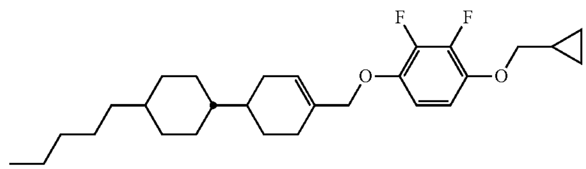
IID-10a-6
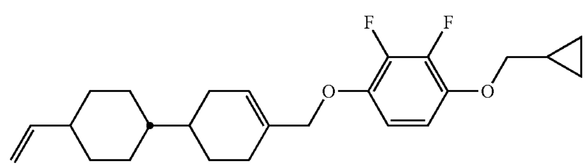
IID-10a-7
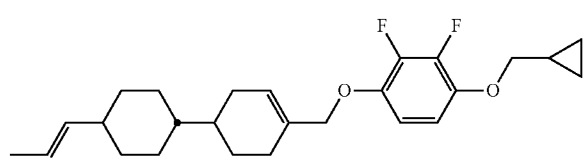
IID-10a-8
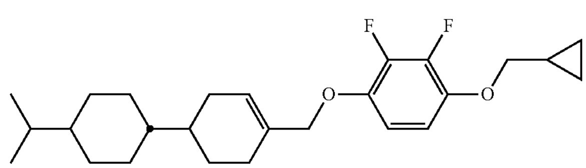
IID-10a-9
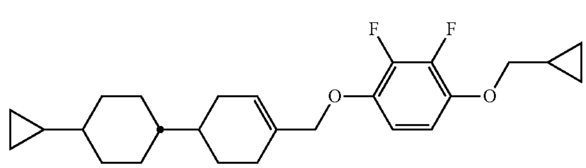

-continued
IID-10a-10
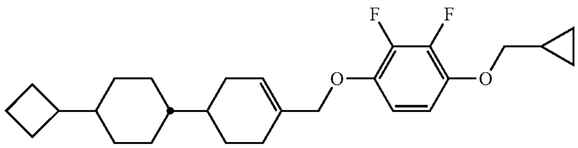
IID-10a-11
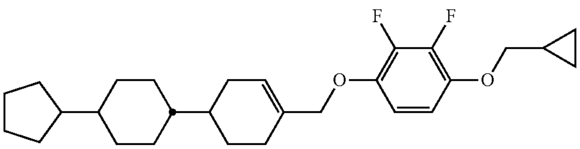
IID-10a-12
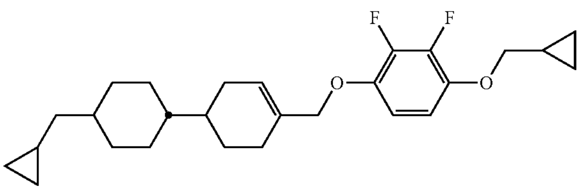
IID-10a-13
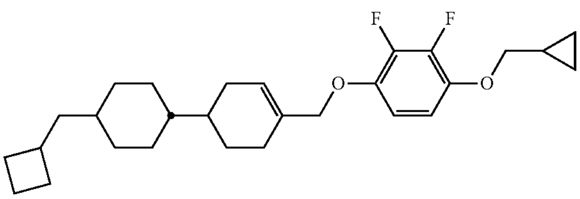
IID-10a-14
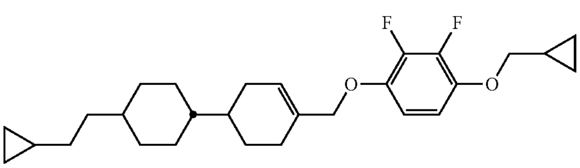
IID-10a-15
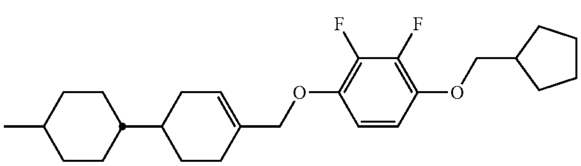
IID-10a-16
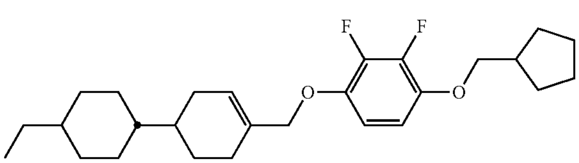
IID-10a-17
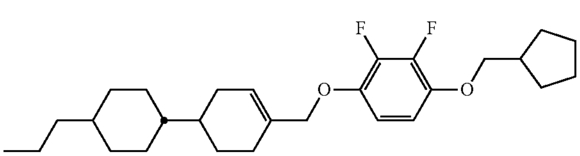
-continued
IID-10a-18
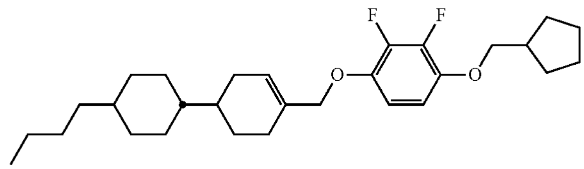
IID-10a-19
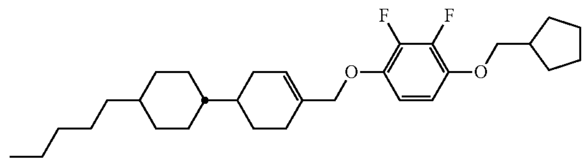
IID-10a-20
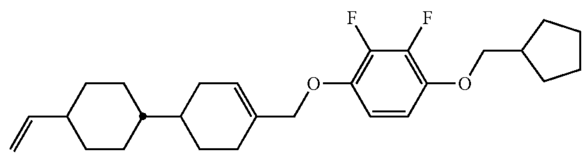
IID-10a-21
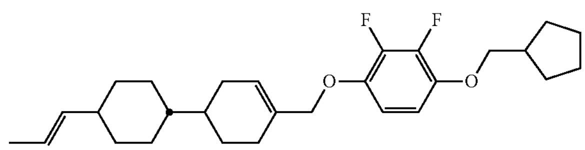
IID-10a-22
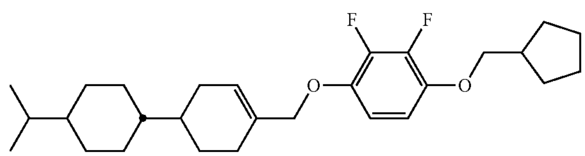
IID-10a-23
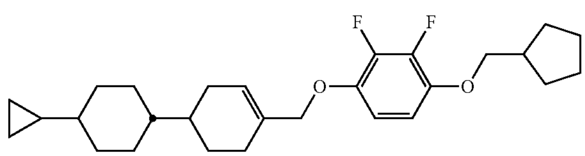
IID-10a-24
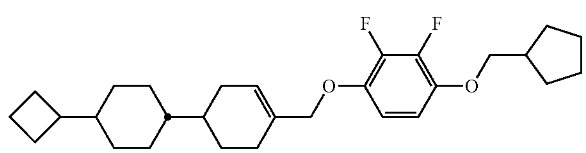
IID-10a-25
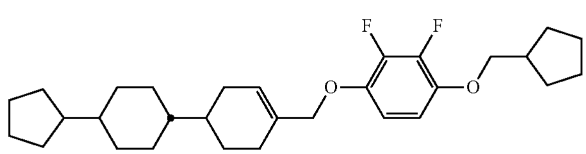
IID-10a-26
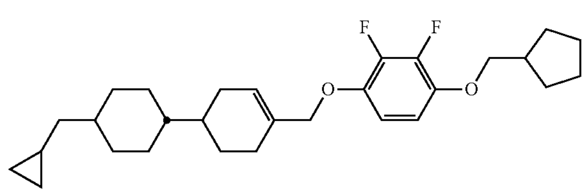

-continued

IID-10a-27

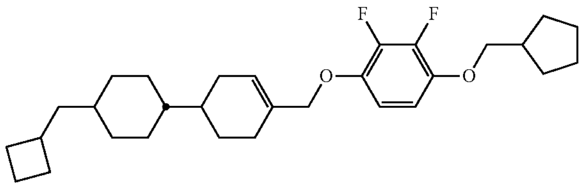

IID-10a-28

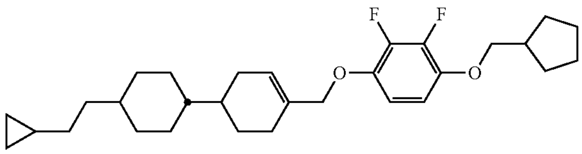

Particularly preferred LC media according to the invention comprise one or more compounds selected from the formulae IIA-2, IIA-8, IIA-10, IIA-16, 11-18, IIA-40, IIA-41, IIA-42, IIA-43, IIB-2, IIB-10, IIB-16, IIC-1, and IID-4 and IID-10 or their subformulae.

The proportion of compounds of the formulae IIA and/or IIB in the mixture as a whole is preferably at least 20% by weight.

Preferably, the LC medium comprises one or more compounds of the formula IIA-2 selected from the following subformulae:

IIA-2-1

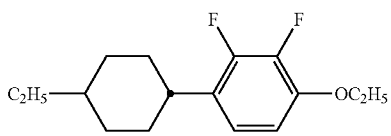

IIA-2-2

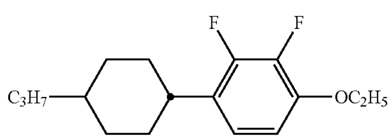

IIA-2-3

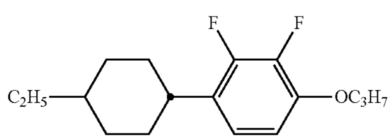

IIA-2-4

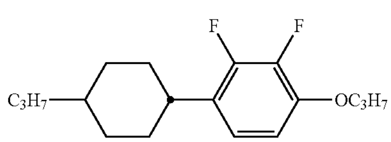

IIA-2-5

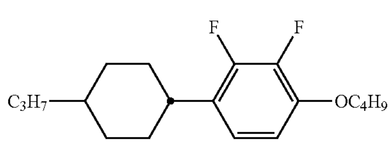

Alternatively, preferably in addition to the compounds of the formulae IIA-2-1 to IIA-2-5, the LC medium comprises one or more compounds of the following formulae:

IIA-2a-1

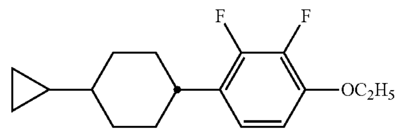

IIA-2a-2

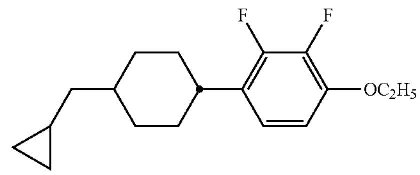

IIA-2a-3

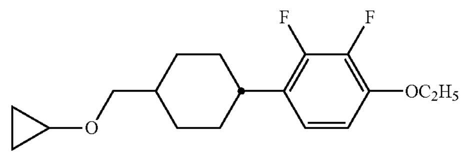

IIA-2a-4

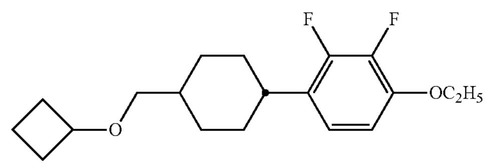

IIA-2a-5

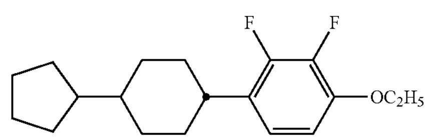

IIA-2a-6

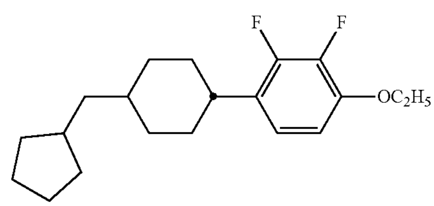

Further preferably, the LC medium comprises one or more compounds of the formula IIA-10 selected from the following sub-formulae:

IIA-10-1

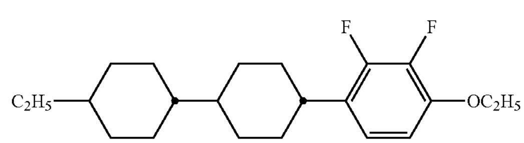

IIA-10-2

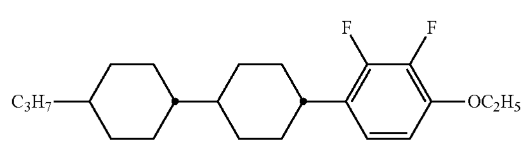

-continued

IIA-10-3

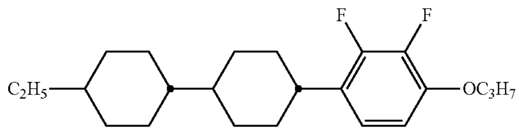

IIA-10-4

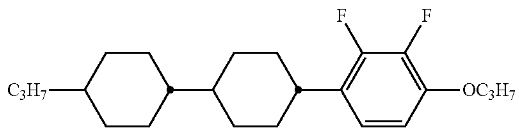

IIA-10-5

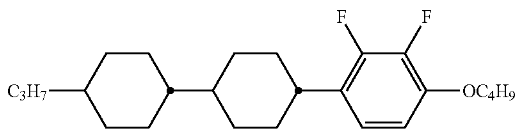

Alternatively, preferably in addition to the compounds of the formulae IIA-10-1 to IIA-10-5, the LC medium comprises one or more compounds of the following formulae:

IIA-10a-1

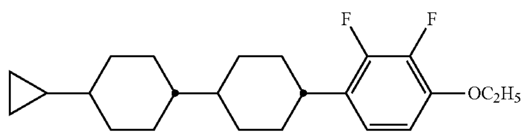

IIA-10a-2

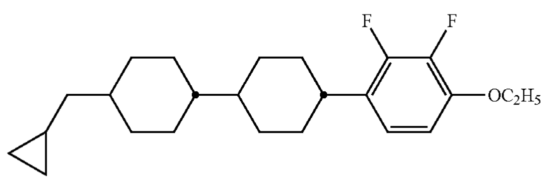

IIA-10a-3

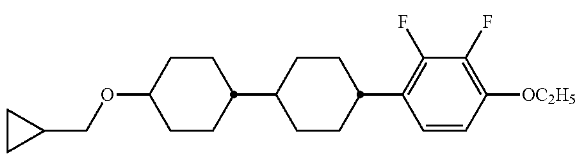

IIA-10a-4

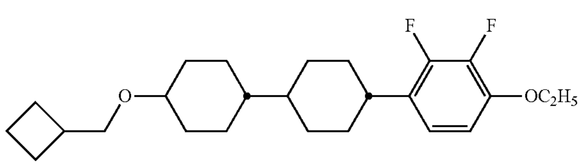

IIA-10a-5

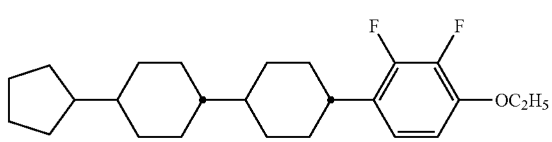

-continued

IIA-10a-6

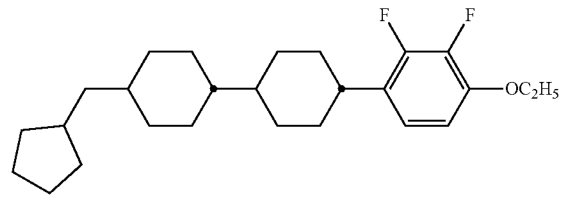

Preferably, the LC medium comprises one or more compounds of the formula IIB-10 selected from the following sub-formulae:

IIB-10-1

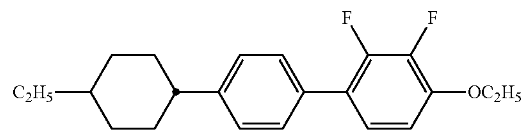

IIB-10-2

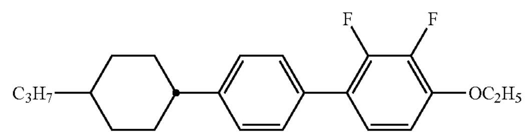

IIB-10-3

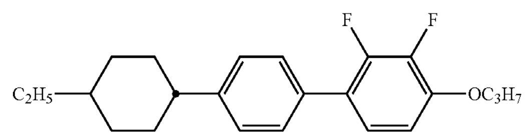

IIB-10-4

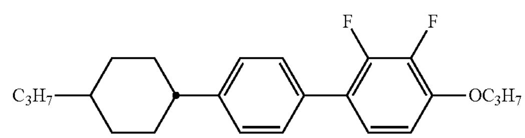

IIB-10-5

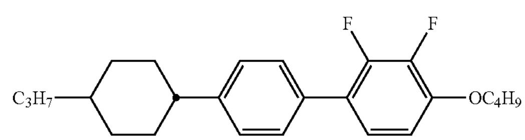

Alternatively, preferably in addition to the compounds of the formulae IIB-10-1 to IIB-10-5, the LC medium comprises one or more compounds of the following formulae:

IIB-10a-1

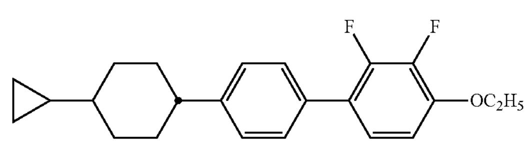

-continued

IIB-10a-2

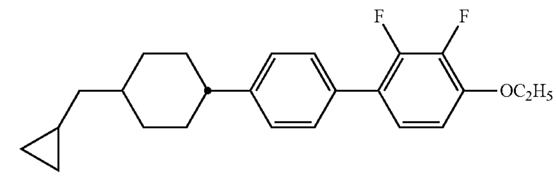

IIB-10a-3

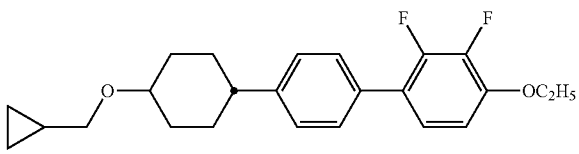

IIB-10a-4

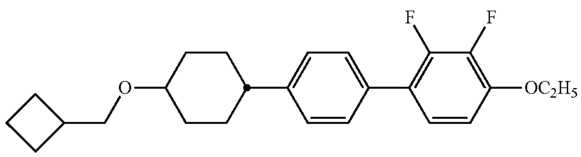

IIB-10a-5

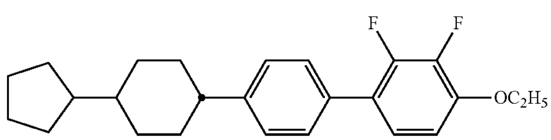

IIB-10a-6

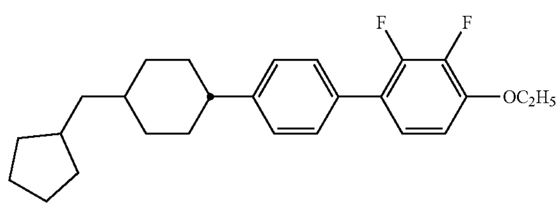

In another preferred embodiment the LC medium comprises one or more compounds of formula III,

III

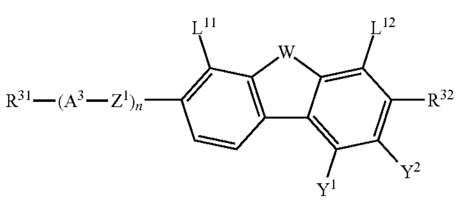

in which $R^{31}$ and $R^{32}$ each, independently of one another, denote H, an alkyl, alkoxy or alkenyl radical having up to 15 C atoms which is unsubstituted, monosubstituted by F, Cl, CN or $CF_3$ or at least monosubstituted by halogen, where, in addition, one or more $CH_2$ groups in these radicals may be replaced by —O—, —S—,

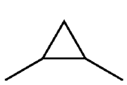 , 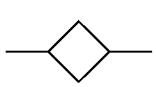 ,

-continued

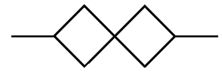 , 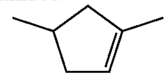 ,

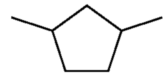 ,

—C≡C—, —$CF_2$O—, —O$CF_2$—, —OC—O— or —O—CO— in such a way that O atoms are not linked directly to one another, $Y^1$, $Y^2$ H, F, Cl, $CF_3$, $CHF_2$, $CH_3$ or $OCH_3$, preferably H, $CH_3$ or $OCH_3$, very preferably H, $A^3$ on each occurrence, independently of one another, denotes a) 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, or c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms, n denotes 0, 1 or 2, preferably 0 or 1, $Z^1$ on each occurrence independently of one another denotes —CO—O—, —O—CO—, —$CF_2$O—, —O$CF_2$—, —$CH_2$O—, —O$CH_2$—, —$CH_2$—, —$CH_2CH_2$—, —$(CH_2)_4$—, —CH═CH—$CH_2$O—, —$C_2F_4$—, —$CH_2CF_2$—, —$CF_2CH_2$—, —CF═CF—, —CH═CF—, —CF═CH—, —CH═CH—, —CC— or a single bond, and $L^{11}$ and $L^{12}$ each, independently of one another, denote F, Cl, $CF_3$ or $CHF_2$, preferably H or F, most preferably F, and W denotes O or S.

In the compounds of formula III $R^{31}$ and $R^{32}$ are preferably selected from straight-chain alkyl or alkoxy with 1 to 12, preferably 1 to 7 C atoms, straight-chain alkenyl with 2 to 12, preferably 2 to 7 C atoms and cyclic alkyl or alkoxy with 3 to 12, preferably 3 to 8 C atoms.

In a preferred embodiment of the present invention the LC medium comprises one or more compounds of formula III selected from the subformulae III-1 and III-2,

III-1

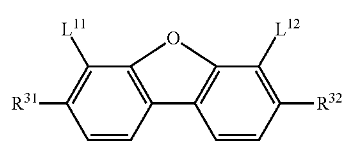

III-2

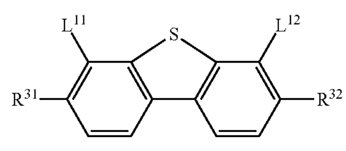

in which the occurring groups have the same meanings as given under formula III above and preferably $R^{31}$ and $R^{32}$ each, independently of one another, an alkyl, alkenyl or alkoxy radical having up to 15 C atoms, more preferably one or both of them denote an alkoxy radical and $L^{11}$ and $L^{12}$ each preferably denote F.

In another preferred embodiment the LC medium comprises one or more compounds of the formula III-1 selected from the group of compounds of subformulae III-1-1 to III-1-10, preferably of formula III-1-6,

III-1-1

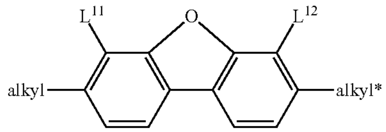

III-1-2

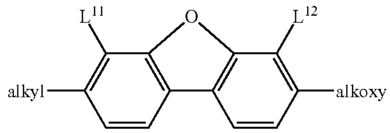

III-1-3

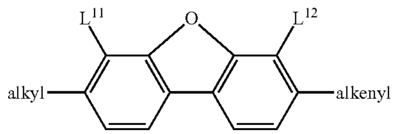

III-1-4

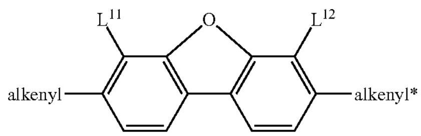

III-1-5

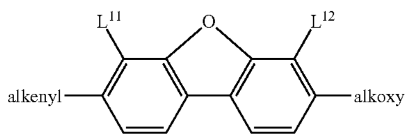

III-1-6

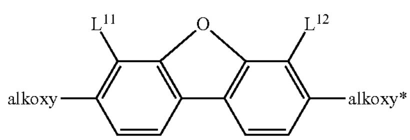

III-1-7

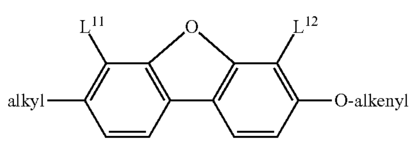

III-1-8

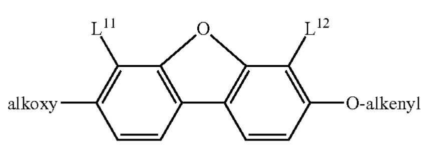

III-1-9

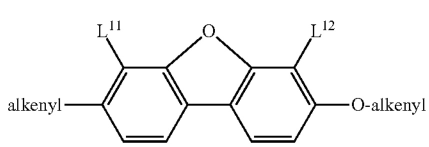

III-1-10

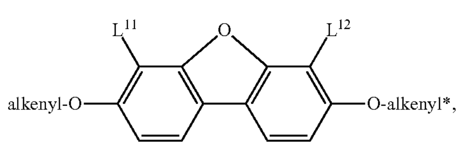

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

In another preferred embodiment the LC medium comprises one or more compounds of the formula III-2 selected from the group of compounds of subformulae III-2-1 to III-2-10, preferably of subformula III-2-1,

III-2-1

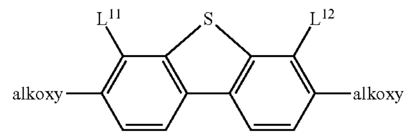

III-2-2

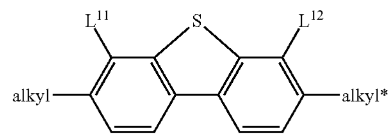

III-2-3

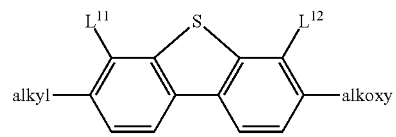

III-2-4

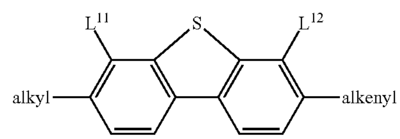

III-2-5

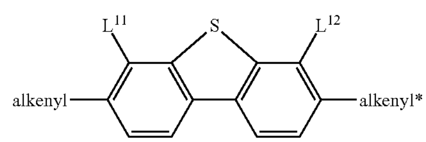

III-2-6

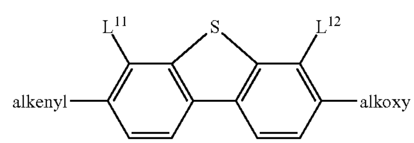

III-2-7

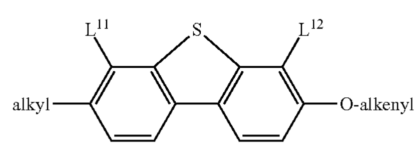

III-2-8

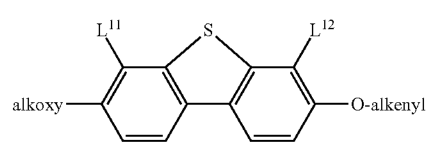

III-2-9

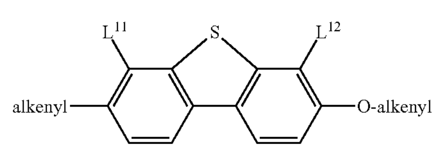

-continued

III-2-10

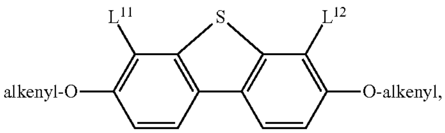

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

Very preferred compounds of formula III-2 are selected from the group consisting of the following subformulae,

III-2-1-1

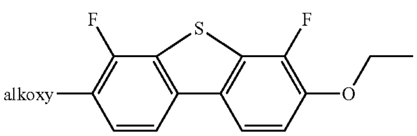

III-2-1-2

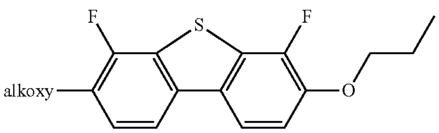

III-2-1-3

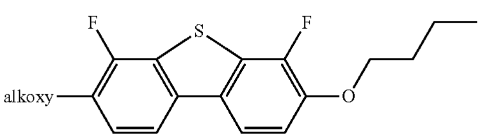

III-2-1-4

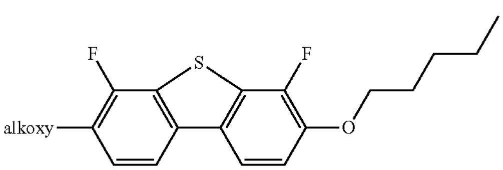

III-2-1-5

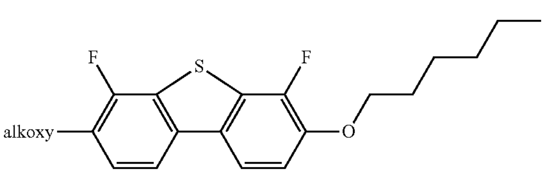

in which alkoxy denotes a straight-chain alkoxy radical having 1-6 C atoms, preferably ethoxy, propoxy, butoxy or pentoxy, very preferably ethoxy or propoxy.

Very preferred are the compounds of formula III-2-1-3, III-2-1-4 and III-2-1-5.

In another preferred embodiment of the present invention the LC medium comprises one or more compounds of formula III selected from the formulae III-3-1 and III-3-2

III-3-1

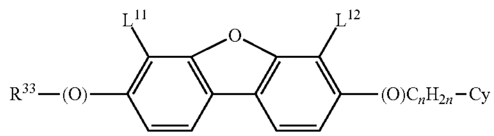

III-3-2

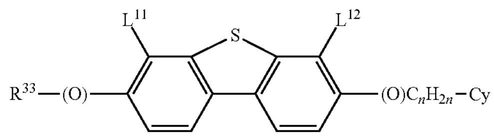

in which $L^{11}$ and $L^{12}$ have the same meanings as given under formula III, (O) denotes O or a single bond, $R^{33}$ denotes alkyl or alkenyl having up to 7 C atoms or a group Cy-$C_mH_{2m+1}$-, m and n are, identically or differently, 0, 1, 2, 3, 4, 5 or 6, preferably 1, 2 or 3, very preferably 1, and Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula III-3-1 and/or III-3-2 are contained in the LC medium either alternatively or additionally to the compounds of formula III-1 and/or III-2, preferably additionally.

Very preferred compounds of the formula III-3-1 are the following,

III-3-1-1

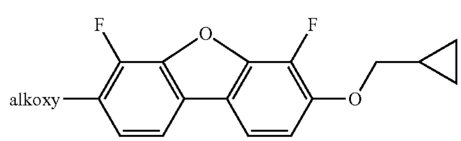

III-3-1-2

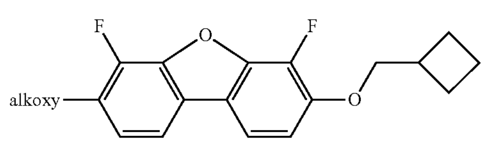

III-3-1-3

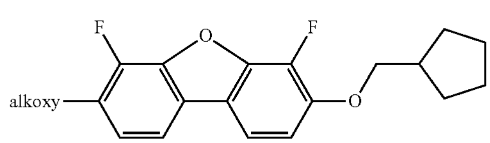

in which alkoxy denotes a straight-chain alkoxy radical having 1-6 C atoms.

Very preferred compounds of the formula III-3-2 are the following,

III-3-2-1

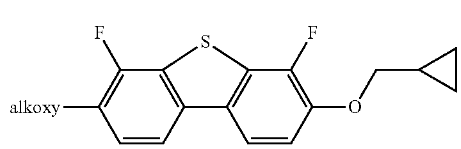

-continued

III-3-2-2

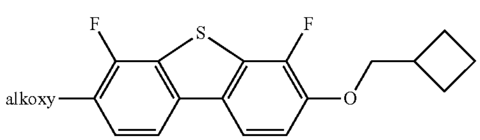

III-3-2-3

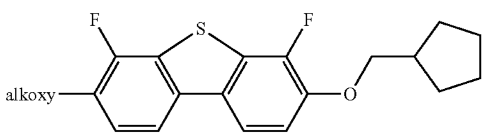

III-3-2-4

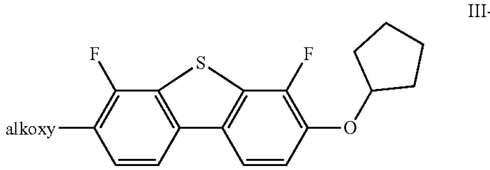

in which alkoxy denotes a straight-chain alkoxy radical having 1-6 C atoms, preferably ethoxy, propoxy, butoxy or pentoxy, very preferably ethoxy or propoxy.

In another preferred embodiment of the present invention, the LC medium comprises one or more compounds of the formulae III-4 to III-6, preferably of formula III-5,

III-4

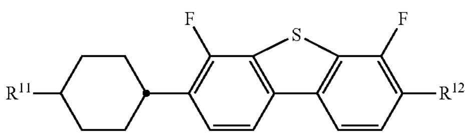

III-5

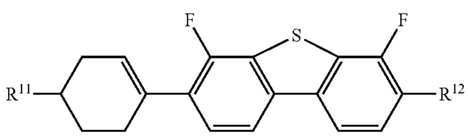

III-6

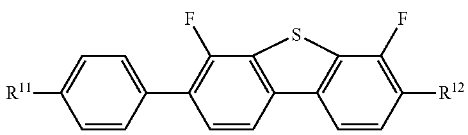

in which the parameters have the meanings given above, $R^{11}$ preferably denotes straight-chain alkyl and $R^{12}$ preferably denotes alkoxy, each having 1 to 7 C atoms.

In another preferred embodiment of the present invention, the LC medium comprises one or more compounds of the formula III selected from the group of compounds of subformulae III-7 to III-9, preferably of subformula III-8,

III-7

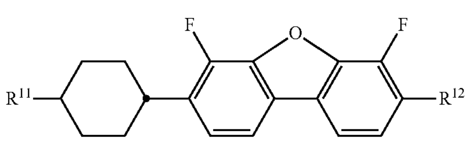

-continued

III-8

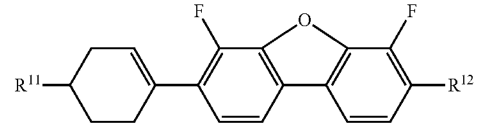

III-9

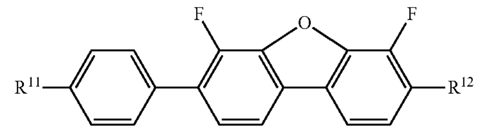

in which the parameters have the meanings given above, $R^{11}$ preferably denotes straight-chain alkyl and $R^{12}$ preferably denotes alkoxy each having 1 to 7 C atoms.

In another preferred embodiment of the present invention, the LC medium comprises one or more compounds of formula III selected from the subformula III-10,

III-10

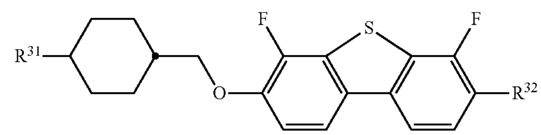

in which $R^{31}$ and $R^{32}$ have the meanings given above.

Very preferred compounds of formula III-10 are selected from the group consisting of the following formulae,

III-10-1

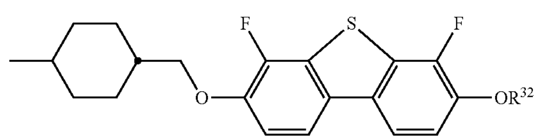

III-10-2

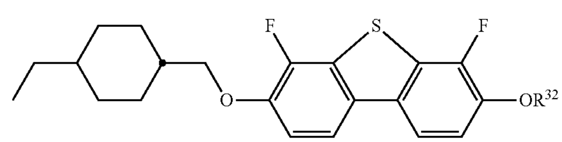

III-10-3

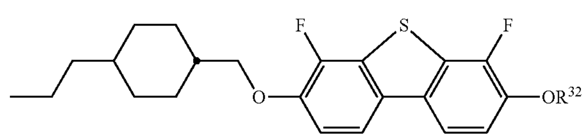

III-10-4

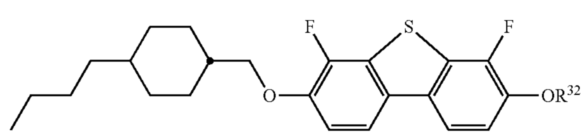

III-10-5

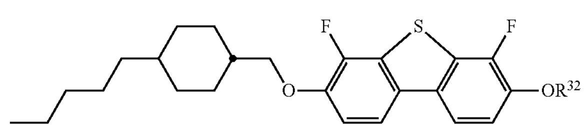

-continued

III-10-6

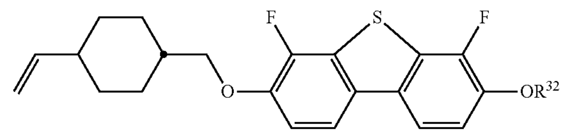

III-10-7

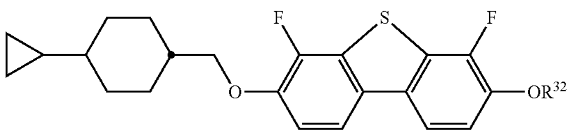

III-10-8

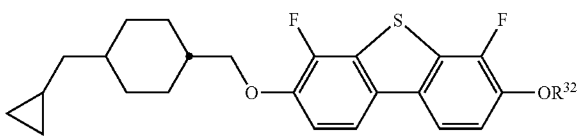

III-10-9

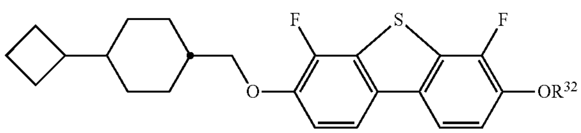

III-10-10

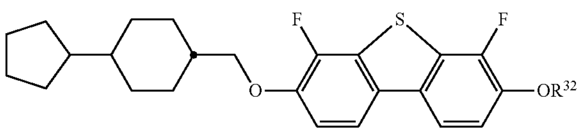

III-10-11

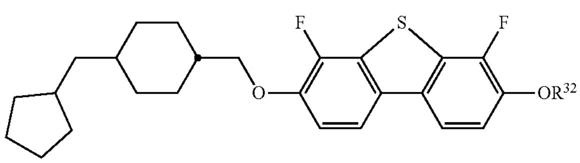

in which $R^{32}$ denotes alkyl having 1 to 7 C-atoms, preferably ethyl, n-propyl or n-butyl, or alternatively cyclopropylmethyl, cyclobutylmethyl or cyclopentylmethyl or alternatively —$(CH_2)_nF$ in which n is 2,3,4, or 5, preferably $C_2H_4F$.

In another preferred embodiment of the present invention, the LC medium comprises one or more compounds of the formula III selected of the subformula III-11,

III-11

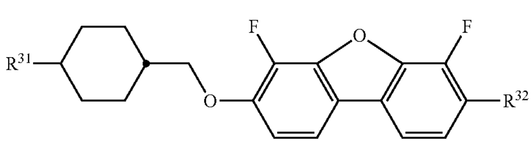

in which $R^{31}$ and $R^{32}$ have the meanings given above.

Very preferred compounds of formula III-11 are selected from the group consisting of the following formulae,

III-11-1

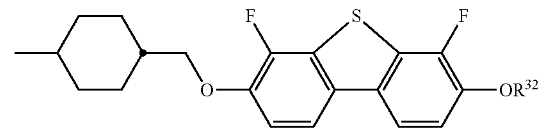

III-11-2

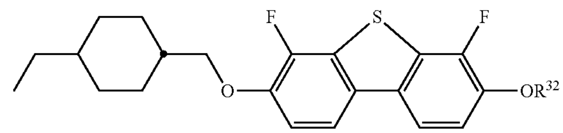

III-11-3

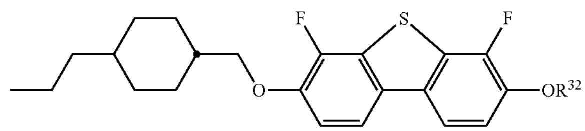

III-11-4

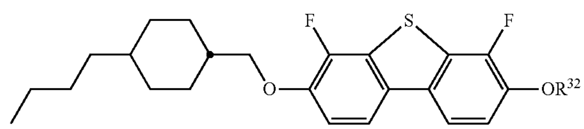

III-11-5

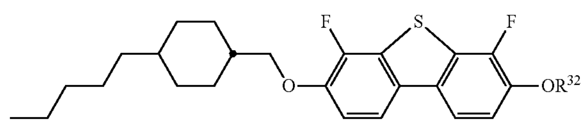

III-11-6

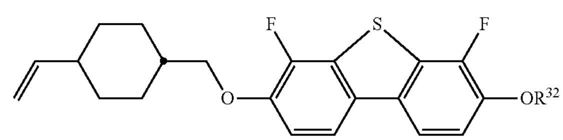

III-11-7

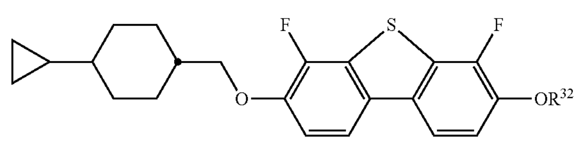

III-11-8

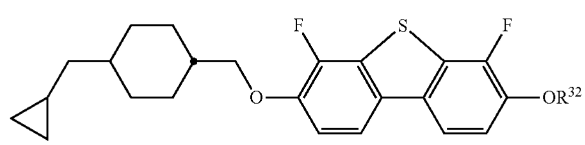

III-11-9

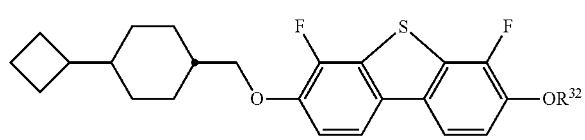

III-11-10

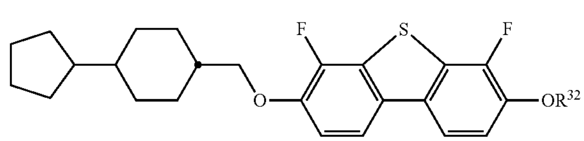

in which $R^{32}$ denotes alkyl having 1 to 7 C-atoms, preferably ethyl, n-propyl or n-butyl, or alternatively cyclopropylmethyl, cyclobutylmethyl or cyclopentylmethyl or alternatively —$(CH_2)_n$F in which n is 2,3,4, or 5, preferably $C_2H_4F$.

In a preferred embodiment, the LC medium comprises one or more compounds of the formula IV,

IV

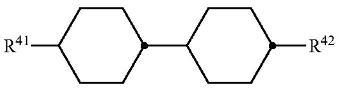

in which $R^{41}$ denotes an unsubstituted alkyl radical having 1 to 7 C atoms where, in addition, one or more $CH_2$ groups may be replaced by

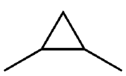
,
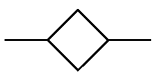
or
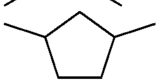
, or an unsubstituted alkenyl radical having 2 to 7 C atoms, preferably an n-alkyl radical, particularly preferably having 2, 3, 4 or 5 C atoms, and $R^{42}$ denotes an unsubstituted alkyl radical having 1 to 7 C atoms or an unsubstituted alkoxy radical having 1 to 6 C atoms, both preferably having 2 to 5 C atoms, or an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

IV-1

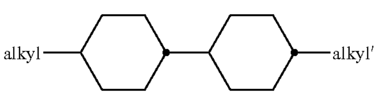

IV-2

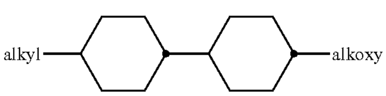

IV-3

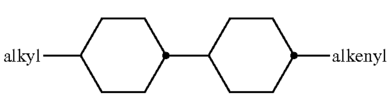

IV-4

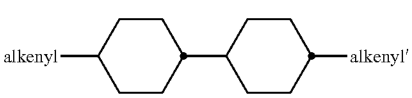

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, the LC medium comprises one or more compounds selected from the compounds of the formulae IV-1-1 to IV-1-6:

IV-1-1

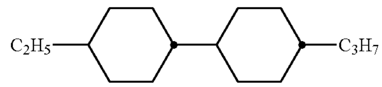

IV-1-2

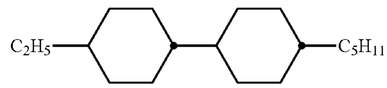

IV-1-3

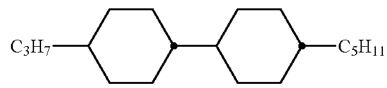

IV-1-4

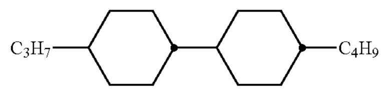

IV-1-5

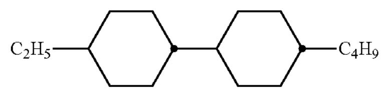

IV-1-6

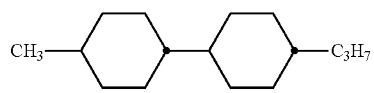

Very preferably, the LC medium according to the invention comprises one or more compounds of the formulae IV-2-1 and/or IV-2-2

IV-2-1

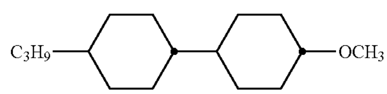

IV-2-2

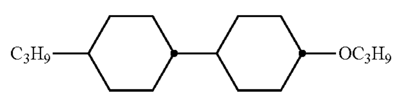

Very preferably, the LC medium according to the invention comprises a compound of formula IV-3, in particular selected from the compounds of the following subformulae:

IV-3-1

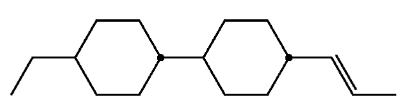

IV-3-2

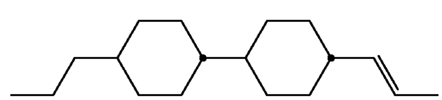

IV-3-3

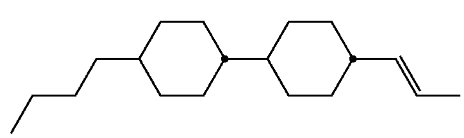

-continued
IV-3-4
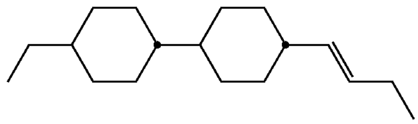
IV-3-5
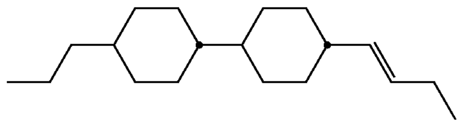
IV-3-6
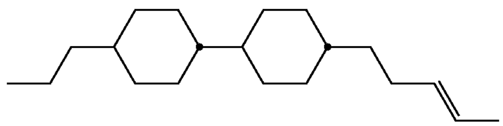
IV-3-7
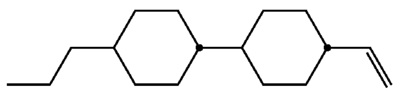
IV-3-8
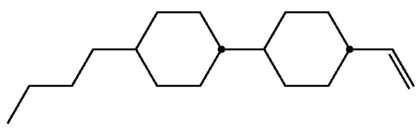
IV-3-9
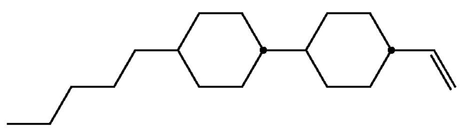
In another preferred embodiment, the LC medium according to the invention comprises one or more compounds of formula IV-3 selected from the compounds of the following subformulae:
IV-3-10
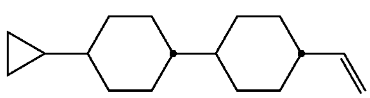
IV-3-11
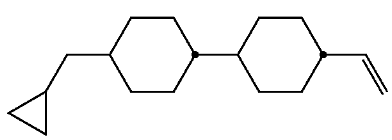
IV-3-12
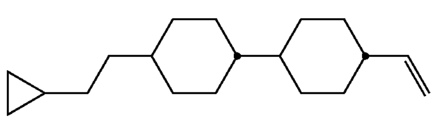
IV-3-13
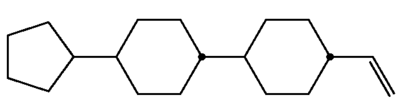
IV-3-14
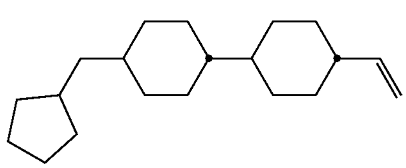
-continued
IV-3-15
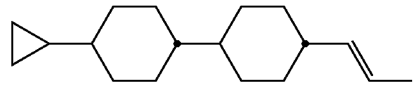
IV-3-16
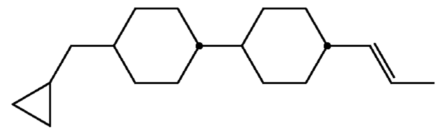
IV-3-17
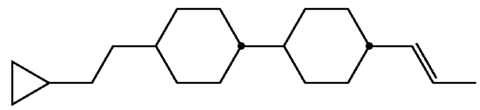
IV-3-18
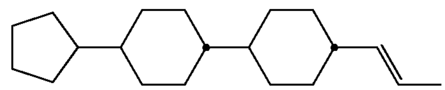
IV-3-19
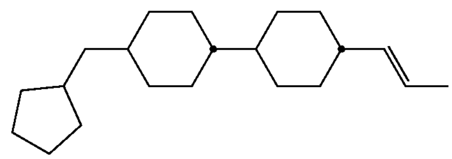
IV-3-20
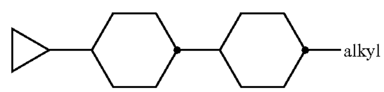
IV-3-21
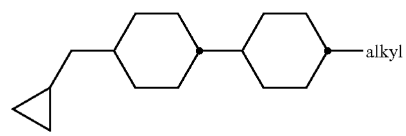
IV-3-22
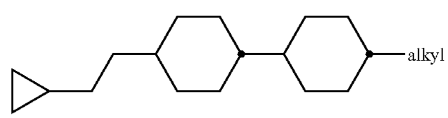
IV-3-23
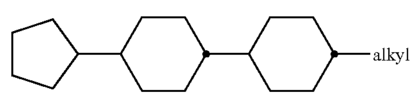
IV-3-24
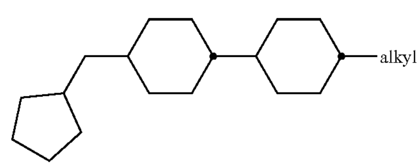
IV-3-25
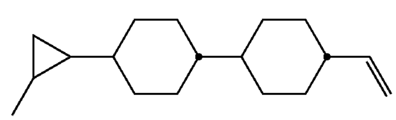
IV-3-26
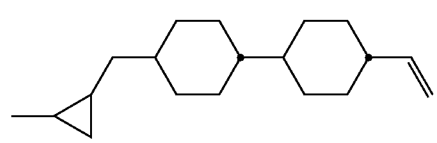

-continued

IV-3-27

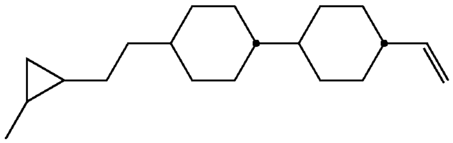

IV-3-28

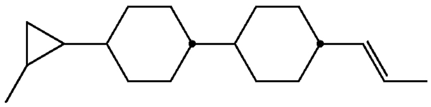

IV-3-29

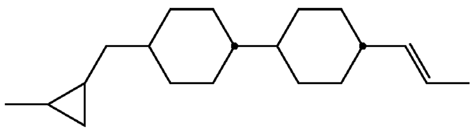

IV-3-30

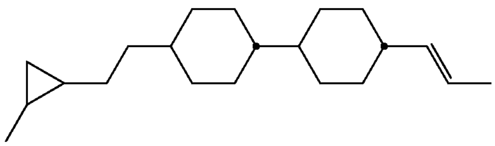

IV-3-31

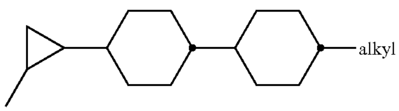

IV-3-32

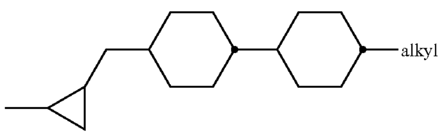

IV-3-33

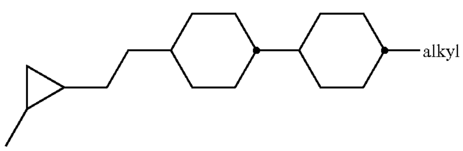

in which alkyl denotes methyl, ethyl, n-propyl, isopropyl, n-butyl, isobutyl, or n-pentyl.

Very preferably, the LC medium according to the invention comprises a compound of formula IV-4, in particular selected from the compounds of the following formulae:

IV-4-1

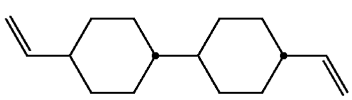

IV-4-2

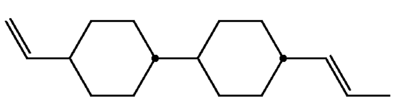

IV-4-3

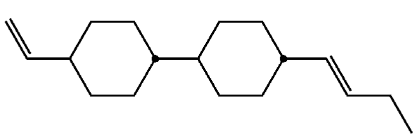

-continued

IV-4-4

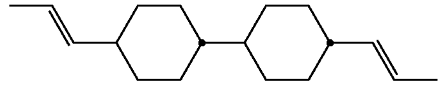

IV-4-5

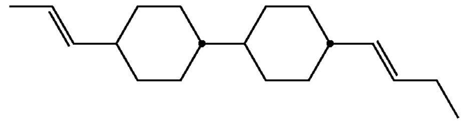

IV-4-6

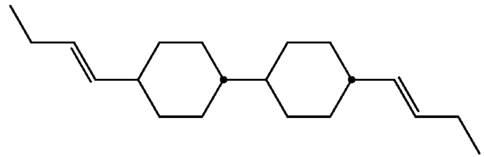

In another preferred embodiment the LC medium comprises one or more compounds of formula IV-4 and its subformulae in which one or both of "alkenyl" and "alkenyl'" denote

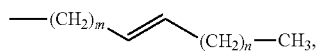

in which m is 0, 1 or 2, and n is 0, 1 or 2, very preferably selected from compounds of formulae IV-4-3 to IV-4-6.

Very preferably, the LC medium according to the invention comprises one or more compounds of the formula IV-1 or its subformulae and/or one or more compounds of the formula IV-3 or its subformulae and/or one or more compounds of the formula IV-4 or its subformulae, where the total concentration of these compounds of the formula IV-1 is in the range from 1% to 30%.

The LC medium according to the invention preferably additionally comprises one or more compounds of the formula IVa, IVa

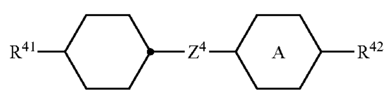

in which $R^{41}$ and $R^{42}$ each, independently of one another, denote a straight-chain alkyl, alkoxy, alkenyl, alkoxyalkyl or alkoxy radical having up to 12 C atoms,

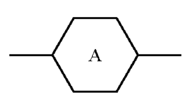

denotes

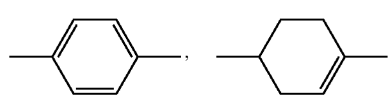

-continued

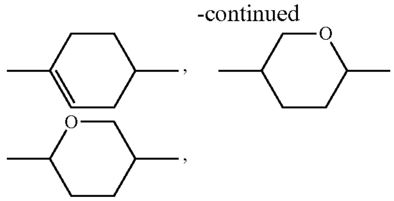

$Z^4$ denotes a single bond, —$CH_2CH_2$—, —CH═CH—, —$CF_2O$—, —$OCF_2$—, —$CH_2O$—, —$OCH_2$—, —COO—, —OCO—, —$C_2F_4$—, —$C_4H_8$— or —CF═CF—.

Preferred compounds of the formula IVa are indicated below:

IVa-1

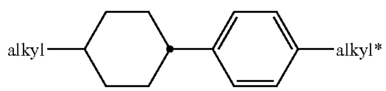

IVa-2

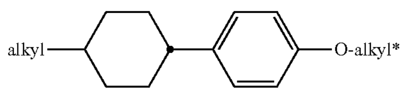

IVa-3

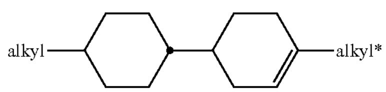

IVa-4

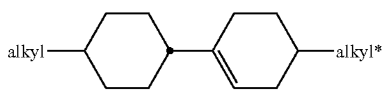

in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula IVa in the mixture as a whole is preferably at least 5% by weight Preferably, the LC medium comprises one or more compounds of formula IVb-1 to IVb-3

IVb-1

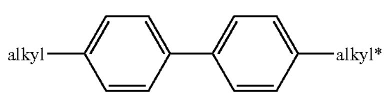

IVb-2

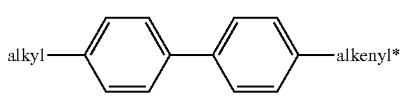

IVb-3

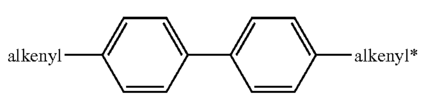

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

The proportion of the compounds of the formulae IV-1 to IV-3 in the mixture as a whole is preferably at least 3% by weight, in particular 5% by weight.

Of the compounds of the formulae IVb-1 to IVb-3, the compounds of the formula IVb-2 are particularly preferred.

Particularly preferred compounds of the formulae IV-1 to IV-3 are selected from the group consisting of the following formulae IVb-1-1

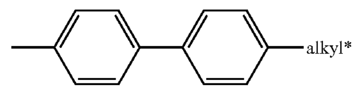

IVb-2-1

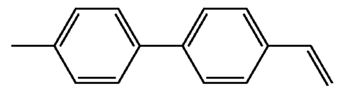

IVb-2-2

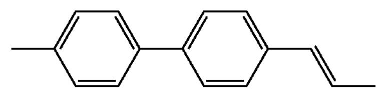

IVb-2-3

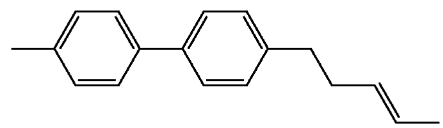

in which alkyl* denotes an alkyl radical having 1 to 6 C atoms and preferably denotes n-propyl.

The LC medium according to the invention particularly preferably comprises one or more compounds of the formulae IVb-1-1 and/or IVb-2-3.

In another preferred embodiment, the LC medium according to the invention comprises one or more compounds of formula V

V

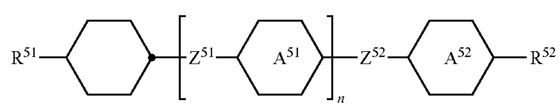

in which $R^{51}$ and $R^{52}$ independently of one another, denote H, an alkyl, alkoxy or alkenyl radical having up to 15 C atoms which is unsubstituted, monosubstituted by F, Cl, CN or $CF_3$ or at least monosubstituted by halogen, where, in addition, one or more $CH_2$ groups in these radicals may be replaced by —O—, —S—, —C≡C—, —$CF_2O$—, —$OCF_2$—, —OC—O—, —O—CO—

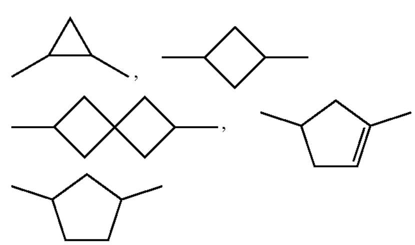

in such a way that O atoms are not linked directly to one another, and preferably denote alkyl having 1 to 7 C atoms, preferably n-alkyl, particularly preferably n-alkyl having 1 to 5 C atoms, alkoxy having 1 to 6 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

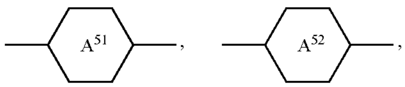

identically or differently, denote

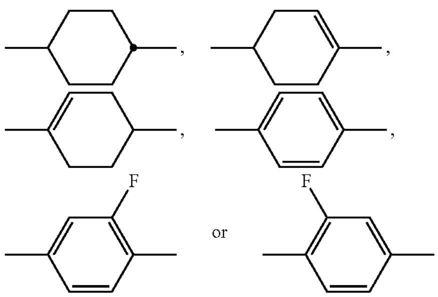

in which

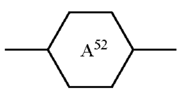

preferably denotes

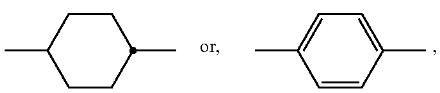

$Z^{51}$, $Z^{52}$ each, independently of one another, denote —$CH_2$—$CH_2$—, —$CH_2$—O—, —CH═CH—, —C≡C—, —COO— or a single bond, preferably —$CH_2$—$CH_2$—, —$CH_2$—O— or a single bond and particularly preferably a single bond, and n is 1 or 2.

The compounds of formula V are preferably selected from the compounds of the formulae V-1 to V-17:

V-1

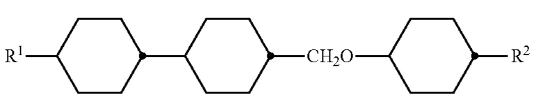

V-2

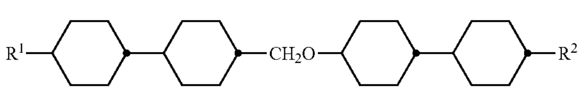

V-3

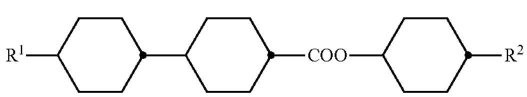

-continued

V-4

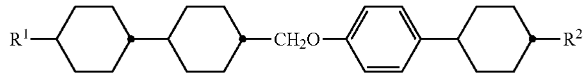

V-5

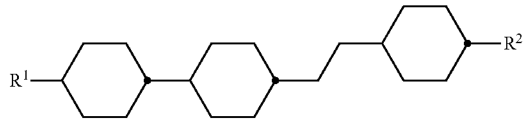

V-6

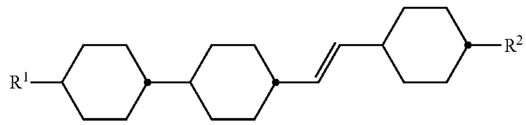

V-7

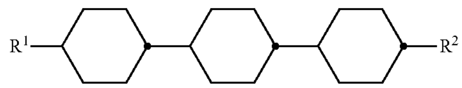

V-8

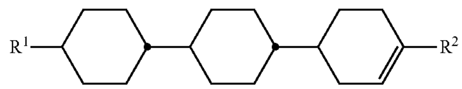

V-9

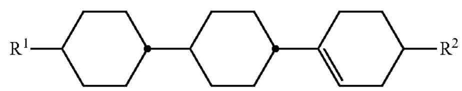

V-10

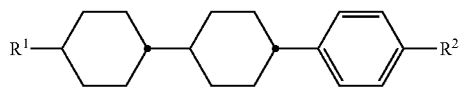

V-11

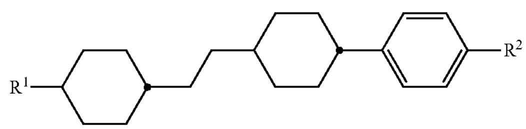

V-12

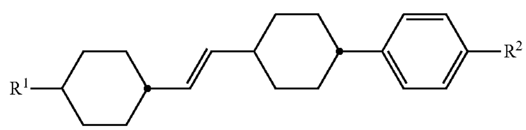

V-13

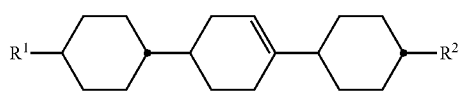

V-14

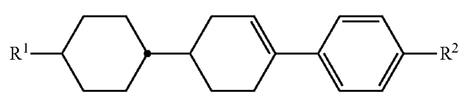

V-15

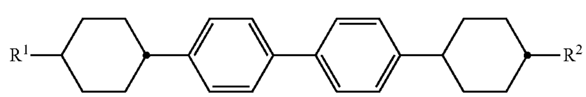

V-16

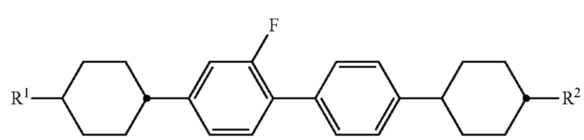

-continued

V-17

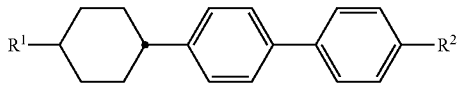

in which $R^1$ and $R^2$ have the meanings indicated for $R^{51}$ and $R^{52}$ above.

$R^1$ and $R^2$ preferably each, independently of one another, denote straight-chain alkyl or alkenyl.

Preferred LC media comprise one or more compounds of the formulae V-1, V-3, V-4, V-6, V-7, V-10, V-11, V-12, V-14, V-15, and/or V-16

LC media according to the invention very particularly preferably comprise the compounds of the formula V-10 and/or IV-1, in particular in amounts of 5 to 30%.

Preferred compounds of the formulae V-10 are indicated below:

V-10a

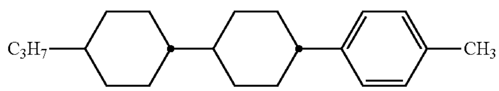

V-10b

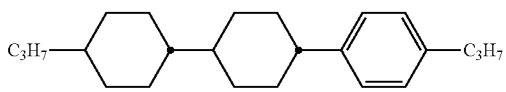

V-10c

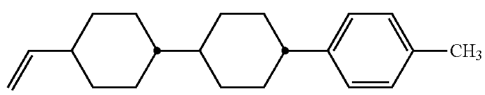

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Particularly preferred LC media comprise the compounds V-10a and/or IV-1-1

V-10a

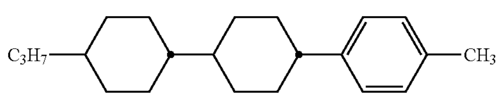

IV-1-1

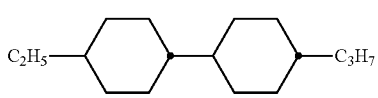

The compounds V-10a and IV-1-1 are preferably present in the mixture in a concentration of 5 to 30%, very preferably 10 to 25%, based on the mixture as a whole.

Preferred LC media comprise at least one compound selected from the group of the compounds

V-6

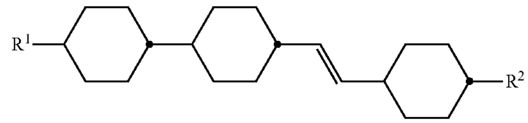

V-7

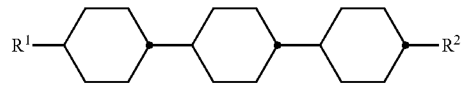

V-14

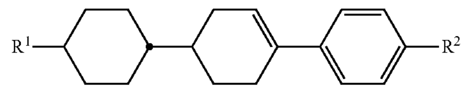

IV

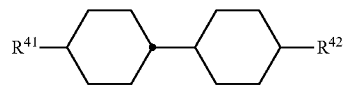

in which $R^1$, $R^2$, $R^{41}$ and $R^{42}$ have the meanings indicated above. Preferably in the compounds V-6, V-7 and IV, $R^1$ and $R^{41}$ denotes alkyl or alkenyl having 1 to 6 or 2 to 6 C atoms, respectively, and $R^2$ and $R^{42}$ denotes alkenyl having 2 to 6 C atoms. Preferably in the compounds V-14, $R^1$ denotes alkyl or alkenyl having 1 to 6 or 2 to 6 C atoms and $R^2$ denotes alkyl having 1 to 6 C atoms.

In another preferred embodiment the LC medium according to the invention comprises one or more compounds of the formula V-7, preferably selected from the compounds of the formulae V-7a to V-7e:

V-7a

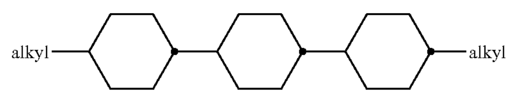

V-7b

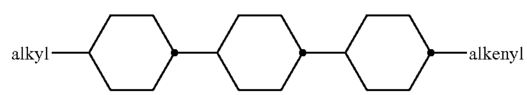

V-7c

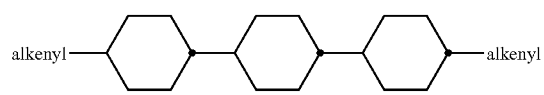

V-7d

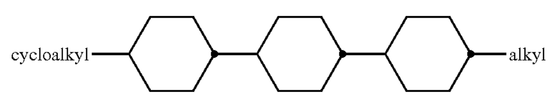

V-7e

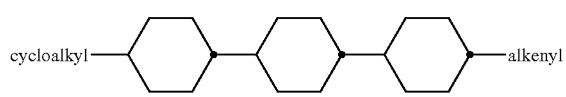

in which alkyl denotes an alkyl group having 1 to 7 C atoms, alkenyl denotes an alkenyl group having 2 to 7 C atoms, and cycloalkyl denotes a cyclic alkyl group having 3 to 12 C atoms, preferably cyclopropyl, cyclobutyl, cyclopentyl, cyclopropylalkyl, cyclobutylalkyl or cyclopentylalkyl.

Very preferred compounds of the formulae V-7a to V-7e are selected from the compounds of the following subformulae:

-continued
V-7b-1
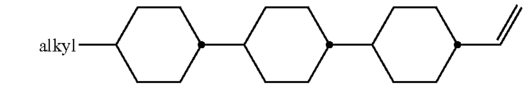
V-7b-2
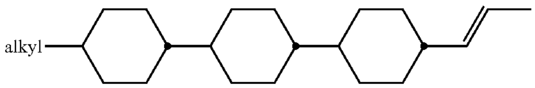
V-7b-3
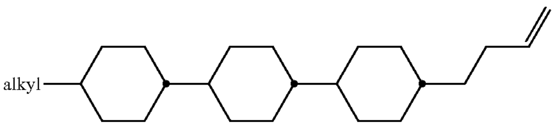
V-7d-1
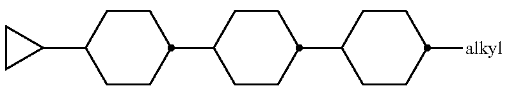
V-7d-2
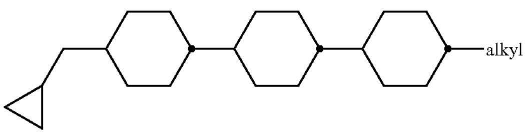
V-7d-3
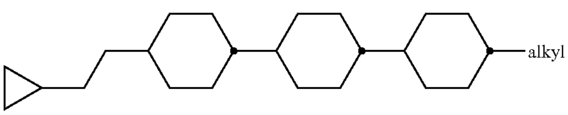
V-7d-4
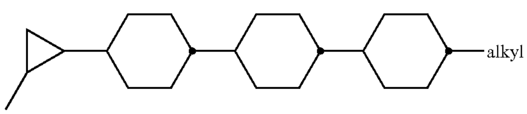
V-7d-5
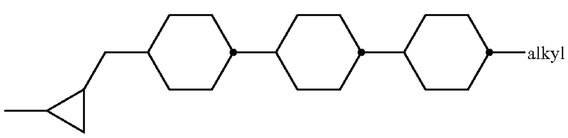
V-7d-6
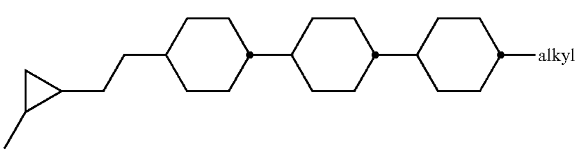
V-7d-7
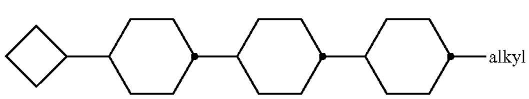
V-7d-8
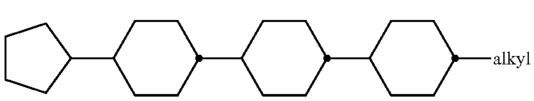
V-7d-9
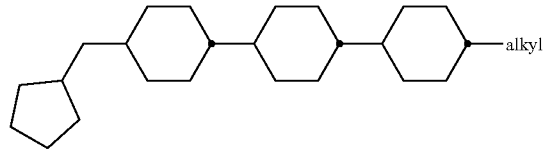
V-7e-1
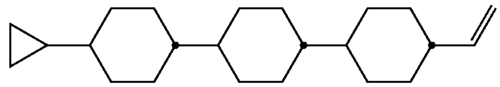
V-7e-2
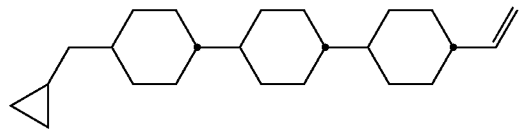
V-7e-3
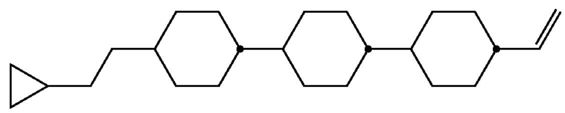
V-7e-4
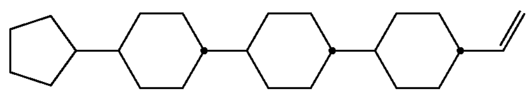
V-7e-5
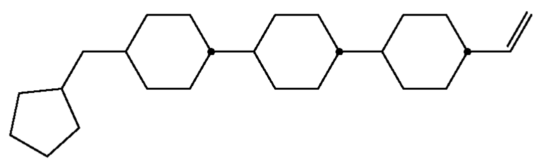
V-7e-6
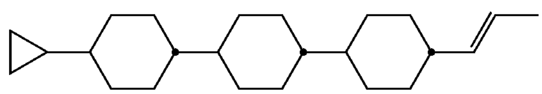
V-7e-7
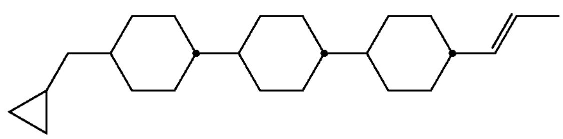
V-7e-8
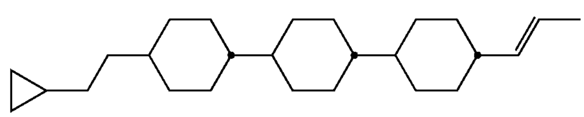
V-7e-9
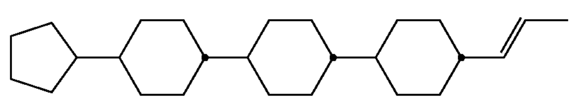
V-7e-10
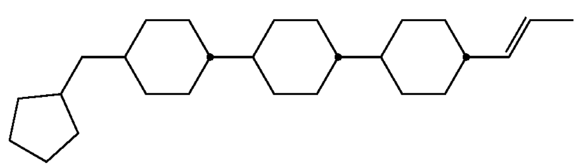

-continued

V-7e-11

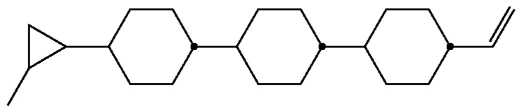

V-7e-12

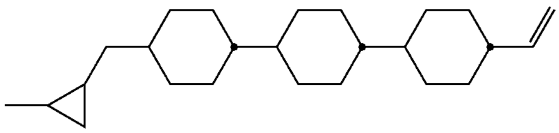

V-7e-13

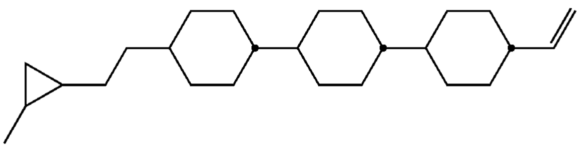

V-7e-14

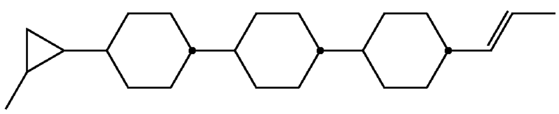

V-7e-15

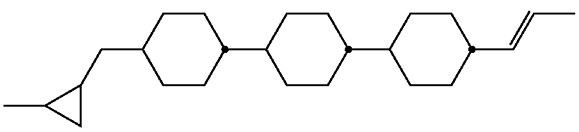

V-7e-16

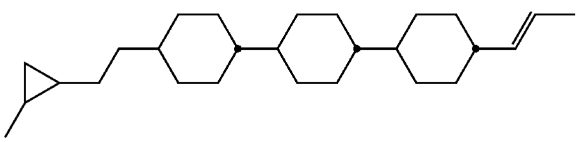

in which alkyl denotes ethyl, n-propyl, n-butyl or n-pentyl, preferably n-propyl.

Further preferred are compounds of formula V, wherein $R^{51}$ and $R^{52}$ independently of one another denote straight-chain alkyl having 1 to 7 C atoms or alkenyl having 2 to 7 C atoms.

In a preferred embodiment of the present invention the LC medium additionally comprises one or more compounds of the formulae VI-1 to VI-25,

VI-1

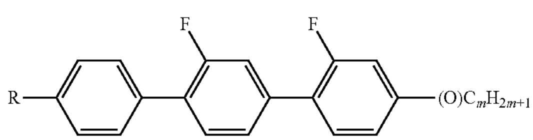

VI-2

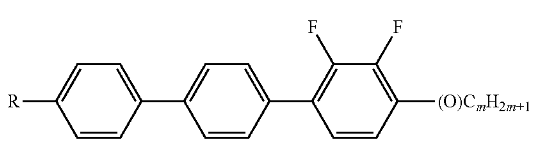

-continued

VI-3

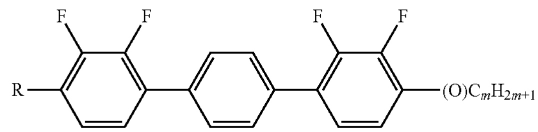

VI-4

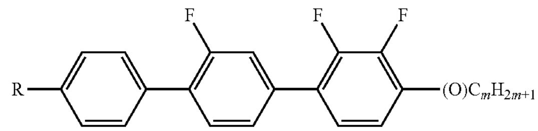

VI-5

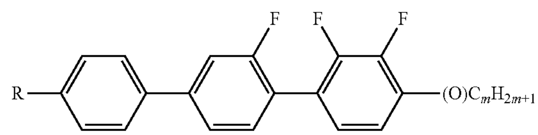

VI-6

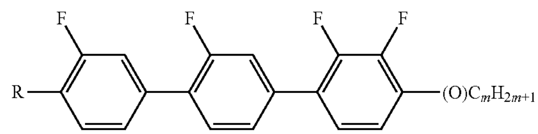

VI-7

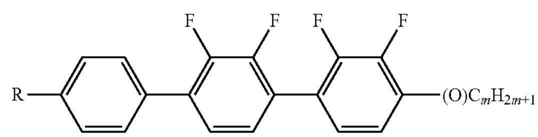

VI-8

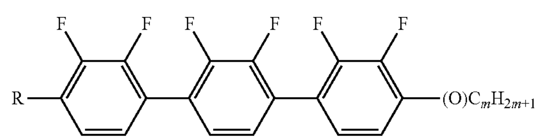

VI-9

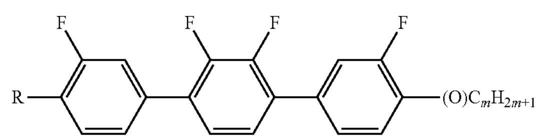

VI-10

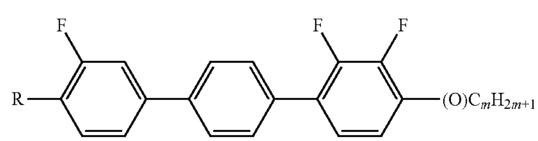

VI-11

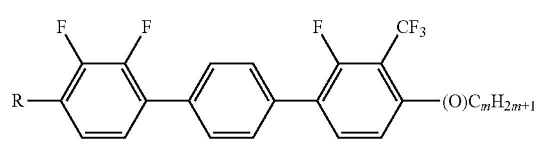

VI-12

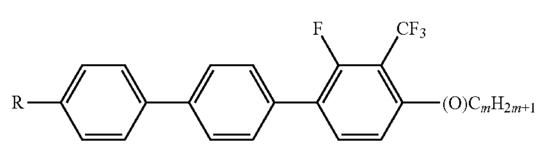

-continued

VI-13

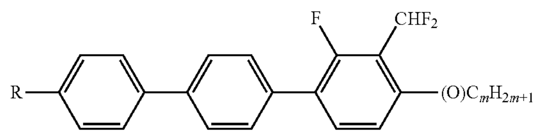

VI-14

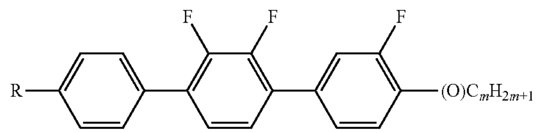

VI-15

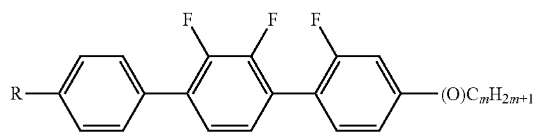

VI-16

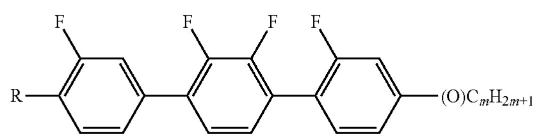

VI-17

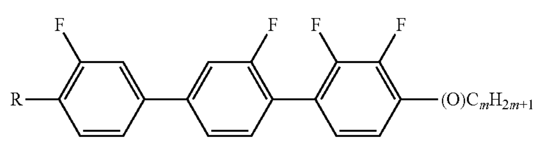

VI-18

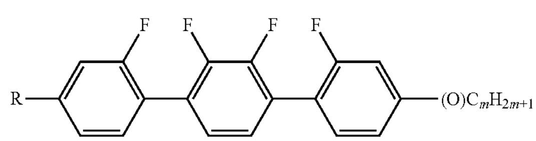

VI-19

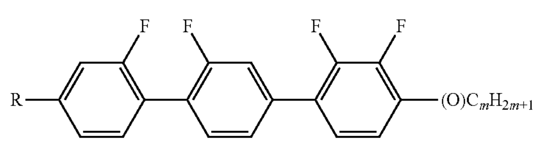

VI-20

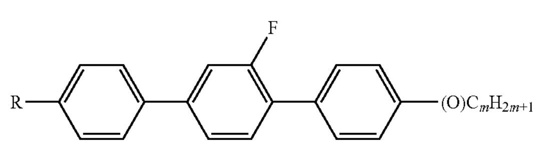

VI-21

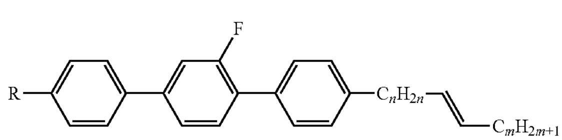

VI-22

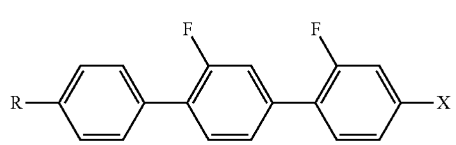

-continued

VI-23

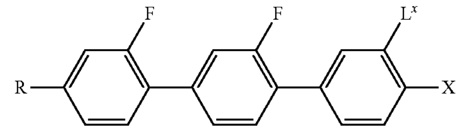

VI-24

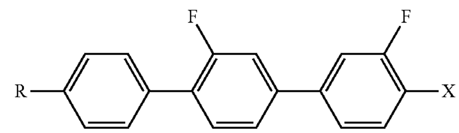

VI-25

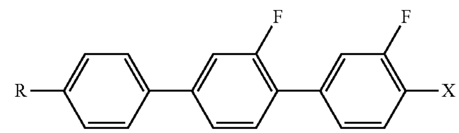

in which

R denotes a straight-chain alkyl or alkoxy radical having 1 to 6 C atoms, (O) denotes —O— or a single bond, X denotes F, Cl, $OCF_3$ or $OCHF_2$, $L^x$ denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or $OCH_3$, very preferably F.

The LC medium according to the invention preferably comprises the terphenyls of the formulae VI-1 to VI-25 in amounts of 2 to 30% by weight, in particular 5 to 20% by weight.

Particular preference is given to compounds of the formulae VI-1, VI-2, VI-4, VI-20, VI-21, and VI-22 wherein X denotes F. In these compounds, R preferably denotes alkyl, furthermore alkoxy, each having 1 to 5 C atoms. In the compounds of the formula VI-20, R preferably denotes alkyl or alkenyl, in particular alkyl. In the compounds of the formula VI-21, R preferably denotes alkyl. In the compounds of the formulae VI-22 to VI-25, X preferably denotes F.

The terphenyls of formula VI-1 to VI-25 are preferably employed in the LC media according to the invention if the Δn value of the mixture is to be 0.1. Preferred LC media comprise 2 to 20% by weight of one or more terphenyl compounds selected from the group of the compounds of formulae VI-1 to VI-25.

In another preferred embodiment of the present invention the LC medium additionally comprises one or more compounds of the formulae VII-1 to VII-9

VII-1

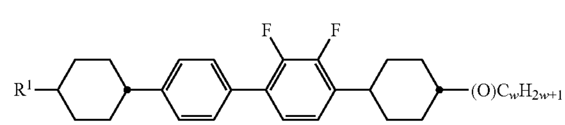

VII-2

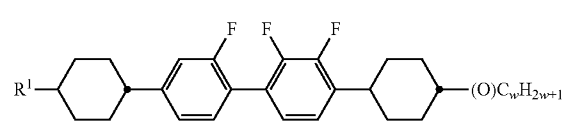

-continued

VII-3

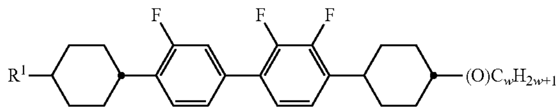

VII-4

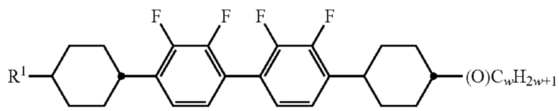

VII-5

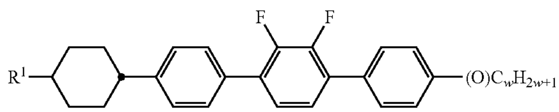

VII-6

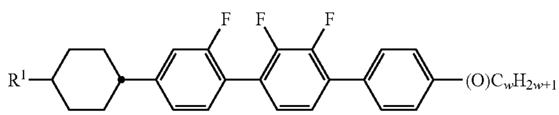

VII-7

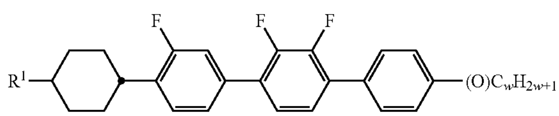

VII-8

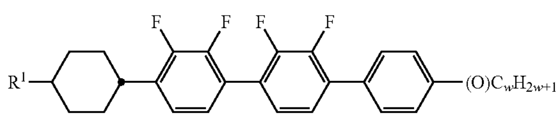

VII-9

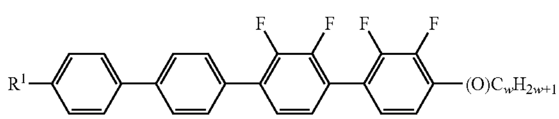

in which $R^1$ each, independently of one another, have one of the meanings indicated for $R^{21}$ in formula IIA, and w and x each, independently of one another, denote 1 to 6.

Particular preference is given to LC media comprising at least one compound of the formula VII-9.

LC medium comprising one or more substances which contain a tetrahydronaphthyl or naphthyl unit, such as, for example, the compounds of the formulae N-1 to N-5,

N-1

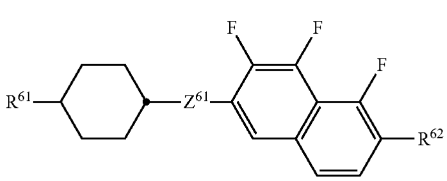

-continued

N-2

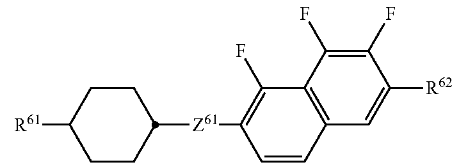

N-3

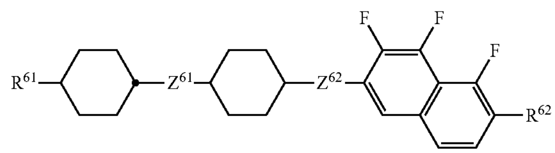

N-4

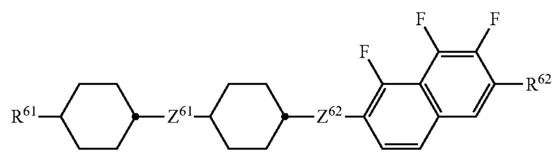

N-5

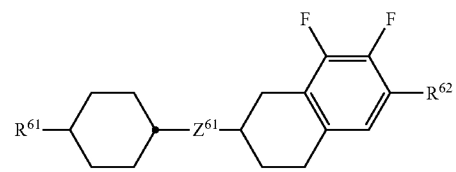

in which $R^{61}$ and $R^{62}$ each, independently of one another, have the meanings indicated for $R^{21}$, preferably denote straight-chain alkyl, straight-chain alkoxy or straight-chain alkenyl, and $Z^{61}$ and $Z^{62}$ each, independently of one another, denote $-C_2H_4-$, $-CH{=}CH-$, $-(CH_2)_4-$, $-(CH_2)_3O-$, $-O(CH_2)_3-$, $-CH{=}CHCH_2CH_2-$, $-CH_2CH_2CH{=}CH-$, $-CH_2O-$, $-OCH_2-$, $-COO-$, $-OCO-$, $-C_2F_4-$, $-CF{=}CF-$, $-CF{=}CH-$, $-CH{=}CF-$, $-CF_2O-$, $-OCF_2-$, $-CH_2-$ or a single bond.

c) LC medium comprising one or more compounds selected from the group of the difluorodibenzochroman compounds of the formula BC, chromans of the formula CR, and fluorinated phenanthrenes of the formulae PH-1 and PH-2,

BC

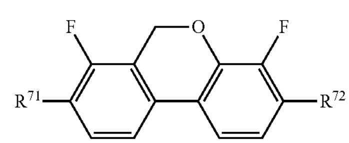

CR

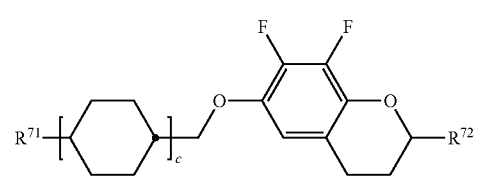

PH-1

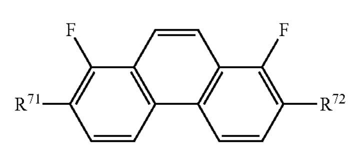

-continued

PH-2

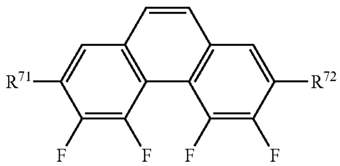

in which $R^{71}$ and $R^{72}$ each, independently of one another, have the meaning of $R^{21}$ and c is 0, 1 or 2. $R^{71}$ and $R^{72}$ preferably, independently of one another, denote alkyl or alkoxy having 1 to 6 C atoms.

The LC medium according to the invention preferably comprises the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

BC-1

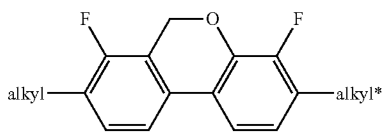

BC-2

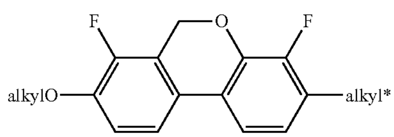

BC-3

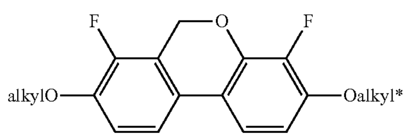

BC-4

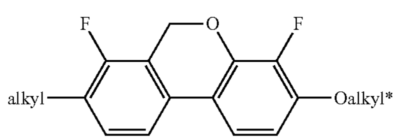

BC-5

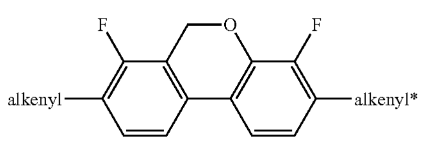

BC-6

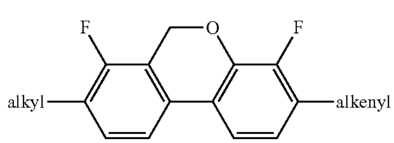

BC-7

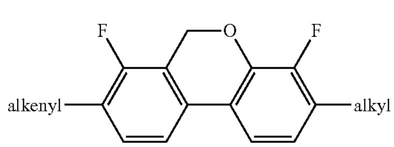

-continued

CR-1

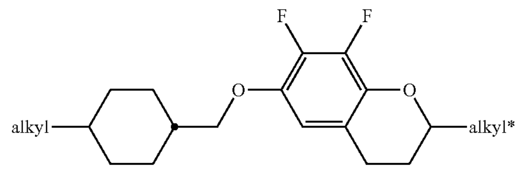

CR-2

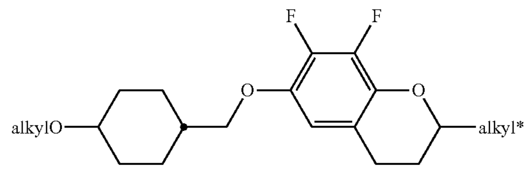

CR-3

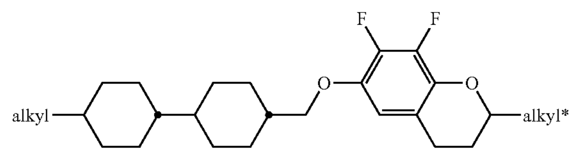

CR-4

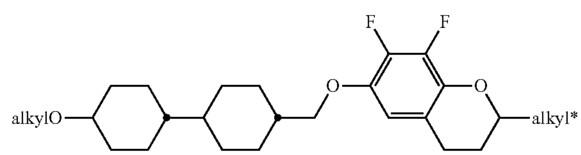

CR-5

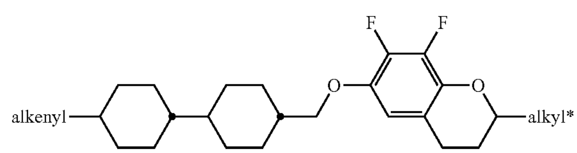

in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Very particular preference is given to an LC medium comprising one, two or three compounds of the formula BC-2, BF-1 and/or BF-2.

d) LC medium comprising one or more indane compounds of the formula In,

In

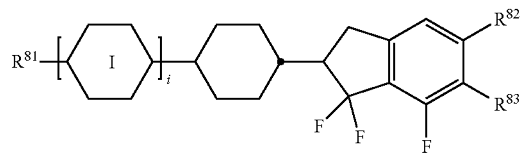

in which $R^{81}$, $R^{82}$, $R^{83}$ each, independently of one another, denote a straight-chain alkyl, alkoxy, alkoxyalkyl or alkenyl radical having 1 to 6 C atoms, $R^{82}$ and $R^{83}$ may also denote halogen, preferably F,
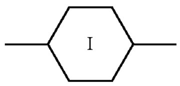
denotes
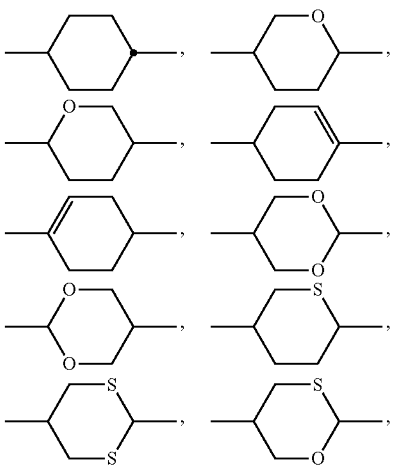
i denotes 0, 1 or 2.
Preferred compounds of the formula In are the compounds of the formulae In-1 to In-16 indicated below:
In-1
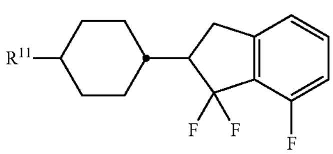
In-2
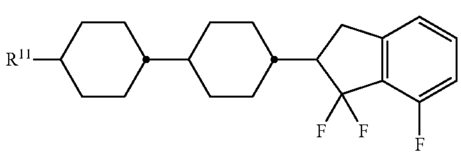
In-3
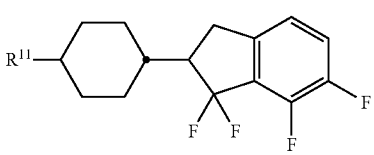
In-4
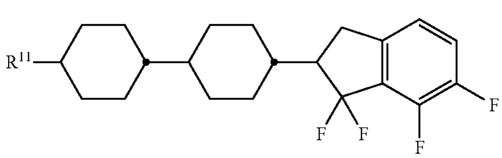
In-5
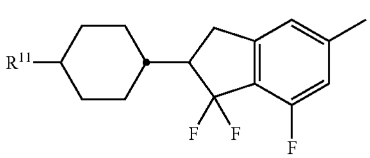
-continued
In-6
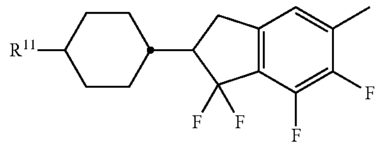
In-7
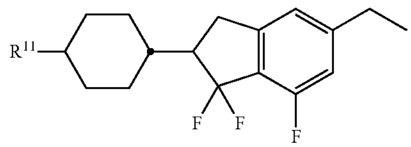
In-8
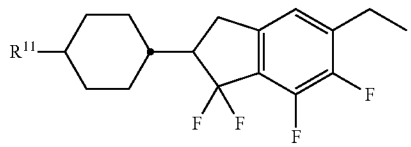
In-9
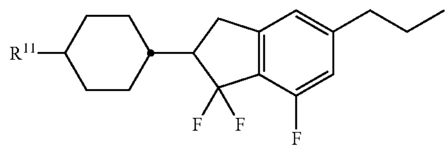
In-10
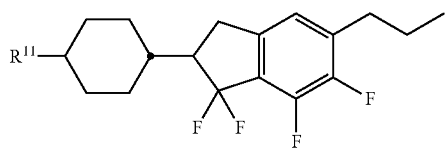
In-11
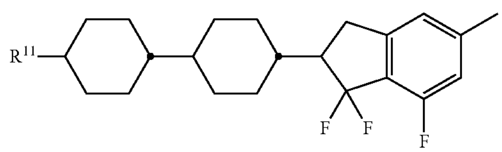
In-12
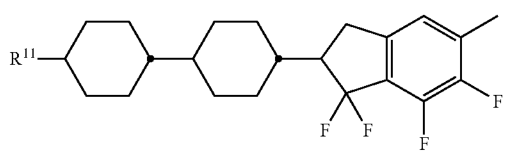
In-13
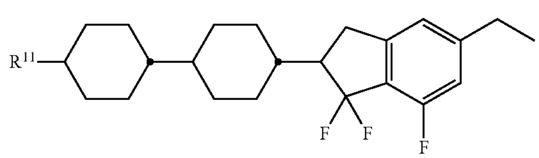
In-14
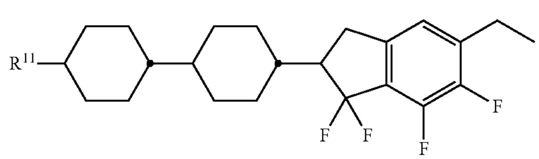

-continued

In-15

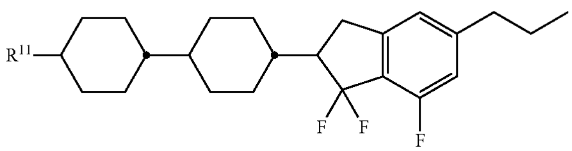

In-16

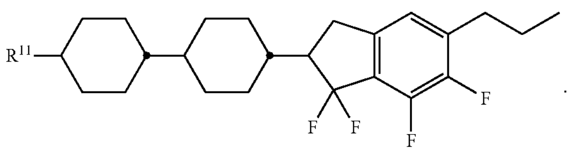

Particular preference is given to the compounds of the formulae In-1, In-2, In-3 and In-4.

The compounds of the formula In and the sub-formulae In-1 to In-16 are preferably employed in the LC media according to the invention in concentrations ≥5% by weight, in particular 5 to 30% by weight and very particularly preferably 5 to 25% by weight.

e) LC medium comprising one or more compounds of the formulae L-1 to L-8,

L-1

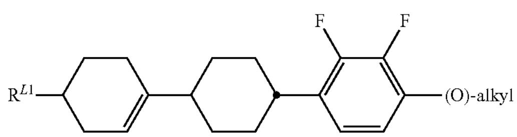

L-2

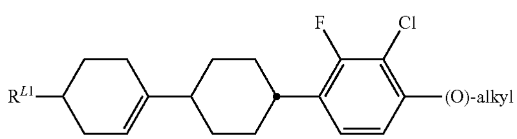

L-3

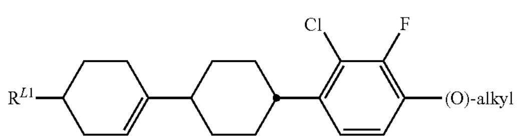

L-4

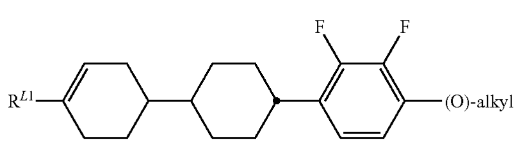

L-5

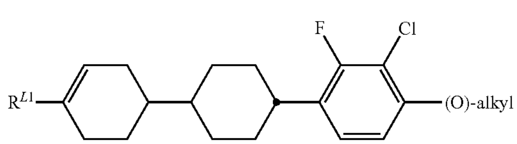

L-6

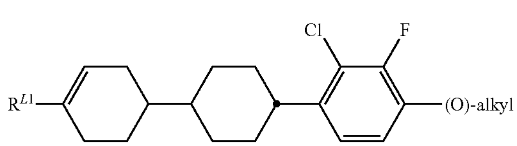

-continued

L-7

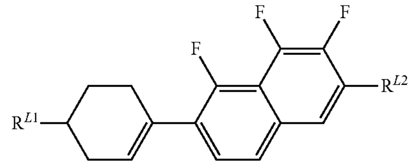

L-8

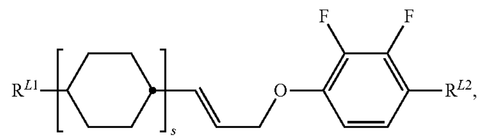

in which $R^{L1}$ and $R^{L2}$ each, independently of one another, have the meanings indicated for $R^{21}$ in formula IIA above, alkyl denotes an alkyl radical having 1 to 6 C atoms, and s denotes 1 or 2.

The compounds of the formulae L-1 to L8 are preferably employed in concentrations of 5 to 15% by weight, in particular 5 to 12% by weight and very particularly preferably 8 to 10% by weight.

f) Preferred LC media additionally comprise one or more compounds of formula IIA-Y

IIA-Y

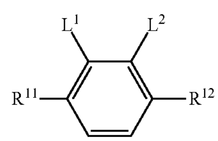

in which $R^{11}$ and $R^{12}$ have one of the meanings given for $R^{21}$ in formula IIA above, and $L^1$ and $L^2$, identically or differently, denote F or Cl.

Preferred compounds of the formula IIA-Y are selected from the group consisting of the following subformulae

IIA-Y1

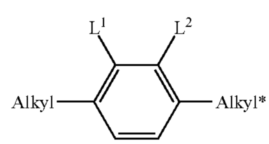

IIA-Y2

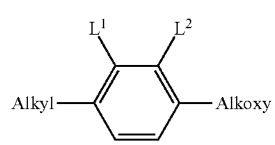

IIA-Y3

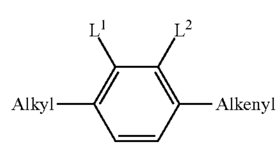

IIA-Y4

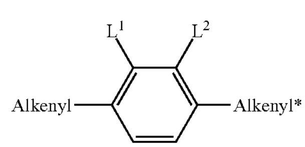

-continued

IIA-Y5

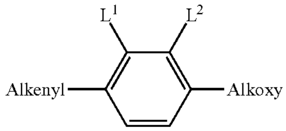

IIA-Y6

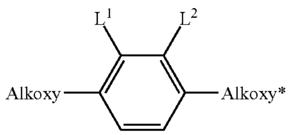

IIA-Y7

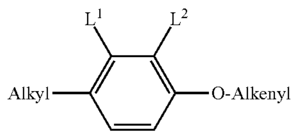

IIA-Y8

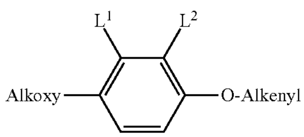

IIA-Y9

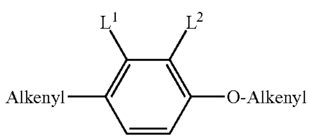

IIA-Y10

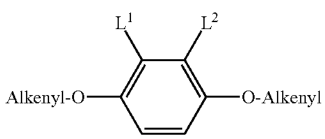

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Particularly preferred compounds of the formula IIA-Y are selected from the group consisting of following subformulae:

IIA-Y6a

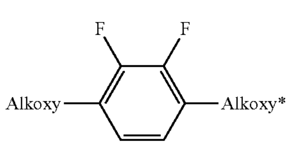

IIA-Y6b

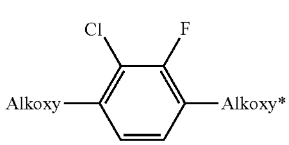

in which Alkoxy and Alkoxy* have the meanings defined above and preferably denote methoxy, ethoxy, n-propyloxy, n-butyloxy or n-pentyloxy.

g) LC medium comprising one or more quaterphenyl compounds selected from the following formula:

Q

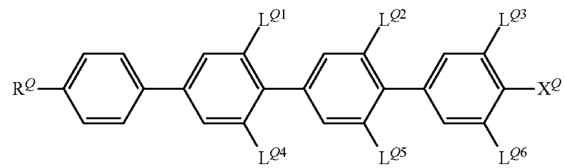

wherein

- $R^Q$ is alkyl, alkoxy, oxaalkyl or alkoxyalkyl having 1 to 9 C atoms or alkenyl or alkenyloxy having 2 to 9 C atoms, all of which are optionally fluorinated,
- $X^Q$ is F, Cl, halogenated alkyl or alkoxy having 1 to 6 C atoms or halogenated alkenyl or alkenyloxy having 2 to 6 C atoms,
- $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

Q1

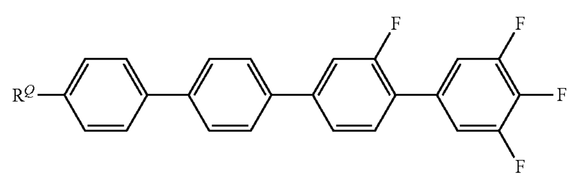

Q2

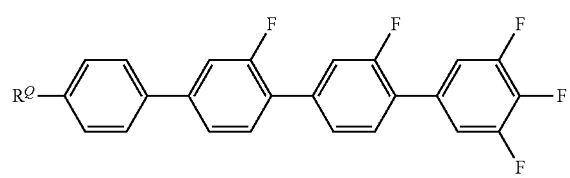

wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC medium is from >0 to ≤5% by weight, very preferably from 0.05 to 2% by weight, more preferably from 0.1 to 1% by weight, most preferably from 0.1 to 0.8% by weight.

Preferably the LC medium contains 1 to 5, preferably 1 or 2 compounds of formula Q.

The addition of quaterphenyl compounds of formula Q to the LC mixture of a polymerizable LC medium enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_{\parallel}$ and $\varepsilon\perp$, and in particular enables to achieve a high value of the dielectric constant $\varepsilon_{\parallel}$ while keeping the dielectric anisotropy $\Delta\varepsilon$ constant, thereby reducing the kick-back voltage and reducing image sticking.

The LC medium according to the invention preferably comprises one or more compounds of formula IA or its subformulae, preferably of formula IA5 or IA12, preferably in a proportion from 1 to 25%, very preferably from 2 to 20%, most preferably from 2 to 15% by weight;

and/or one or more compounds of formula IIA and/or IIB, preferably in a total concentration in the range of from 30% to 65%, more preferably from 35% to 60%, particularly preferably from 40 to 55%;

and/or one or more compounds of formula IV, preferably in a total concentration in the range of 35% to 60%, more preferably 40% to 55%, particularly preferably 45% to 50%;

and/or one or more compounds of formula III, preferably of formula III-2, very preferably of formula III-2-1, preferably in a total concentration in the range of 2% to 25%, very preferably 4% to 15%.

In particular, the LC medium comprises one or more compounds CY-n-Om, in particular CY-3-O4, CY-5-O4 and/or CY-3-O2, preferably in a total concentration in the range of from 5% to 30%, preferably 10% to 20%, based on the mixture as a whole;

one or more compounds PY-n-Om, in particular PY-1-O2, PY-2-O2 and/or PY-3-O2, preferably in a total concentration in the range of from 5% to 40%, preferably 10% to 30%, based on the mixture as a whole;

and/or one or more compounds CPY-n-Om, in particular CPY-2-O2, CPY-3-O2 and/or CPY-5-O2, preferably in concentrations >5%, in particular 7% to 20%, based on the mixture as a whole, and/or one or more compounds CCY-n-Om, preferably CCY-4-O2, CCY-3-O2, CCY-3-O3, CCY-3-O1 and/or CCY-5-O2, preferably in concentrations >3%, in particular 5 to 15%, based on the mixture as a whole;

and/or one or more compounds CPY-n-Om and CY-n-Om, preferably in concentrations of 10 to 80%, based on the mixture as a whole, and/or one or more compounds CPY-n-Om and PY-n-Om, preferably CPY-2-O2 and/or CPY-3-O2 and PY-3-O2 or PY-1-O2, preferably in concentrations of 5 to 20%, more preferably 10 to 15% to based on the mixture as a whole, and/or one or more compound(s) selected from the group consisting of CCH-13, CCH-23, CCH-34, CCH-35, CCH-301 and CCH-303, preferably in a total concentration of 3 to 40%, preferably 3 to 25% based on the mixture as a whole, and/or one or more compounds selected from the group consisting of CC-2-V1, CC-3-V1, CC-3-V2, CC-4-V1, CC-3-V, CC-4-V and CC-5-V, preferably in a total concentration of 3 to 40%, more preferably from 5% to 30% based on the mixture as a whole, and/or one or more compound(s) CCP-n-m and/or CCP-Vn-m and/or CPP-n-m, preferably selected from the group consisting of CCP-3-1, CCP-V-1, CCP-V2-1 and CPP-3-2, preferably in a total concentration of 4 to 35%, preferably 5 to 25% based on the mixture as a whole, and/or one or more compound(s) CLP-n-m and/or CLP-Vn-m, preferably selected from the group consisting of CLP-3-1, CLP-3-2 and CLP-V-1, preferably in a total concentration of 1 to 25%, preferably 2 to 15% based on the mixture as a whole, and/or one or more compounds selected from the group consisting of PYP-n-m, PGIY-n-Om and PGP-n-2V, preferably in a total concentration of 2 to 20%, more preferably 2% to 15%, most preferably 2 to 10%, based on the mixture as a whole, and/or one or more compound(s) PP-n-m and/or PP-n-nVm, preferably selected from the group consisting of PP-1-3, PP-1-4, PP-1-5, PP-1-2V and PP-1-2V1, preferably in a total concentration of 1 to 15%, preferably 2 to 10% based on the mixture as a whole, and/or the compound PPGU-3-F, preferably in a concentration of 0.1% to 3% based on the mixture as a whole.

It is advantageous for the liquid-crystalline medium according to the invention to preferably have a nematic phase from ≤−20° C. to ≥70° C., particularly preferably from ≤−30° C. to ≥80° C., very particularly preferably from ≤−40° C. to ≥90° C.

The LC medium according to the invention has a clearing temperature of 70° C. or more, preferably of 74° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the LC medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity V20 of at most 30 $mm^2 \cdot s^{-1}$ at 20° C.

The mixture is nematic at a temperature of −20° C. or less, preferably at −30° C. or less, very preferably at −40° C. or less.

The values of the birefringence Δn in the liquid-crystal mixture are generally between 0.07 and 0.16, preferably between 0.08 and 0.15, very preferably between 0.09 and 0.14. In a preferred embodiment of the present invention, the LC medium has a birefringence in the range of from 0.090 to 0.110, preferably from 0.095 to 0.108, in particular from 0.102 to 0.107.

The liquid-crystal mixture according to the invention has a dielectric anisotropy Δε of −1.5 to −8.0, preferably of −2.0 to −4.0, in particular −2.5 to −3.6, The rotational viscosity $\gamma_1$ at 20° C. is preferably ≤120 mPa·s, in particular ≤105 mPa·s. In a preferred embodiment, the rotational viscosity $\gamma_1$ at 20° C. is ≤100 mPa·s, in particular ≤95 mPa·s.

The liquid-crystal media according to the invention have relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all VA-TFT (vertical alignment-thin film transistor) applications, such as, for example, VAN (vertically aligned nematic), MVA (multidomain VA), (S)-PVA (super patterned VA), ASV (advanced super view, or axially symmetric VA), PSA (polymer sustained VA) and PS-VA (polymer stabilised VA). They are furthermore suitable for IPS (in-plane switching) and FFS (fringe field switching) applications having negative Δε.

The nematic LC media in the displays according to the invention generally comprise two components A and B, which themselves consist of one or more individual compounds.

Component A has significantly negative dielectric anisotropy and gives the nematic phase a dielectric anisotropy of ≤−0.5. It preferably comprises one or more of the compounds of the formulae IIA, IIB, IIC and/or IID, furthermore one or more compounds of the formula III.

The proportion of component A is preferably between 45 and 100%, in particular between 60 and 85%.

For component A, one (or more) individual compound(s) which has (have) a value of Δε≤−1.5 is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot S^{-1}$, at 20° C.

A multiplicity of suitable materials is known to the person skilled in the art from the literature. Particular preference is given to compounds of the formula IV.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

Besides one or more compounds of the formula IA, the LC medium preferably comprises 4 to 15, in particular 5 to 12, and particularly preferably <10, compounds of the formulae IIA, IIB, IIC and/or IID and one or more compounds of the formula IV.

Besides compounds of the formula IA and the compounds of the formulae IIA, IIB, IIC and/or IID and IV, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenyl-cyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula R $$R^{R1}\text{-L-G-E-}R^{R2} \qquad \text{R}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline,

| | | |
|---|---|---|
| G denotes | —CH=CH— | —N(O)=N— |
| | —CH=CQ— | —CH=N(O)— |
| | —C≡C— | $—CH_2—CH_2—$ |
| | —CO—O— | $—CH_2—O—$ |
| | —CO—S— | $—CH_2—S—$ |
| | —CH=N— | —COO—Phe—COO— |
| | $—CF_2O—$ | —CF=CF— |
| | $—OCF_2—$ | $—OCH_2—$ |
| | $—(CH_2)_4—$ | $—(CH_2)_3O—$ |

or a C—C single bond, Q denotes halogen, preferably chlorine, or —CN, and $R^{R1}$ and $R^{R2}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{R1}$ and $R^{R2}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

The LC medium has preferably a nematic LC phase.

Preferably the LC medium comprises one or more polymerizable compounds, preferably selected from polymerizable mesogenic compounds, also known as “reactive mesogens” or RMs, very preferably from formula M $$R^a—B^1—(Z^m—B^2)_m—R^b \qquad M$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —$C(R^0)$=$C(R^{00})$—, —C≡C—, —$N(R^{00})$—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^m$ —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —CH=CF—, —CF=CH—, —C≡C—, —CH=CH—COO—, —OCO—CH=CH—, —CH2CH2-CO—O—, O—CO—$CH_2$—$CH_2$—, —$CR^0R^{00}$— or a single bond, $R^0$ and $R^{00}$ H or alkyl having 1 to 12 C atoms, m 0, 1, 2, 3 or 4, n1 1, 2, 3 or 4, L P, P-Sp-, OH, $CH_2OH$, F, Cl, Br, I, —CN, —$NO_2$, —NCO, —NCS, —OCN, —SCN, —C(=O)$N(R^x)_2$, —C(=O)$Y^1$, —C(=O)$R^x$, —$N(R^x)_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, $Y^1$ halogen, $R^x$ P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from the group consisting of $CH_2$=$CW^1$—CO—O—, $CH_2$=$CW^1$—CO—,

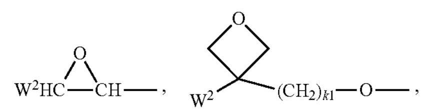

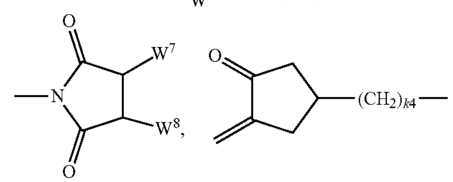

$CH_2$=$CW^2$—$(O)_{k3}$—, $CW^1$=CH—CO—$(O)_{k3}$—, $CW^1$=CH—CO—NH—, $CH_2$=$CW^1$—CO—NH—, $CH_3$—CH=CH—O—, $(CH_2$=$CH)_2$CH—OCO—, $(CH_2$=CH—$CH_2)_2$CH—OCO—, $(CH_2$=$CH)_2$CH—O—, $(CH_2$=CH—$CH_2)_2$N—, $(CH_2$=CH—$CH_2)_2$N—CO—, HO—$CW^2W^3$—, HS—$CW^2W^3$—, $HW^2N$—, HO—$CW^2W^3$—NH—, $CH_2$=$CW^1$—CO—NH—, $CH_2$=CH—$(COO)_{k1}$-Phe-$(O)_{k2}$—, $CH_2$=CH—$(CO)_{k1}$-Phe-$(O)_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$=$CW^1$—CO—O—, $CH_2$=$CW^1$—CO—,

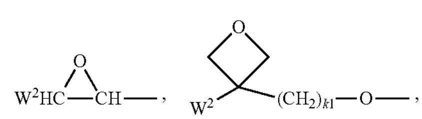

-continued

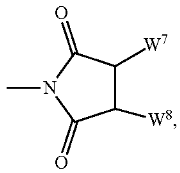,

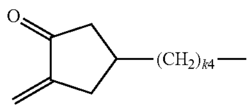, $CH_2{=}CW^2{-}O{-}$, $CH_2{=}CW^2{-}$, $CW^1{=}CH{-}CO{-}(O)_{k3}{-}$, $CW^1{=}CH{-}CO{-}NH{-}$, $CH_2{=}CW^1{-}CO{-}NH{-}$, $(CH_2{=}CH)_2CH{-}OCO{-}$, $(CH_2{=}CH{-}CH_2)_2CH{-}OCO{-}$, $(CH_2{=}CH)_2CH{-}O{-}$, $(CH_2{=}CH{-}CH_2)_2N{-}$, $(CH_2{=}CH{-}CH_2)_2N{-}CO{-}$, $CH_2{=}CW^1{-}CO{-}NH{-}$, $CH_2{=}CH{-}(COO)_{k1}$-Phe-$(O)_{k2}{-}$, $CH_2{=}CH{-}(CO)_{k1}$-Phe-$(O)_{k2}{-}$, Phe-CH═CH— and $W^4W^5W^6Si{-}$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2{=}CW^1{-}CO{-}O{-}$, in particular $CH_2{=}CH{-}CO{-}O{-}$, $CH_2{=}C(CH_3){-}CO{-}O{-}$ and $CH_2{=}CF{-}CO{-}O{-}$, furthermore $CH_2{=}CH{-}O{-}$, $(CH_2{=}CH)_2CH{-}O{-}CO{-}$, $(CH_2{=}CH)_2CH{-}O{-}$,

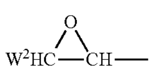 and 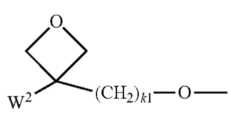.

Further preferred polymerizable groups P are selected from the group consisting of vinyloxy, acrylate, methacrylate, fluoroacrylate, chloroacrylate, oxetane and epoxide, most preferably from acrylate and methacrylate.

Very preferably all polymerizable groups in the polymerizable compound have the same meaning.

If the spacer group Sp is different from a single bond, it is preferably of the formula Sp"-X", so that the respective radical P-Sp- conforms to the formula P-Sp"-X"—, wherein

- Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, $-N(R^0)-$, $-Si(R^0R^{00})-$, —CO—, —CO—O—, —O—CO—, —O—CO—O—, —S—CO—, —CO—S—, $-N(R^{00})-CO-O-$, $-O-CO-N(R^0)-$, $-N(R^0)-CO-N(R^{00})-$, —CH═CH— or —C≡C— in such a way that O and/or S atoms are not linked directly to one another,
- X" denotes —O—, —S—, —CO—, —CO—O—, —O—CO—, —O—CO—O—, $-CO-N(R^0)-$, $-N(R^0)-CO-$, $-N(R^0)-CO-N(R^{00})-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, —CH═N—, —N═CH—, —N═N—, $-CH{=}CR^0-$, $-CY^2{=}CY^3-$, —C≡C—, —CH═CH—CO—O—, —O—CO—CH═CH— or a single bond,
- $R^0$ and $R^{00}$ each, independently of one another, denote H or alkyl having 1 to 20 C atoms, and
- $Y^2$ and $Y^3$ each, independently of one another, denote H, F, Cl or CN.
- X" is preferably —O—, —S—, —CO—, —COO—, —OCO—, —O—COO—, $-CO-NR^0-$, $-NR^0-CO-$, $-NR^0-CO-NR^{00}-$ or a single bond.

Typical spacer groups Sp and -Sp"-X"— are, for example, $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^0R^{00}-O)_{p1}-$, in which p1 is an integer from 1 to 12, q1 is an integer from 1 to 3, and $R^0$ and $R^{00}$ have the meanings indicated above.

Particularly preferred groups Sp and -Sp"-X"— are $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a preferred embodiment of the invention the polymerizable compounds contain a spacer group Sp that is substituted by one or more polymerizable groups P, so that the group Sp-P corresponds to $Sp(P)_s$, with s being ≥2 (branched polymerizable groups).

Preferred polymerizable compounds according to this preferred embodiment are those wherein s is 2, i.e. compounds which contain a group $Sp(P)_2$. Very preferred polymerizable compounds according to this preferred embodiment contain a group selected from the following formulae:

—X-alkyl-CHPP S1

$-X\text{-alkyl-CH}((CH_2)_{aa}P)((CH_2)_{bb}P)$ S2

$-X-N((CH_2)_{aa}P)((CH_2)_{bb}P)$ S3

$-X\text{-alkyl-CHP}-CH_2-CH_2P$ S4

$-X\text{-alkyl-C}(CH_2P)(CH_2P)-C_{aa}H_{2aa+1}$ S5

$-X\text{-alkyl-CHP}-CH_2P$ S6

$-X\text{-alkyl-CPP}-C_{aa}H_{2aa+1}$ S7

$-X\text{-alkyl-CHPCHP}-C_{aa}H_{2aa+1}$ S8 in which P is as defined in formula M,

- alkyl denotes a single bond or straight-chain or branched alkylene having 1 to 12 C atoms which is unsubstituted or mono- or polysubstituted by F, Cl or CN and in which one or more non-adjacent $CH_2$ groups may each, independently of one another, be replaced by $-C(R^0){=}C(R^0)-$, —C≡C—, $-N(R^0)-$, —O—, —S—, —CO—, —CO—O—, —O—CO—, —O—CO—O— in such a way that O and/or S atoms are not linked directly to one another, where $R^0$ has the meaning indicated above,
- aa and bb each, independently of one another, denote 0, 1, 2, 3, 4, 5 or 6, X has one of the meanings indicated for X", and is preferably O, CO, $SO_2$, O—CO—, CO—O or a single bond.

Preferred spacer groups $Sp(P)_2$ are selected from formulae S1, S2 and S3.

Very preferred spacer groups $Sp(P)_2$ are selected from the following subformulae:

| | |
|---|---|
| —CHPP | S1a |
| —O—CHPP | S1b |
| —$CH_2$—CHPP | S1c |
| —$OCH_2$—CHPP | S1d |
| —CH($CH_2$—P)($CH_2$—P) | S2a |
| —OCH($CH_2$—P)($CH_2$—P) | S2b |
| —$CH_2$—CH($CH_2$—P)($CH_2$—P) | S2c |
| —$OCH_2$—CH($CH_2$—P)($CH_2$—P) | S2d |
| —CO—NH(($CH_2$)$_2$P)(($CH_2$)$_2$P) | S3a |

P is preferably selected from the group consisting of vinyloxy, acrylate, methacrylate, fluoroacrylate, chloroacrylate, oxetane and epoxide, very preferably from acrylate and methacrylate, most preferably from methacrylate.

Further preferably all polymerizable groups P that are present in the same compound have the same meaning, and very preferably denote acrylate or methacrylate, most preferably methacrylate.

Sp preferably denotes a single bond or —$(CH_2)_{p1}$—, —$(CH_2)_{p2}$—CH═CH—$(CH_2)_{p3}$—, —O—$(CH_2)_{p1}$—, —O—CO—$(CH_2)_{p1}$, or —CO—O—$(CH_2)_{p1}$, wherein p1 is 2, 3, 4, 5 or 6, preferably 2 or 3, p2 and p3 are independently of each other 0, 1, 2 or 3 and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Further preferably at least one group Sp is a single bond.

Further preferably at least one group Sp is different from a single bond, and is preferably selected from —$(CH_2)_{p1}$—, —$(CH_2)_{p2}$—CH═CH—$(CH_2)_{p3}$—, —O—$(CH_2)_{p1}$—, —O—CO—$(CH_2)_{p1}$, or —CO—O—$(CH_2)_{p1}$, wherein p1 is 2, 3, 4, 5 or 6, preferably 2 or 3, p2 and p3 are independently of each other 0, 1, 2 or 3 and, if Sp is —O—$(CH_2)_{p1}$—, —O—CO—$(CH_2)_{p1}$ or —CO—O—$(CH_2)_{p1}$ the O-atom or CO-group, respectively, is linked to the benzene ring.

Very preferably Sp is different from a single bond, and is selected from —$(CH_2)_2$—, —$(CH_2)_3$—, —$(CH_2)_4$—, —O—$(CH_2)_2$—, —O—$(CH_2)_3$—, —O—CO—$(CH_2)_2$ and —CO—O—$(CH)_2$—, wherein the O atom or the CO group is attached to the benzene ring.

Particularly preferred compounds of the formula M are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which $B^1$ and $B^2$ each, independently of one another, denote 1,4-phenylene, 1,3-phenylene, naphthalene-1,4-diyl or naphthalene-2,6-diyl.

Further preferred compounds of the formula M are those in which the group —$B^1$—$(Z^m$—$B^2)_m$— in formula M is selected from the following formulae

A1

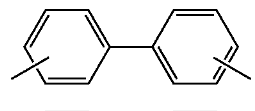

A2

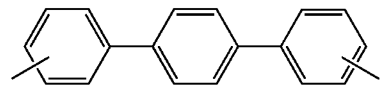

A3

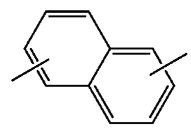

A4

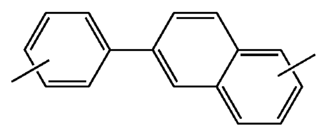

A5

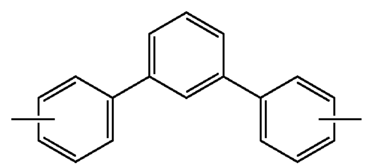

A6

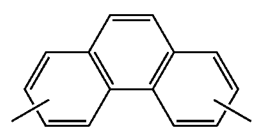

wherein at least one benzene ring is substituted by at last one group L and the benzene rings are optionally further substituted by one or more groups L or P-Sp-.

Preferred compounds of formula M and its sub-formulae are selected from the following preferred embodiments, including any combination thereof:

All groups P in the compound have the same meaning,

—$B^1$—$(Z^m$—$B^2)_m$— is selected from formulae A1, A2 and A5, the compounds contain exactly two polymerizable groups (represented by the groups P), the compounds contain exactly three polymerizable groups (represented by the groups P), P is selected from the group consisting of acrylate, methacrylate and oxetane, very preferably acrylate or methacrylate, P is methacrylate, all groups Sp are a single bond, at least one of the groups Sp is a single bond and at least one of the groups Sp is different from a single bond, Sp, when being different from a single bond, is —$(CH_2)_{p2}$—, —$(CH_2)_{p2}$—O—, —$(CH_2)_{p2}$—CO—

O—, —$(CH_2)_{p2}$—O—CO—, wherein p2 is 2, 3, 4, 5 or 6, and the O-atom or the CO-group, respectively, is connected to the benzene ring, Sp is a single bond or denotes —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO— group, respectively, is connected to the benzene ring, R denotes P-Sp-, R does not denote or contain a polymerizable group, R does not denote or contain a polymerizable group and denotes straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or $L^a$, L or L' denote F, Cl or CN, L is F.

Very preferred compounds of formula M are selected from the following formulae:

M1

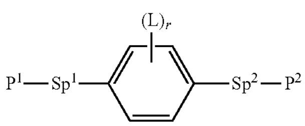

M2

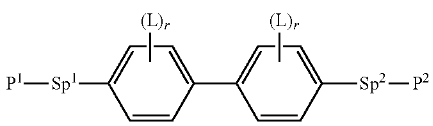

M3

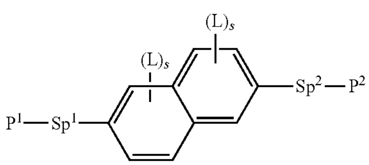

M4

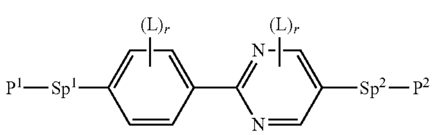

M5

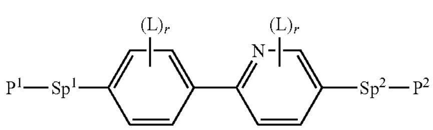

M6

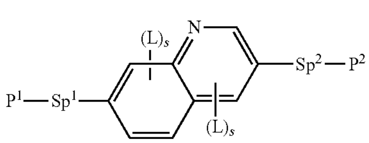

M7

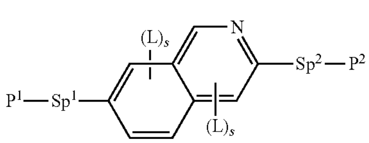

-continued

M8

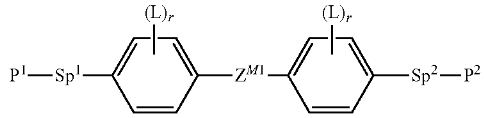

M9

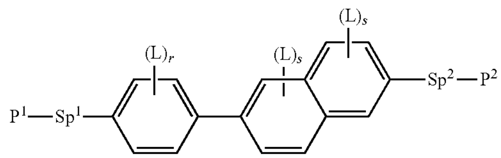

M10

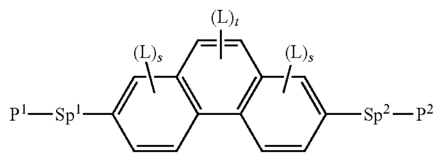

M11

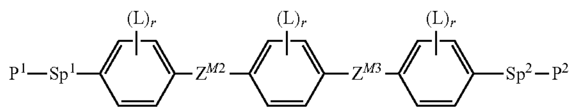

M12

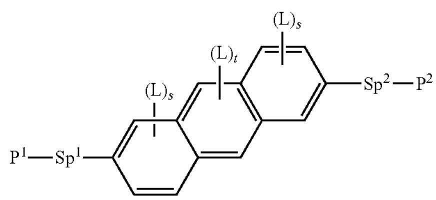

M13

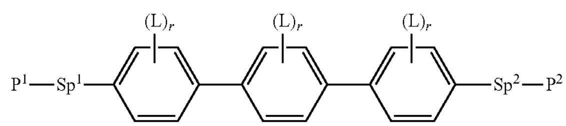

M14

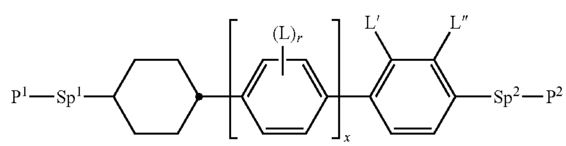

M15

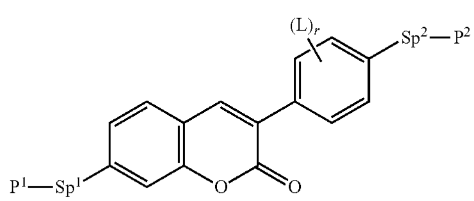

M16

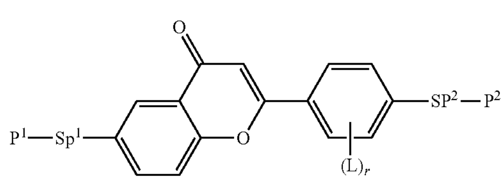

-continued
M17
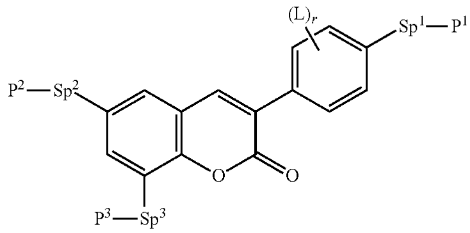
M18
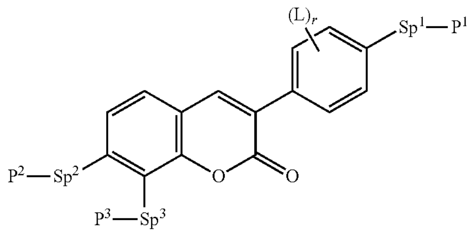
M19
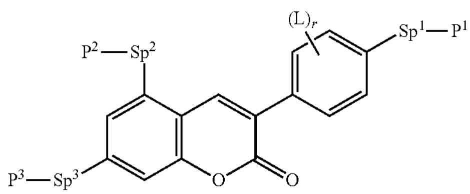
M20
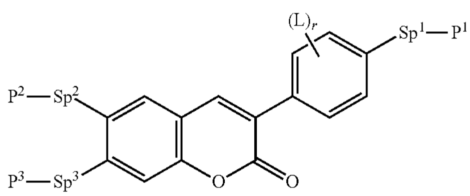
M21
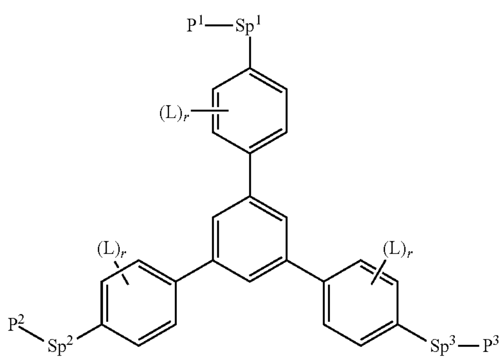
M22
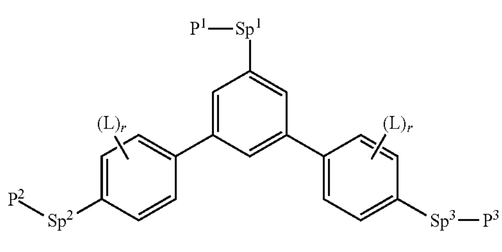
-continued
M23
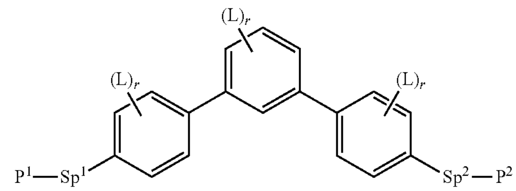
M24
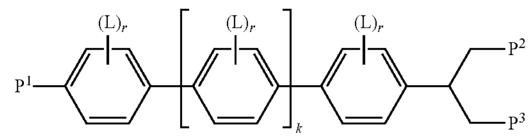
M25
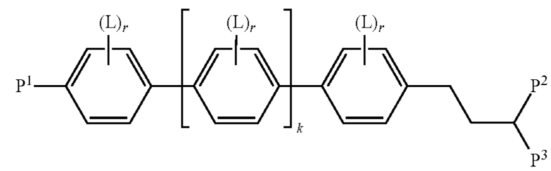
M26
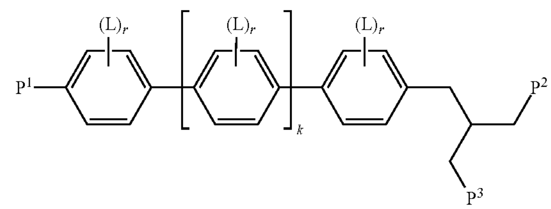
M27
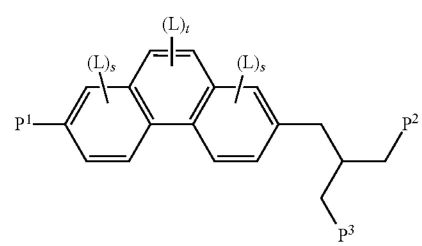
M28
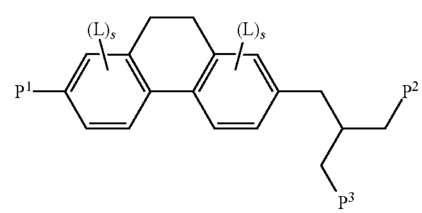
M29
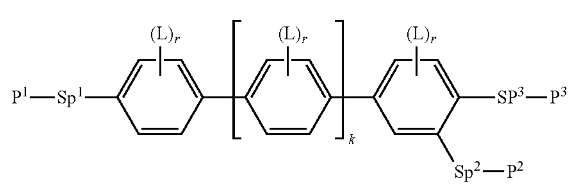

-continued

M30

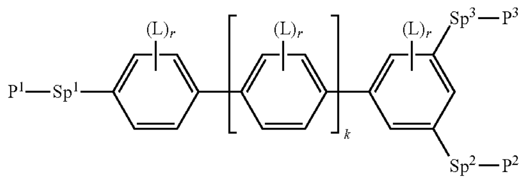

M31

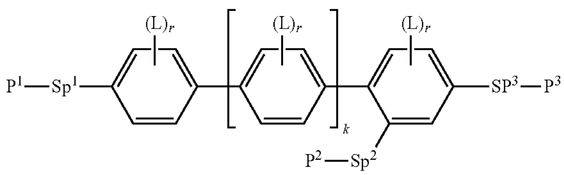

M32

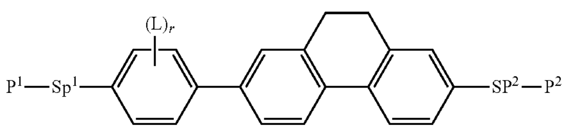

in which the individual radicals, on each occurrence identically or differently, and each, independently of one another, have the following meaning:

$P^1$, $P^2$, $P^3$ a polymerizable group, preferably selected from vinyloxy, acrylate, methacrylate, fluoroacrylate, chloroacrylate, oxetane and epoxy, very preferably acrylate or methacrylate, $Sp^1$, $Sp^2$, $Sp^3$ a single bond or a spacer group where, in addition, one or more of the radicals $P^1$-$Sp^1$-, $P^2$-$Sp^2$- and $P^3$-$Sp^3$- may denote $R^M$, with the proviso that at least one of the radicals $P^1$-$Sp^1$-, $P^2$-$Sp^2$ and $P^3$-$Sp^3$- present is different from $R^M$, preferably having one of the preferred meanings of Sp as given above, very preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, $R^M$ H, F, Cl, CN or straight-chain or branched alkyl having 1 to 25 C atoms, in which, in addition, one or more non-adjacent $CH_2$ groups may each be replaced, independently of one another, by —$C(R^0)$═$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), and wherein $R^{aa}$ does not denote or contain a group $P^1$, $P^2$ or $P^3$, $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^{M1}$ —O—, —CO—, —$C(R^yR^z)$— or —$CF_2CF_2$—, $Z^{M2}$, $Z^{M3}$ —CO—O—, —O—CO—, —$CH_2O$—, —$OCH_2$—, —$CF_2O$—, —$OCF_2$— or —$(CH_2)_n$—, where n is 2, 3 or 4, L F, Cl, CN or straight-chain or branched, optionally mono- or polyfluorinated alkyl, alkoxy, thioalkyl, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, s 0, 1, 2 or 3, t 0, 1 or 2, x 0 or 1.

Very preferred are compounds of formulae M2, M13 and M32, especially direactive compounds containing exactly two polymerizable groups $P^1$ and $P^2$.

Further preferred are compounds selected from formulae M17 to M31, in particular from formulae M20, M22, M26, M29 and M31, especially trireactive compounds containing exactly three polymerizable groups $P^1$, $P^2$ and $P^3$.

In the compounds of formulae M1 to M32 the group

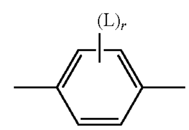

is preferably

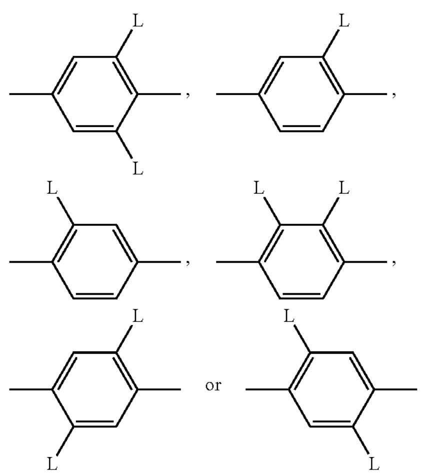

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, —CH═$CH_2$, $C(CH_3)$═$CH_2$, $SCH_3$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, —CH═$CH_2$, $C(CH_3)$═$CH_2$, $SCH_3$, $OCH_3$, $COCH_3$, $OCF_3$ or P-Sp-, more preferably F, Cl, $CH_3$, —CH═$CH_2$, $C(CH_3)$═$CH_2$, $SCH_3$, $OCH_3$, $COCH_3$ or $OCF_3$, most preferably F, $SCH_3$ or $OCH_3$.

Preferred compounds of formulae M1 to M32 are those wherein $P^1$, $P^2$ and $P^3$ denote an acrylate, methacrylate, oxetane or epoxy group, very preferably an acrylate or methacrylate group, most preferably a methacrylate group.

Further preferred compounds of formulae M1 to M32 are those wherein $Sp^1$, $Sp^2$ and $Sp^3$ are a single bond.

Further preferred compounds of formulae M1 to M32 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M32 are those wherein those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Further preferred polymerizable compounds are selected from Table E below, especially selected from the group consisting of formulae RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-163, RM-169, RM-170 and RM-171 to RM-183.

Particularly preferred are LC media comprising one, two or three polymerizable compounds of formula M.

Further preferred are LC media comprising two or more direactive polymerizable compounds of formula M, preferably selected from formulae M1 to M16 and M32, very preferably selected from formulae M2, M13 and M32.

Further preferred are LC media comprising one or more direactive polymerizable compounds of formula M, preferably selected from formulae M1 to M16 and M32, very preferably from formulae M2, M13 and M32, and one or more trireactive polymerizable compounds of formula M, preferably selected from formulae M17 to M32, very preferably from formulae M20, M22, M26, M29 and M31.

Further preferred are LC media comprising one or more polymerizable compounds of formula M wherein at least one r is not 0, or at least one of s and t is not 0, very preferably selected from formulae M2, M13, M22, M24, M27, M29, M31 and M32, and wherein L is selected from the preferred groups shown above, most preferably from F, $OCH_3$ and $SCH_3$.

Further preferred are LC media comprising one or more polymerizable compounds which show absorption in the wavelength range from 320 to 380 nm, preferably selected from formula M, very preferably from formulae M1 to M32.

Particular preference is given to LC media comprising one, two or three polymerizable compounds selected from formula M or formulae M1 to M32.

The combination of compounds of the preferred embodiments mentioned above with the polymerized compounds described above and below causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays. In particular, the LC media exhibit significantly shortened response times, in particular also the grey-shade response times, in PSA displays compared with the LC media from the prior art.

For use in PSA displays the total proportion of the polymerizable compounds, like those of formula M or M1 to M32, in the LC medium is preferably from 0.01 to 2.0%, very preferably from 0.1 to 1.0%, most preferably from 0.2 to 0.8%.

For use in SA-VA displays the total proportion of the polymerizable compounds, like those of formula M or M1 to M32, in the LC medium is preferably from >0 to <3%, very preferably from >0 to <2%, more preferably from 0.05 to 2.0, most preferably from 0.05 to 1.0%.

The compounds of the formulae M and its subformulae can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

The invention furthermore relates to an LC medium or LC display as described above, wherein the polymerizable compounds, like those of formula M and its subformulae, are present in polymerized form.

Optionally one or more polymerization initiators are added to the LC medium. Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG). If a polymerization initiator is employed, its proportion is preferably 0.001 to 5% by weight, particularly preferably 0.001 to 1% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof. The polymerization can thus also be carried out without the addition of an initiator. In a preferred embodiment, the LC medium thus does not contain a polymerization initiator.

The LC medium may also comprise one or more stabilisers in order to prevent undesired spontaneous polymerization of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerizable component (component A), is preferably 10-50,000 ppm, particularly preferably 50-5,000 ppm.

In a preferred embodiment the LC media contain one or more chiral dopants, preferably in a concentration from 0.01 to 1% by weight, very preferably from 0.05 to 0.5% by weight. The chiral dopants are preferably selected from the group consisting of compounds from Table C below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

In another preferred embodiment of the present invention the LC media contain one or more further stabilisers.

Preferred stabilisers are selected from the compounds of formula H

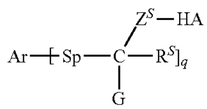

H in which

Ar denotes an aromatic or heteroaromatic hydrocarbon group having 4 to 40 C atoms, preferably 6 to 30 C atoms;

Sp denotes a spacer group;

$R^S$ denotes H, alkyl having 1 to 12 C atoms or alkenyl having 2 to 12 C atoms;

$Z^S$ denotes —O—, —C(O)O—, —$(CH_2)_z$— or —$(CH_2)_z$O—, or a single bond;

HA denotes

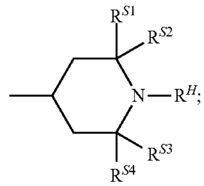

$R^H$ denotes H, O—, $CH_3$, OH or $OR^S$, preferably H or O—;

$R^{S1}$, $R^{S2}$, $R^{S3}$ and $R^{S4}$, identically or differently, denote alkyl having 1 to 6 C atoms, preferably having 1 to 3 C atoms, very preferably $CH_3$;

G denotes H or $R^S$ or a group $Z^S$-HA;

z is an integer from 1 to 6; and q is 3 or 4.

The compounds of formula H are described in EP3354710 A1 and EP3354709 A1.

Preferred compounds of formula H are selected from the formulae H-1, H-2 and H-3:

H-1

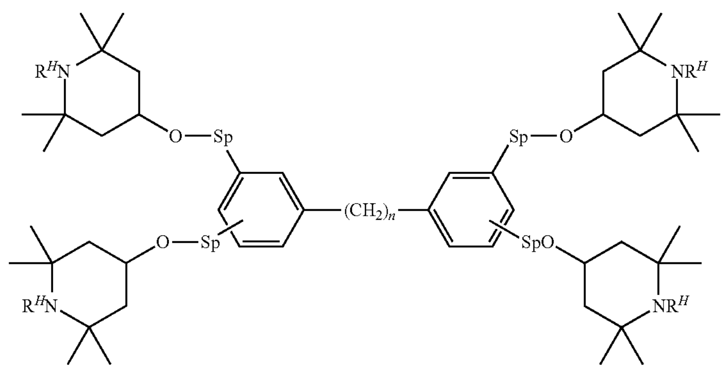

H-2

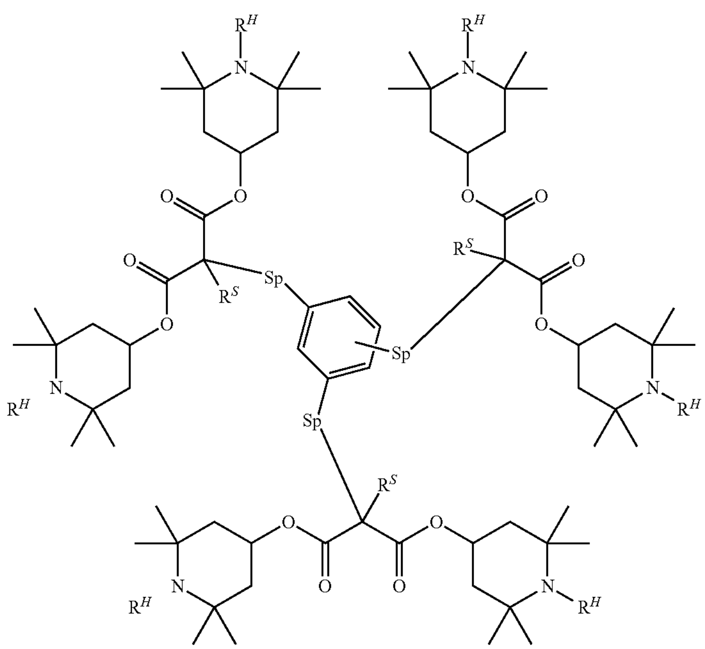

-continued

H-3

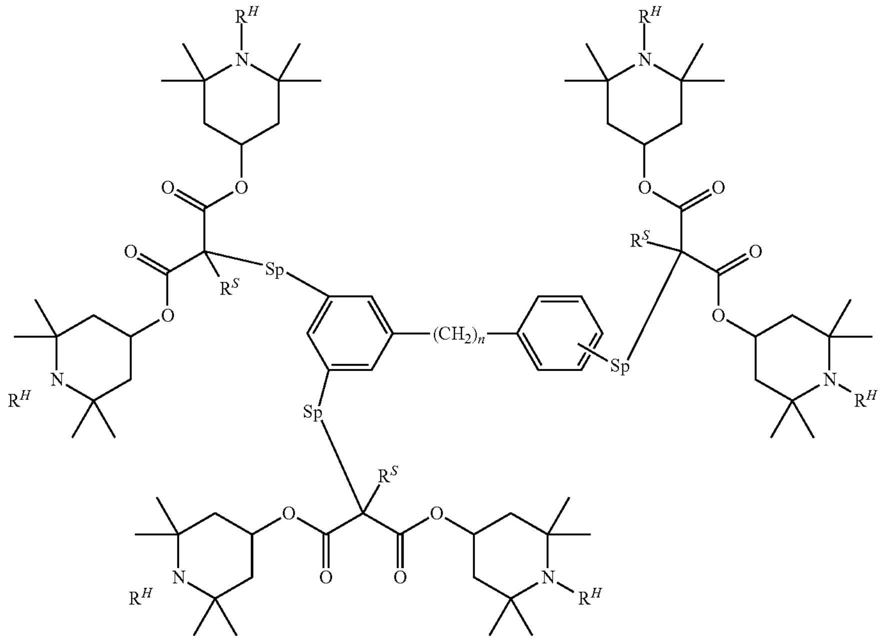

in which $R^H$ has the meanings given above and preferably denotes H or O—, and n is an integer from 0 to 12, preferably 5, 6, 7, 8 or 9, very preferably 7, and Sp denotes a spacer group, preferably alkylene having 1 to 12 C atoms in which one or more non-adjacent —$CH_2$— groups may be replaced with —O—.

Preferred compounds of formula H-1 are those of formula H-1-1:

H-1-1

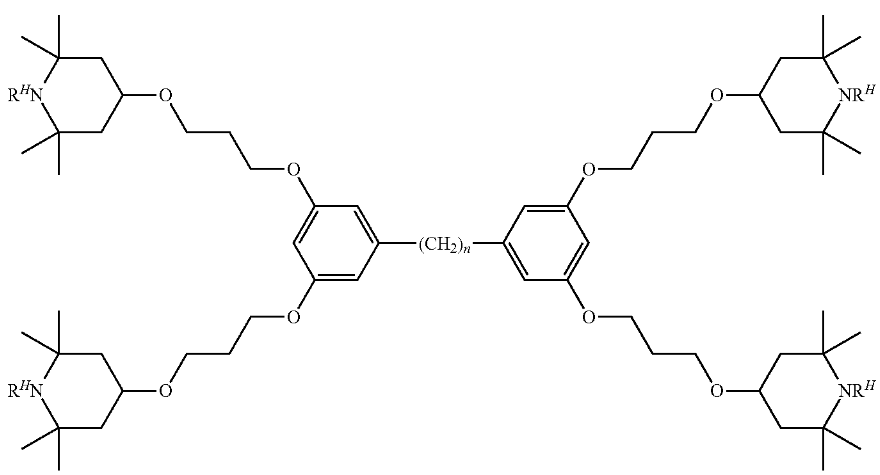

in which $R^H$ has the meanings given above and preferably denotes H or O—, and n is an integer from 0 to 12, preferably 5, 6, 7, 8 or 9, very preferably 7.

Very preferred compounds of formula H-1-1 are those of formula H-1-1-1:

H-1-1-1

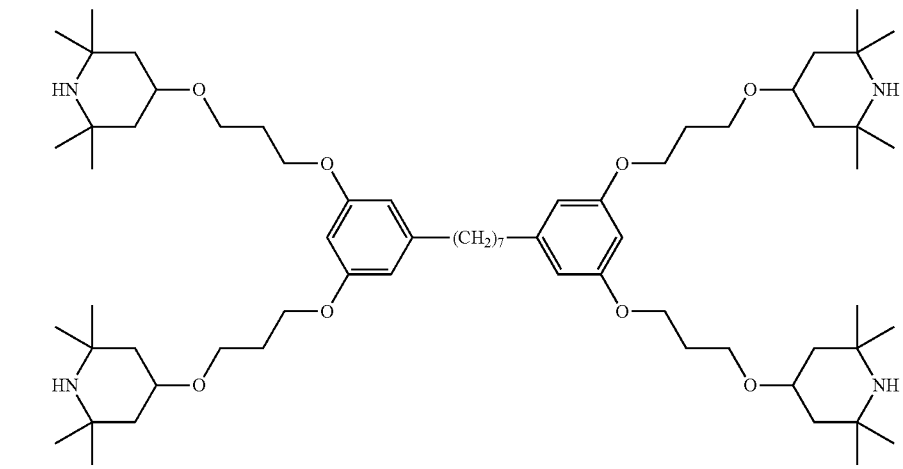

Preferred compounds of formula H-2 are those of formula H-2-1:

H-2-1

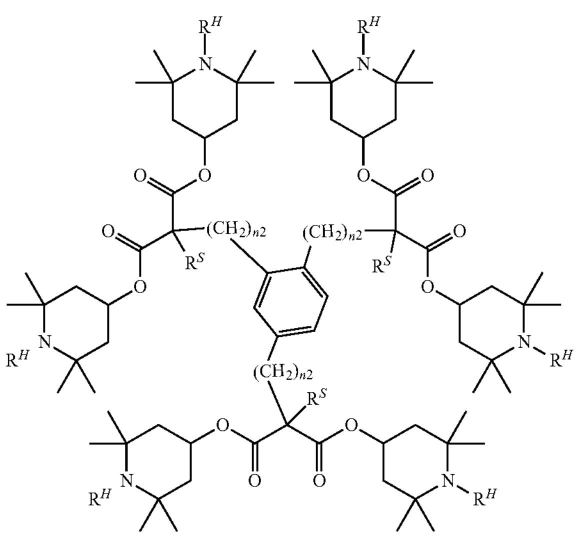

in which $R^H$ has the meanings given above and preferably denotes H or O—, and n2, on each occurrence identically or differently, preferably identically, is an integer from 1 to 12, preferably 2, 3, 4, 5, or 6, very preferably 3, and $R^S$ on each occurrence identically or differently, preferably identically, denotes alkyl having 1 to 6 C atoms, preferably n-butyl.

Very preferred compounds of formula H-2-1 are those of formula H-2-1-1:

H-2-1-1

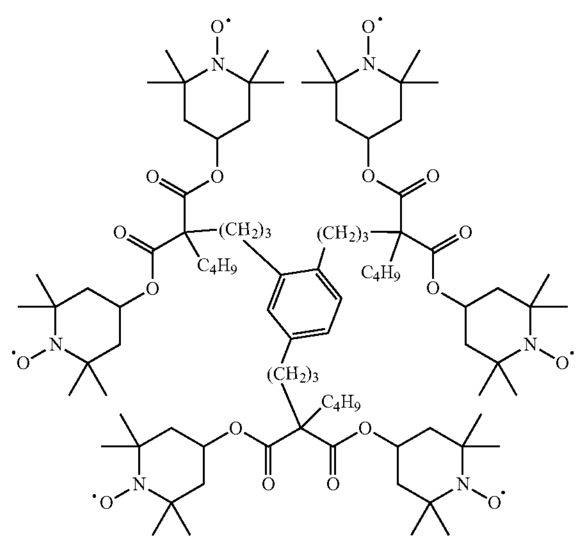

Preferred compounds of formula H-3 are selected from the formula H-3-1:

H-3-1
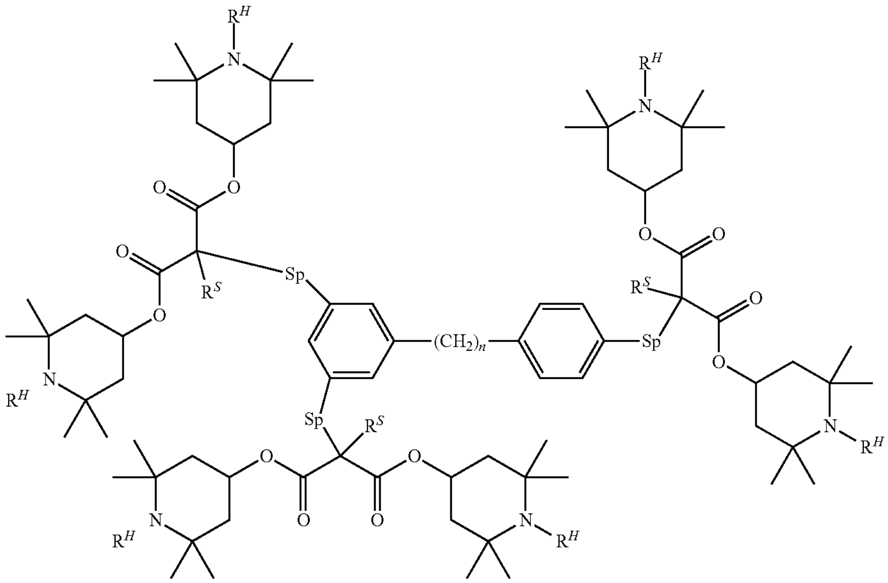
in which Sp and $R^H$ have the meanings given above and $R^H$ preferably denotes H or O—, and n is an integer from 0 to 12, preferably 5, 6, 7, 8 or 9, very preferably 7.
Further preferred stabilisers are selected from the group consisting of the formulae ST-1 to ST-18:
ST-1
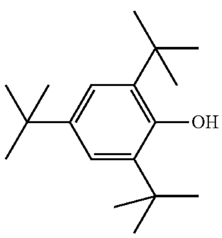
ST-2
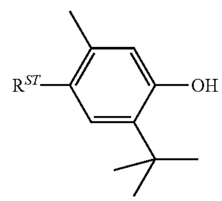
ST-3
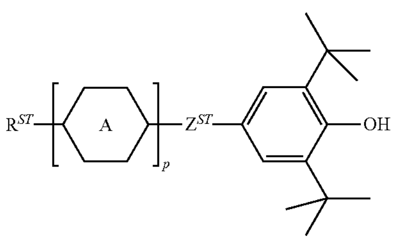
ST-4
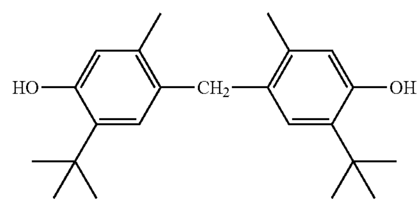
ST-5
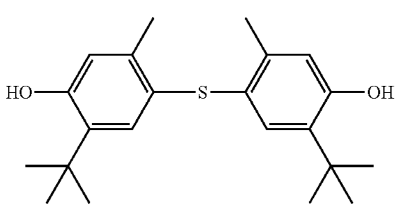
ST-6
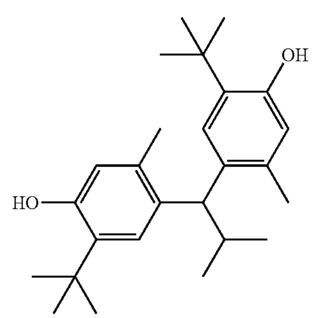

-continued
ST-7
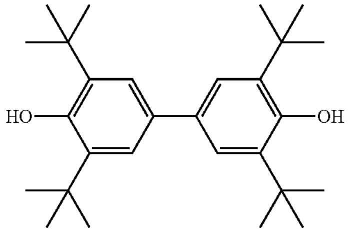
ST-8
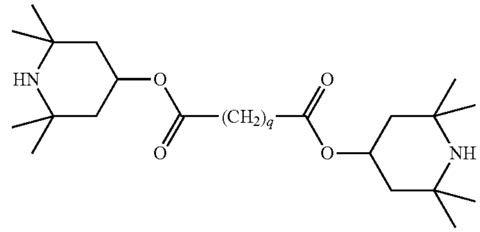
ST-9
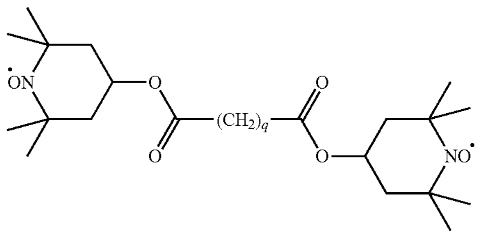
ST-10
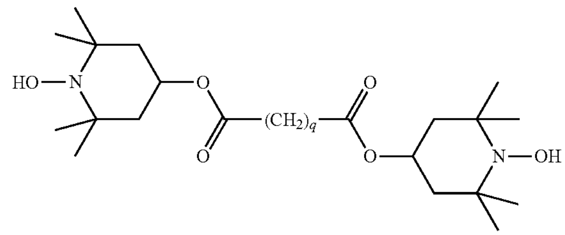
ST-11
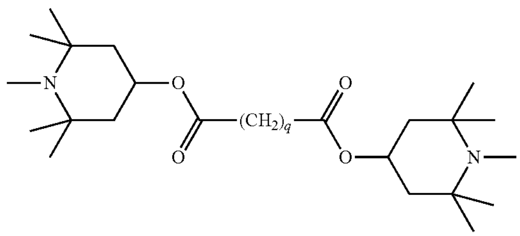
ST-12
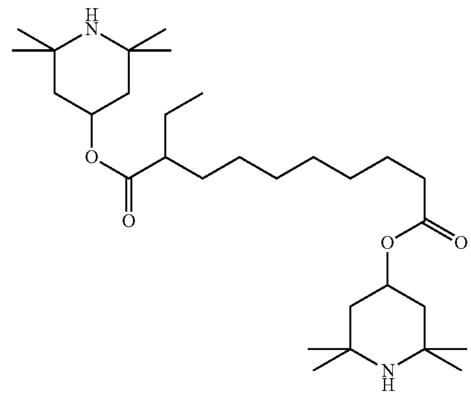
ST-13
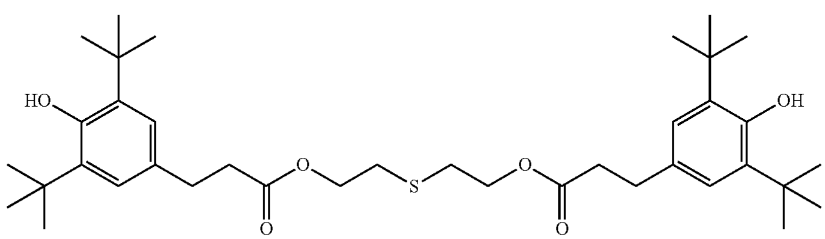
ST-14
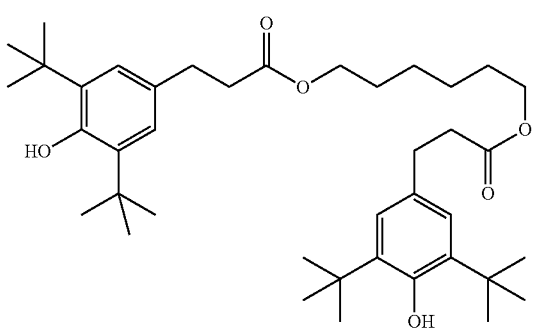
ST-15
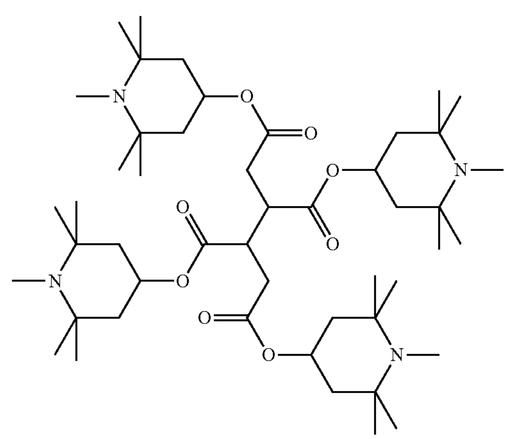

-continued

ST-16

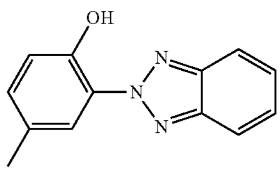

ST-17

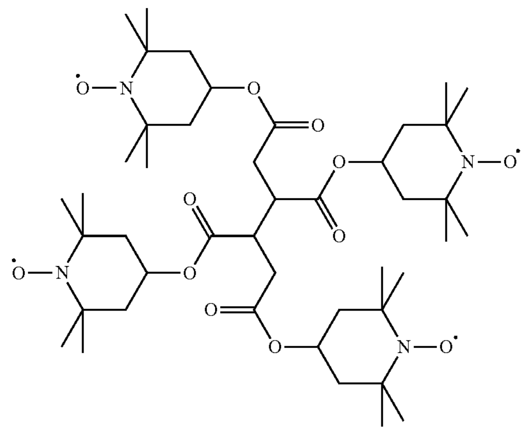

ST-18

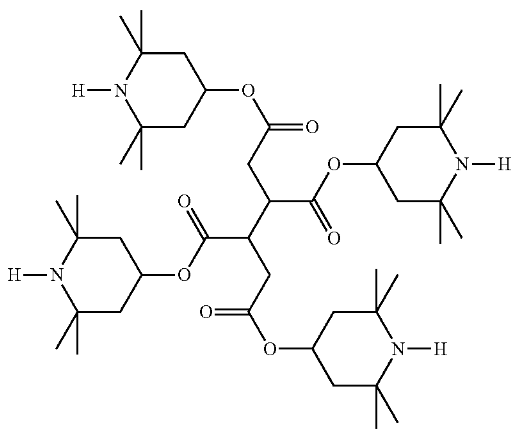

in which $R^{ST}$ denotes H, an alkyl or alkoxy radical having 1 to 15 C atoms, wherein, in addition, one or more $CH_2$ groups may each be replaced, independently of one another, by —C≡C—, —$CF_2O$—, —$OCF_2$—, —CH═CH—,

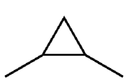,
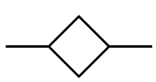,
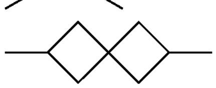,
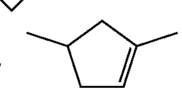,
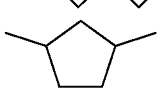,

—O—, —CO—O—, —O—CO— in such a way that O atoms are not linked directly to one another, and in which, in addition, one or more H atoms may be replaced by halogen,

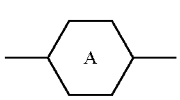

, on each occurrence, identically or differently, denotes

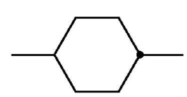 or 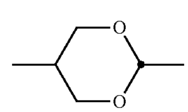, $Z^{ST}$ each, independently of one another, denote —CO—O—, —O—CO—, —$CF_2O$—, —$OCF_2$—, —$CH_2O$—, —$OCH_2$—, —$CH_2$—, —$CH_2CH_2$—, —$(CH_2)_4$—, —CH═CH—, —$CH_2O$—, —$C_2F_4$—, —$CH_2CF_2$—, —$CF_2CH_2$—, —CF═CF—, —CH═CF—, —CF═CH—, —CH═CH—, —C≡C— or a single bond, $L^1$ and $L^2$ each, independently of one another, denote F, Cl, $CH_3$, $CF_3$ or $CHF_2$, p denotes 0, 1 or 2, q denotes 1, 2, 3, 4, 5, 6, 7, 8, 9 or 10.

Preferred compounds of formula ST are those selected from the formulae ST-3 and in particular:

ST-1
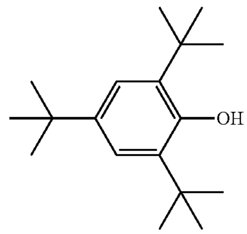
ST-3a
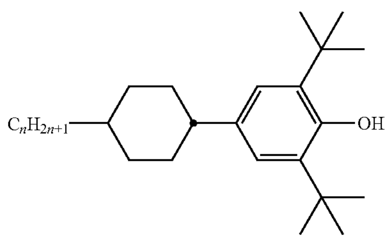
in which n=1, 2, 3, 4, 5, 6 or 7, preferably n=3
ST-3b
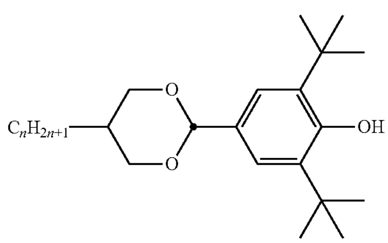
in which n=1, 2, 3, 4, 5, 6 or 7, preferably n=3
ST-3c
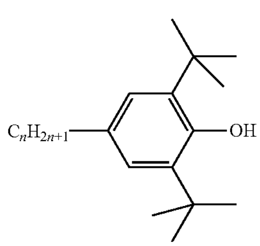
in which n=1, 2, 3, 4, 5, 6 or 7, preferably n=1 or 7
ST-8-1
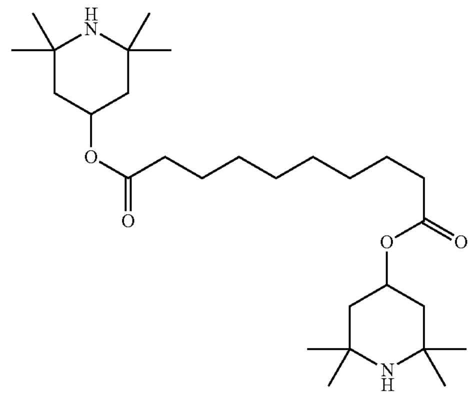
ST-9-1
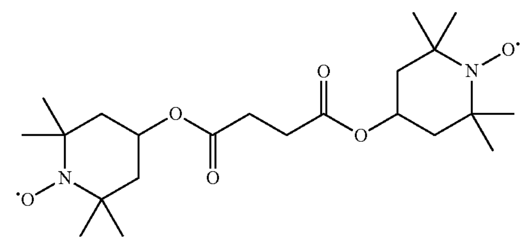
ST-12
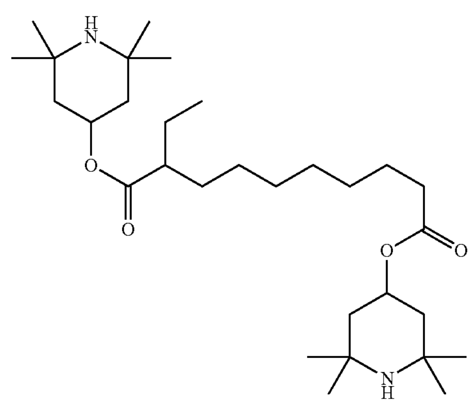
ST-16
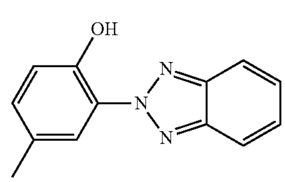

-continued

ST-17

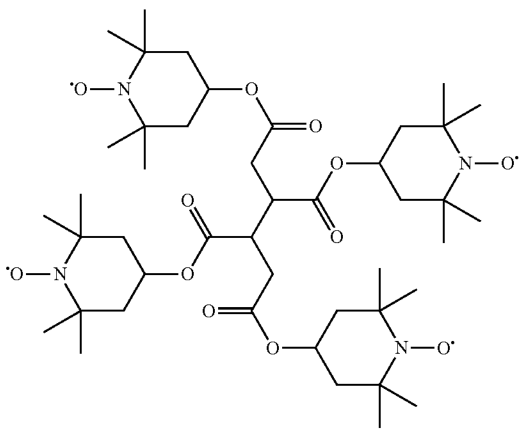

ST-18

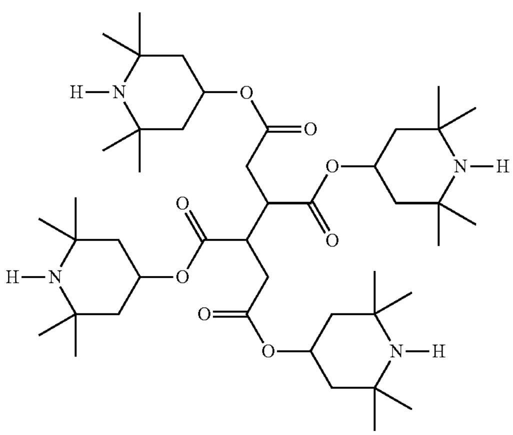

In the compounds of the formulae ST-3a and ST-3b, n preferably denotes 3. In the compounds of the formula ST-2a, n preferably denotes 7.

Very preferred stabilisers are selected from the group of the compounds of the formulae ST-2a-1, ST-3a-1, ST-3b-1, ST-8-1, ST-9-1 and ST-12:

ST-3a-1

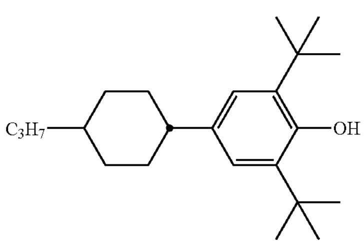

ST-3b-1

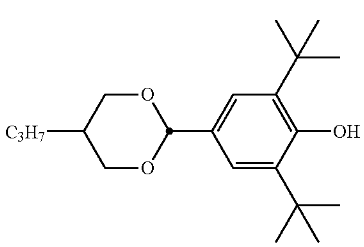

-continued

ST-3c-1

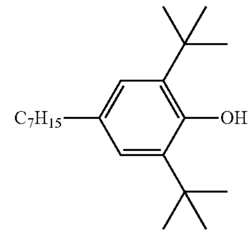

ST-8-1

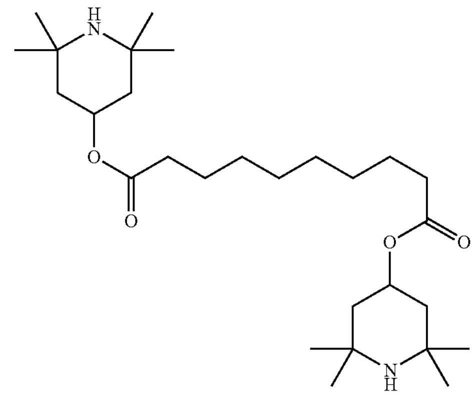

ST-9-1

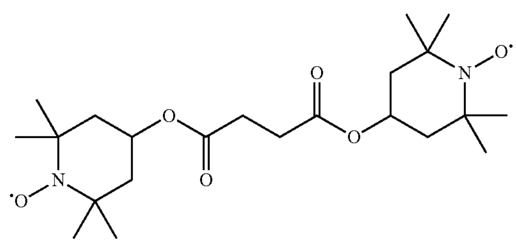

ST-12

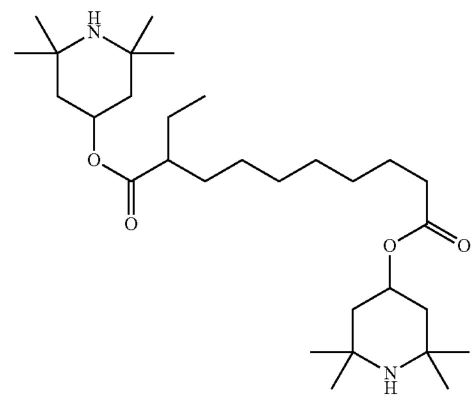

In another preferred embodiment the LC medium comprises one or more stabilisers selected from Table D below.

Preferably the proportion of stabilisers in the LC medium is from 10 to 500 ppm, very preferably from 20 to 100 ppm.

In another preferred embodiment the LC medium according to the present invention contains a self alignment (SA) additive, preferably in a concentration of 0.1 to 2.5%.

In a preferred embodiment the SA-VA display according to the present invention does not contain a polyimide alignment layer. In another preferred embodiment the SA-VA display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the RMs in the PSA process.

Suitable SA additives to induce homeotropic alignment, especially for use in SA-VA mode displays, are disclosed for example in US 2013/0182202 A1, US 2014/0838581 A1, US 2015/0166890 A1 and US 2015/0252265 A1.

In another preferred embodiment an LC medium or a polymer stabilised SA-VA display according to the present invention contains one or more self alignment additives selected from Table F below.

In another preferred embodiment the LC medium according to the present invention contains one or more SA additives, preferably selected from formula II or its subformulae or selected from Table F below, in a concentration from 0.1 to 5%, very preferably from 0.2 to 3%, most preferably from 0.2 to 1.5%.

The invention furthermore relates to an LC display comprising an LC medium according to the invention as described above and below, which is a preferably a PSA or SA display, very preferably a PS-VA, PS-IPS, PS-FFS or SA-VA display.

The invention furthermore relates to an LC display comprising an LC medium as described above and below wherein the polymerizable compounds are present in polymerized form, which is preferably a PSA or SA display, very preferably a PS-VA, PS-IPS, PS-FFS or SA-VA display.

For the production of PSA or polymer stabilised SA displays, the polymerizable compounds contained in the LC medium are polymerized by in-situ polymerization in the LC medium between the substrates of the LC display, preferably while a voltage is applied to the electrodes.

The structure of the displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:

- a first substrate including a pixel electrode defining pixel areas, the pixel electrode being connected to a switching element disposed in each pixel area and optionally including a micro-slit pattern, and optionally a first alignment layer disposed on the pixel electrode,
- a second substrate including a common electrode layer, which may be disposed on the entire portion of the second substrate facing the first substrate, and optionally a second alignment layer,
- an LC layer disposed between the first and second substrates and including an LC medium as described above and below, wherein the polymerizable compounds may also be present in polymerized form.

The first and/or second alignment layer controls the alignment direction of the LC molecules of the LC layer. For example, in PS-VA displays the alignment layer is selected such that it imparts to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The LC layer with the LC medium can be deposited between the substrates of the display by methods that are conventionally used by display manufacturers, for example the so-called one-drop-filling (ODF) method. The polymerizable component of the LC medium is then polymerized for example by UV photopolymerization. The polymerization can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerization the polymerizable compounds form a copolymer, which causes a certain tilt angle of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. It is also possible firstly to carry out the polymerization, optionally while applying a voltage, in a first step in order to produce a tilt angle, and subsequently, in a second polymerization step without an applied voltage, to polymerize or crosslink the compounds which have not reacted in the first step ("end curing").

Suitable and preferred polymerization methods are, for example, thermal or photopolymerization, preferably photopolymerization, in particular UV induced photopolymerization, which can be achieved by exposure of the polymerizable compounds to UV radiation.

The polymerizable compounds of formula M and its subformulae do in particular show good UV absorption in, and are therefore especially suitable for, a process of preparing a PSA display including one or more of the following features or any combination thereof:

- the polymerizable medium is exposed to UV light in the display in a 2-step process, including a first UV exposure step ("UV1 step"), with application of a voltage to the electrodes of the display, to generate the tilt angle, and a second UV exposure step ("UV2 step"), without application of a voltage to the electrodes of the display, to complete polymerization of the polymerizable compounds,
- the polymerizable medium is exposed to UV light in the display generated by an UV-LED lamp, preferably at least in the UV2 step, more preferably both in the UV1 and UV2 step,
- the polymerizable medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV2 step, but are optionally also used in the UV1 step when avoiding high intensity is necessary for the process, the polymerizable medium is exposed to UV light in the display generated by a UV lamp with a radiation spectrum that is shifted to longer wavelengths, preferably ≥340 nm, more preferably from 350 to <370 nm, very preferably from 355 to 368 nm, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features or any combination thereof:

the polymerizable LC medium is irradiated by UV light in a 2-step process, including a first UV exposure step ("UV1 step"), with application of a voltage, to generate the tilt angle, and a second UV exposure step ("UV2 step"), without application of a voltage, to complete polymerization of the polymerizable compounds, the polymerizable LC medium is irradiated by UV light generated by a UV lamp having an intensity of from 0.5 $mW/cm^2$ to 10 $mW/cm^2$ in the wavelength range from 300-380 nm, preferably in the UV2 step, and optionally also in the UV1 step, the polymerizable LC medium is irradiated by UV light having a wavelength of ≥340 nm, and preferably 0.420 nm, very preferably in the range from 340 to 380 nm, more preferably in the range from 350 to <370 nm, most preferably in the range from 355 to 368 nm, the polymerizable LC medium is irradiated by UV light while a voltage is applied to the electrodes of the display, irradiation by UV light is carried out using a UV-LED lamp.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV irradiation can be carried out using a cut-off filter being substantially transmissive for wavelengths λ>340 nm.

In a preferred embodiment of the present invention, UV irradiation is carried out using a UV-LED lamp.

The use of UV-LED lamps, which have with only one narrow emission peak, in the PSA process provides several advantages, like for example a more effective optical energy transfer to the polymerizable compounds in the LC medium, depending on the choice of the suitable polymerizable compounds that shows absorption at the emission wavelength of the LED lamp. This allows to reduce the UV intensity and/or the UV irradiation time, thus enabling a reduced tact time and savings in energy and production costs. Another advantage is that the narrow emission spectrum of the lamp allows an easier selection of the appropriate wavelength for photopolymerization.

Very preferably the UV light source is an UV-LED lamp emitting a wavelength in the range from 340 to 400 nm, more preferably in the range from 340 to 380 nm. UV-LED lamps emitting UV light with a wavelength of 365 nm are especially preferred.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

The LC medium according to the present invention may additionally comprise one or more further components or additives, preferably selected from the list including but not limited to co-monomers, chiral dopants, polymerization initiators, inhibitors, stabilisers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

For the present invention and in the following examples, the structures of the liquid-crystal compounds are indicated by means of acronyms. Unless stated otherwise, the transformation into chemical formulae is done in accordance with Tables A.1 to A.3 below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Preferably n, m and l are independently of each other 1, 2, 3, 4, 5, 6, or 7. Table A.1 shows the codes for the ring elements of the nuclei of the compound, Table A.2 lists the bridging units, and Table A.3 lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group.

TABLE A.1

| Ring elements | |
|---|---|
| C | 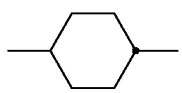 |
| D | 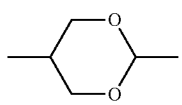 |
| DI | 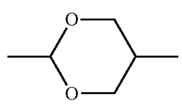 |
| A | 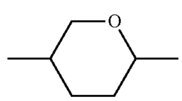 |
| AI | 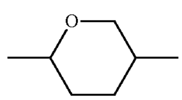 |
| P | 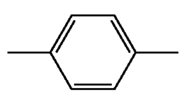 |
| G | 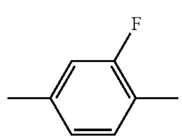 |
| GI | 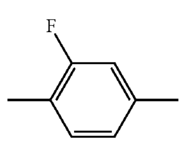 |
| U | 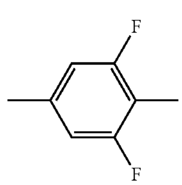 |

TABLE A.1-continued

| Ring elements | |
|---|---|
| UI | 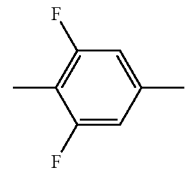 |
| Y | 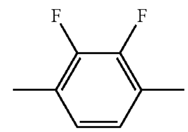 |
| P(F,Cl)Y | 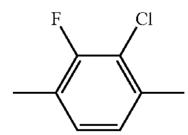 |
| P(Cl,F)Y | 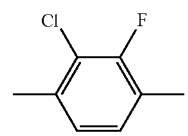 |
| np | 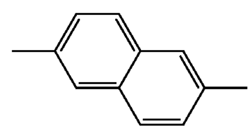 |
| n3f | 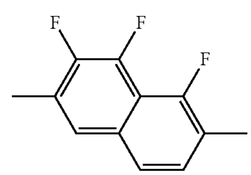 |
| nN3fI | 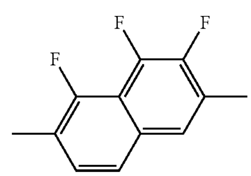 |
| th | 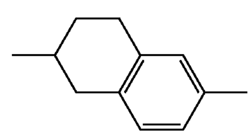 |
| thI | 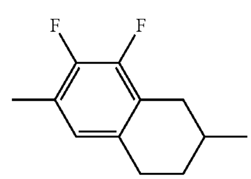 |
| tH2f | 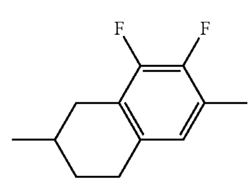 |

TABLE A.1-continued
| Ring elements | |
|---|---|
| tH2fI | 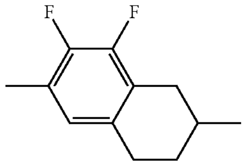 |
| o2f | 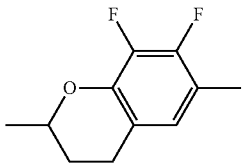 |
| o2fI | 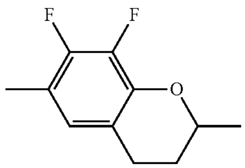 |
| dh | 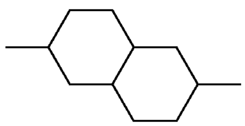 |
| nf | 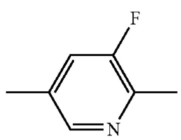 |
| B | 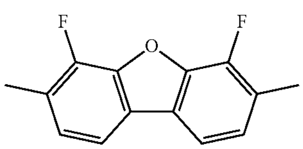 |
| B(S) | 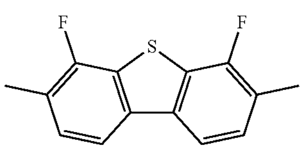 |
| O | 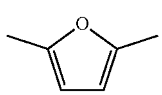 |
| S | 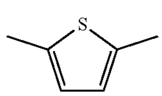 |
| K | 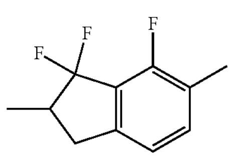 |
| KI | 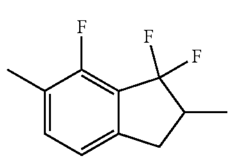 |
TABLE A.1-continued
| Ring elements | |
|---|---|
| L | 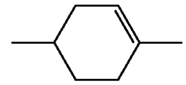 |
| LI | 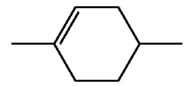 |
| F | 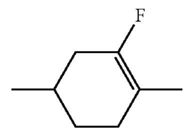 |
| FI | 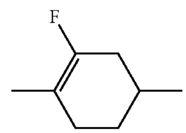 |
| Bh | 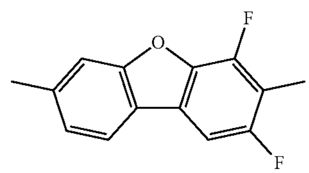 |
| Bh(S) | 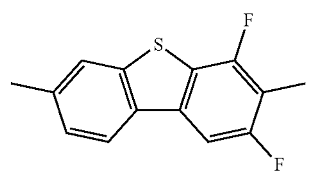 |
| Bf | 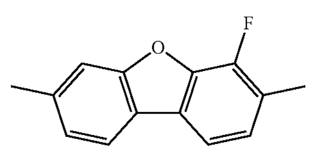 |
| Bf(S) | 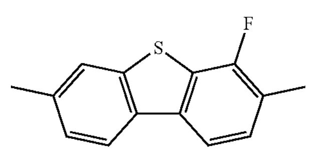 |
| Bfi | 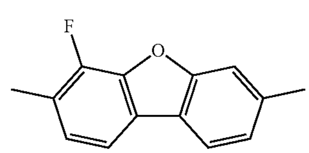 |
| Bfi(S) | 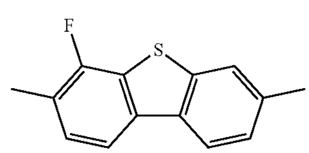 |

TABLE A.2

| Bridging units | |
|---|---|
| E | $—CH_2—CH_2—$ |
| V | —CH=CH— |
| T | —C≡C— |
| W | $—CF_2—CF_2—$ |
| B | —CF=CF— |

TABLE A.2-continued

| Bridging units | | | |
|---|---|---|---|
| Z | —CO—O— | ZI | —O—CO— |
| X | —CF=CH— | XI | —CH=CF— |
| O | $—CH_2—O—$ | OI | $—O—CH_2—$ |
| Q | $—CF_2—O—$ | QI | $—O—CF_2—$ |

TABLE A

| End groups | | | |
|---|---|---|---|
| On the left individually or in combination | | On the right individually or in combination | |
| -n- | $C_nH_{2n+1}—$ | -n | $—C_nH_{2n+1}$ |
| -nO- | $C_nH_{2n+1}—O—$ | -On | $—O—C_nH_{2+1}$ |
| | | -m | $—C_mH_{2m+1}$ |
| | | -Om | $—O—C_mH_{2m+1}$ |
| -V- | $CH_2═CH—$ | -V | $—CH═CH_2$ |
| -nV- | $C_nH_{2n+1}—CH═CH—$ | -nV | $—C_nH_{2n}—CH═CH_2$ |
| -Vn- | $CH_2═CH—C_2H_2n—$ | -Vn | $—CH═CH—C_nH_{2n}+1$ |
| -nVm- | $C_nH_{2n+1}—CH═CH—C_mH_{2m}—$ | -nVm | $—C_nH_{2n}—CH═CH—C_mH_{2m+1}$ |
| -N- | N≡C— | -N | —C≡N |
| -S- | S═C═N— | -S | —N═C═S |
| -F- | F- | -F | —F |
| -CL- | Cl— | -CL | —Cl |
| -M- | $CFH_2—$ | -M | $—CFH_2$ |
| -D- | $CF_2H—$ | -D | $—CF_2H$ |
| -T- | $CF_3—$ | -T | $—CF_3$ |
| -MO- | $CFH_2O—$ | -OM | $—OCFH_2$ |
| -DO- | $CF_2HO—$ | -OD | $—OCF_2H$ |
| -TO- | $CF_3O—$ | -OT | $—OCF_3$ |
| -A- | H—C≡C— | -A | —C≡C—H |
| -nA- | $C_nH_{2+1}—C≡C—$ | -An | $—C≡C—C_nH_{2n+1}$ |
| -NA- | N≡C—C≡C— | -AN | —C≡C—C≡N |
| -(cn)- | 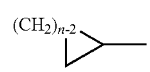 | -(c) | 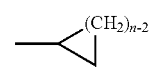 |
| -(cn)m- | 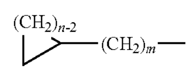 | -m(cn) | 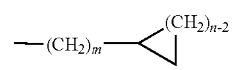 |
| On the left only in combination | | On the right only in combination | |
| - . . . n . . . - | $—C_nH_{2n}—$ | - . . . n . . . - | $—C_nH_{2n}—$ |
| | | - . . . m . . . - | $—C_mH_{2m}—$ |
| - . . . M . . . - | —CFH— | - . . .M . . . - | —CFH— |
| - . . . D . . . - | $—CF_2—$ | - . . . D . . . - | $—CF_2—$ |
| - . . . V . . . - | —CH═CH— | - . . . V . . . - | —CH═CH— |
| - . . . Z . . . - | —CO—O— | - . . . Z . . . - | —CO—O— |
| - . . . ZI . . . - | —O—CO— | - . . . ZI . . . - | —O—CO— |
| - . . . K . . . - | —CO— | - . . . K . . . - | —CO— |
| - . . . W . . . - | —CF═CF— | - . . . W . . . - | —CF═CF— |
| - . . . O . . . - | —O— | - . . . O . . . - | —O— |

in which n and m are each integers, and the three dots " . . . " are placeholders for other abbreviations from this table.

Table B shows illustrative structures of compounds together with their respective abbreviations.

TABLE B

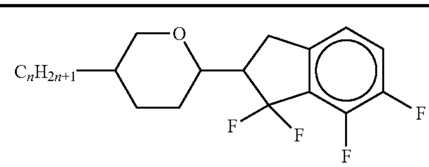

AIK-n-F

TABLE B-continued
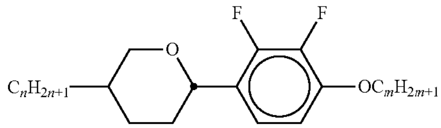
AIY-n-Om
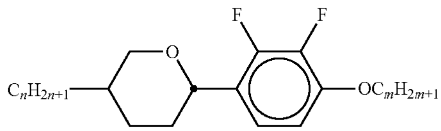
AY-n-Om
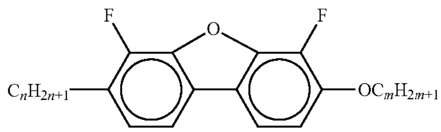
B-nO-Om
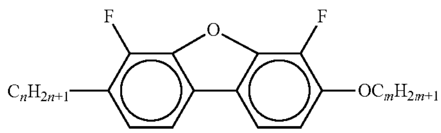
B-n-Om
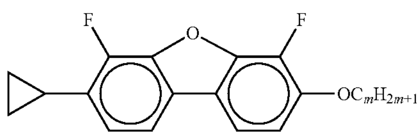
B-(c3)-Om
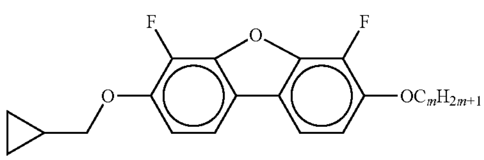
B-(c3)1O-Om
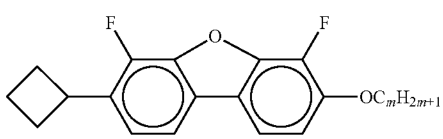
B-(c4)-Om
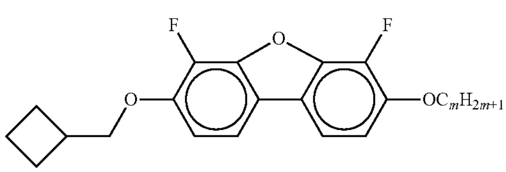
B-(c4)1O-Om TABLE B-continued
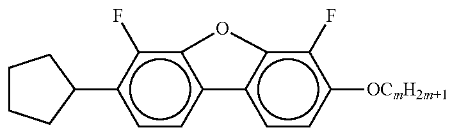
B-(c5)-Om
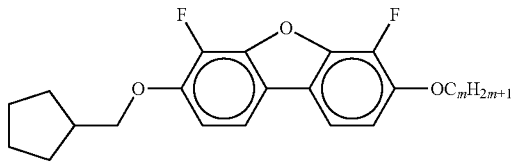
B-(c5)1O-Om
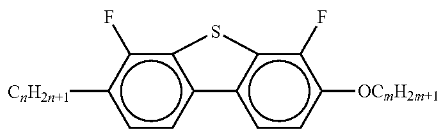
B(S)-nO-Om
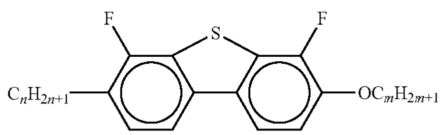
B(S)-n-Om
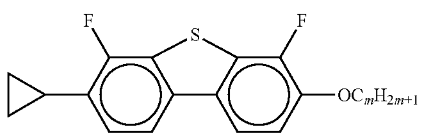
B(S)-(c3)-Om
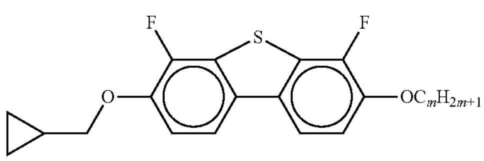
B(S)(c3)1O-Om
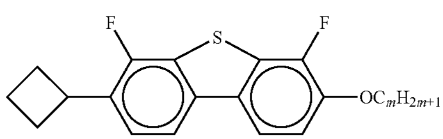
B(S)-(c4)-Om
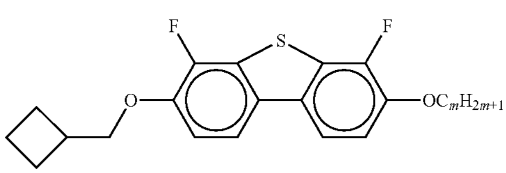
B(S)-(c4)1O-Om TABLE B-continued
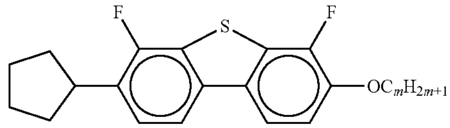
B(S)-(c5)-Om
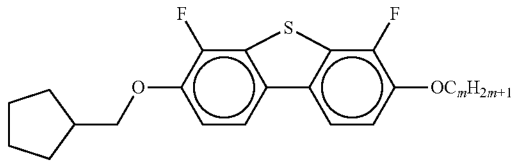
B(S)-(c5)1O-Om
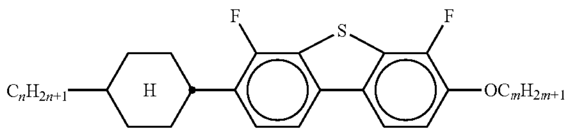
CB(S)-n-(O)m
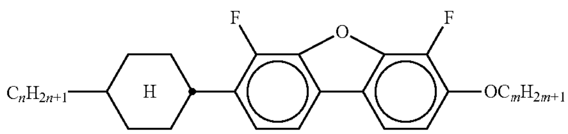
CB-n-m
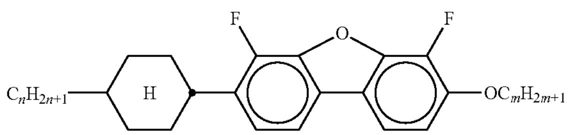
CB-n-Om
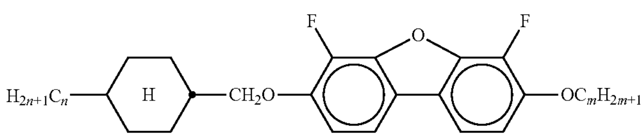
COB-n-Om
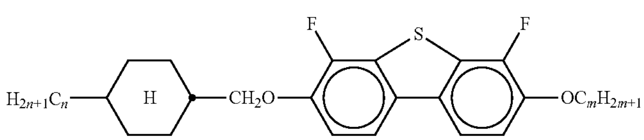
COB(S)-n-Om
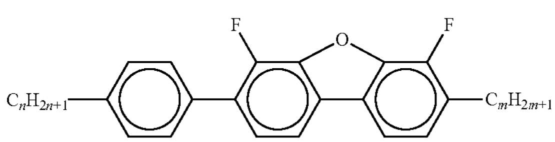
PB-n-m TABLE B-continued
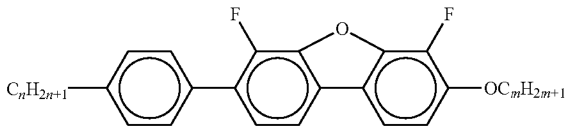
PB-n-Om
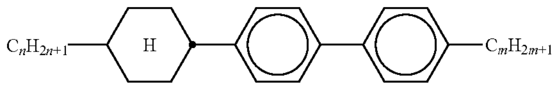
BCH-nm
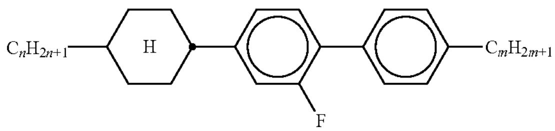
BCH-nmF
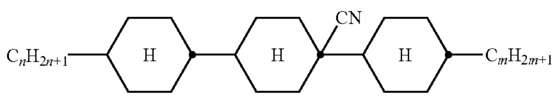
BCN-nm
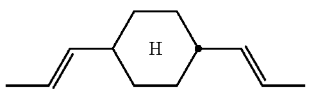
C1V-V1
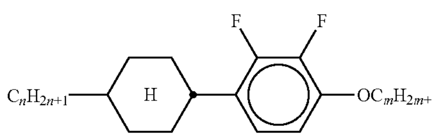
CY-n-Om
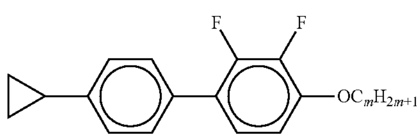
CY(c3)-Om
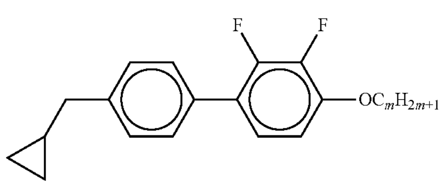
CY-(c3)1-Om
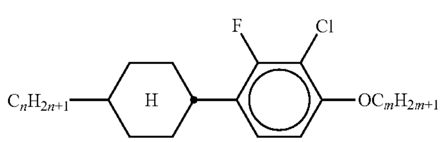
CY(F,Cl)-n-Om TABLE B-continued
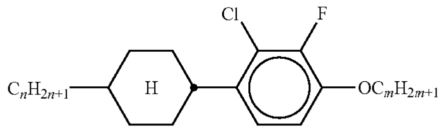
CY(Cl,F)-n-Om
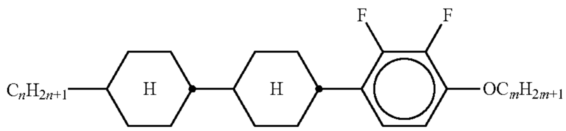
CCY-n-Om
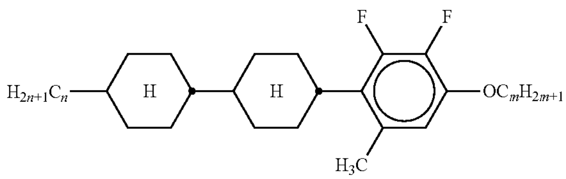
CC1Y-n-Om
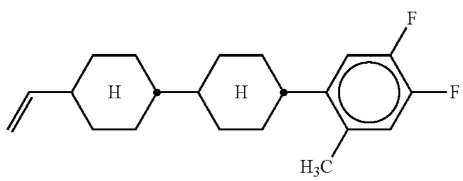
CC1G-V-F
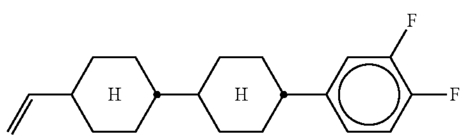
CCG-V-F
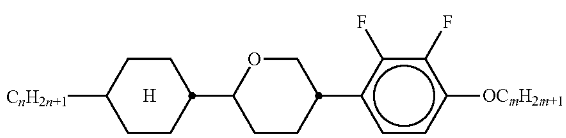
CAIY-n-Om
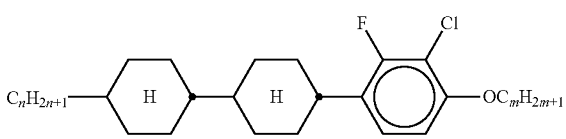
CCY(F,Cl)-n-Om
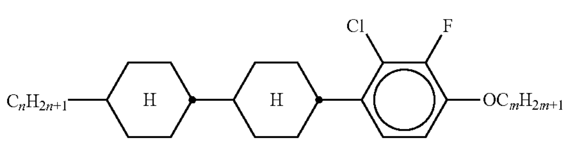
CCY(Cl,F)-n-Om TABLE B-continued
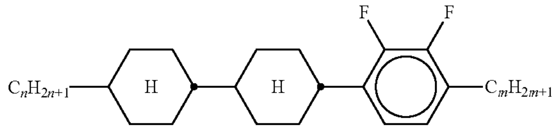
CCY-n-m
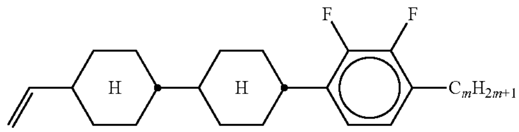
CCY-V-m
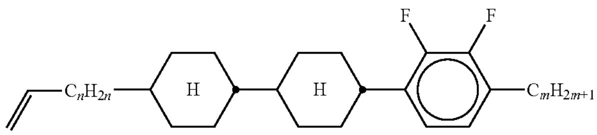
CCY-Vn-m
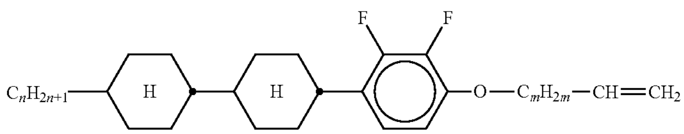
CCY-n-OmV
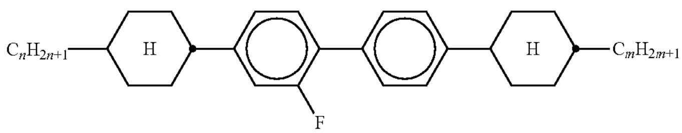
CGPC-n-m, CBC-nmF
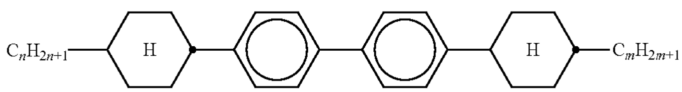
CPPC-n-m, CBC-nm
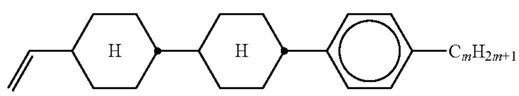
CCP-V-m
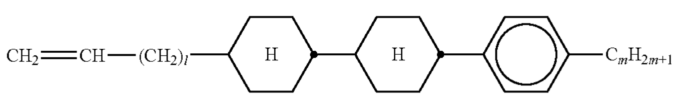
CCP-Vl-m
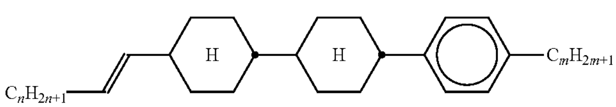
CCP-nV-m
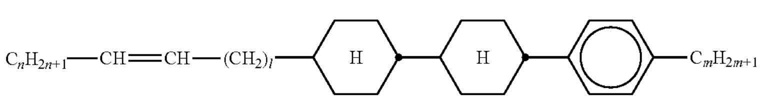
CCP-nVl-m TABLE B-continued
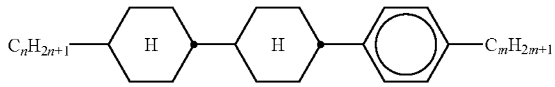
CCP-n-m
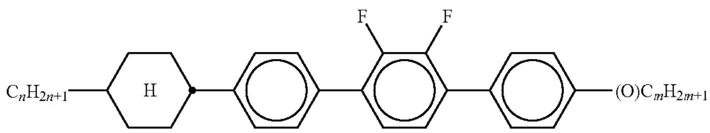
CPYP-n-(O)m
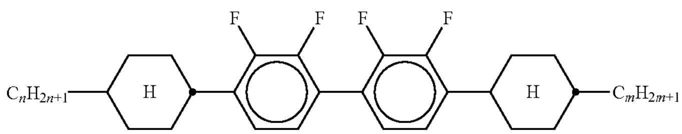
CYYC-n-m
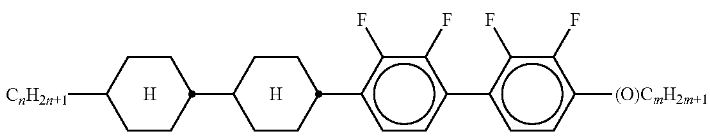
CCYY-n-(O)m
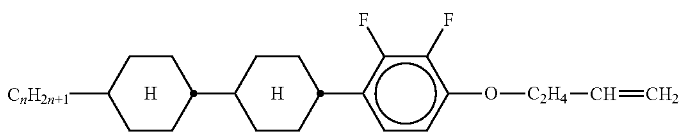
CCY-n-O2V
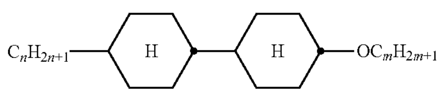
CCH-nOm, CC-n-Om
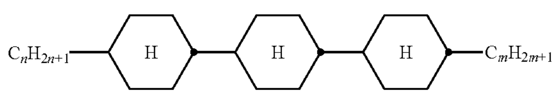
CCC-n-m
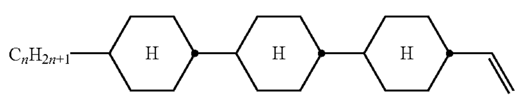
CCC-n-V
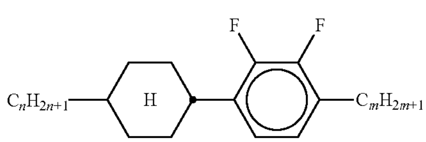
CY-n-m
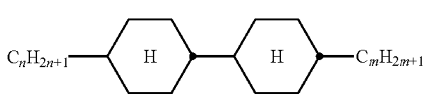
CCH-nm, CC-n-m TABLE B-continued
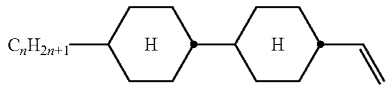
CC-n-V
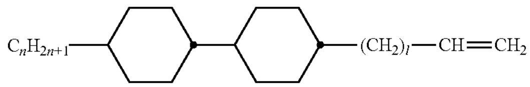
CC-n-IV
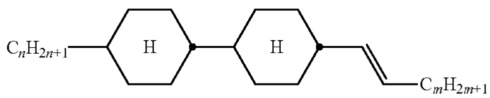
CC-n-Vm
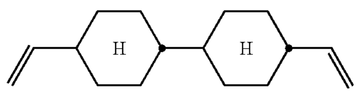
CC-V-V
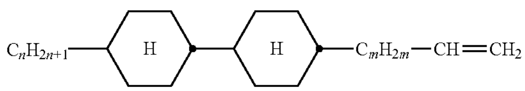
CC-n-mV
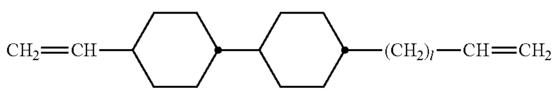
CC-V-IV
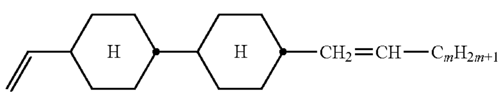
CC-V-Vm
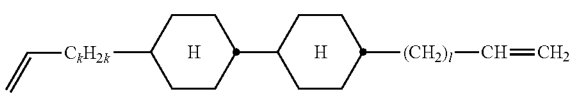
CC-Vk-IV
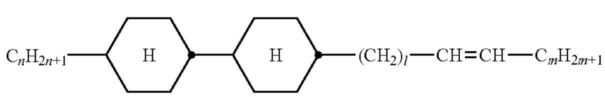
CC-n-IVm
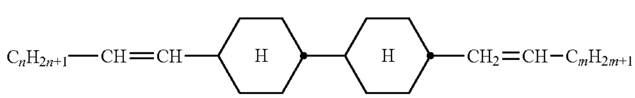
CC-nV-Vm
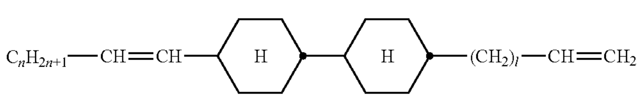
CC-nV-IV TABLE B-continued
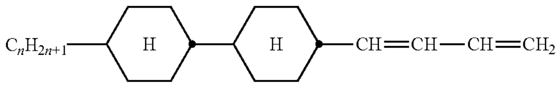
CC-n-VV
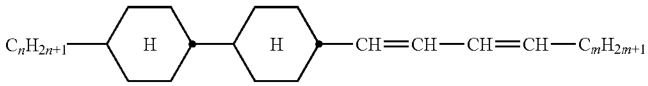
CC-n-VVm
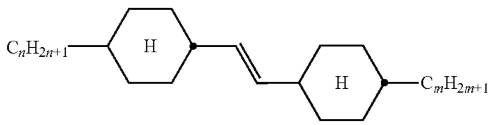
CVC-n-m
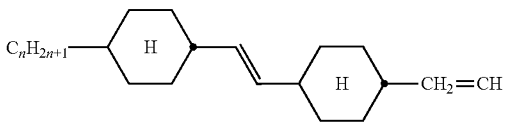
CVC-n-V
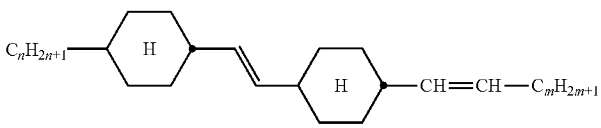
CVC-n-Vm
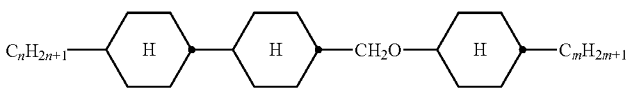
CCOC-n-m
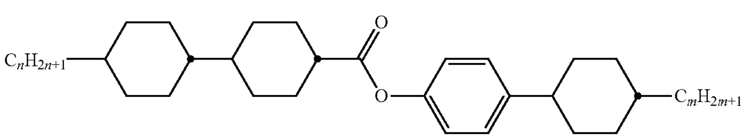
CCZPC-n-m
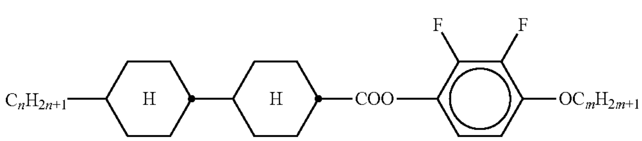
CCZY-n-Om, CP-nOmFF
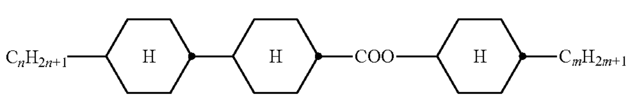
CCZC-n-m, CH-nm
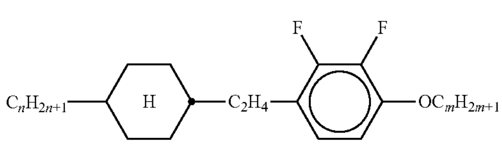
CEY-n-Om TABLE B-continued
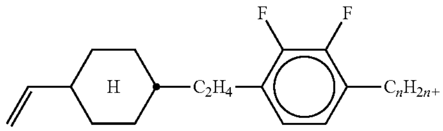
CEY-V-n
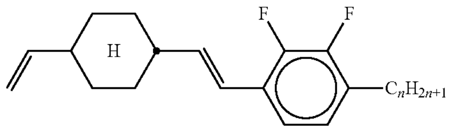
CVY-V-n
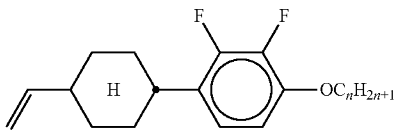
CY-V-On
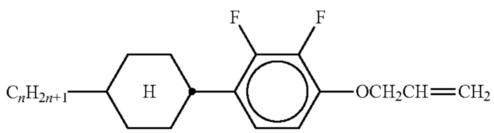
CY-n-O1V
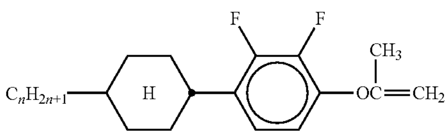
CY-n-OC($CH_3$)=$CH_2$
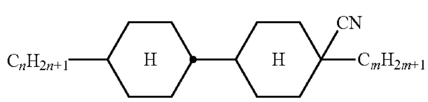
CCN-nm
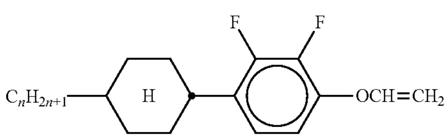
CY-n-OV
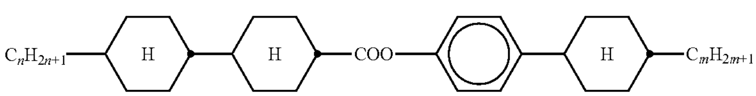
CCPC-nm
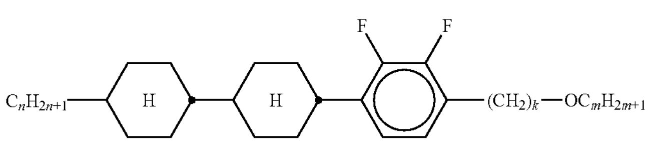
CCY-n-kOm TABLE B-continued
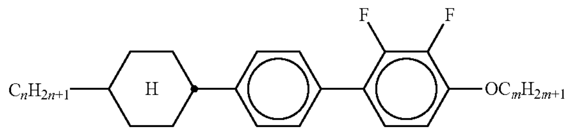
CPY-n-Om
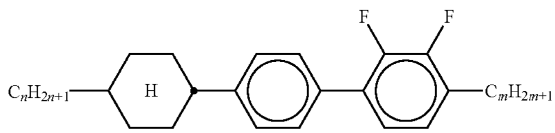
CPY-n-m
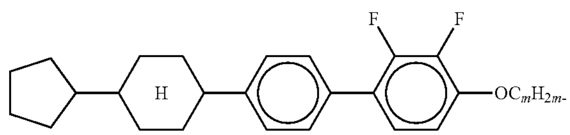
CPY-cp-Om
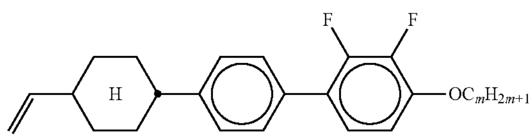
CPY-V-Om
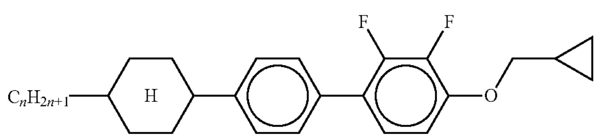
CPY-n-O1(c3)
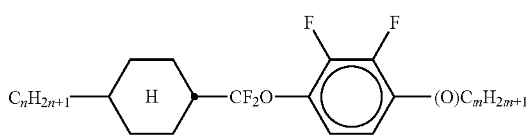
CQY-n-(O)m
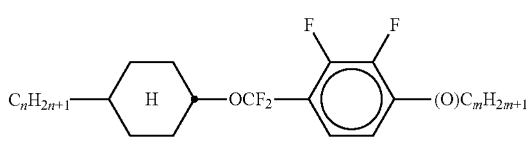
CQIY-n-(O)m
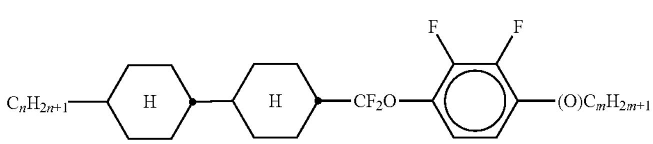
CCQY-n-(O)m
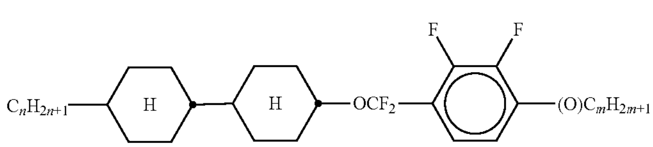
CCQIY-n-(O)m TABLE B-continued
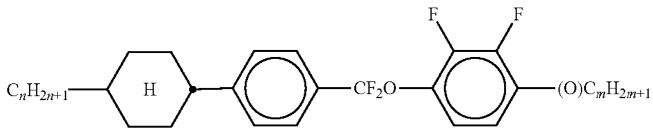
CPQY-n-(O)m
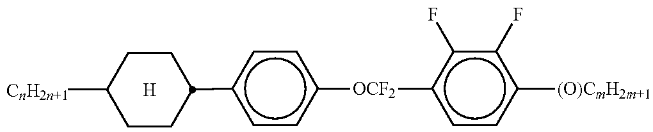
CPQIY-n-(O)m
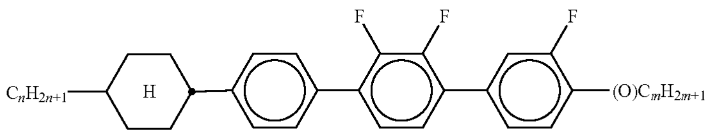
CPYG-n-(O)m
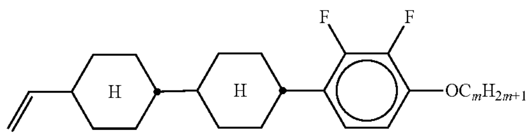
CCY-V-Om
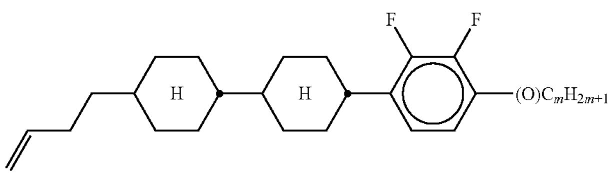
CCY-V2-(O)m
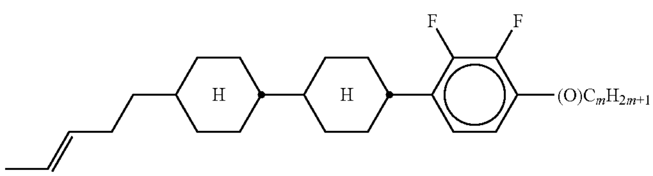
CCY-1V2-(O)m
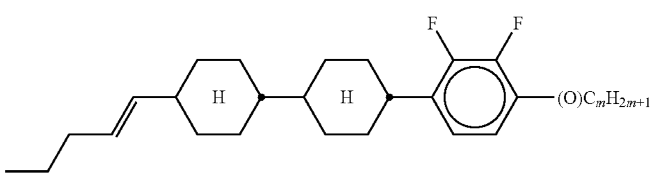
CCY-3V-(O)m
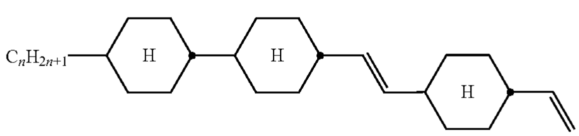
CCVC-n-V TABLE B-continued
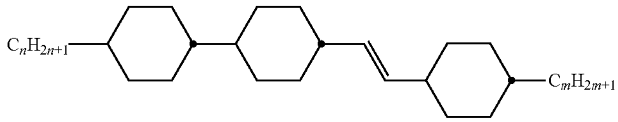
CCVC-n-m
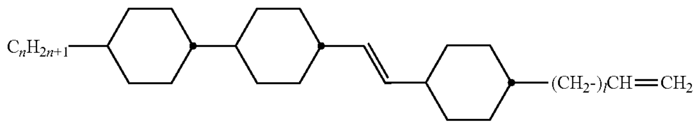
CCVC-n-IV
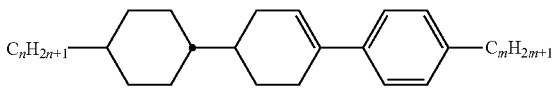
CLP-n-m
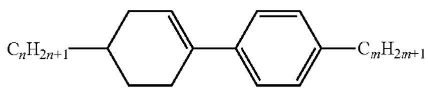
LP-n-m
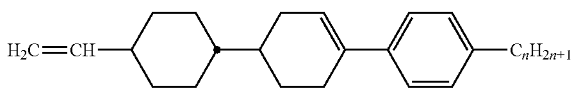
CLP-V-n
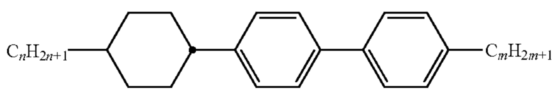
CPP-n-m
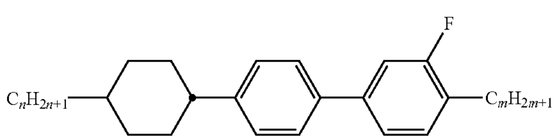
CPG-n-m
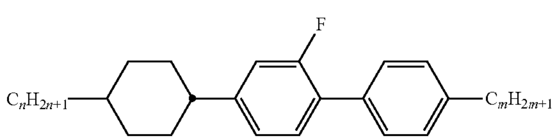
CGP-n-m
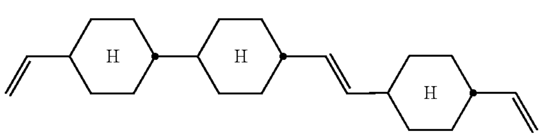
CCVC-V-V
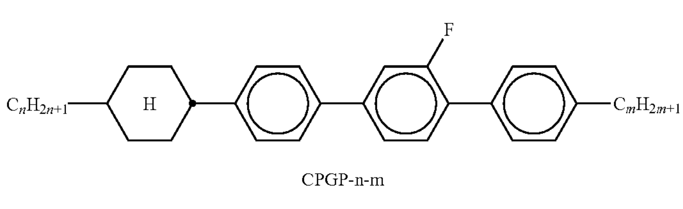
CPGP-n-m TABLE B-continued
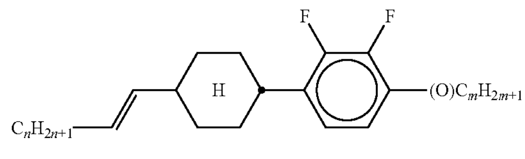
CY-nV-(O)m
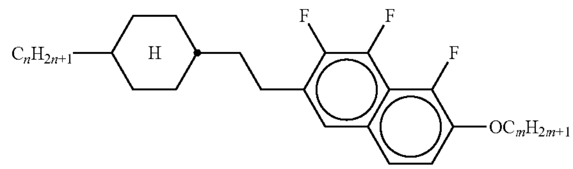
CENaph-n-Om
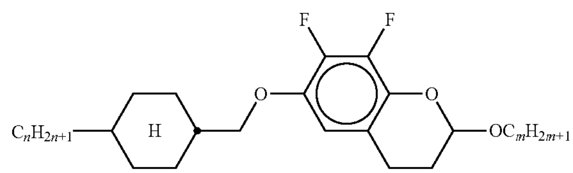
COChrom-n-Om
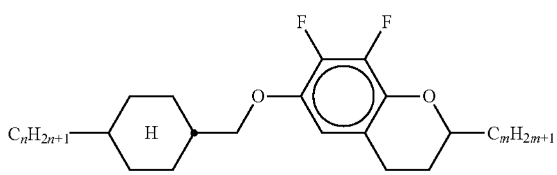
COChrom-n-m
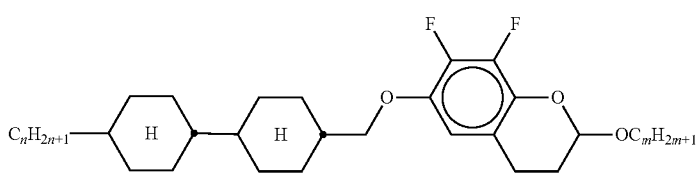
CCOChrom-n-Om
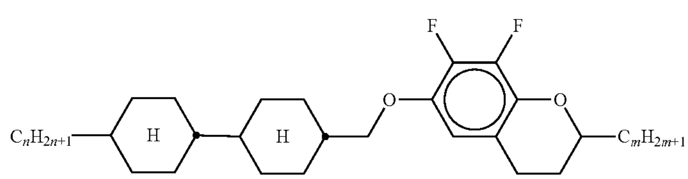
CCOChrom-n-m
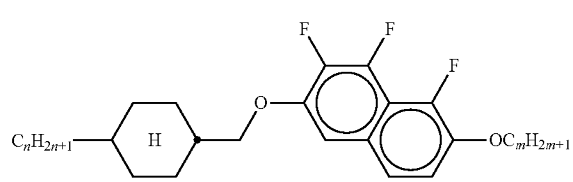
CONaph-n-Om TABLE B-continued
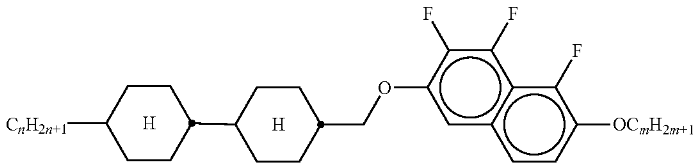
CCONaph-n-Om
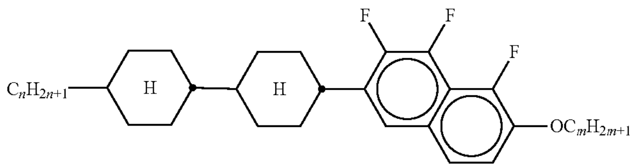
CCNaph-n-Om
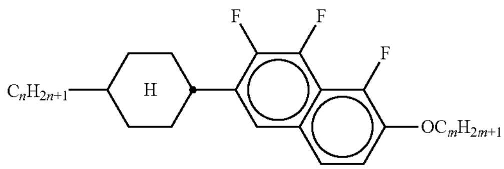
CNaph-n-Om
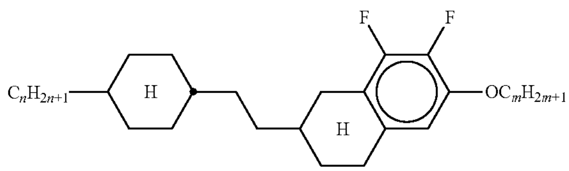
CETNaph-n-Om
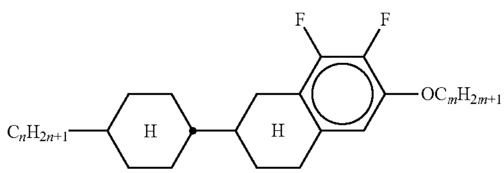
CTNaph-n-Om
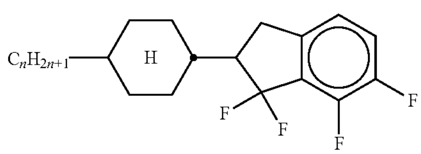
CK-n-F
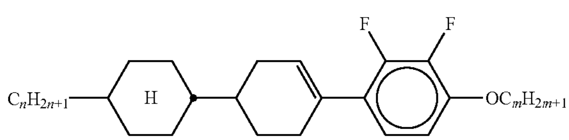
CLY-n-Om
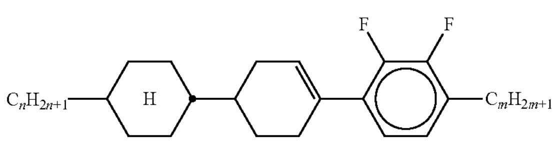
CLY-n-m TABLE B-continued
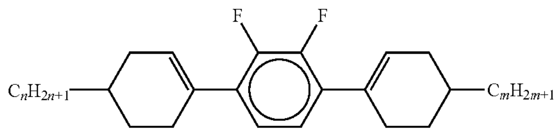
LYLI-n-m
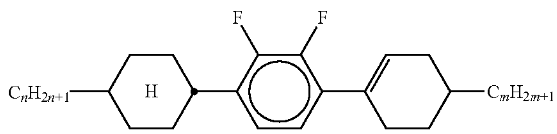
CYLI-n-m
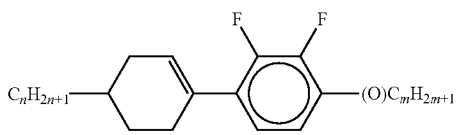
LY-n-(O)m
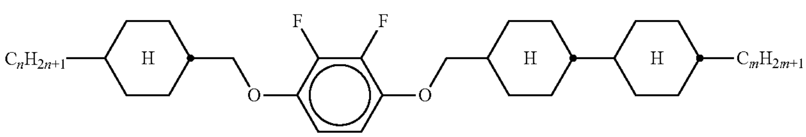
COYOICC-n-m
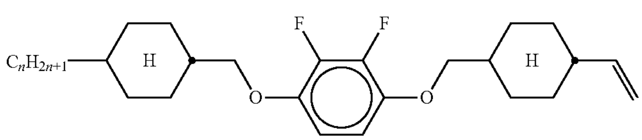
COYOIC-n-V
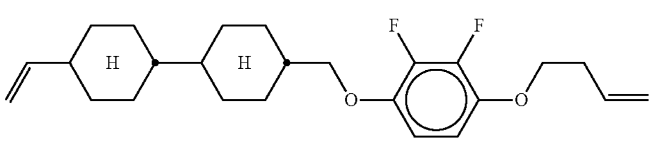
CCOY-V-O2V
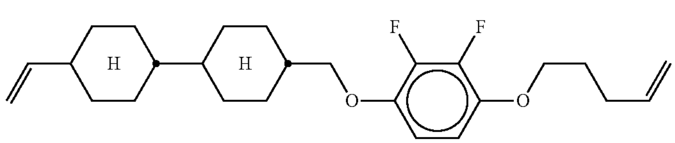
CCOY-V-O3V
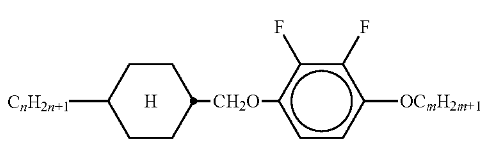
COY-n-Om
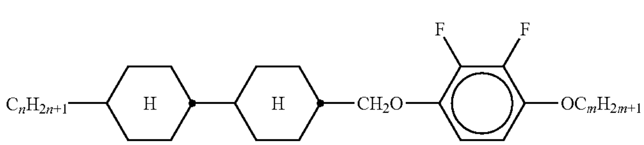
CCOY-n-Om TABLE B-continued
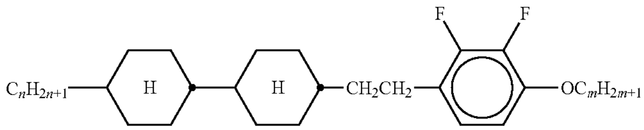
CCEY-n-Om
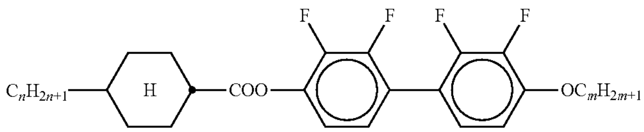
CZYY-n-Om
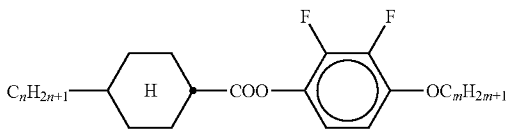
D-nOmFF
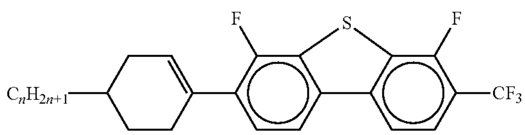
LB(S)-n-T
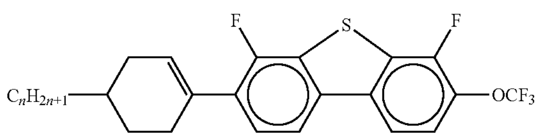
LB(S)-n-OT
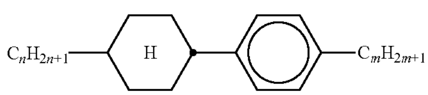
PCH-nm, CP-n-m
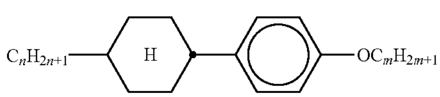
PCH-nOm, CP-n-Om
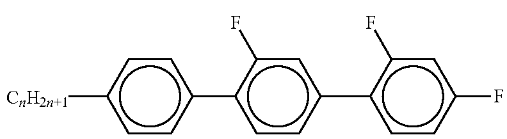
PGIGI-n-F
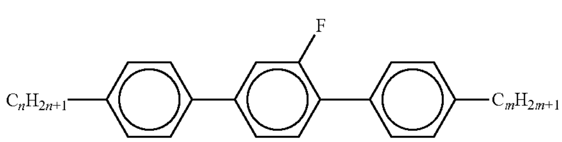
PGP-n-m TABLE B-continued
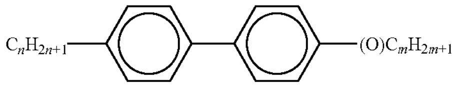
PP-n-(O)m
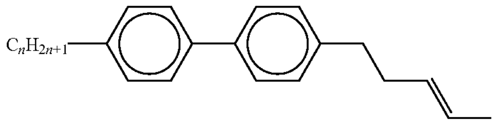
PP-n-2V1
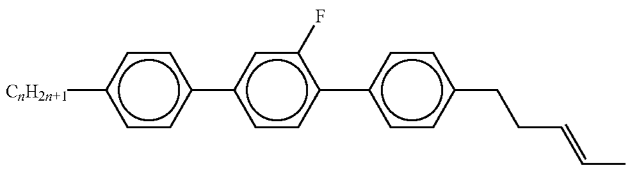
PGP-n-2V1
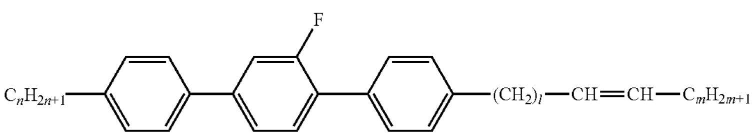
PCP-n-IVm
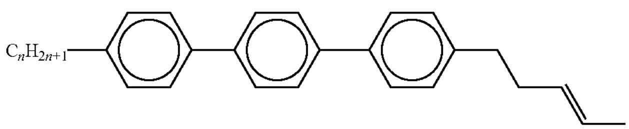
PPP-n-2V1
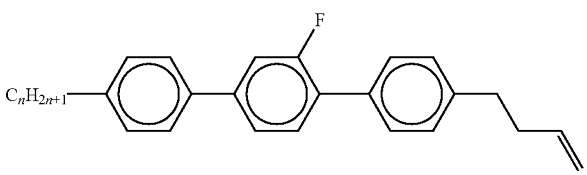
PGP-n-2V
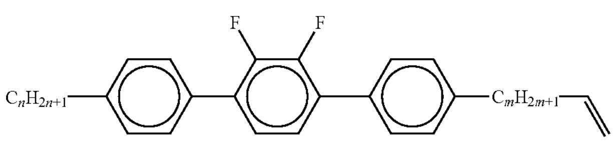
PYP-n-mV
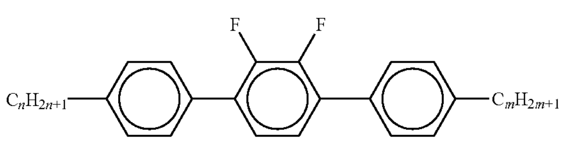
PYP-n-m
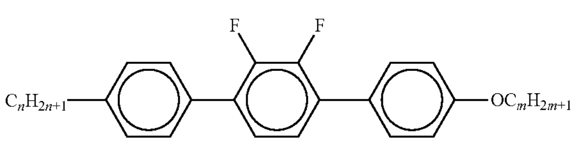
PYP-n-Om TABLE B-continued
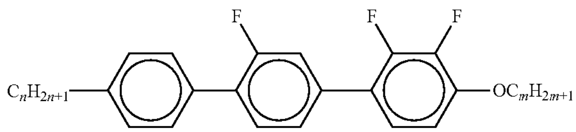
PGIY-n-Om
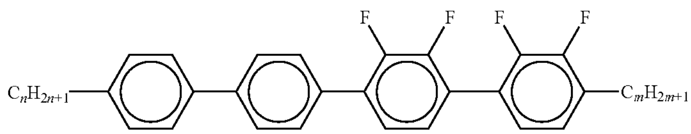
PPYY-n-m
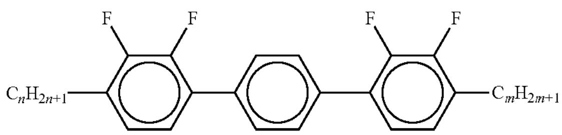
YPY-n-m
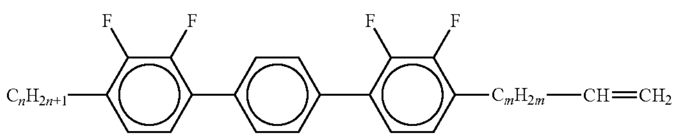
YPY-n-mV
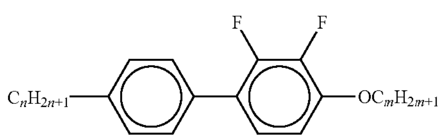
PY-n-Om
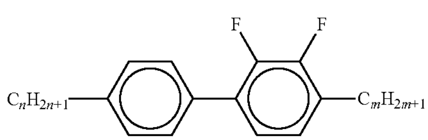
PY-n-m
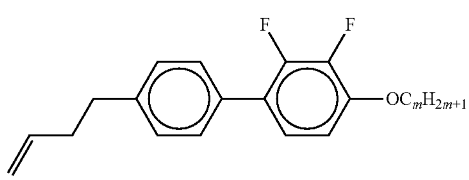
PY-V2-Om
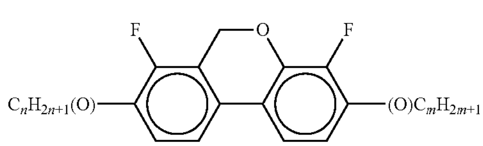
DFDBC-n(O)-(O)m TABLE B-continued
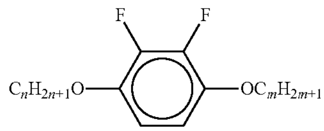
Y-nO-Om
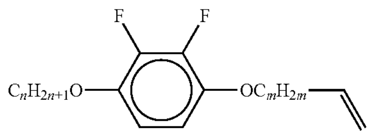
Y-nO-OmV
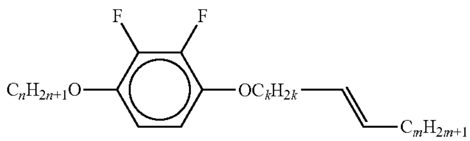
Y-nO-OkVm
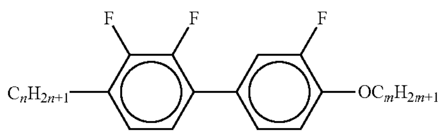
YG-n-Om
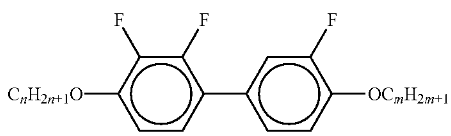
YG-nO-Om
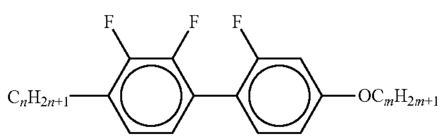
YGI-n-Om
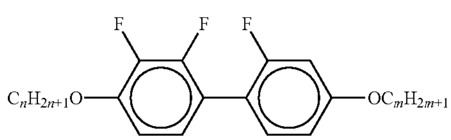
YGI-nO-Om
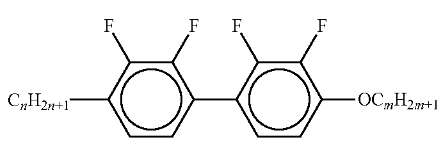
YY-n-Om TABLE B-continued

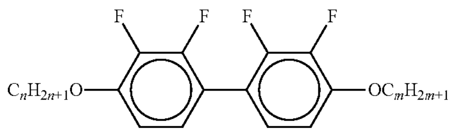
YY-nO-Om

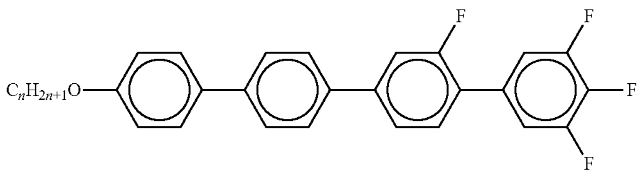
PPGU-n-F

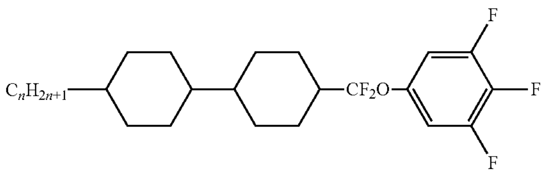
CCQU-n-F

In Table B, n, m, k and l are, independently of one another, each an integer, preferably 1 to 9 preferably 1 to 7, k and l may also be 0 and are preferably 0 to 4, more preferably 0 or 2 and most preferably 2, n is preferably 1, 2, 3, 4 or 5 or, in the combination "-nO—", n is preferably 1, 2, 3 or 4, very preferably 2 or 4, m is preferably 1, 2, 3, 4 or 5 or, in the combination "—Om", m is preferably 1, 2, 3 or 4, more preferably 2 or 4. The combination "-nVm" preferably is "2V1". (O)$C_mH_{2m+1}$ means $C_mH_{2m+1}$ or $OC_mH_{2m+1}$.

In a preferred embodiment of the present invention, the LC media according to the invention comprise one or more compounds selected from the group consisting of compounds from Table B.

TABLE C

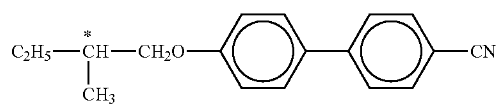
C 15

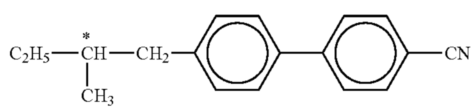
CB 15

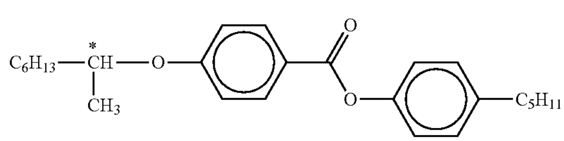
CM 21

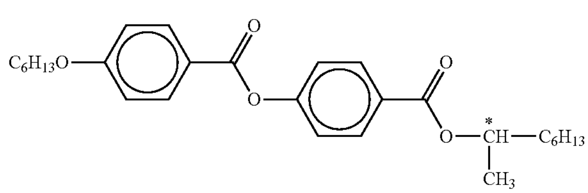
R/S-811

TABLE C-continued
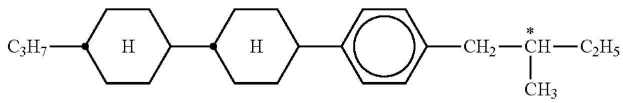
CM 44
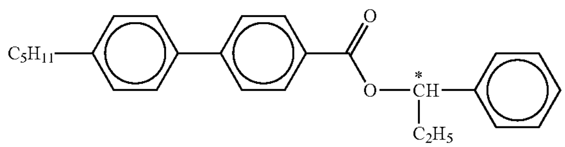
CM 45
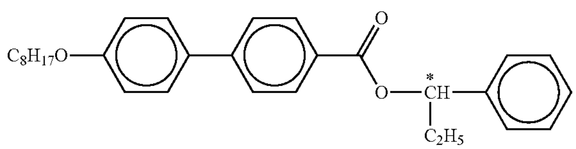
CM 47
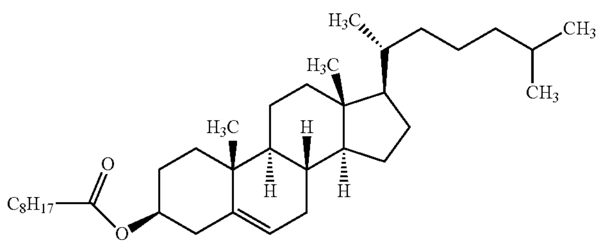
CN
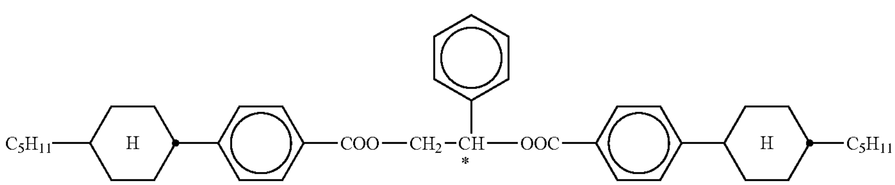
R/S-1011
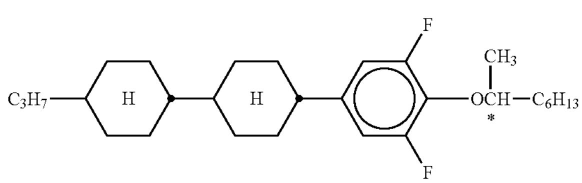
R/S-2011
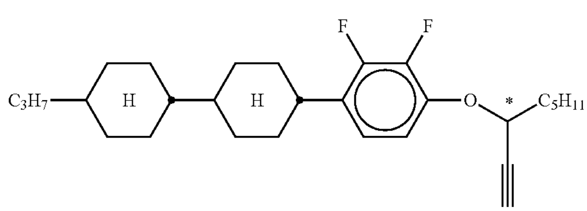
R/S-3011

TABLE C-continued

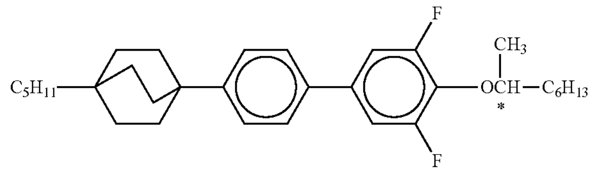

R/S-4011

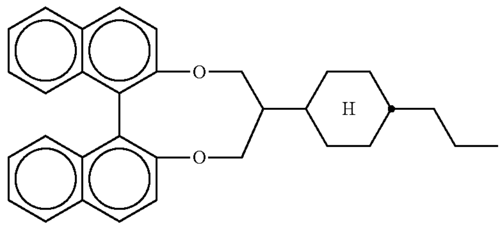

R/S-5011

Table C shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table C.

TABLE D

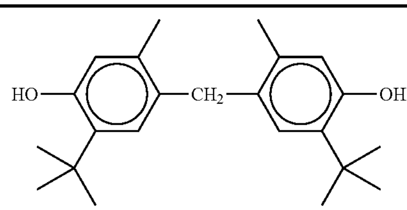

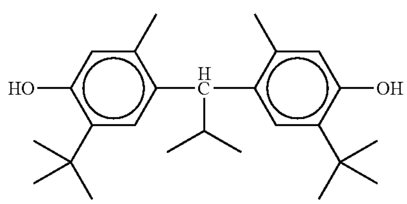

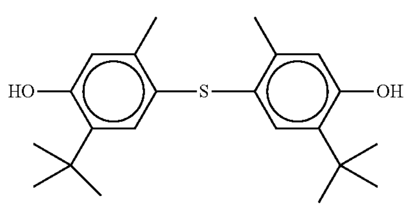

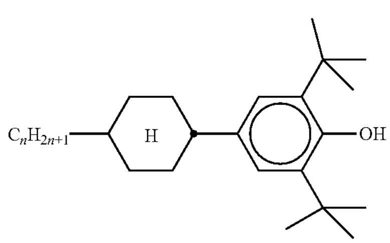

TABLE D-continued
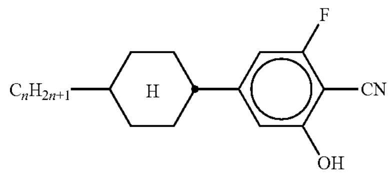
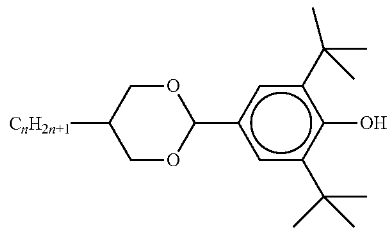
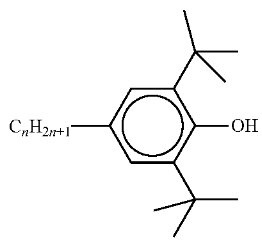
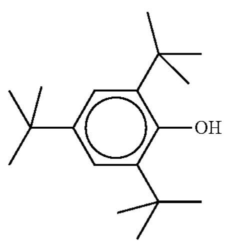
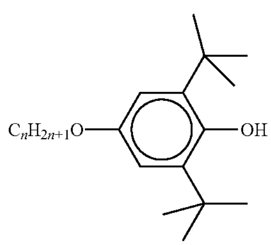
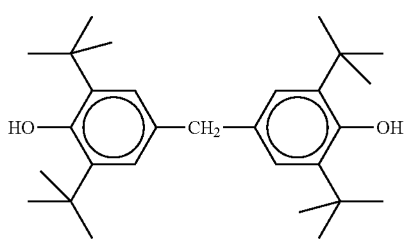
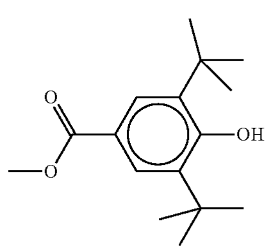

TABLE D-continued
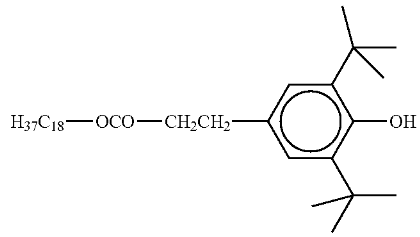
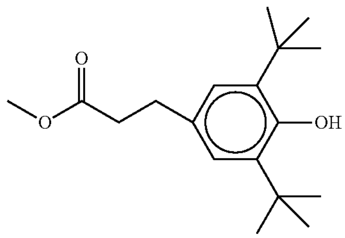
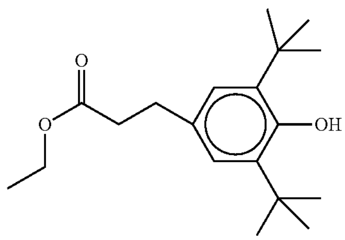
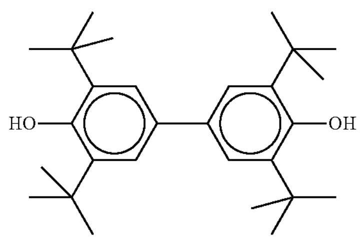
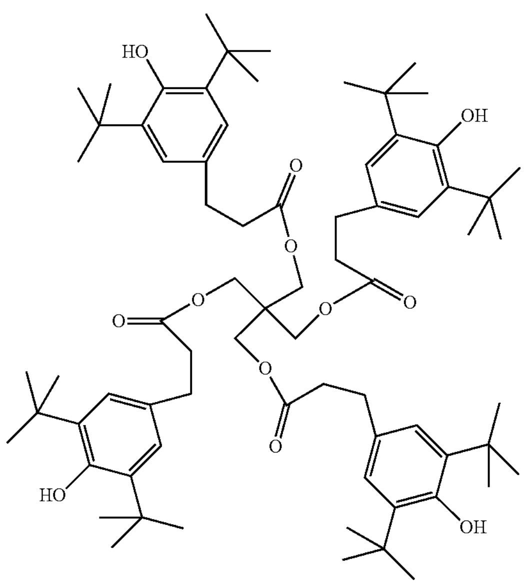 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
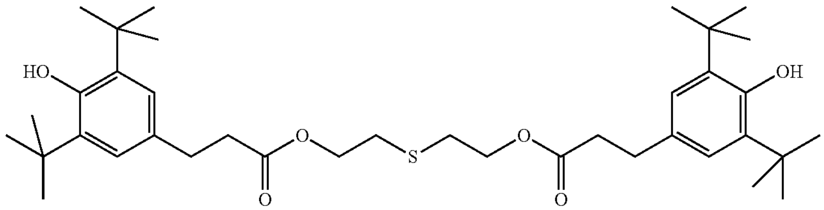 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
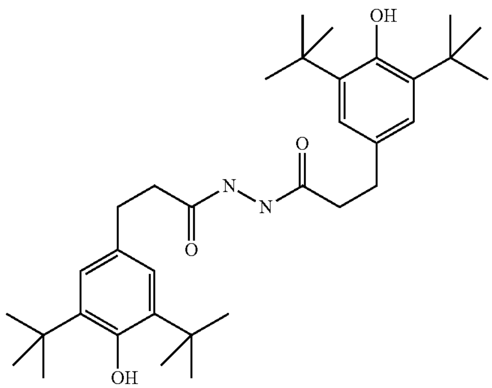 [SMILES: CC(C)(C)c1cc(CCC(=O)NNC(=O)CCc2cc(C(C)(C)C)c(O)c(C(C)(C)C)c2)cc(C(C)(C)C)c1O]
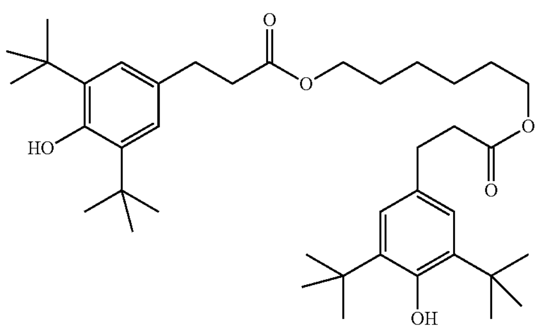 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
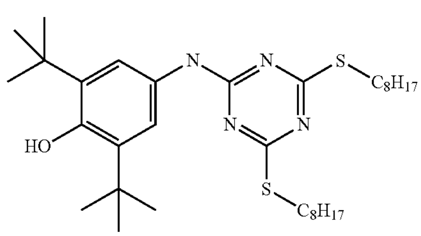

TABLE D-continued
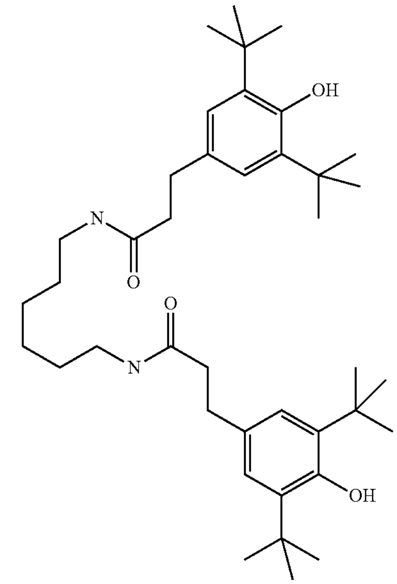 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
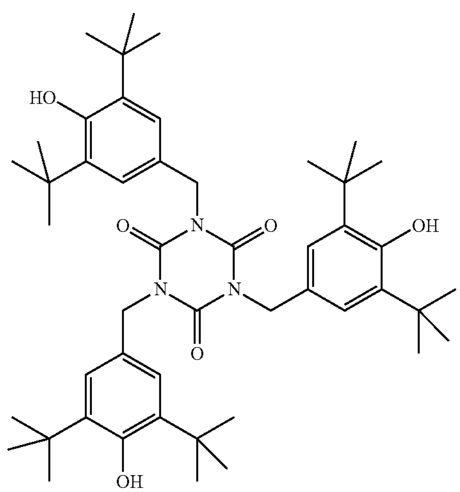 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
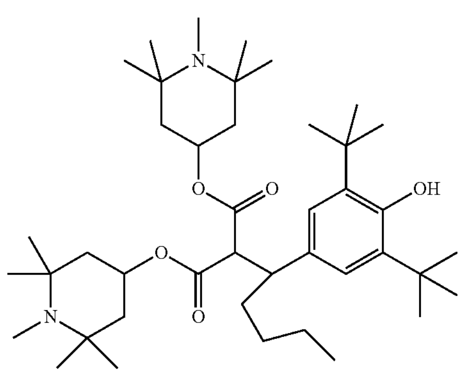 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
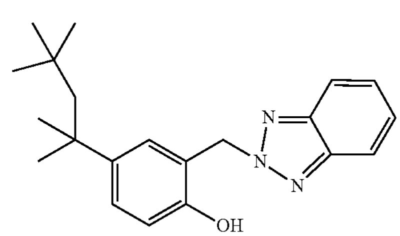 [SMILES: CC(C)(C)CC(C)(C)c1ccc(O)c(Cn2nc3ccccc3n2)c1]

TABLE D-continued
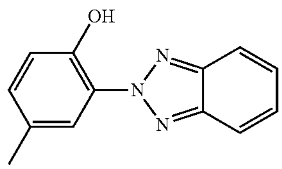 [SMILES: Cc1ccc(O)c(-n2nc3ccccc3n2)c1]
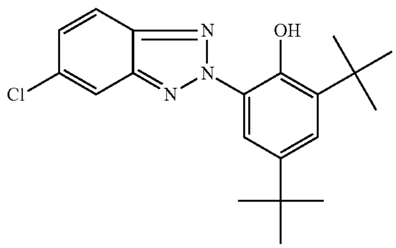 [SMILES: CC(C)(C)c1cc(-n2nc3ccc(Cl)cc3n2)c(O)c(C(C)(C)C)c1]
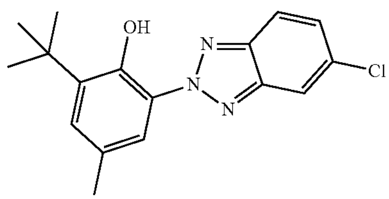 [SMILES: Cc1cc(-n2nc3ccc(Cl)cc3n2)c(O)c(C(C)(C)C)c1]
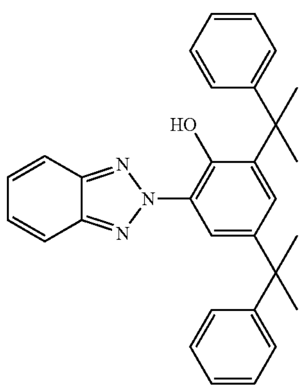 [SMILES: CC(C)(c1ccccc1)c1cc(-n2nc3ccccc3n2)c(O)c(C(C)(C)c2ccccc2)c1]
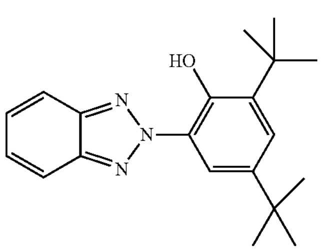 [SMILES: CC(C)(C)c1cc(-n2nc3ccccc3n2)c(O)c(C(C)(C)C)c1]
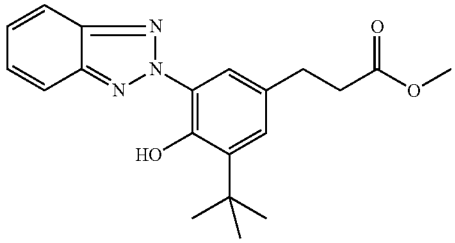 [SMILES: COC(=O)CCc1cc(-n2nc3ccccc3n2)c(O)c(C(C)(C)C)c1]

TABLE D-continued
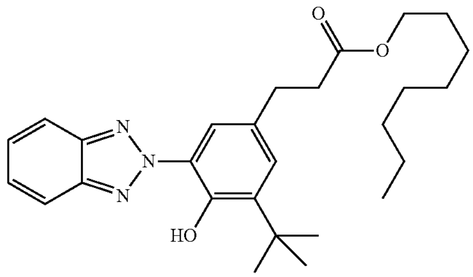 [SMILES: CCCCCCCCOC(=O)CCc1cc(-n2nc3ccccc3n2)c(O)c(C(C)(C)C)c1]
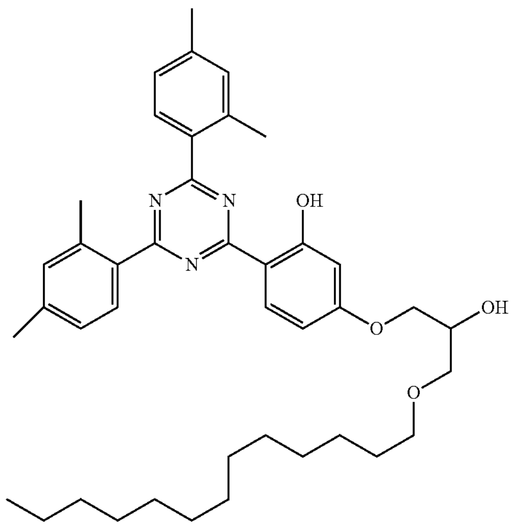 [SMILES: CCCCCCCCCCCCCOCC(O)COc1ccc(-c2nc(-c3ccc(C)cc3C)nc(-c3ccc(C)cc3C)n2)c(O)c1]
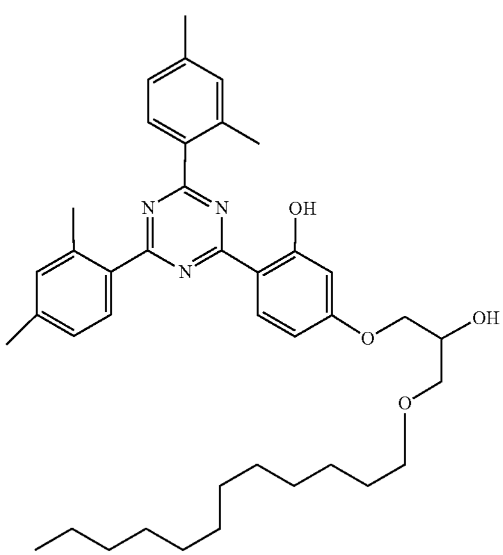 [SMILES: CCCCCCCCCCCCOCC(O)COc1ccc(-c2nc(-c3ccc(C)cc3C)nc(-c3ccc(C)cc3C)n2)c(O)c1]

TABLE D-continued
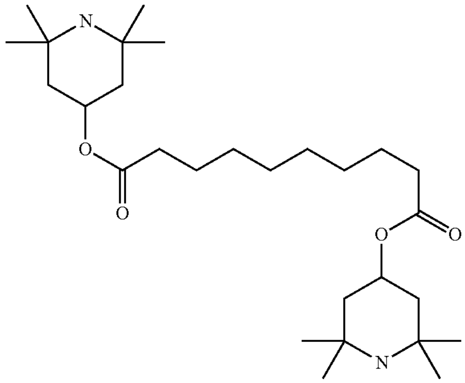
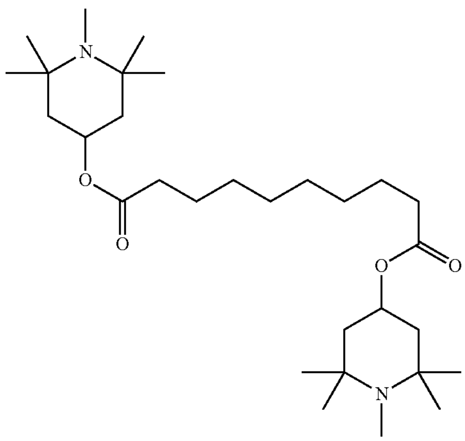
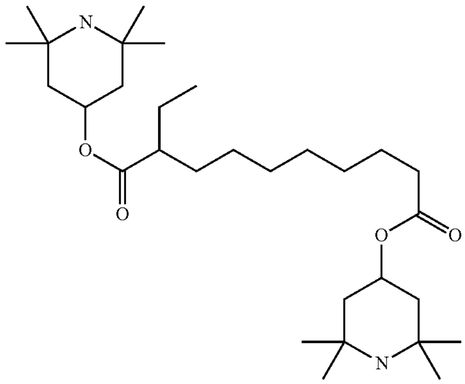
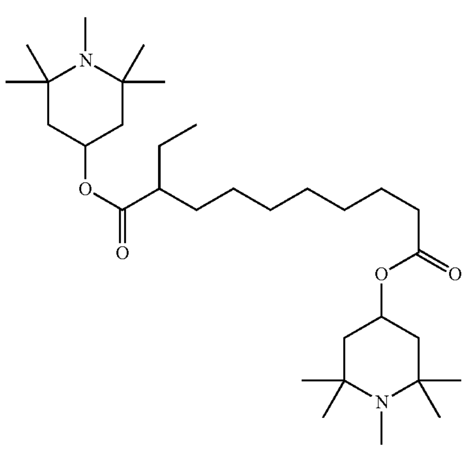

TABLE D-continued
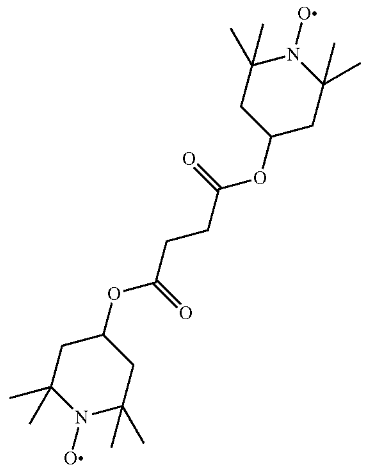
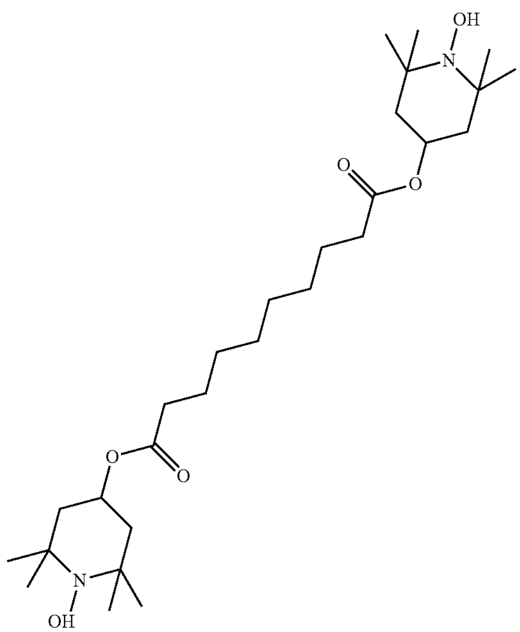
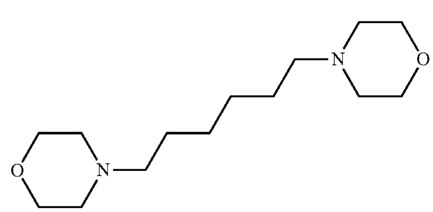 [SMILES: C(CCCN1CCOCC1)CCN1CCOCC1]

TABLE D-continued
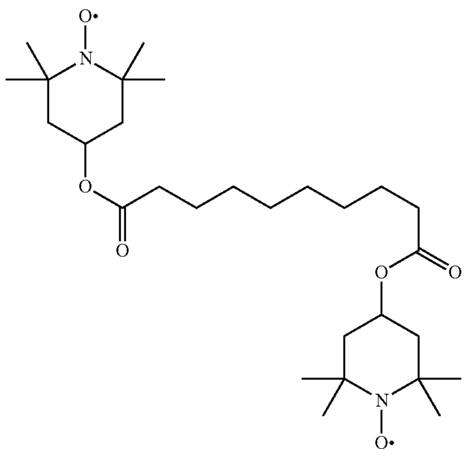
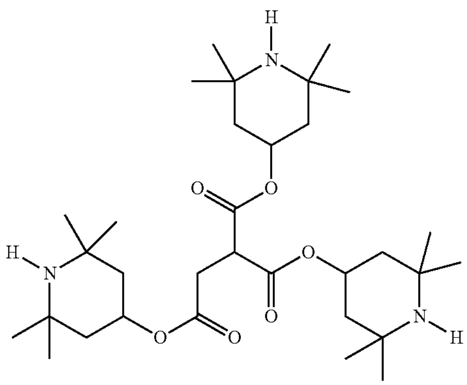
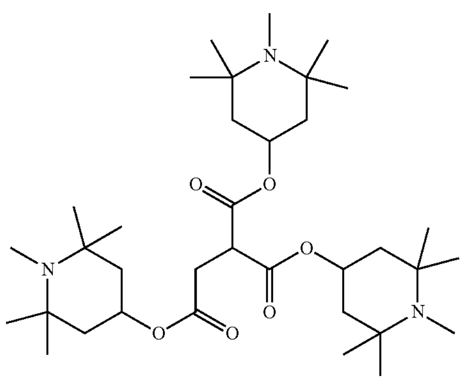
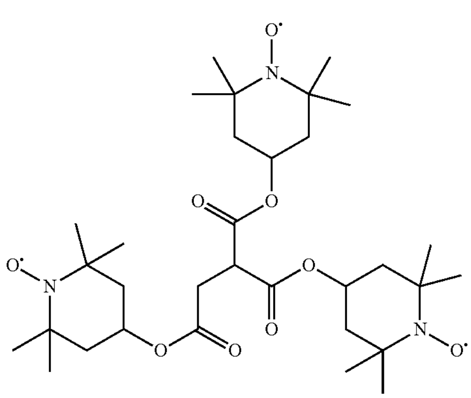

TABLE D-continued
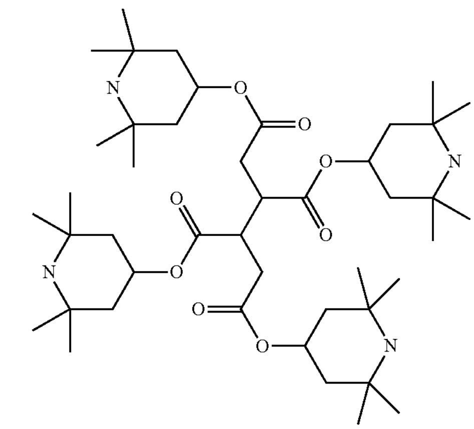
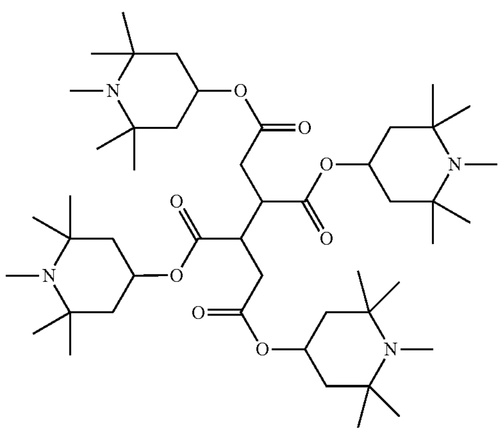
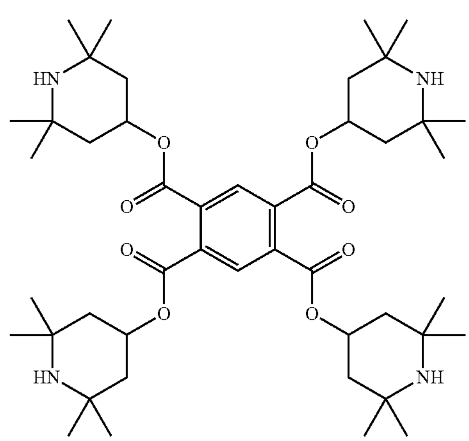

TABLE D-continued
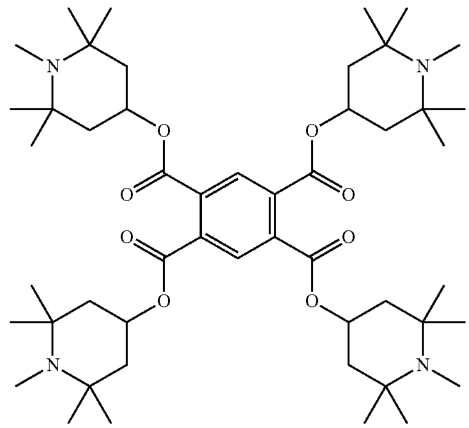
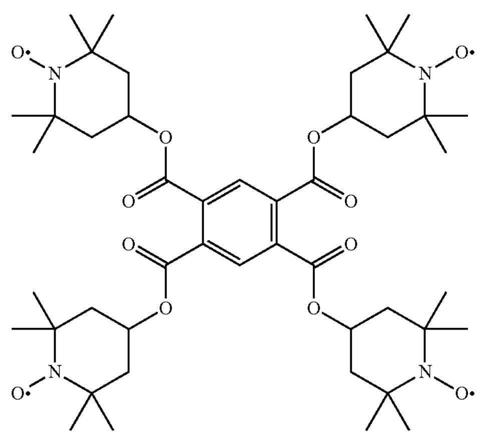
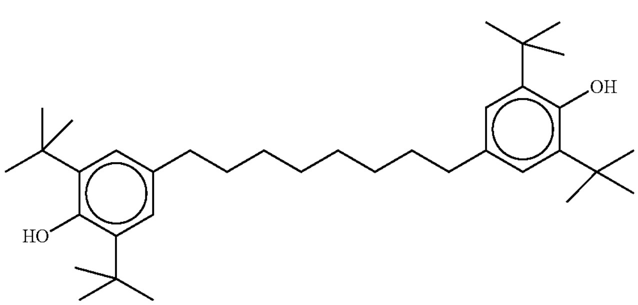

TABLE D-continued

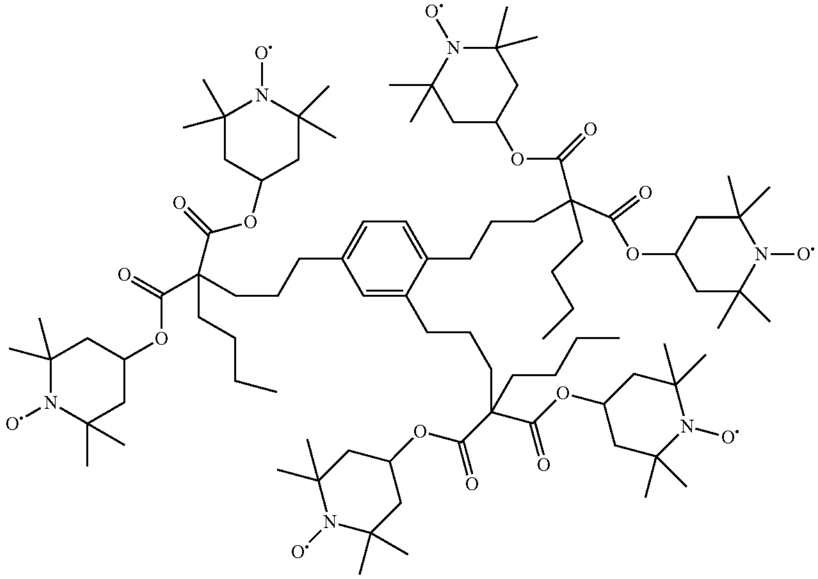

Table D shows possible stabilisers which can be added to the LC media according to the invention. Therein n denotes an integer from 1 to 12, preferably 1, 2, 3, 4, 5, 6, 7 or 8, and terminal methyl groups are not shown.

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

TABLE E

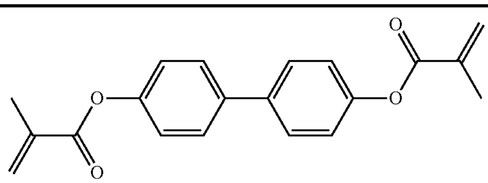

RM-1

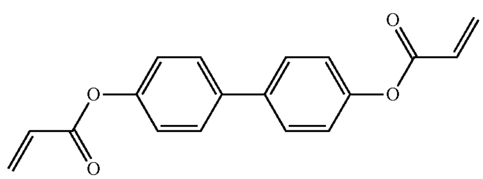

RM-2

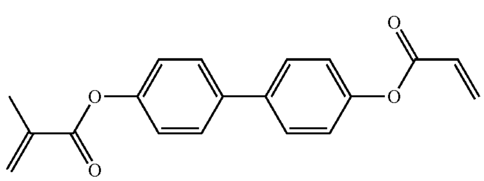 [SMILES: C=CC(=O)Oc1ccc(-c2ccc(OC(=O)C(=C)C)cc2)cc1]

RM-3

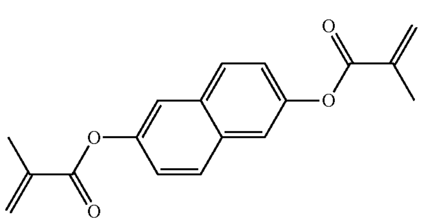 [SMILES: C=C(C)C(=O)Oc1ccc2cc(OC(=O)C(=C)C)ccc2c1]

RM-4

TABLE E-continued
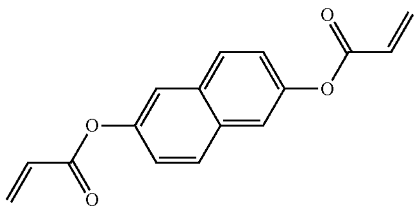 [SMILES: C=CC(=O)Oc1ccc2cc(OC(=O)C=C)ccc2c1]
RM-5
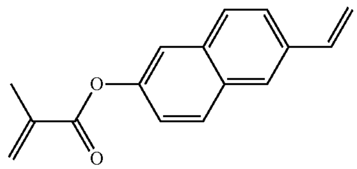 [SMILES: C=Cc1ccc2cc(OC(=O)C(=C)C)ccc2c1]
RM-6
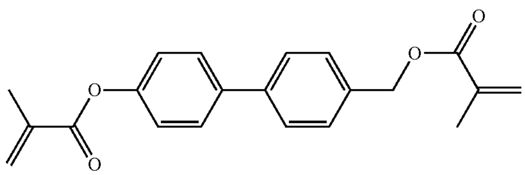 [SMILES: C=C(C)C(=O)OCc1ccc(-c2ccc(OC(=O)C(=C)C)cc2)cc1]
RM-7
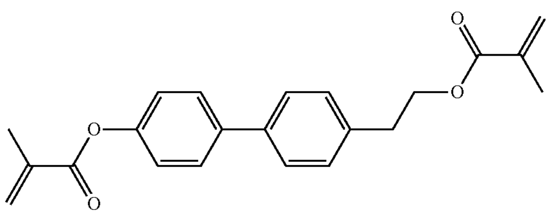 [SMILES: C=C(C)C(=O)OCCc1ccc(-c2ccc(OC(=O)C(=C)C)cc2)cc1]
RM-8
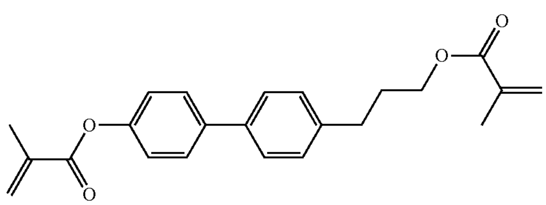 [SMILES: C=C(C)C(=O)OCCCc1ccc(-c2ccc(OC(=O)C(=C)C)cc2)cc1]
RM-9
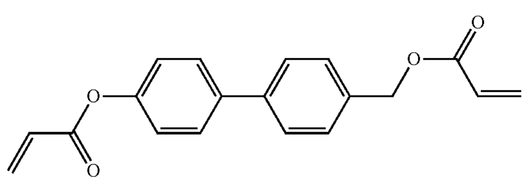 [SMILES: C=CC(=O)OCc1ccc(-c2ccc(OC(=O)C=C)cc2)cc1]
RM-10
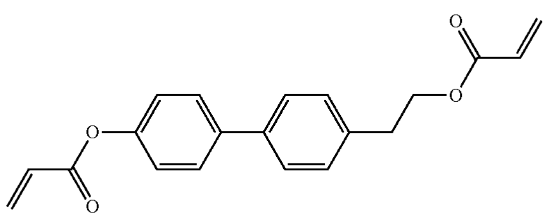 [SMILES: C=CC(=O)OCCc1ccc(-c2ccc(OC(=O)C=C)cc2)cc1]
RM-11
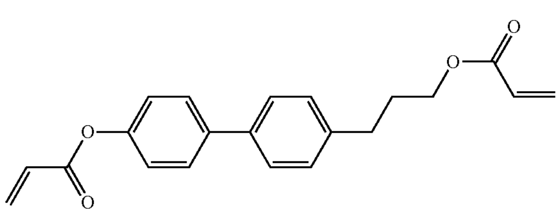 [SMILES: C=CC(=O)OCCCc1ccc(-c2ccc(OC(=O)C=C)cc2)cc1]
RM-12

TABLE E-continued
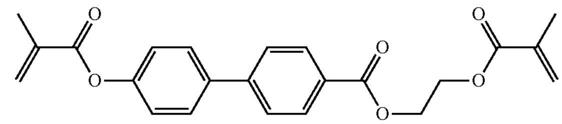 [SMILES: C=C(C)C(=O)OCCOC(=O)c1ccc(-c2ccc(OC(=O)C(=C)C)cc2)cc1]
RM-13
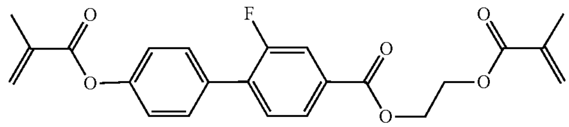 [SMILES: C=C(C)C(=O)OCCOC(=O)c1ccc(-c2ccc(OC(=O)C(=C)C)cc2)c(F)c1]
RM-14
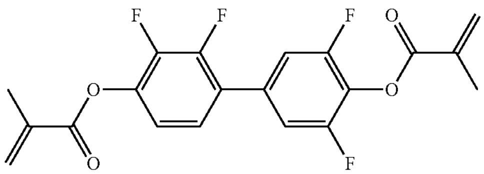 [SMILES: C=C(C)C(=O)Oc1ccc(-c2cc(F)c(OC(=O)C(=C)C)c(F)c2)c(F)c1F]
RM-15
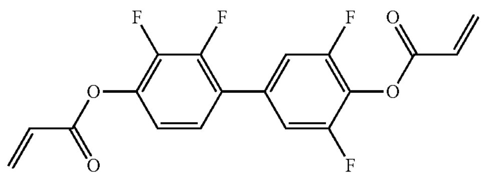 [SMILES: C=CC(=O)Oc1ccc(-c2cc(F)c(OC(=O)C=C)c(F)c2)c(F)c1F]
RM-16
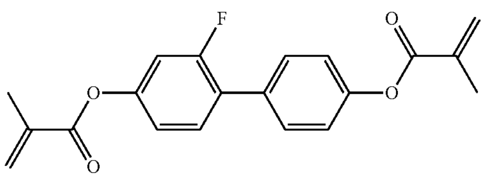
RM-17
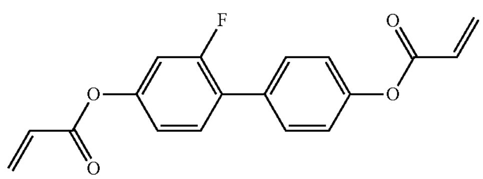
RM-18
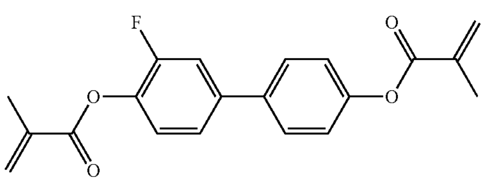
RM-19
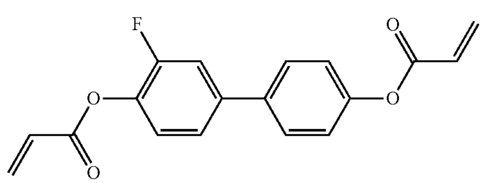 [SMILES: C=CC(=O)Oc1ccc(-c2ccc(OC(=O)C=C)c(F)c2)cc1]
RM-20
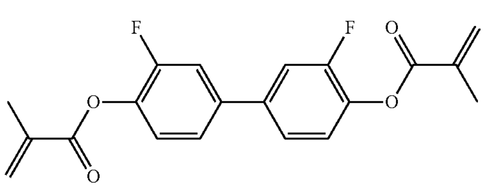
RM-21

TABLE E-continued
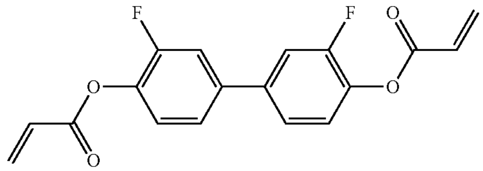 [SMILES: C=CC(=O)Oc1ccc(-c2ccc(OC(=O)C=C)c(F)c2)cc1F]
RM-22
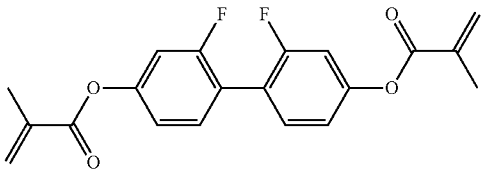 [SMILES: C=C(C)C(=O)Oc1ccc(-c2ccc(OC(=O)C(=C)C)cc2F)c(F)c1]
RM-23
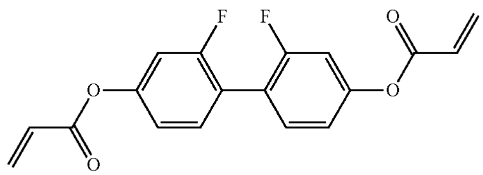 [SMILES: C=CC(=O)Oc1ccc(-c2ccc(OC(=O)C=C)cc2F)c(F)c1]
RM-24
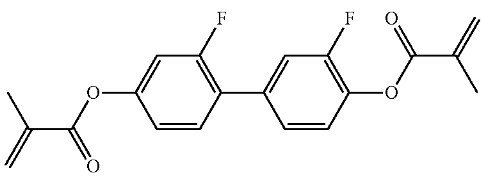 [SMILES: C=C(C)C(=O)Oc1ccc(-c2ccc(OC(=O)C(=C)C)c(F)c2)c(F)c1]
RM-25
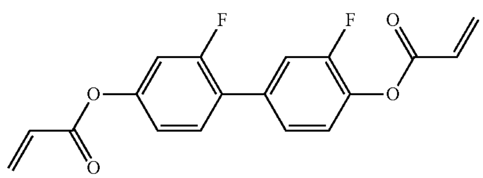
RM-26
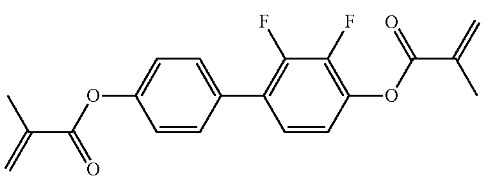
RM-27
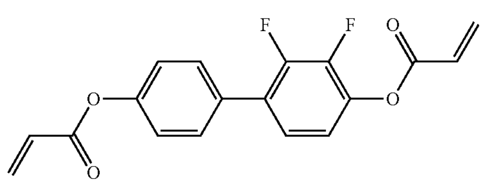
RM-28
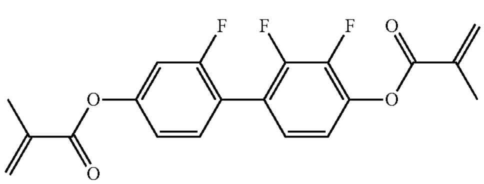 [SMILES: C=C(C)C(=O)Oc1ccc(-c2ccc(OC(=O)C(=C)C)c(F)c2F)c(F)c1]
RM-29
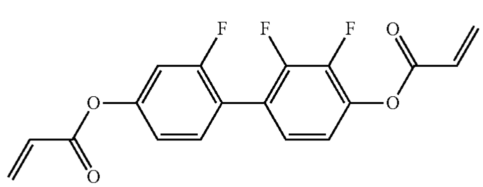
RM-30

TABLE E-continued
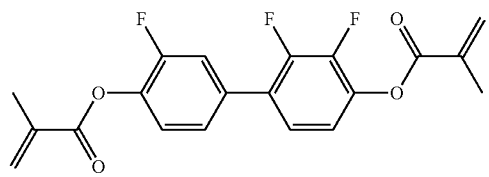 [SMILES: C=C(C)C(=O)Oc1ccc(-c2ccc(OC(=O)C(=C)C)c(F)c2F)cc1F]
RM-31
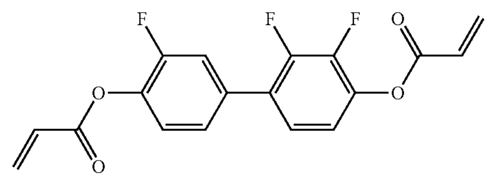
RM-32
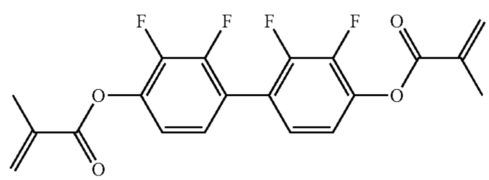
RM-33
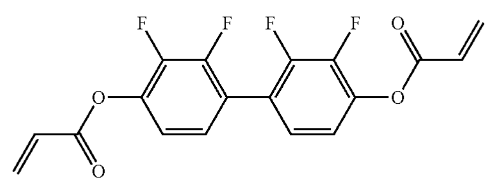 [SMILES: C=CC(=O)Oc1ccc(-c2ccc(OC(=O)C=C)c(F)c2F)cc1F]
RM-34
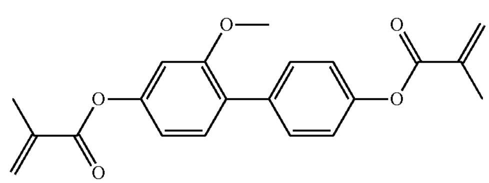
RM-35
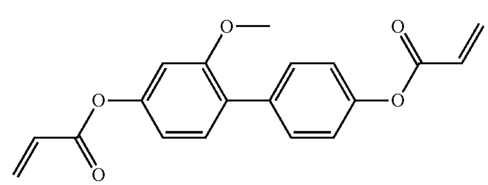 [SMILES: C=CC(=O)Oc1ccc(-c2ccc(OC(=O)C=C)cc2OC)cc1]
RM-36
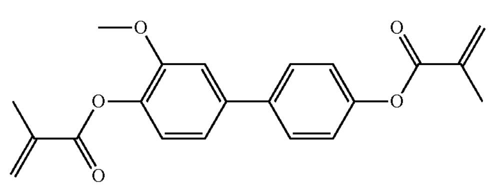
RM-37
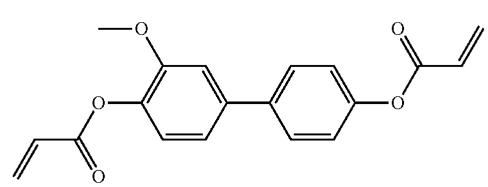
RM-38

TABLE E-continued
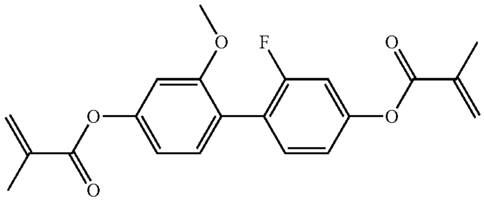 [SMILES: C=C(C)C(=O)Oc1ccc(-c2ccc(OC(=O)C(=C)C)cc2OC)c(F)c1]
RM-39
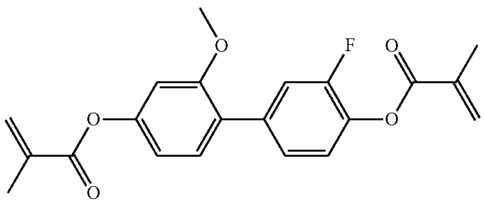 [SMILES: C=C(C)C(=O)Oc1ccc(-c2ccc(OC(=O)C(=C)C)c(F)c2)c(OC)c1]
RM-40
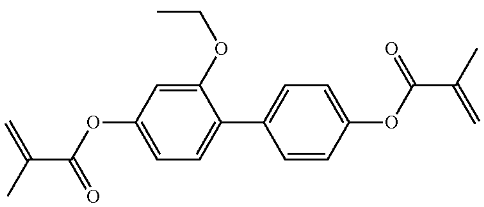 [SMILES: C=C(C)C(=O)Oc1ccc(-c2ccc(OC(=O)C(=C)C)cc2OCC)cc1]
RM-41
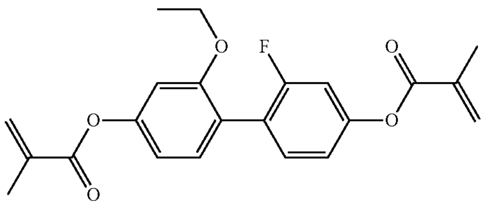 [SMILES: C=C(C)C(=O)Oc1ccc(-c2ccc(OC(=O)C(=C)C)cc2OCC)c(F)c1]
RM-42
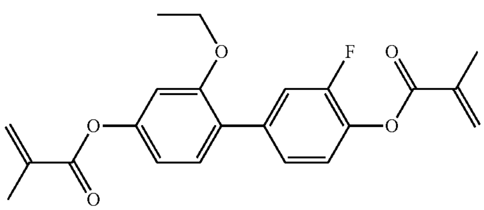 [SMILES: C=C(C)C(=O)Oc1ccc(-c2ccc(OC(=O)C(=C)C)c(F)c2)c(OCC)c1]
RM-43
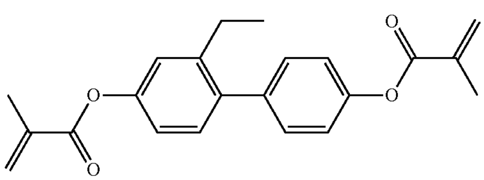 [SMILES: C=C(C)C(=O)Oc1ccc(-c2ccc(OC(=O)C(=C)C)cc2CC)cc1]
RM-44
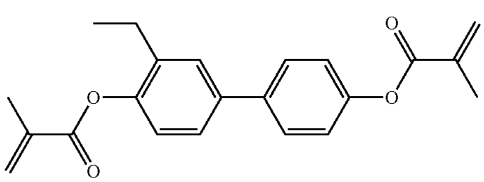
RM-45
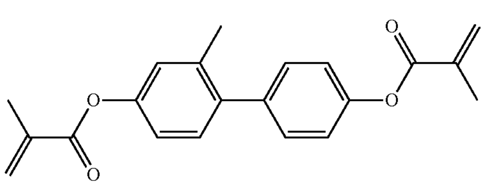
RM-46

TABLE E-continued
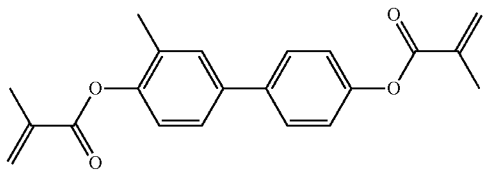 [SMILES: C=C(C)C(=O)Oc1ccc(-c2ccc(OC(=O)C(=C)C)c(C)c2)cc1]
RM-47
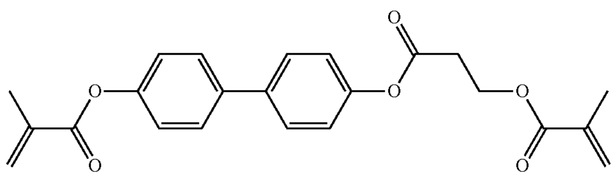 [SMILES: C=C(C)C(=O)OCCC(=O)Oc1ccc(-c2ccc(OC(=O)C(=C)C)cc2)cc1F]
RM-48
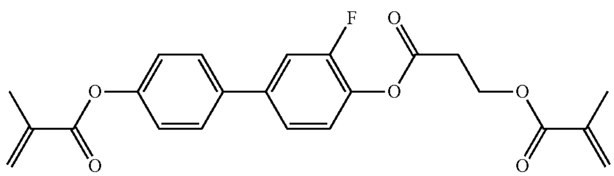
RM-49
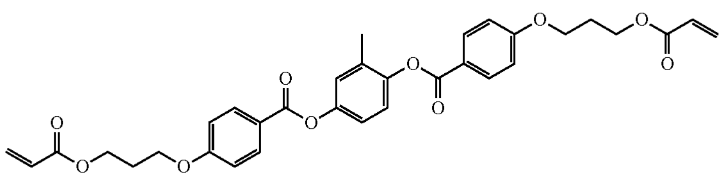 [SMILES: C=CC(=O)OCCCOc1ccc(C(=O)Oc2ccc(OC(=O)c3ccc(OCCCOC(=O)C=C)cc3)c(C)c2)cc1]
RM-50
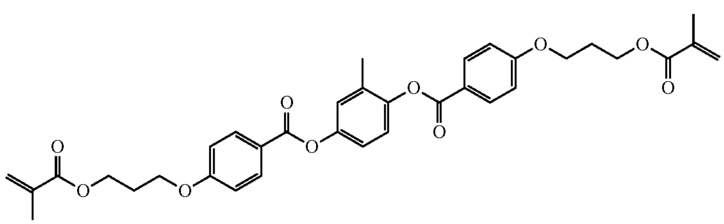 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
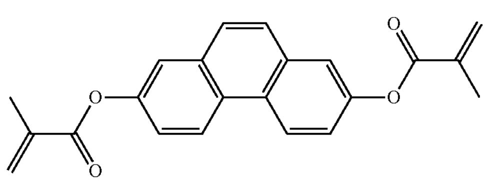 [SMILES: C=C(C)C(=O)Oc1ccc2c(ccc3cc(OC(=O)C(=C)C)ccc32)c1]
RM-52
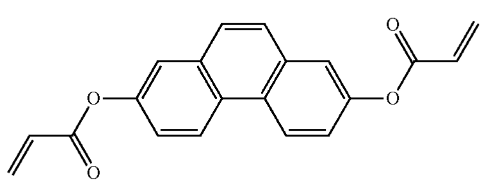 [SMILES: C=CC(=O)Oc1ccc2c(ccc3cc(OC(=O)C=C)ccc32)c1]
RM-53
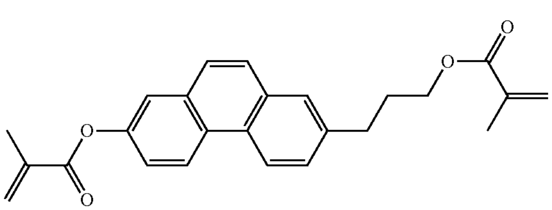 [SMILES: C=C(C)C(=O)OCCCc1ccc2c(ccc3cc(OC(=O)C(=C)C)ccc32)c1]
RM-54

TABLE E-continued
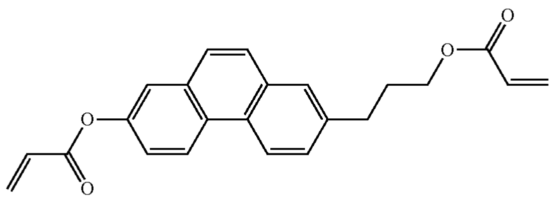 [SMILES: C=CC(=O)OCCCc1ccc2c(ccc3cc(OC(=O)C=C)ccc32)c1]
RM-55
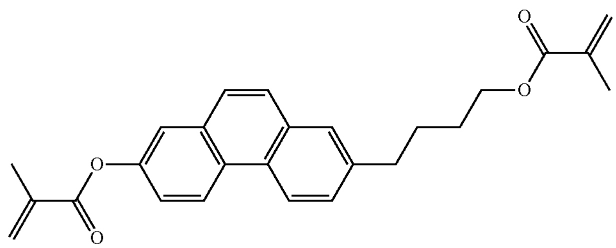 [SMILES: C=C(C)C(=O)OCCCCc1ccc2c(ccc3cc(OC(=O)C(=C)C)ccc32)c1]
RM-56
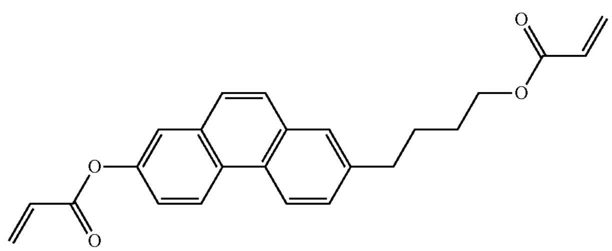 [SMILES: C=CC(=O)OCCCCc1ccc2c(ccc3cc(OC(=O)C=C)ccc32)c1]
RM-57
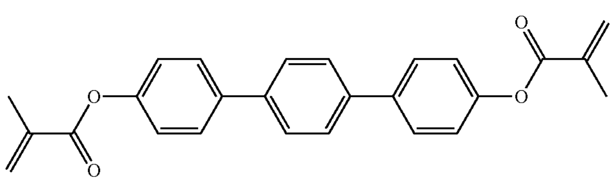 [SMILES: C=C(C)C(=O)Oc1ccc(-c2ccc(-c3ccc(OC(=O)C(=C)C)cc3)cc2)cc1]
RM-58
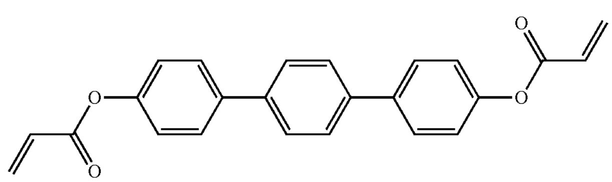
RM-59
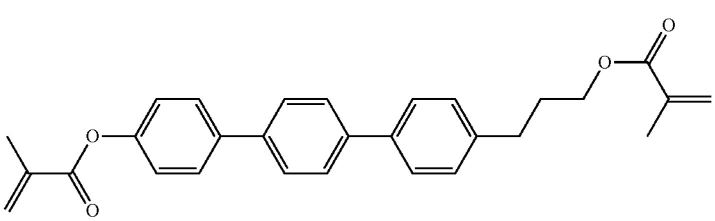 [SMILES: C=C(C)C(=O)OCCCc1ccc(-c2ccc(-c3ccc(OC(=O)C(=C)C)cc3)cc2)cc1]
RM-60
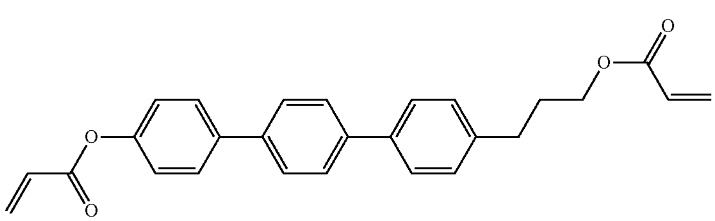 [SMILES: C=CC(=O)OCCCc1ccc(-c2ccc(-c3ccc(OC(=O)C=C)cc3)cc2)cc1]
RM-61

TABLE E-continued
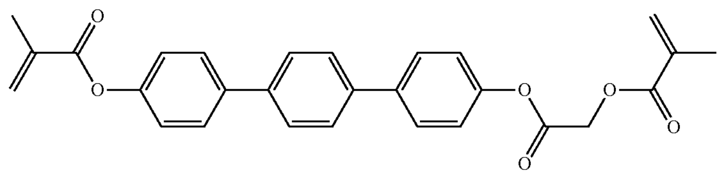 [SMILES: C=C(C)C(=O)OCC(=O)Oc1ccc(-c2ccc(-c3ccc(OC(=O)C(=C)C)cc3)cc2)cc1]
RM-62
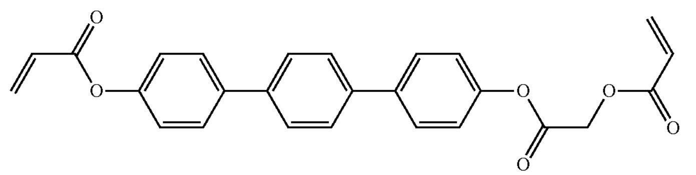 [SMILES: C=CC(=O)OCC(=O)Oc1ccc(-c2ccc(-c3ccc(OC(=O)C=C)cc3)cc2)cc1]
RM-63
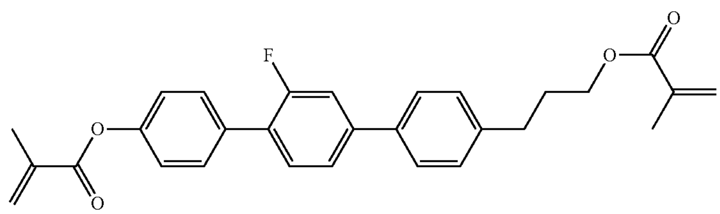 [SMILES: C=C(C)C(=O)OCCCc1ccc(-c2ccc(-c3ccc(OC(=O)C(=C)C)cc3)c(F)c2)cc1]
RM-64
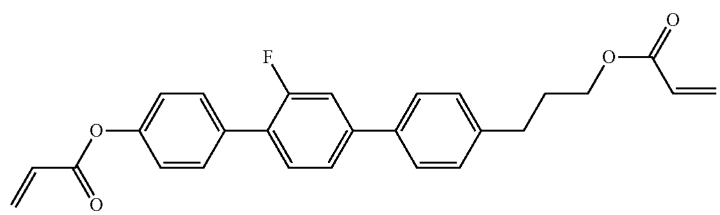 [SMILES: C=CC(=O)OCCCc1ccc(-c2ccc(-c3ccc(OC(=O)C=C)cc3)c(F)c2)cc1]
RM-65
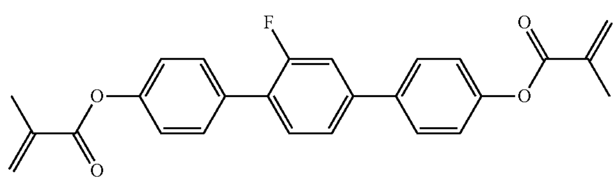
RM-66
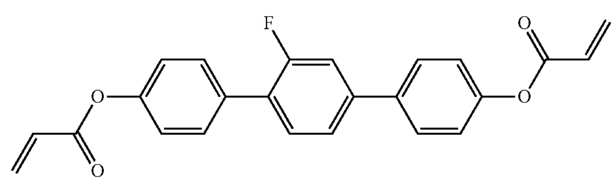 [SMILES: C=CC(=O)Oc1ccc(-c2ccc(-c3ccc(OC(=O)C=C)cc3)c(F)c2)cc1]
RM-67
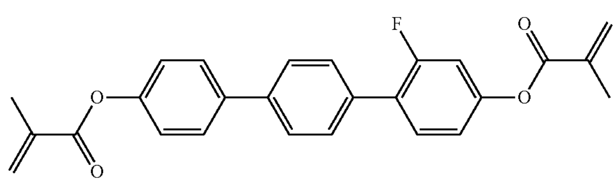
RM-68
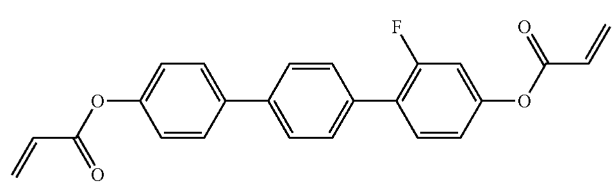 [SMILES: C=CC(=O)Oc1ccc(-c2ccc(-c3ccc(OC(=O)C=C)cc3F)cc2)cc1]
RM-69

TABLE E-continued
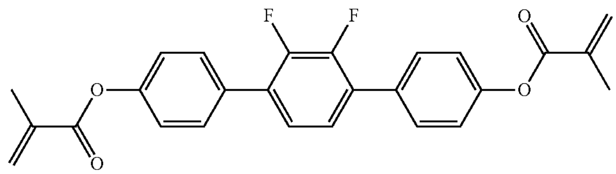 [SMILES: C=C(C)C(=O)Oc1ccc(-c2ccc(-c3ccc(OC(=O)C(=C)C)cc3)c(F)c2F)cc1]
RM-70
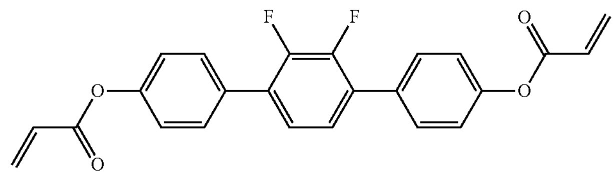
RM-71
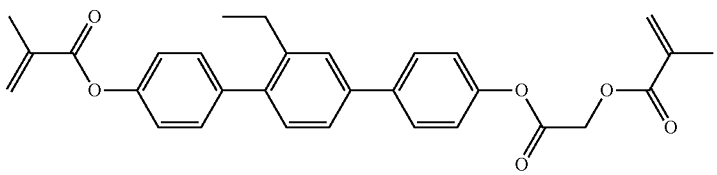 [SMILES: C=C(C)C(=O)OCC(=O)Oc1ccc(-c2ccc(-c3ccc(OC(=O)C(=C)C)cc3)c(CC)c2)cc1]
RM-72
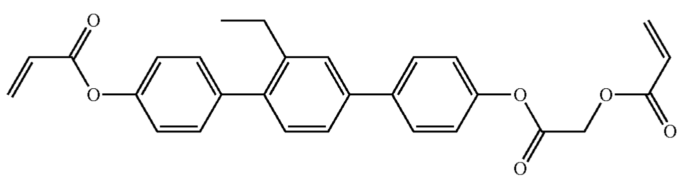 [SMILES: C=CC(=O)OCC(=O)Oc1ccc(-c2ccc(-c3ccc(OC(=O)C=C)cc3)c(CC)c2)cc1]
RM-73
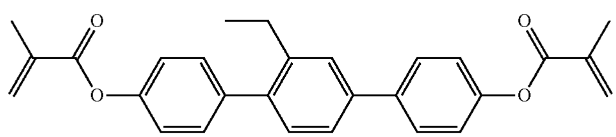
RM-74
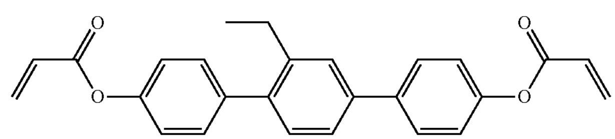 [SMILES: C=CC(=O)Oc1ccc(-c2ccc(-c3ccc(OC(=O)C=C)cc3)c(CC)c2)cc1]
RM-75
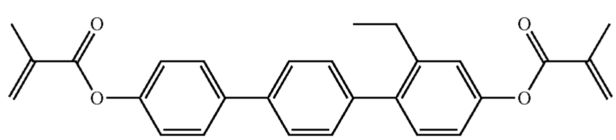 [SMILES: C=C(C)C(=O)Oc1ccc(-c2ccc(-c3ccc(OC(=O)C(=C)C)cc3CC)cc2)cc1]
RM-76
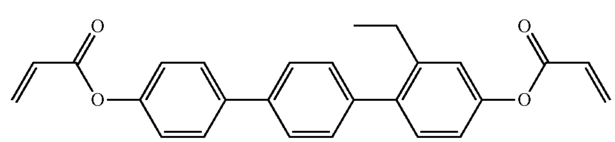 [SMILES: C=CC(=O)Oc1ccc(-c2ccc(-c3ccc(OC(=O)C=C)cc3CC)cc2)cc1]
RM-77
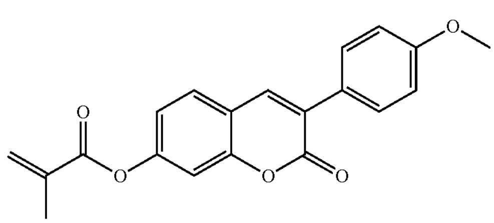 [SMILES: C=C(C)C(=O)Oc1ccc2cc(-c3ccc(OC)cc3)c(=O)oc2c1]
RM-78

TABLE E-continued
RM-79
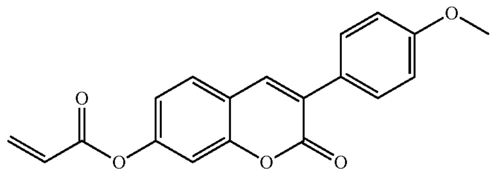 [SMILES: C=CC(=O)Oc1ccc2cc(-c3ccc(OC)cc3)c(=O)oc2c1]
RM-80
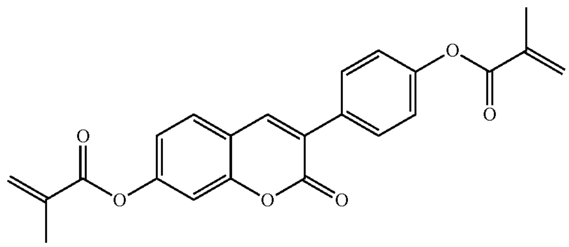 [SMILES: C=C(C)C(=O)Oc1ccc(-c2cc3ccc(OC(=O)C(=C)C)cc3oc2=O)cc1]
RM-81
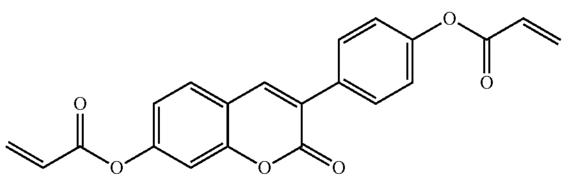 [SMILES: C=CC(=O)Oc1ccc(-c2cc3ccc(OC(=O)C=C)cc3oc2=O)cc1]
RM-82
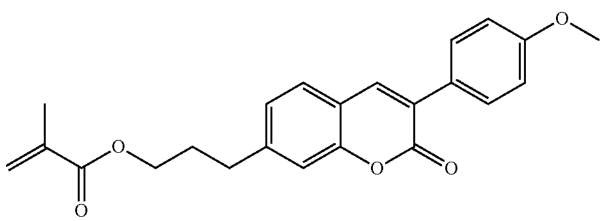 [SMILES: C=C(C)C(=O)OCCCc1ccc2cc(-c3ccc(OC)cc3)c(=O)oc2c1]
RM-83
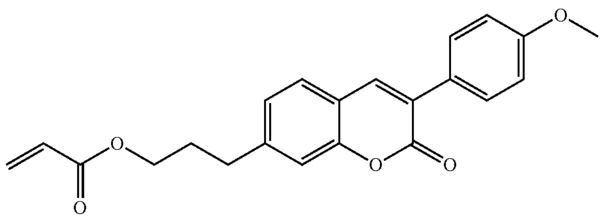 [SMILES: C=CC(=O)OCCCc1ccc2cc(-c3ccc(OC)cc3)c(=O)oc2c1]
RM-84
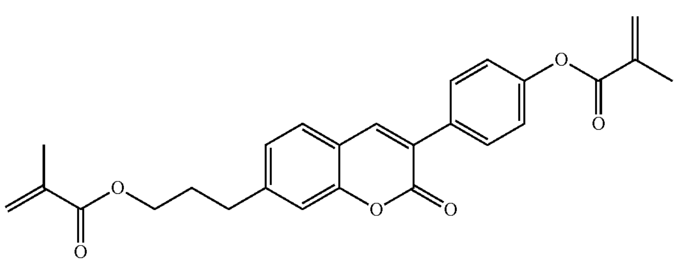 [SMILES: C=C(C)C(=O)OCCCc1ccc2cc(-c3ccc(OC(=O)C(=C)C)cc3)c(=O)oc2c1]
RM-85
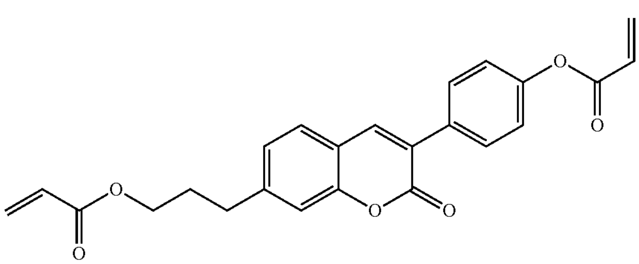 [SMILES: C=CC(=O)OCCCc1ccc2cc(-c3ccc(OC(=O)C=C)cc3)c(=O)oc2c1]

TABLE E-continued
RM-86
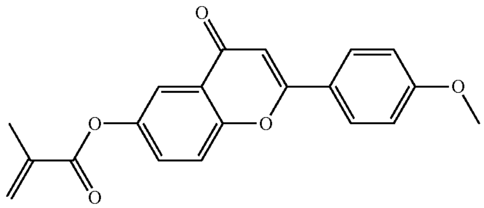 [SMILES: C=C(C)C(=O)Oc1ccc2oc(-c3ccc(OC)cc3)cc(=O)c2c1]
RM-87
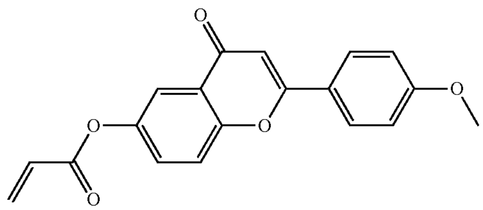 [SMILES: C=CC(=O)Oc1ccc2oc(-c3ccc(OC)cc3)cc(=O)c2c1]
RM-88
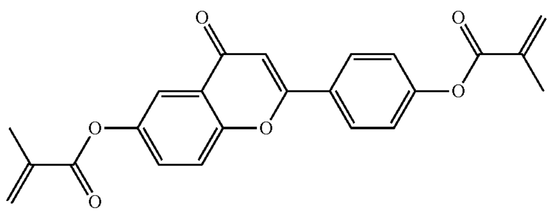 [SMILES: C=C(C)C(=O)Oc1ccc(-c2cc(=O)c3cc(OC(=O)C(=C)C)ccc3o2)cc1]
RM-89
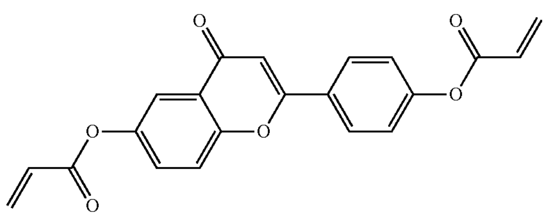 [SMILES: C=CC(=O)Oc1ccc(-c2cc(=O)c3cc(OC(=O)C=C)ccc3o2)cc1]
RM-90
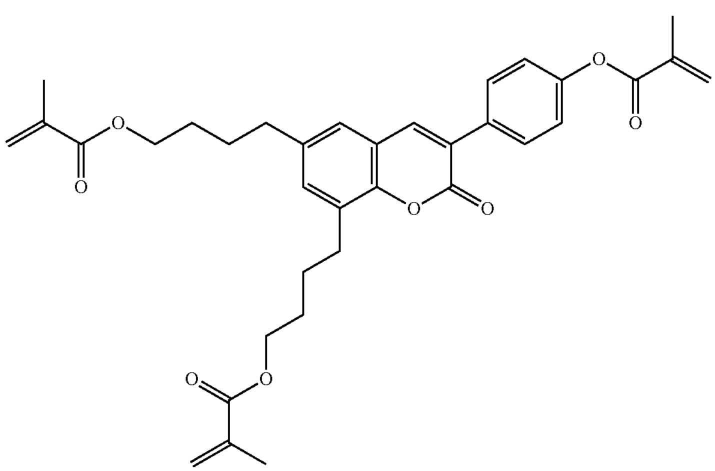 [SMILES: C=C(C)C(=O)OCCCCc1cc(CCCCOC(=O)C(=C)C)c2oc(=O)c(-c3ccc(OC(=O)C(=C)C)cc3)cc2c1]

TABLE E-continued
RM-91
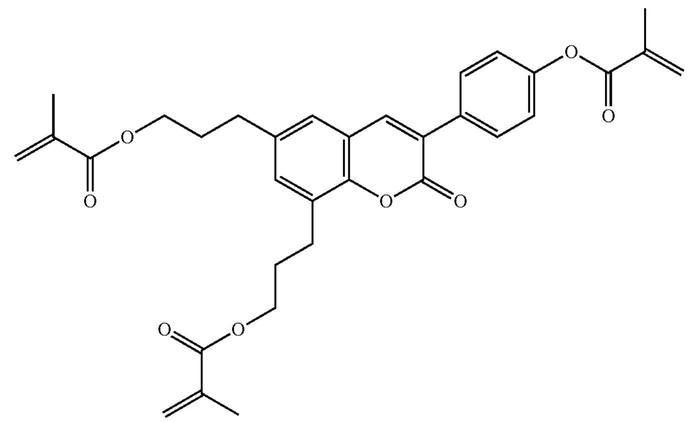 [SMILES: C=C(C)C(=O)OCCCc1cc(CCCOC(=O)C(=C)C)c2oc(=O)c(-c3ccc(OC(=O)C(=C)C)cc3)cc2c1]
RM-92
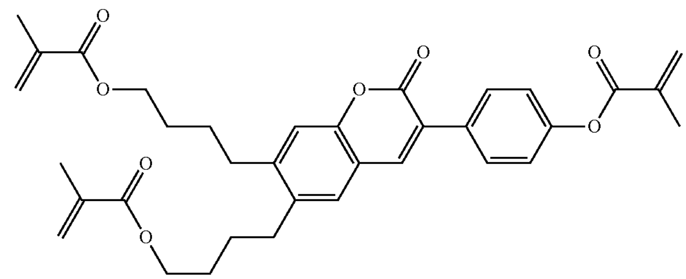 [SMILES: C=C(C)C(=O)OCCCCc1cc2cc(-c3ccc(OC(=O)C(=C)C)cc3)c(=O)oc2cc1CCCCOC(=O)C(=C)C]
RM-93
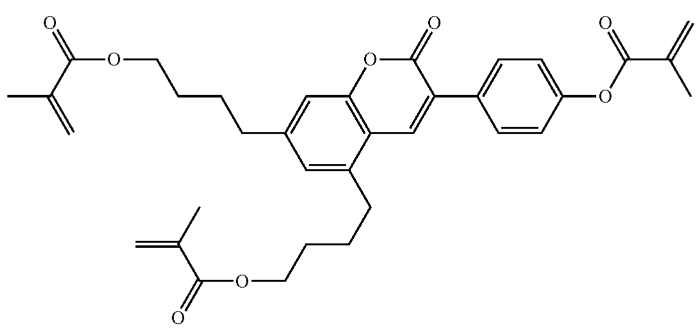 [SMILES: C=C(C)C(=O)OCCCCc1cc(CCCCOC(=O)C(=C)C)c2cc(-c3ccc(OC(=O)C(=C)C)cc3)c(=O)oc2c1]
RM-94
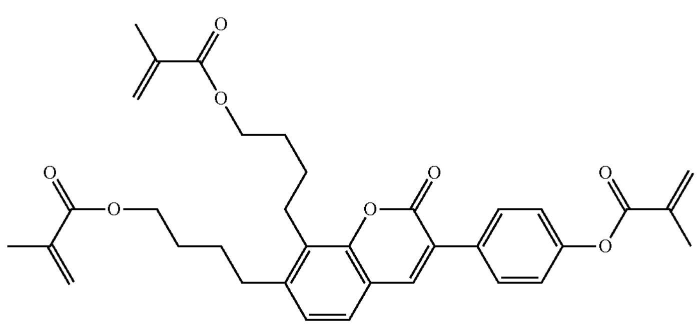 [SMILES: C=C(C)C(=O)OCCCCc1ccc2cc(-c3ccc(OC(=O)C(=C)C)cc3)c(=O)oc2c1CCCCOC(=O)C(=C)C]
RM-95
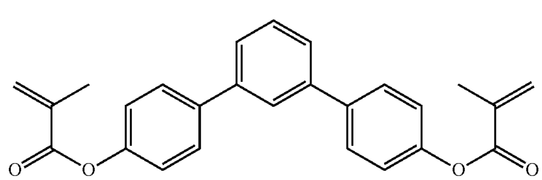 [SMILES: C=C(C)C(=O)Oc1ccc(-c2cccc(-c3ccc(OC(=O)C(=C)C)cc3)c2)cc1]

TABLE E-continued
RM-96
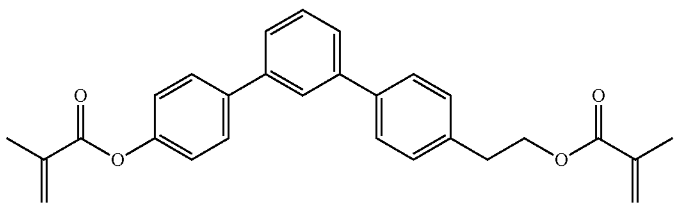 [SMILES: C=C(C)C(=O)OCCc1ccc(-c2cccc(-c3ccc(OC(=O)C(=C)C)cc3)c2)cc1]
RM-97
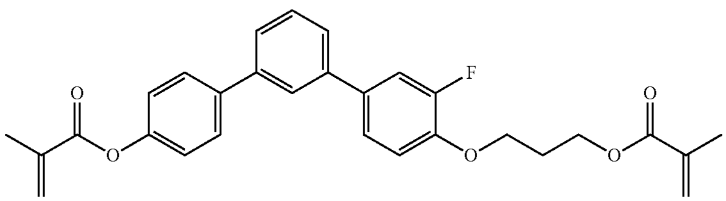 [SMILES: C=C(C)C(=O)OCCCOc1ccc(-c2cccc(-c3ccc(OC(=O)C(=C)C)cc3)c2)cc1F]
RM-98
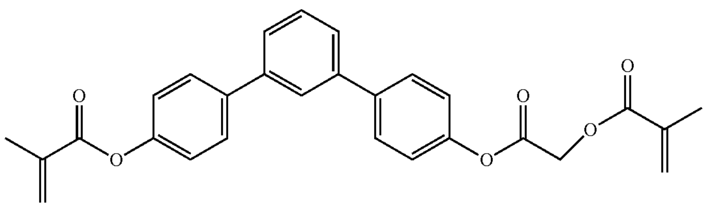 [SMILES: C=C(C)C(=O)OCC(=O)Oc1ccc(-c2cccc(-c3ccc(OC(=O)C(=C)C)cc3)c2)cc1]
RM-99
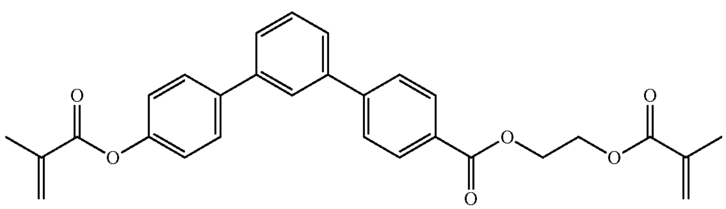 [SMILES: C=C(C)C(=O)OCCOC(=O)c1ccc(-c2cccc(-c3ccc(OC(=O)C(=C)C)cc3)c2)cc1]
RM-100
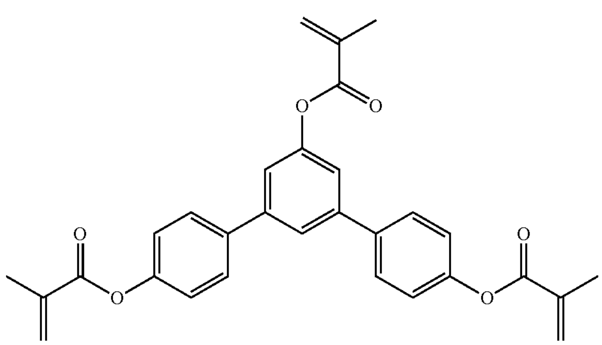 [SMILES: C=C(C)C(=O)Oc1ccc(-c2cc(OC(=O)C(=C)C)cc(-c3ccc(OC(=O)C(=C)C)cc3)c2)cc1]
RM-101
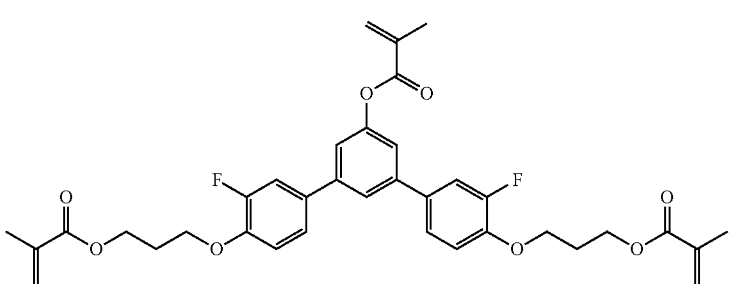 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]

TABLE E-continued
RM-102
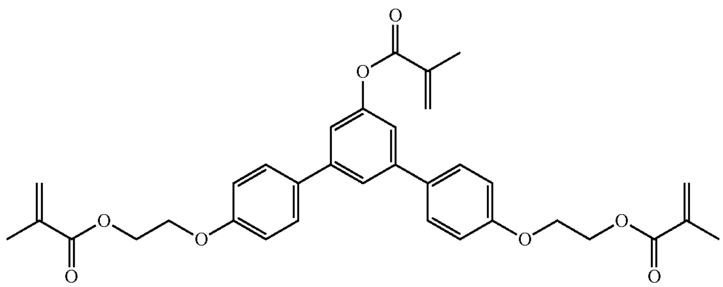 [SMILES: C=C(C)C(=O)OCCOc1ccc(-c2cc(OC(=O)C(=C)C)cc(-c3ccc(OCCOC(=O)C(=C)C)cc3)c2)cc1]
RM-103
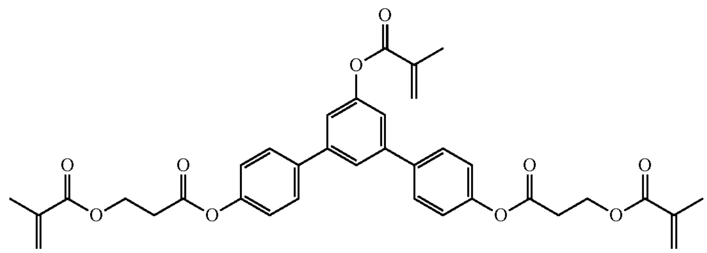 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
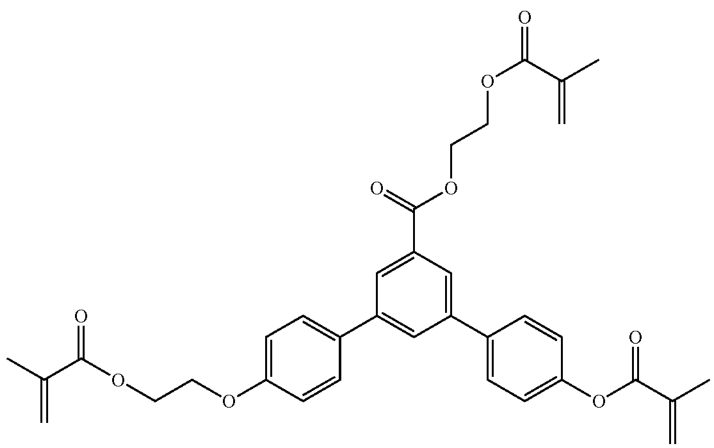 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
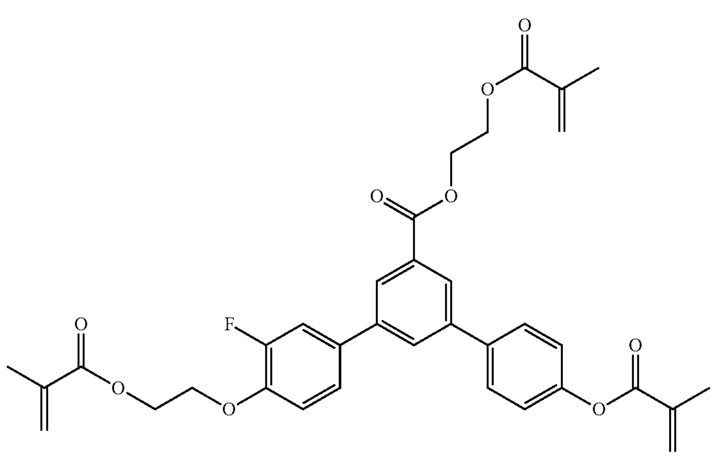 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

TABLE E-continued
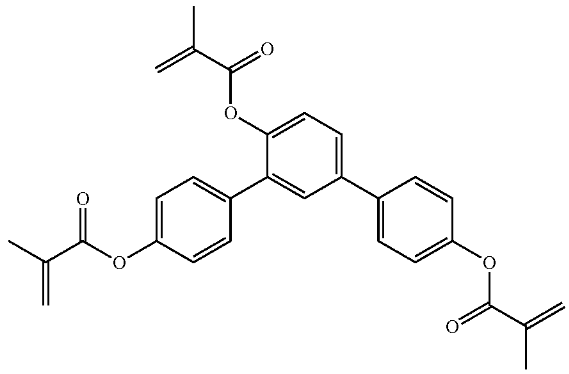 [SMILES: C=C(C)C(=O)Oc1ccc(-c2ccc(OC(=O)C(=C)C)c(-c3ccc(OC(=O)C(=C)C)cc3)c2)cc1]
RM-106
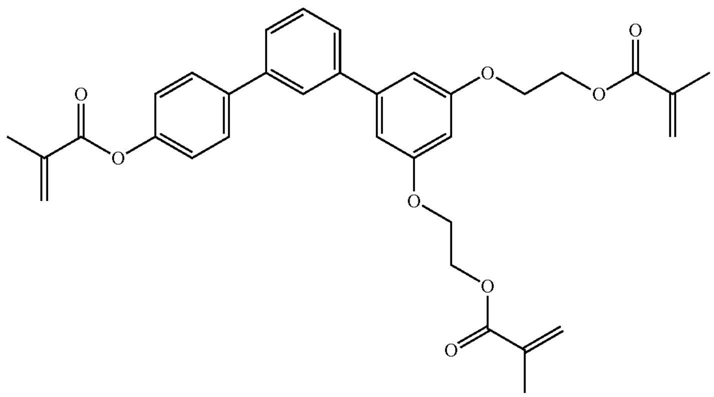 [SMILES: C=C(C)C(=O)OCCOc1cc(OCCOC(=O)C(=C)C)cc(-c2cccc(-c3ccc(OC(=O)C(=C)C)cc3)c2)c1]
RM-107
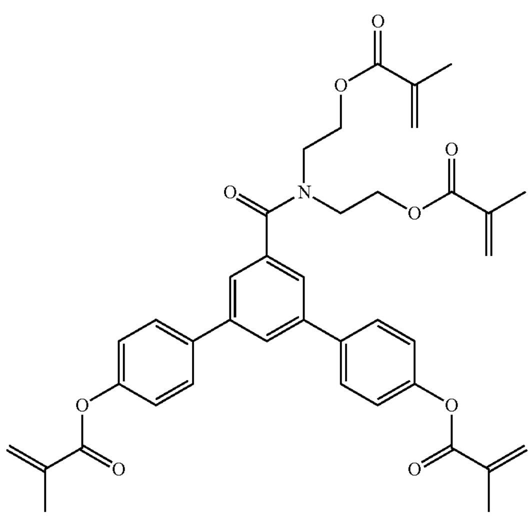 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
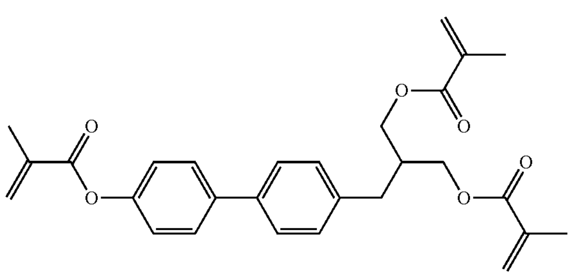 [SMILES: C=C(C)C(=O)OCC(COC(=O)C(=C)C)Cc1ccc(-c2ccc(OC(=O)C(=C)C)cc2)cc1]
RM-109

TABLE E-continued
RM-110
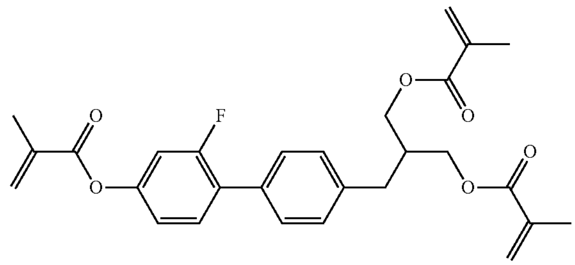 [SMILES: C=C(C)C(=O)OCC(COC(=O)C(=C)C)Cc1ccc(-c2ccc(OC(=O)C(=C)C)cc2F)cc1]
RM-111
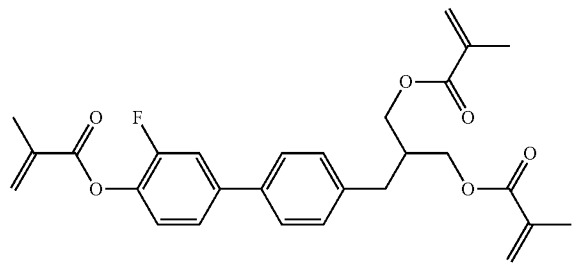 [SMILES: C=C(C)C(=O)OCC(COC(=O)C(=C)C)Cc1ccc(-c2ccc(OC(=O)C(=C)C)c(F)c2)cc1]
RM-112
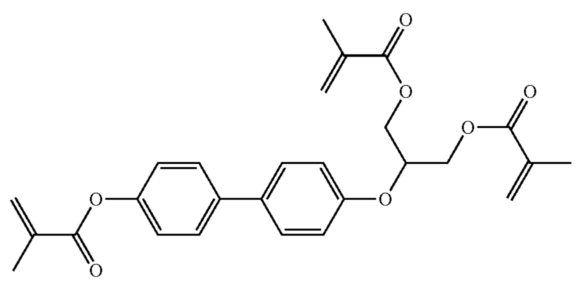 [SMILES: C=C(C)C(=O)OCC(COC(=O)C(=C)C)Oc1ccc(-c2ccc(OC(=O)C(=C)C)cc2)cc1]
RM-113
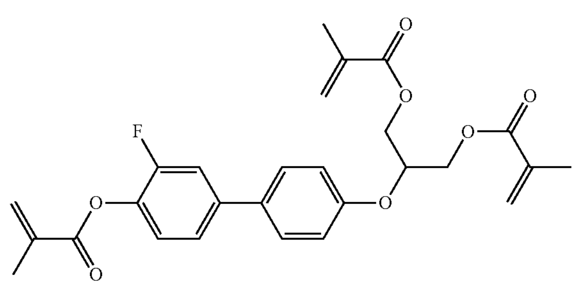 [SMILES: C=C(C)C(=O)OCC(COC(=O)C(=C)C)Oc1ccc(-c2ccc(OC(=O)C(=C)C)c(F)c2)cc1]
RM-114
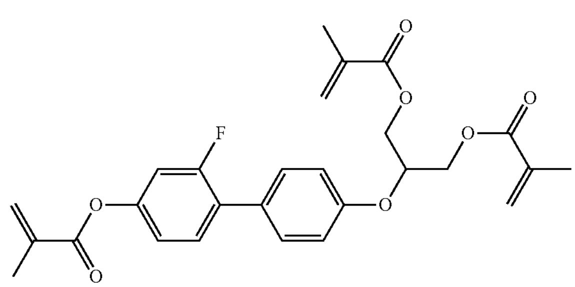 [SMILES: C=C(C)C(=O)OCC(COC(=O)C(=C)C)Oc1ccc(-c2ccc(OC(=O)C(=C)C)cc2F)cc1]

TABLE E-continued
RM-115
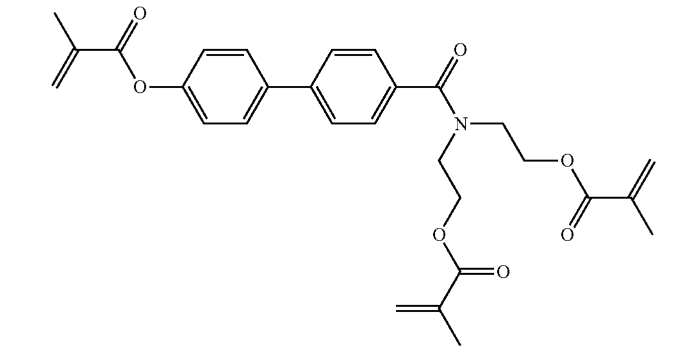 [SMILES: C=C(C)C(=O)OCCN(CCOC(=O)C(=C)C)C(=O)c1ccc(-c2ccc(OC(=O)C(=C)C)cc2)cc1]
RM-116
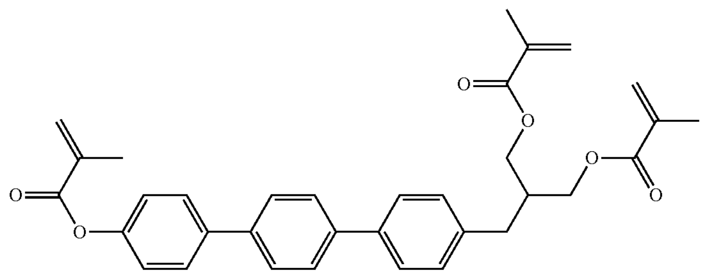
RM-117
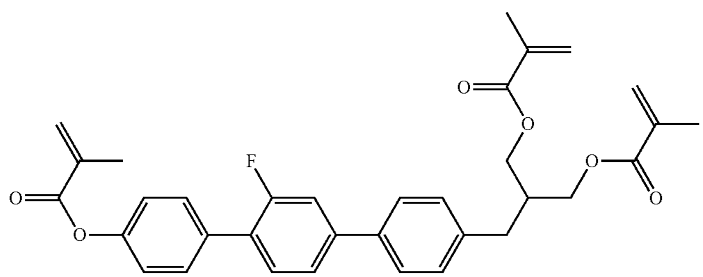 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
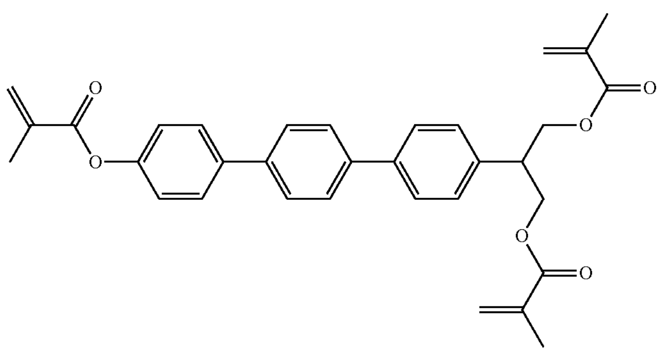 [SMILES: C=C(C)C(=O)OCC(COC(=O)C(=C)C)c1ccc(-c2ccc(-c3ccc(OC(=O)C(=C)C)cc3)cc2)cc1]
RM-119
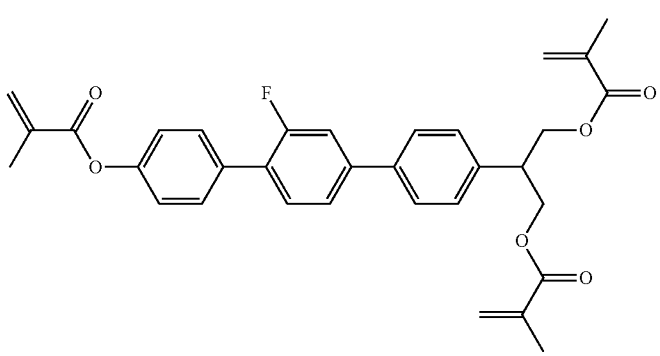 [SMILES: C=C(C)C(=O)OCC(COC(=O)C(=C)C)c1ccc(-c2ccc(-c3ccc(OC(=O)C(=C)C)cc3)c(F)c2)cc1]

TABLE E-continued
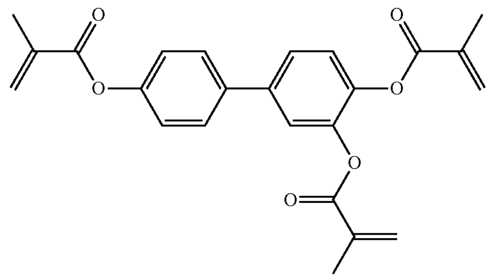 [SMILES: C=C(C)C(=O)Oc1ccc(-c2ccc(OC(=O)C(=C)C)c(OC(=O)C(=C)C)c2)cc1]
RM-120
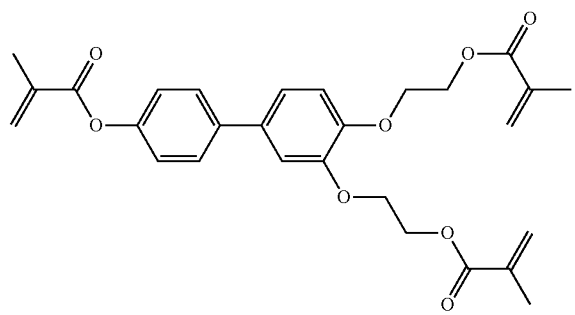 [SMILES: C=C(C)C(=O)OCCOc1ccc(-c2ccc(OC(=O)C(=C)C)cc2)cc1OCCOC(=O)C(=C)C]
RM-121
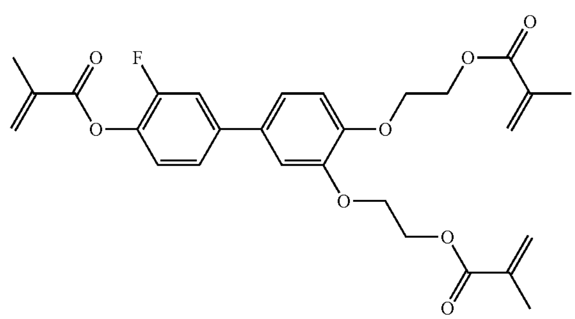 [SMILES: C=C(C)C(=O)OCCOc1ccc(-c2ccc(OC(=O)C(=C)C)c(F)c2)cc1OCCOC(=O)C(=C)C]
RM-122
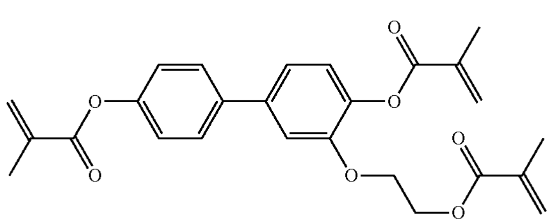 [SMILES: C=C(C)C(=O)OCCOc1cc(-c2ccc(OC(=O)C(=C)C)cc2)ccc1OC(=O)C(=C)C]
RM-123
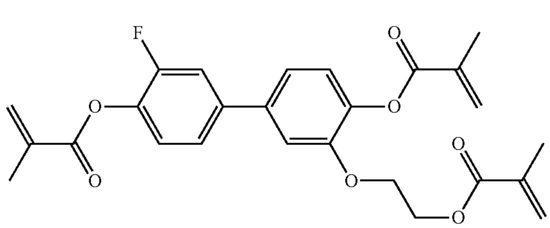
RM-124

TABLE E-continued
RM-125
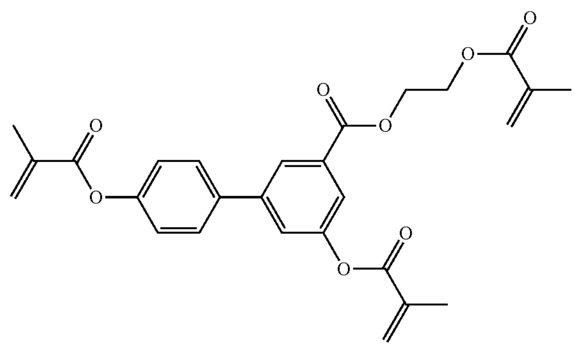 [SMILES: C=C(C)C(=O)OCCOC(=O)c1cc(OC(=O)C(=C)C)cc(-c2ccc(OC(=O)C(=C)C)cc2)c1]
RM-126
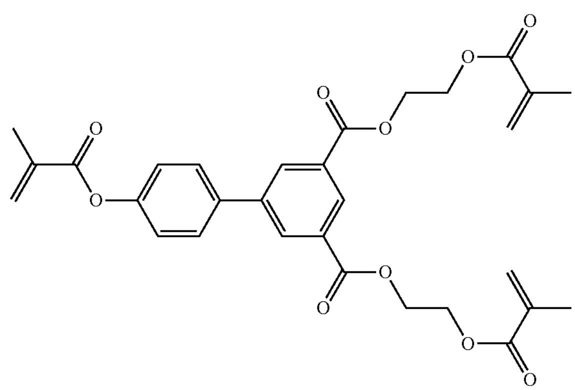 [SMILES: C=C(C)C(=O)OCCOC(=O)c1cc(C(=O)OCCOC(=O)C(=C)C)cc(-c2ccc(OC(=O)C(=C)C)cc2)c1]
RM-127
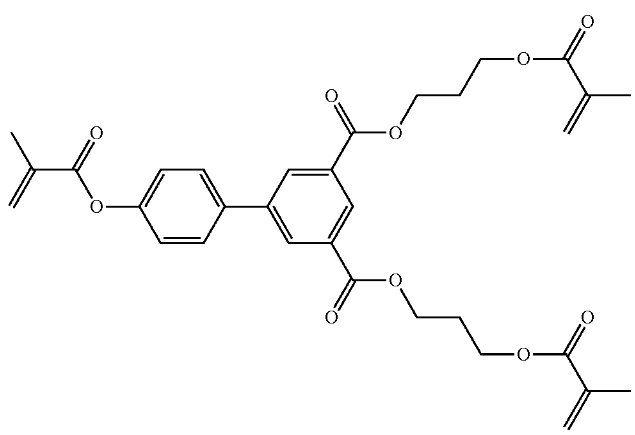 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
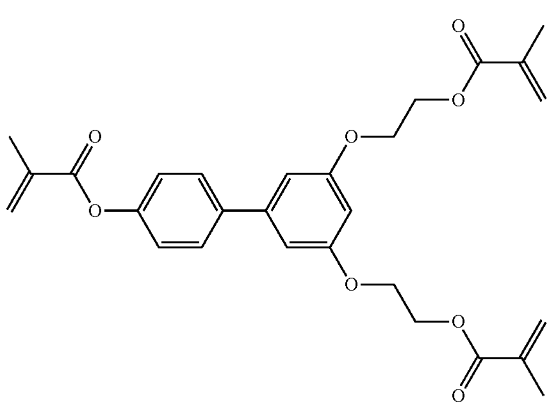 [SMILES: C=C(C)C(=O)OCCOc1cc(OCCOC(=O)C(=C)C)cc(-c2ccc(OC(=O)C(=C)C)cc2)c1]

TABLE E-continued
RM-129
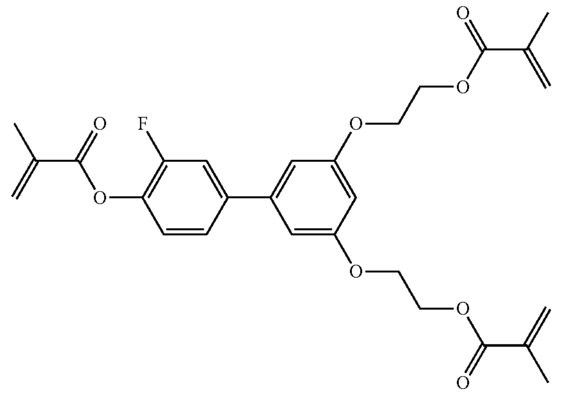 [SMILES: C=C(C)C(=O)OCCOc1cc(OCCOC(=O)C(=C)C)cc(-c2ccc(OC(=O)C(=C)C)c(F)c2)c1]
RM-130
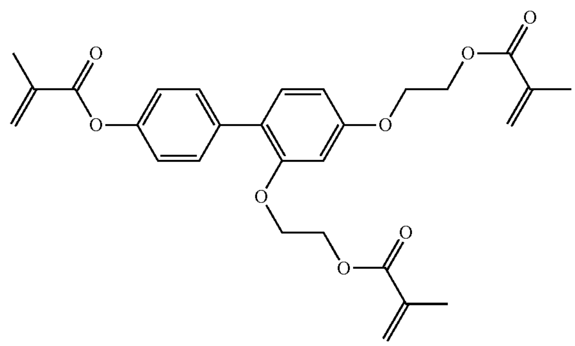 [SMILES: C=C(C)C(=O)OCCOc1ccc(-c2ccc(OC(=O)C(=C)C)cc2)c(OCCOC(=O)C(=C)C)c1]
RM-131
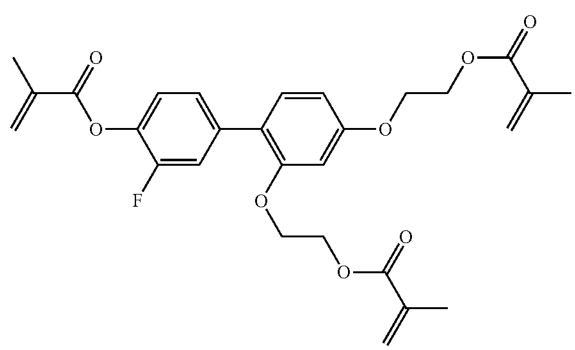
RM-132
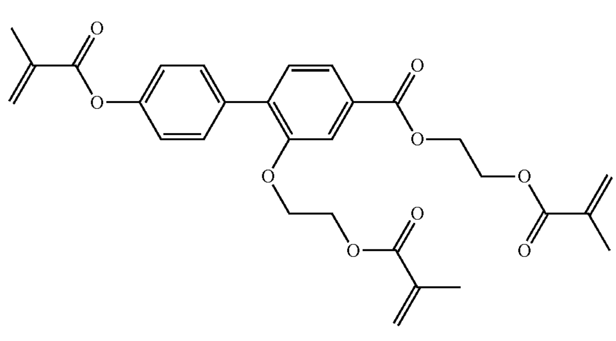 [SMILES: C=C(C)C(=O)OCCOC(=O)c1ccc(-c2ccc(OC(=O)C(=C)C)cc2)c(OCCOC(=O)C(=C)C)c1]

TABLE E-continued
RM-133
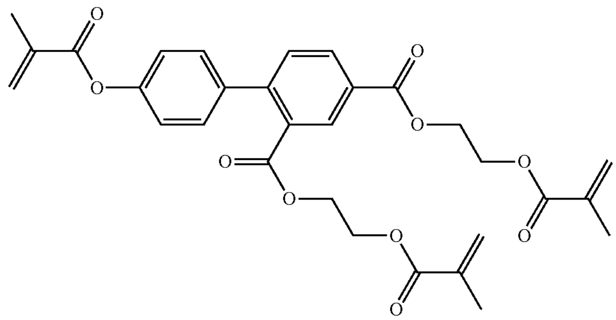 [SMILES: C=C(C)C(=O)OCCOC(=O)c1ccc(-c2ccc(OC(=O)C(=C)C)cc2)c(C(=O)OCCOC(=O)C(=C)C)c1]
RM-134
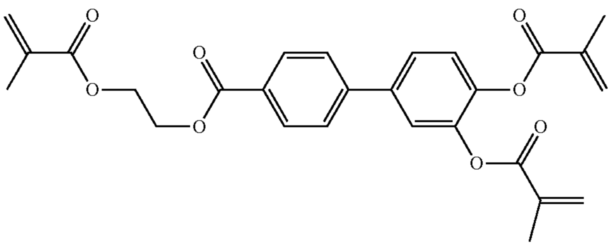 [SMILES: C=C(C)C(=O)OCCOC(=O)c1ccc(-c2ccc(OC(=O)C(=C)C)c(OC(=O)C(=C)C)c2)cc1]
RM-135
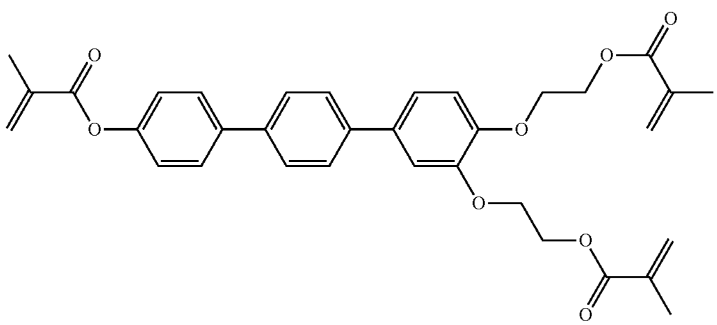 [SMILES: C=C(C)C(=O)OCCOc1ccc(-c2ccc(-c3ccc(OC(=O)C(=C)C)cc3)cc2)cc1OCCOC(=O)C(=C)C]
RM-136
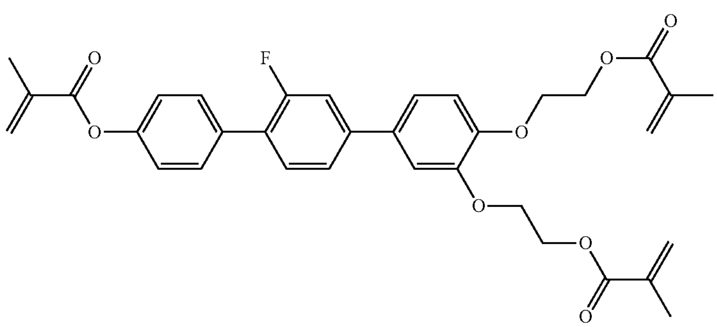 [SMILES: C=C(C)C(=O)OCCOc1ccc(-c2ccc(-c3ccc(OC(=O)C(=C)C)cc3)c(F)c2)cc1OCCOC(=O)C(=C)C]
RM-137
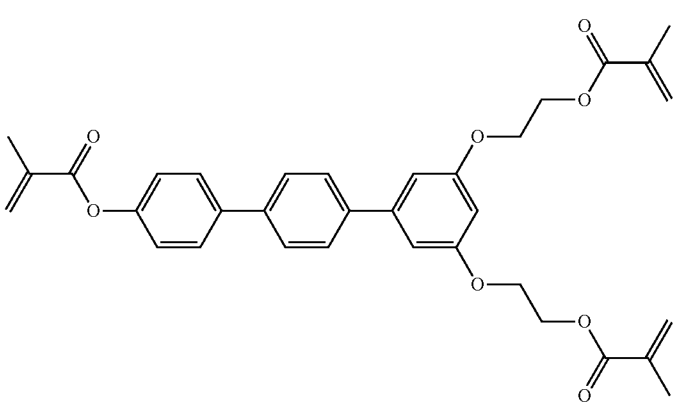 [SMILES: C=C(C)C(=O)OCCOc1cc(OCCOC(=O)C(=C)C)cc(-c2ccc(-c3ccc(OC(=O)C(=C)C)cc3)cc2)c1]

TABLE E-continued
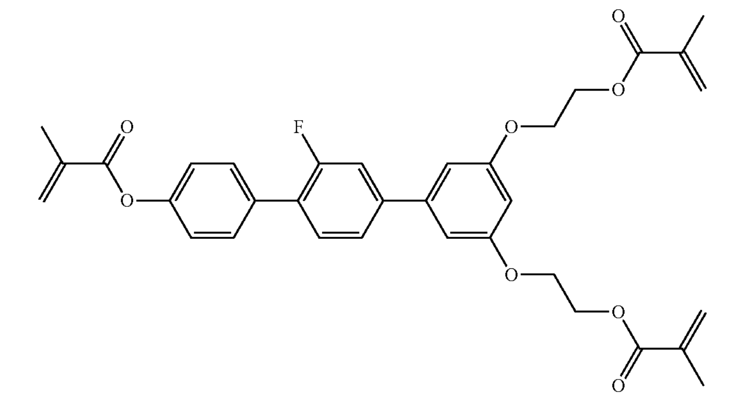 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-138
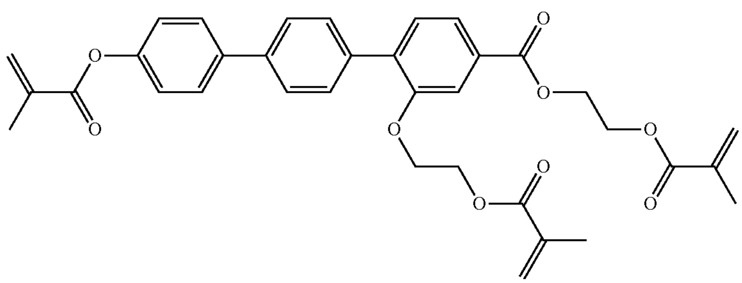 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-139
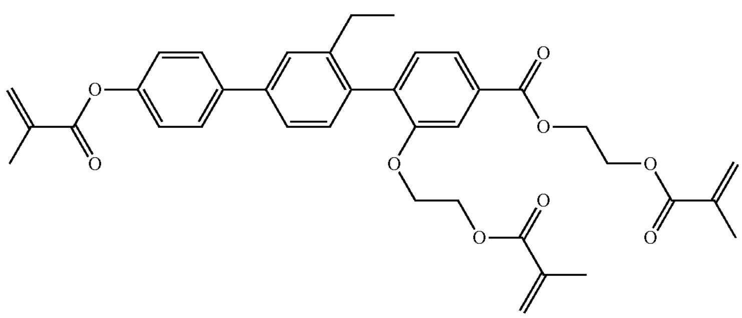 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140
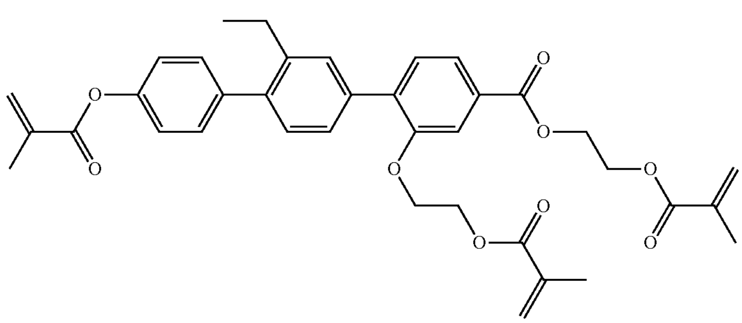 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-141
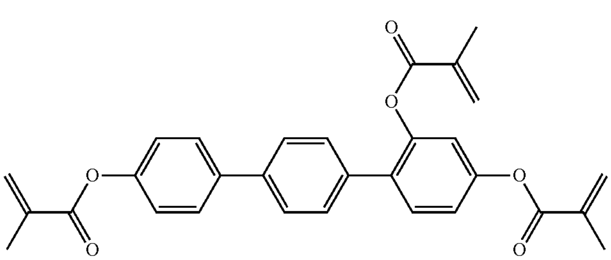 [SMILES: C=C(C)C(=O)Oc1ccc(-c2ccc(-c3ccc(OC(=O)C(=C)C)cc3OC(=O)C(=C)C)cc2)cc1]
RM-142

TABLE E-continued
RM-143
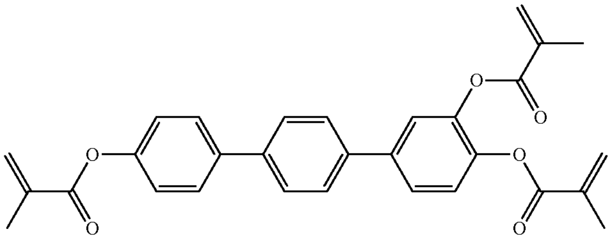 [SMILES: C=C(C)C(=O)Oc1ccc(-c2ccc(-c3ccc(OC(=O)C(=C)C)c(OC(=O)C(=C)C)c3)cc2)cc1]
RM-144
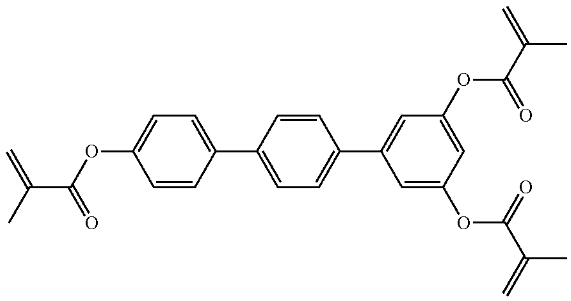 [SMILES: C=C(C)C(=O)Oc1ccc(-c2ccc(-c3cc(OC(=O)C(=C)C)cc(OC(=O)C(=C)C)c3)cc2)cc1]
RM-145
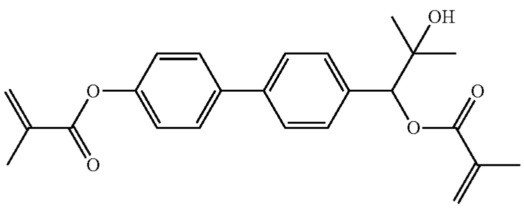 [SMILES: C=C(C)C(=O)Oc1ccc(-c2ccc(C(OC(=O)C(=C)C)C(C)(C)O)cc2)cc1]
RM-146
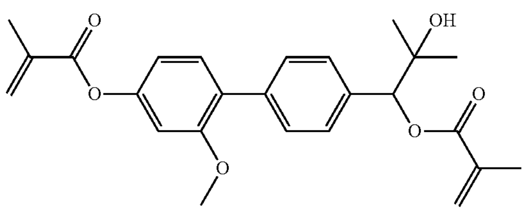 [SMILES: C=C(C)C(=O)Oc1ccc(-c2ccc(C(OC(=O)C(=C)C)C(C)(C)O)cc2)c(OC)c1]
RM-147
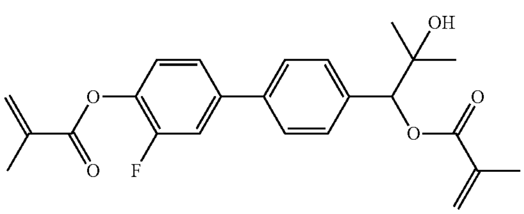 [SMILES: C=C(C)C(=O)Oc1ccc(-c2ccc(C(OC(=O)C(=C)C)C(C)(C)O)cc2)cc1F]
RM-148
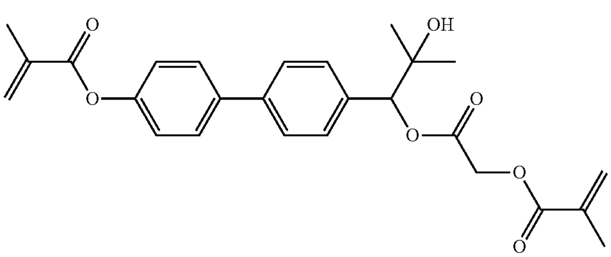 [SMILES: C=C(C)C(=O)OCC(=O)OC(c1ccc(-c2ccc(OC(=O)C(=C)C)cc2)cc1)C(C)(C)O]
RM-149
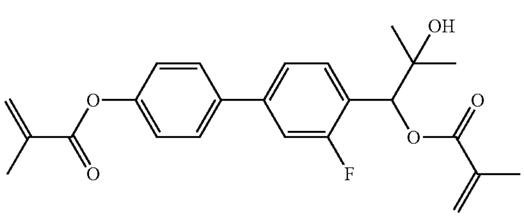 [SMILES: C=C(C)C(=O)Oc1ccc(-c2ccc(C(OC(=O)C(=C)C)C(C)(C)O)c(F)c2)cc1]

TABLE E-continued
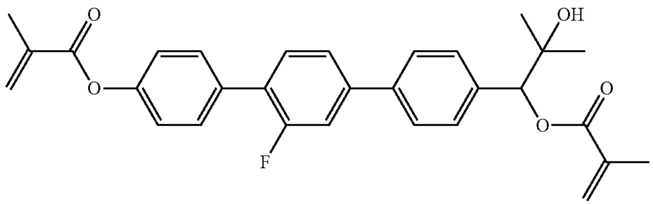 [SMILES: C=C(C)C(=O)Oc1ccc(-c2ccc(-c3ccc(C(OC(=O)C(=C)C)C(C)(C)O)cc3)cc2F)cc1]
RM-150
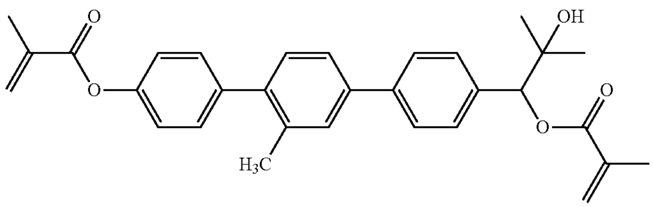 [SMILES: C=C(C)C(=O)Oc1ccc(-c2ccc(-c3ccc(C(OC(=O)C(=C)C)C(C)(C)O)cc3)cc2C)cc1]
RM-151
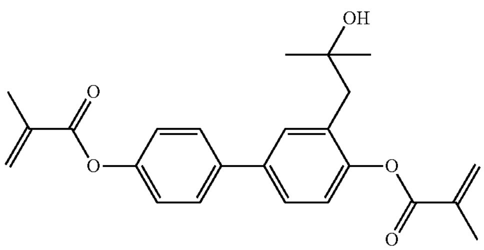 [SMILES: C=C(C)C(=O)Oc1ccc(-c2ccc(OC(=O)C(=C)C)c(CC(C)(C)O)c2)cc1]
RM-152
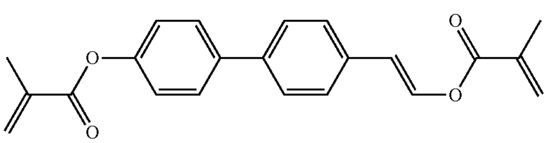 [SMILES: C=C(C)C(=O)O/C=C/c1ccc(-c2ccc(OC(=O)C(=C)C)cc2)cc1]
RM-153
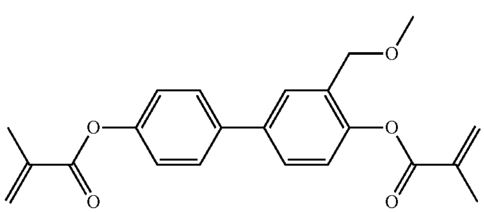 [SMILES: C=C(C)C(=O)Oc1ccc(-c2ccc(OC(=O)C(=C)C)c(COC)c2)cc1]
RM-154
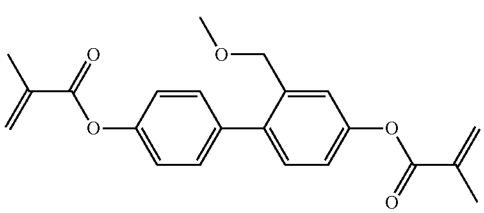 [SMILES: C=C(C)C(=O)Oc1ccc(-c2ccc(OC(=O)C(=C)C)cc2COC)cc1]
RM-155
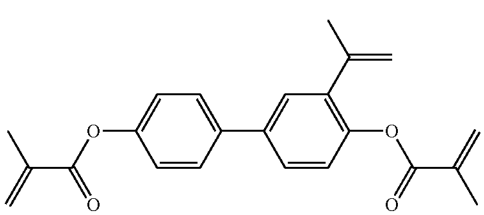 [SMILES: C=C(C)C(=O)Oc1ccc(-c2ccc(OC(=O)C(=C)C)c(C(=C)C)c2)cc1]
RM-156

TABLE E-continued
RM-157
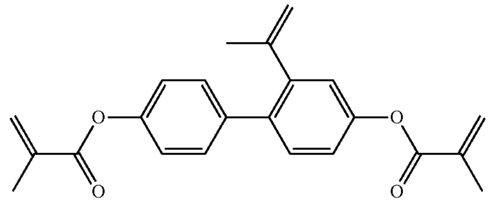 [SMILES: C=C(C)C(=O)Oc1ccc(-c2ccc(OC(=O)C(=C)C)cc2C(=C)C)cc1]
RM-158
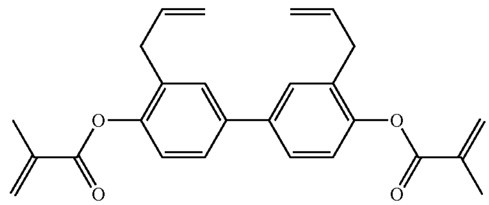 [SMILES: C=CCc1cc(-c2ccc(OC(=O)C(=C)C)c(CC=C)c2)ccc1OC(=O)C(=C)C]
RM-159
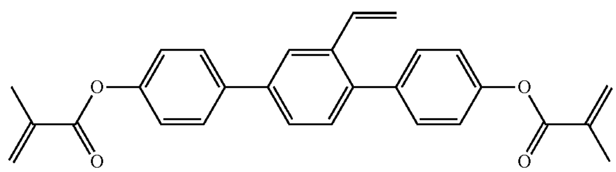 [SMILES: C=Cc1cc(-c2ccc(OC(=O)C(=C)C)cc2)ccc1-c1ccc(OC(=O)C(=C)C)cc1]
RM-160
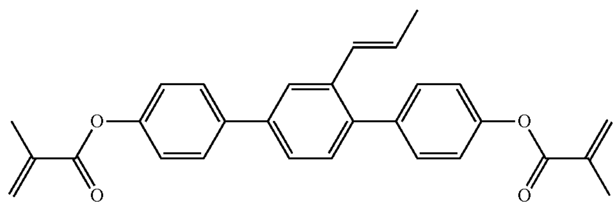 [SMILES: C=C(C)C(=O)Oc1ccc(-c2ccc(-c3ccc(OC(=O)C(=C)C)cc3)c(/C=C/C)c2)cc1]
RM-161
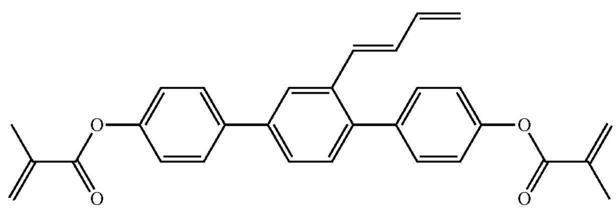 [SMILES: C=C/C=C/c1cc(-c2ccc(OC(=O)C(=C)C)cc2)ccc1-c1ccc(OC(=O)C(=C)C)cc1]
RM-162
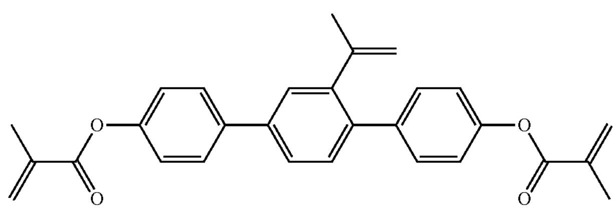 [SMILES: C=C(C)C(=O)Oc1ccc(-c2ccc(-c3ccc(OC(=O)C(=C)C)cc3)c(C(=C)C)c2)cc1]
RM-163
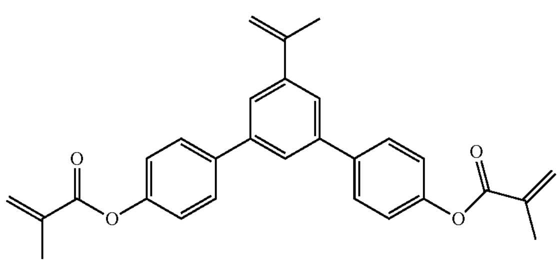 [SMILES: C=C(C)C(=O)Oc1ccc(-c2cc(C(=C)C)cc(-c3ccc(OC(=O)C(=C)C)cc3)c2)cc1]
RM-164
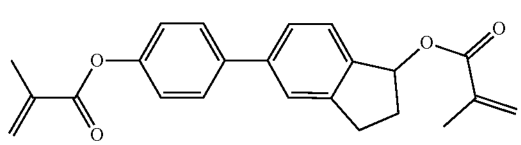 [SMILES: C=C(C)C(=O)Oc1ccc(-c2ccc3c(c2)CCC3OC(=O)C(=C)C)cc1]

TABLE E-continued
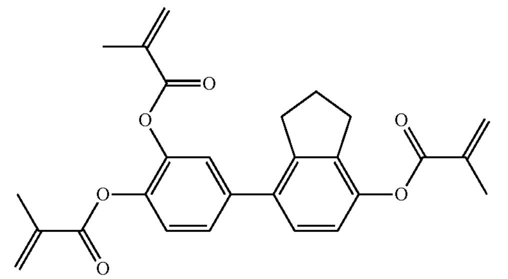 [SMILES: C=C(C)C(=O)Oc1ccc(-c2ccc(OC(=O)C(=C)C)c3c2CCC3)cc1OC(=O)C(=C)C]
RM-165
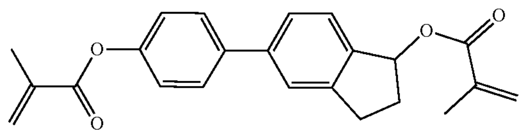 [SMILES: C=C(C)C(=O)Oc1ccc(-c2ccc3c(c2)CCC3OC(=O)C(=C)C)cc1]
RM-166
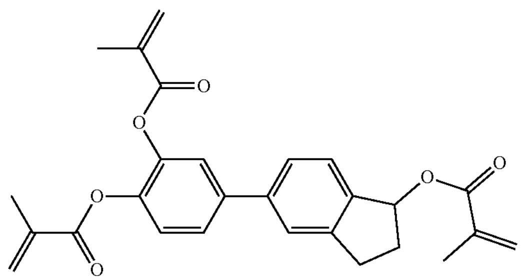 [SMILES: C=C(C)C(=O)Oc1ccc(-c2ccc3c(c2)CCC3OC(=O)C(=C)C)cc1OC(=O)C(=C)C]
RM-167
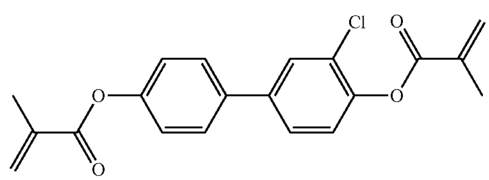
RM-168
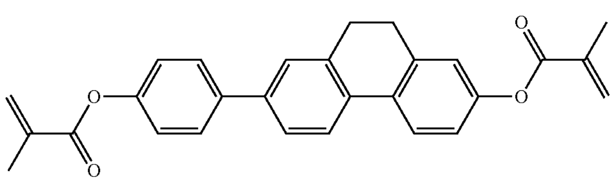 [SMILES: C=C(C)C(=O)Oc1ccc(-c2ccc3c(c2)CCc2cc(OC(=O)C(=C)C)ccc2-3)cc1]
RM-169
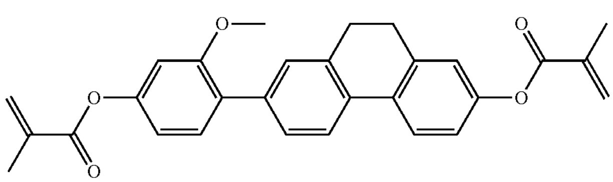
RM-170
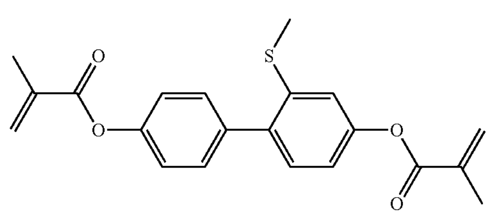 [SMILES: C=C(C)C(=O)Oc1ccc(-c2ccc(OC(=O)C(=C)C)cc2SC)cc1]
RM-171

TABLE E-continued
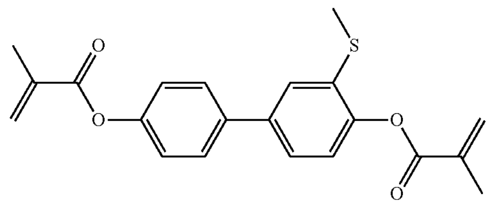
RM-172
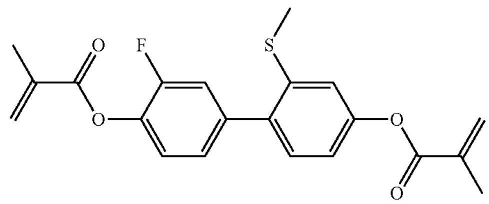 [SMILES: C=C(C)C(=O)Oc1ccc(-c2ccc(OC(=O)C(=C)C)c(F)c2)c(SC)c1]
RM-173
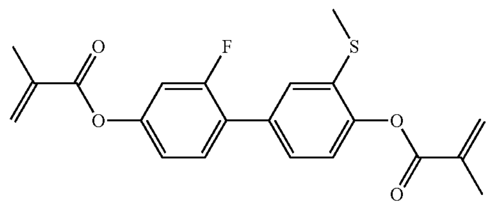 [SMILES: C=C(C)C(=O)Oc1ccc(-c2ccc(OC(=O)C(=C)C)c(SC)c2)c(F)c1]
RM-174
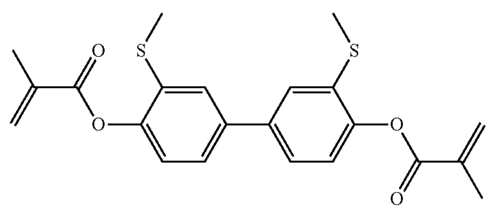 [SMILES: C=C(C)C(=O)Oc1ccc(-c2ccc(OC(=O)C(=C)C)c(SC)c2)cc1SC]
RM-175
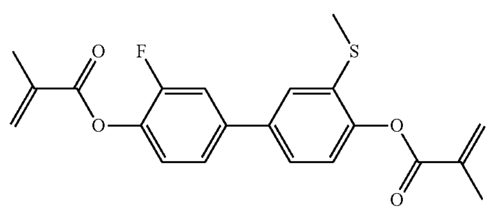 [SMILES: C=C(C)C(=O)Oc1ccc(-c2ccc(OC(=O)C(=C)C)c(SC)c2)cc1F]
RM-176
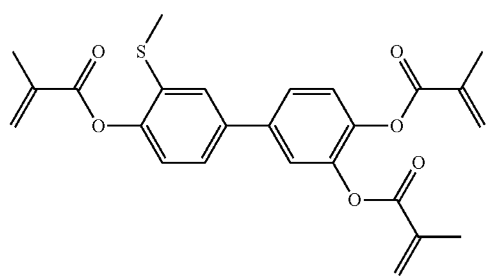 [SMILES: C=C(C)C(=O)Oc1ccc(-c2ccc(OC(=O)C(=C)C)c(SC)c2)cc1OC(=O)C(=C)C]
RM-177
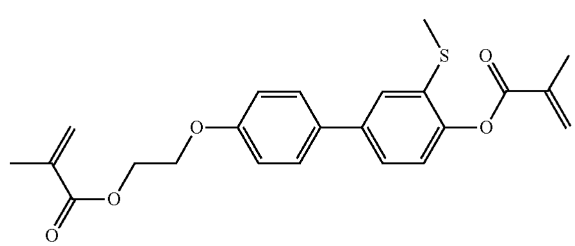 [SMILES: C=C(C)C(=O)OCCOc1ccc(-c2ccc(OC(=O)C(=C)C)c(SC)c2)cc1]
RM-178

TABLE E-continued

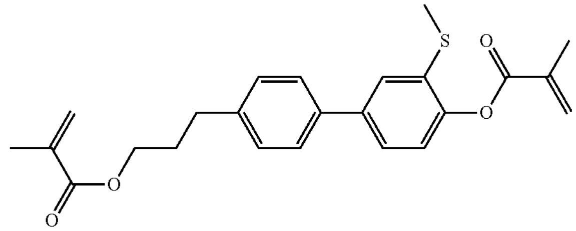

RM-179

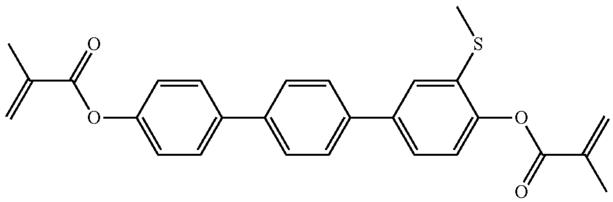 [SMILES: C=C(C)C(=O)Oc1ccc(-c2ccc(-c3ccc(OC(=O)C(=C)C)c(SC)c3)cc2)cc1]

RM-180

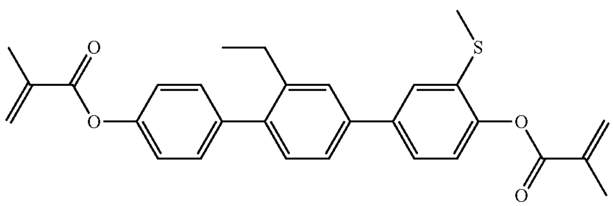 [SMILES: C=C(C)C(=O)Oc1ccc(-c2ccc(-c3ccc(OC(=O)C(=C)C)c(SC)c3)cc2CC)cc1]

RM-181

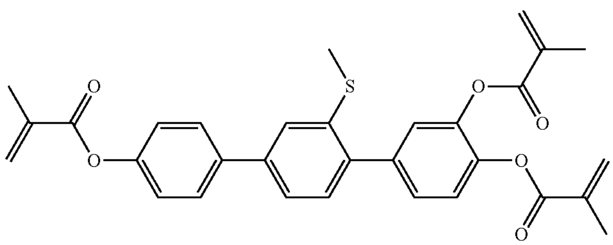 [SMILES: C=C(C)C(=O)Oc1ccc(-c2ccc(-c3ccc(OC(=O)C(=C)C)c(OC(=O)C(=C)C)c3)c(SC)c2)cc1]

RM-182

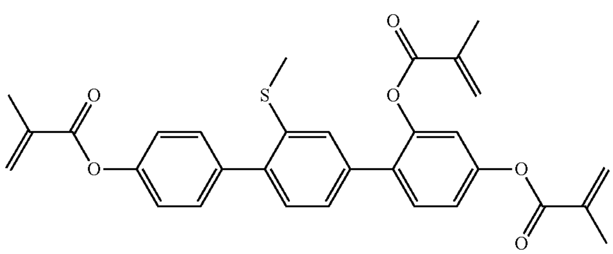 [SMILES: C=C(C)C(=O)Oc1ccc(-c2ccc(-c3ccc(OC(=O)C(=C)C)cc3OC(=O)C(=C)C)cc2SC)cc1]

RM-183

Table E shows illustrative reactive mesogenic compounds which can be used in the LC media in accordance with the present invention.

In a preferred embodiment, the mixtures according to the invention comprise one or more polymerizable compounds, preferably selected from the polymerizable compounds of the formulae RM-1 to RM-182. Of these, compounds RM-1, RM-4, RM-8, RM-17, RM-19, RM-35, RM-37, RM-39, RM-40RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-163, RM-169, RM-170 and RM-171 to RM-183 are particularly preferred.

TABLE F

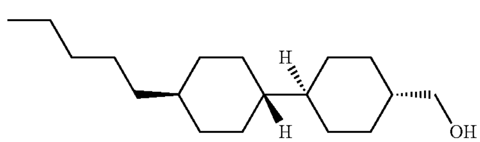 [SMILES: CCCCC[C@H]1CC[C@H]([C@H]2CC[C@H](CO)CC2)CC1]

SA-1

TABLE F-continued
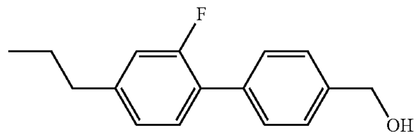 [SMILES: CCCc1ccc(-c2ccc(CO)cc2)c(F)c1]
SA-2
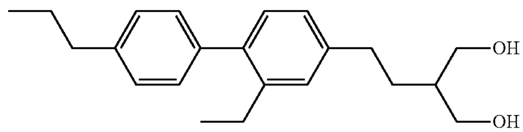 [SMILES: CCCc1ccc(-c2ccc(CCC(CO)CO)cc2CC)cc1]
SA-3
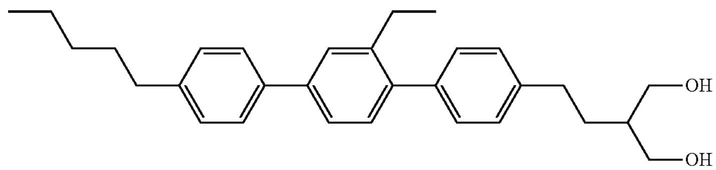 [SMILES: CCCCCc1ccc(-c2ccc(-c3ccc(CCC(CO)CO)cc3)c(CC)c2)cc1]
SA-4
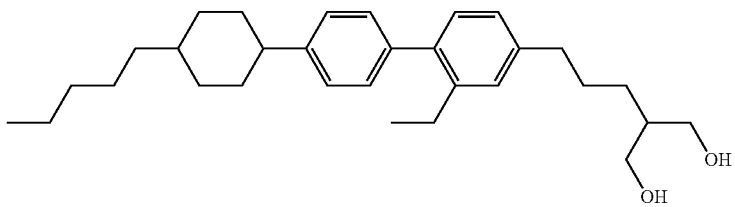 [SMILES: CCCCCC1CCC(c2ccc(-c3ccc(CCCC(CO)CO)cc3CC)cc2)CC1]
SA-5
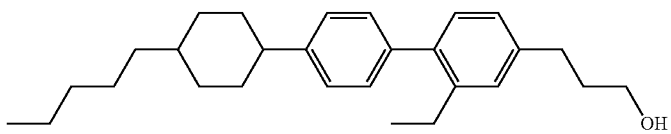 [SMILES: CCCCCC1CCC(c2ccc(-c3ccc(CCCO)cc3CC)cc2)CC1]
SA-6
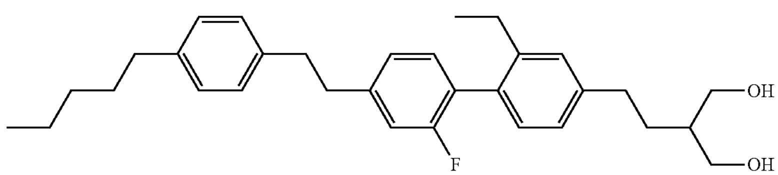 [SMILES: CCCCCc1ccc(CCc2ccc(-c3ccc(CCC(CO)CO)cc3CC)c(F)c2)cc1]
SA-7
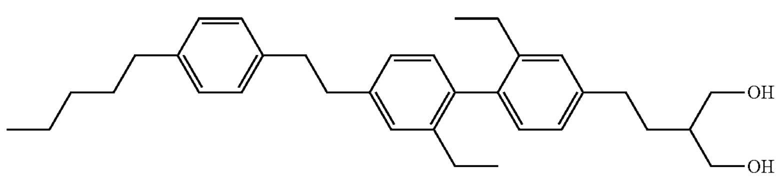
SA-8
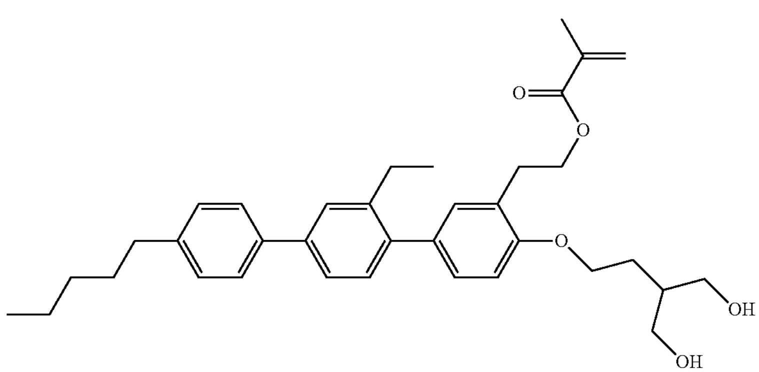 [SMILES: C=C(C)C(=O)OCCc1cc(-c2ccc(-c3ccc(CCCCC)cc3)cc2CC)ccc1OCCC(CO)CO]
SA-9

TABLE F-continued
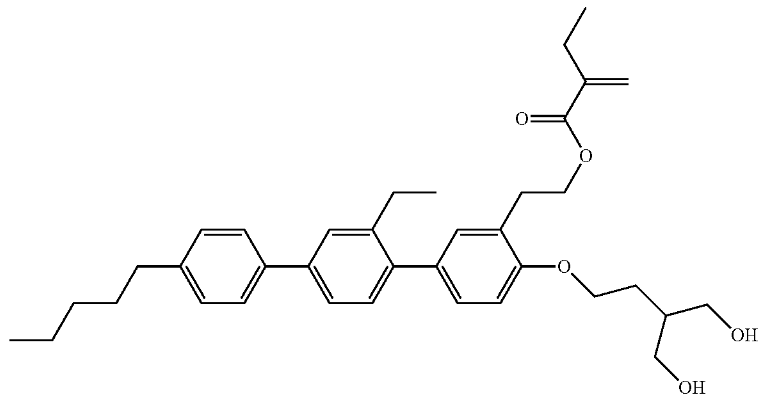 [SMILES: C=C(CC)C(=O)OCCc1cc(-c2ccc(-c3ccc(CCCCC)cc3)cc2CC)ccc1OCCC(CO)CO]
SA-10
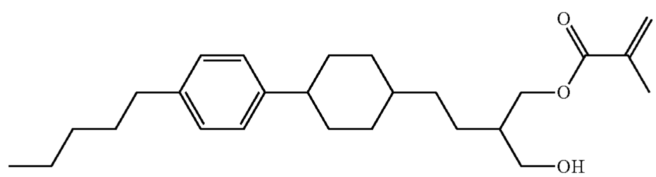 [SMILES: C=C(C)C(=O)OCC(CO)CCC1CCC(c2ccc(CCCCC)cc2)CC1]
SA-11
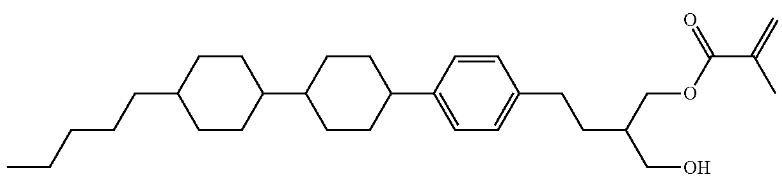 [SMILES: C=C(C)C(=O)OCC(CO)CCc1ccc(C2CCC(C3CCC(CCCCC)CC3)CC2)cc1]
SA-12
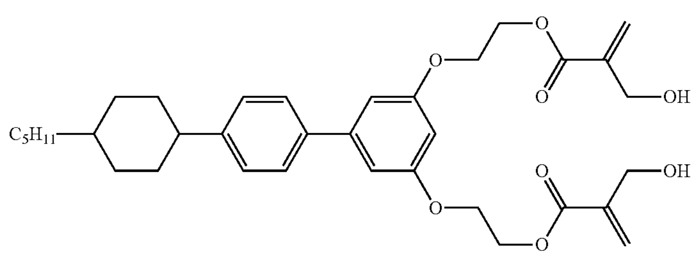
SA-13
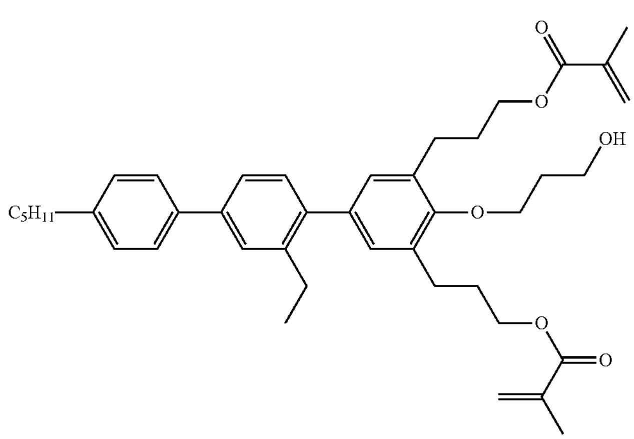
SA-14

TABLE F-continued
SA-15
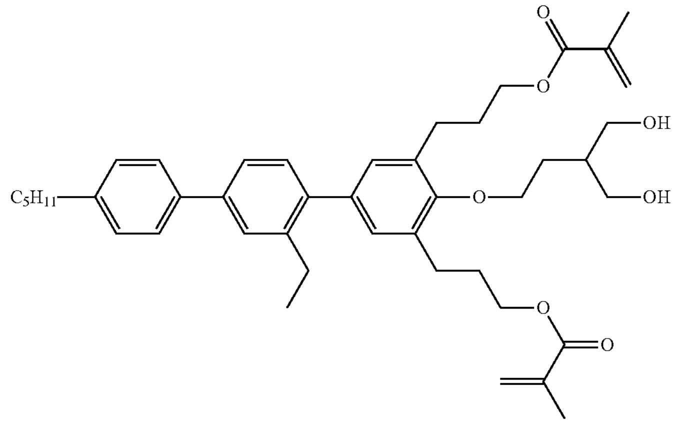
SA-16
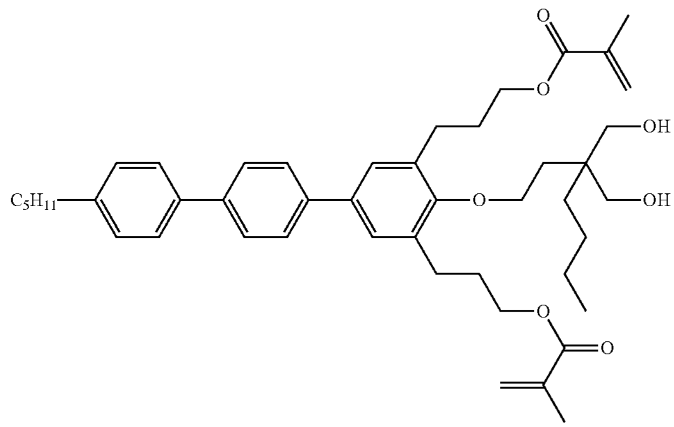
SA-17
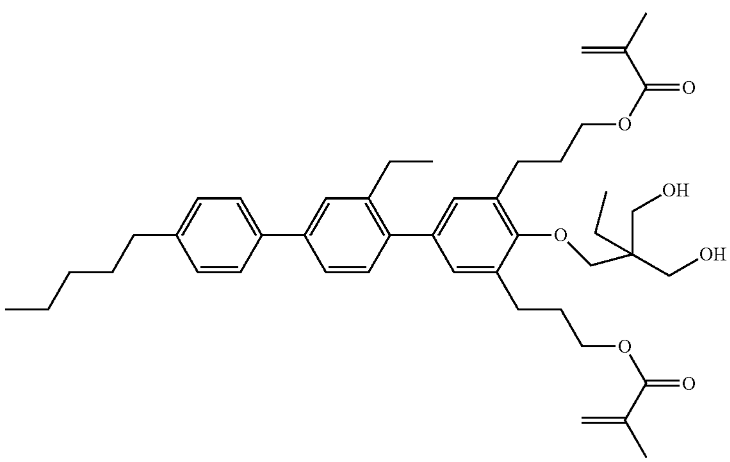 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-18
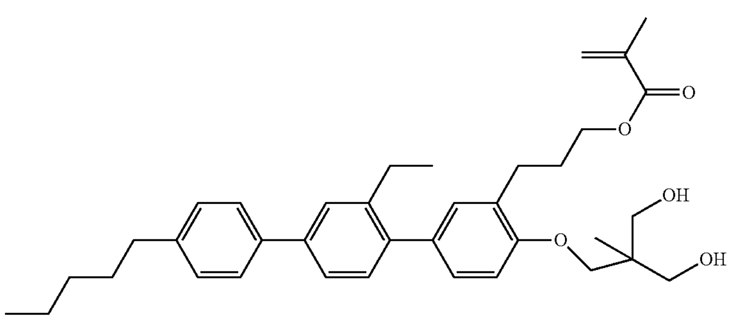 [SMILES: C=C(C)C(=O)OCCCc1cc(-c2ccc(-c3ccc(CCCCC)cc3)cc2CC)ccc1OCC(C)(CO)CO]

TABLE F-continued
SA-19
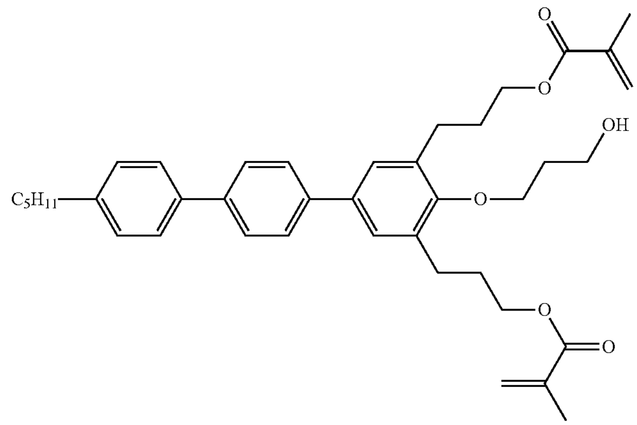
SA-20
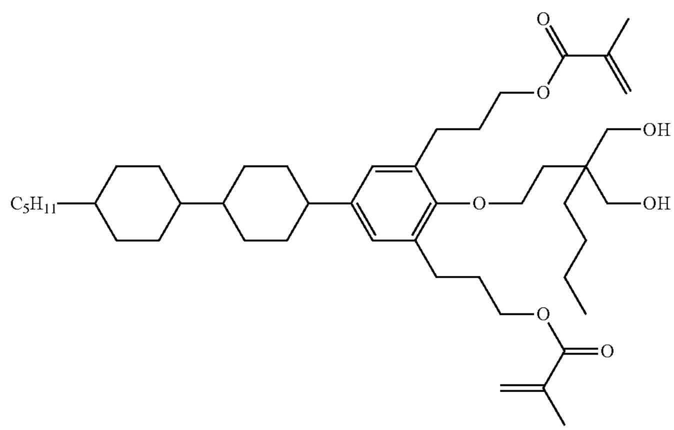
SA-21
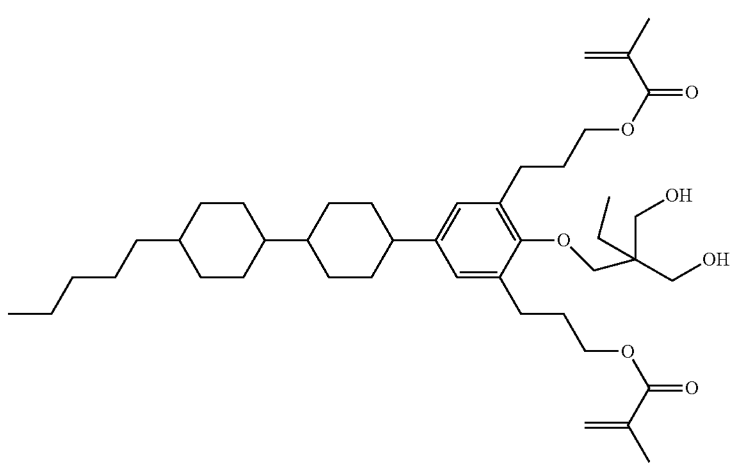 [SMILES: C=C(C)C(=O)OCCCc1cc(C2CCC(C3CCC(CCCCC)CC3)CC2)cc(CCCOC(=O)C(=C)C)c1OCC(CC)(CO)CO]

TABLE F-continued
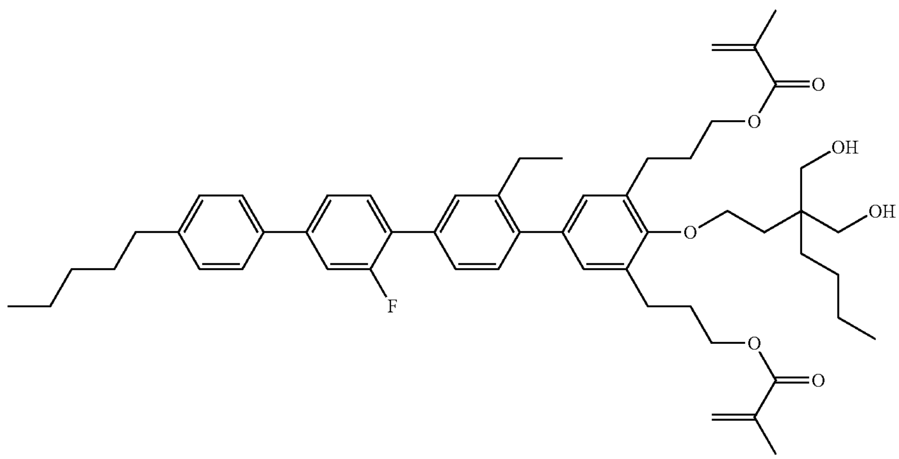 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-22
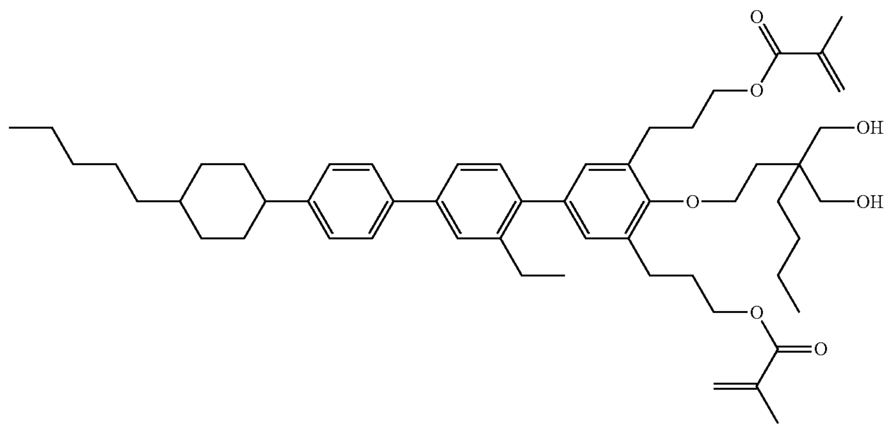 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]
SA-23
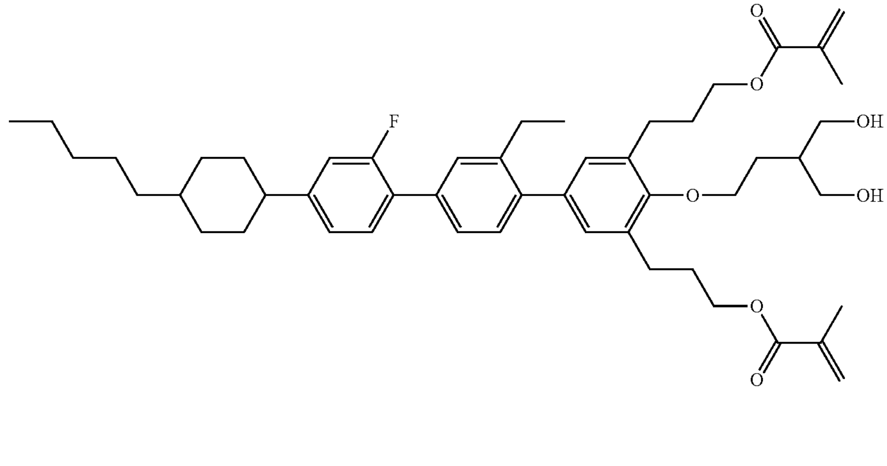 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-24

TABLE F-continued
SA-25
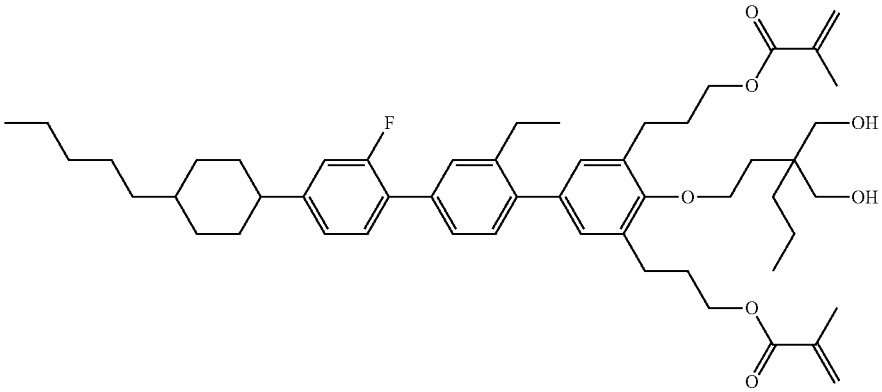 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-26
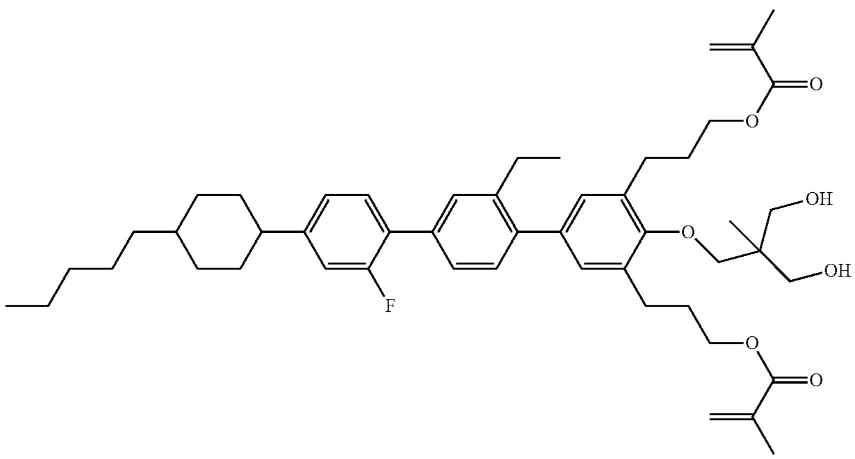 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]
SA-27
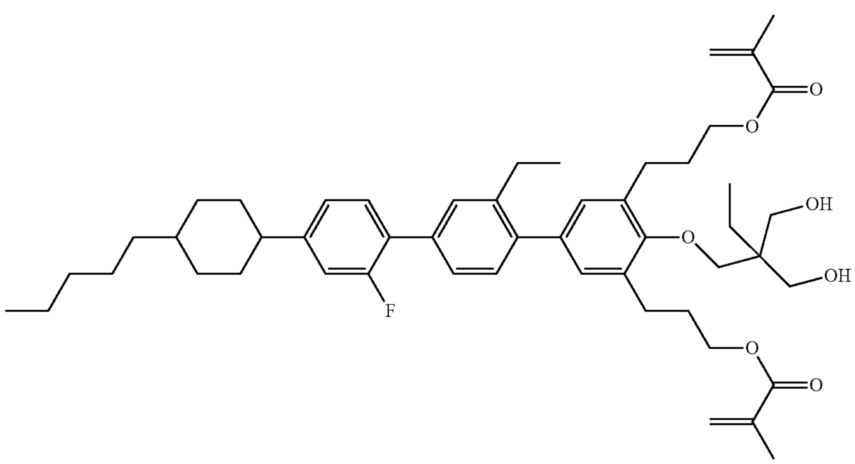 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]

TABLE F-continued
SA-28
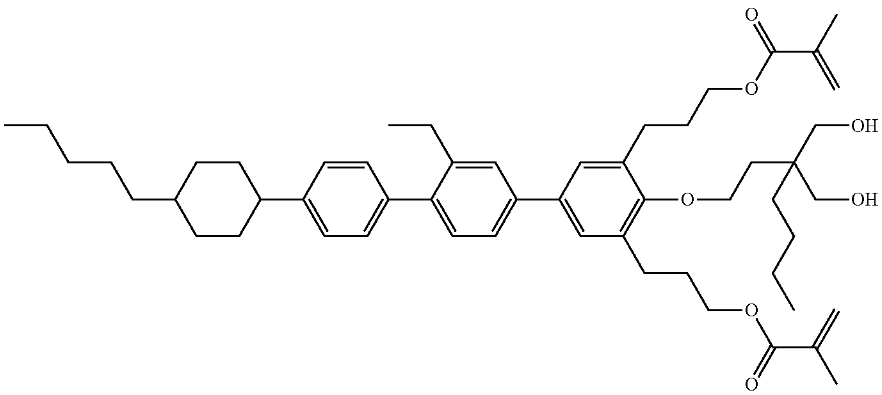 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-29
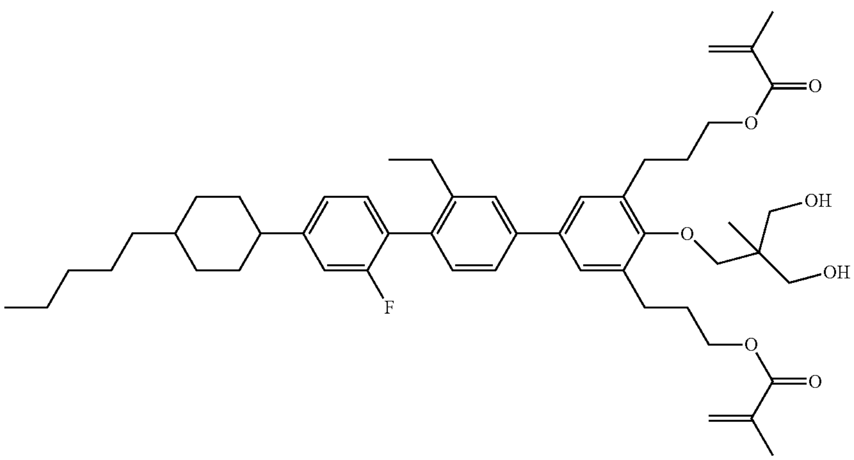 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]
SA-30
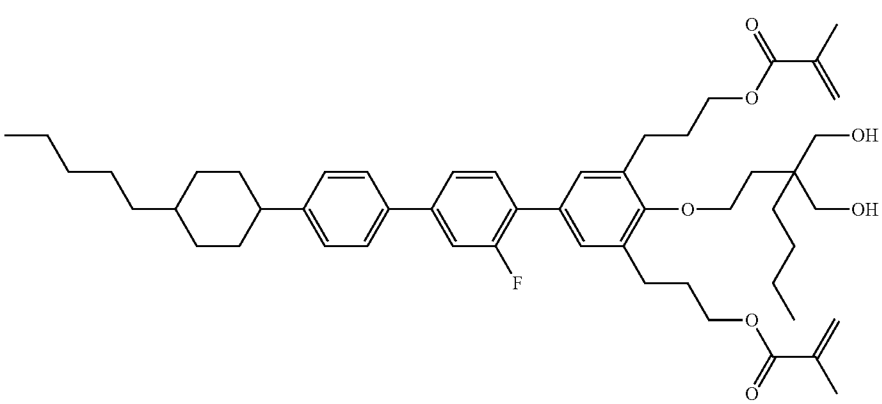 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]

TABLE F-continued
SA-31
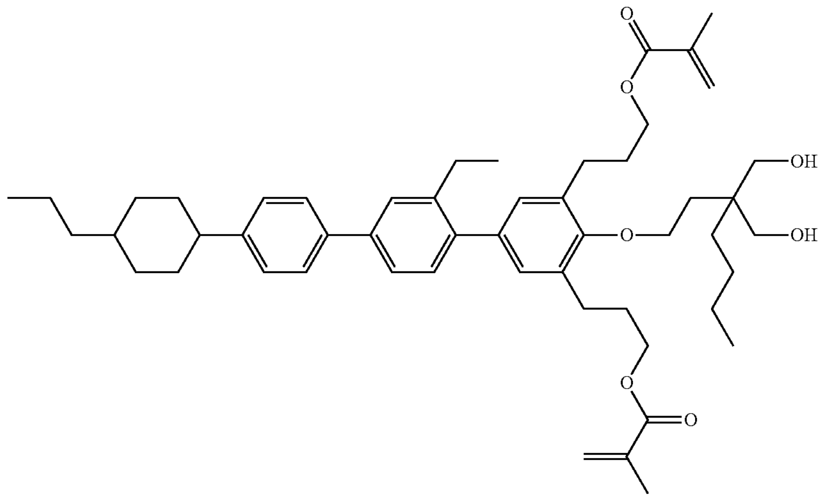 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-32
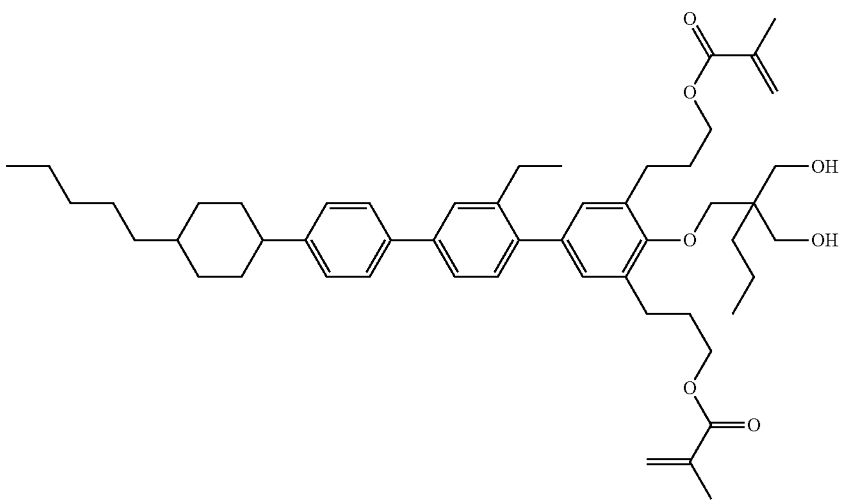 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCC(CO)(CO)CCC]
SA-33
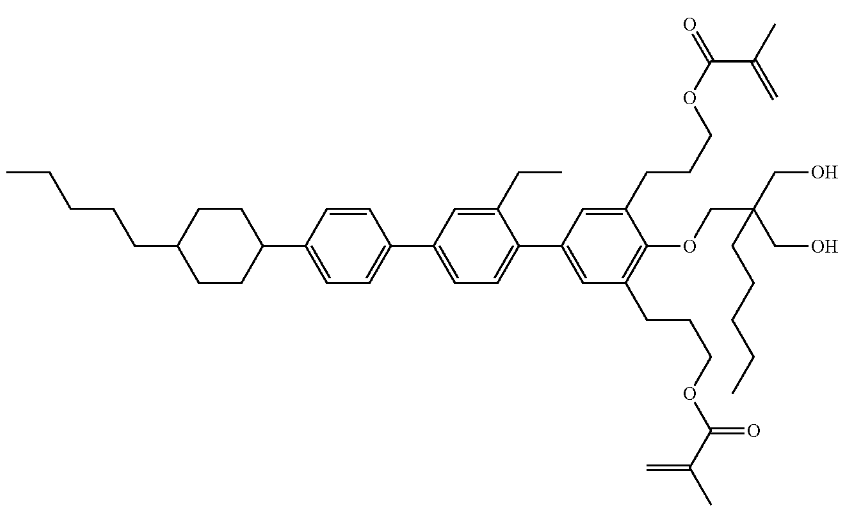 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCC(CO)(CO)CCCCC]

TABLE F-continued
SA-34
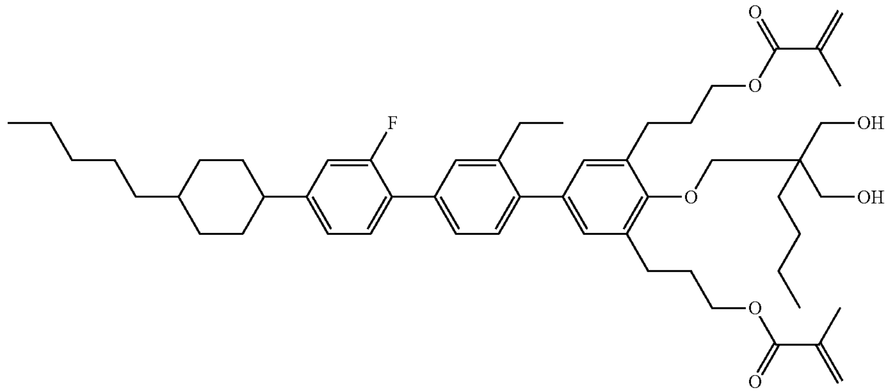 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CO)(CO)CCCC]
SA-35
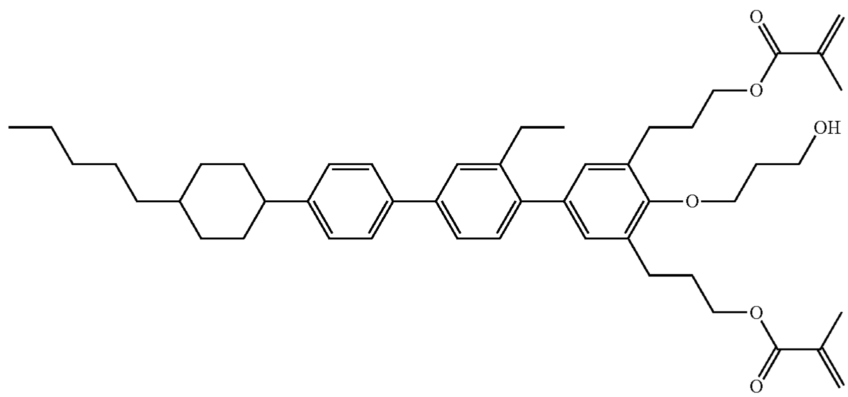 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-36
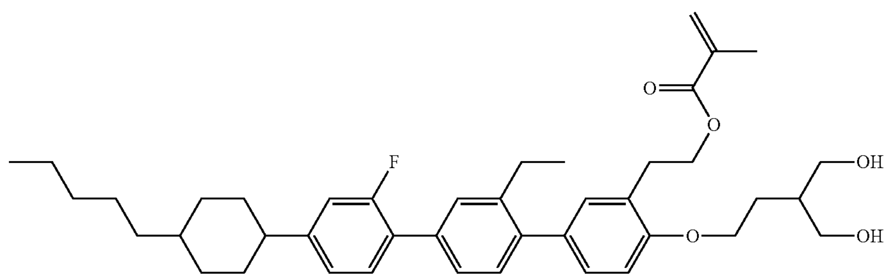 [SMILES: C=C(C)C(=O)OCCc1cc(-c2ccc(-c3ccc(C4CCC(CCCCC)CC4)cc3F)cc2CC)ccc1OCCC(CO)CO]
SA-37
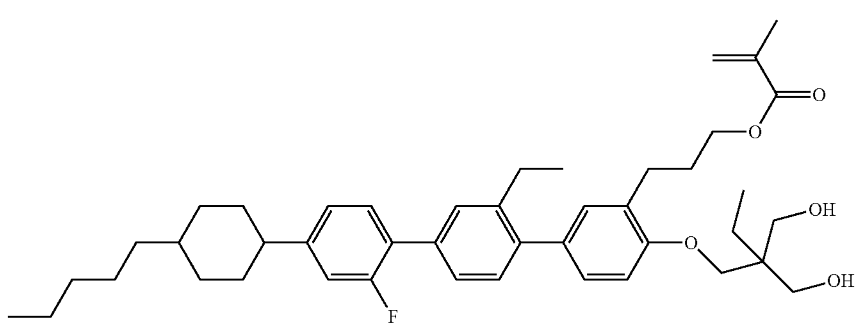 [SMILES: C=C(C)C(=O)OCCCc1cc(-c2ccc(-c3ccc(C4CCC(CCCCC)CC4)cc3F)cc2CC)ccc1OCC(CC)(CO)CO]

TABLE F-continued
SA-38
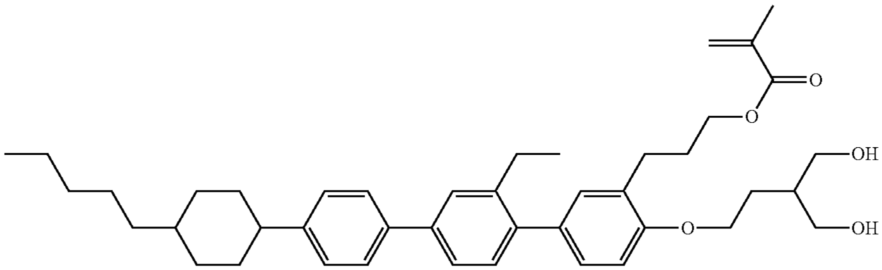 [SMILES: C=C(C)C(=O)OCCCc1cc(-c2ccc(-c3ccc(C4CCC(CCCCC)CC4)cc3)cc2CC)ccc1OCCC(CO)CO]
SA-39
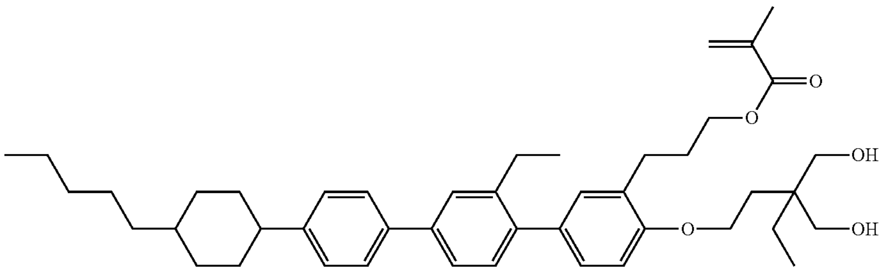 [SMILES: C=C(C)C(=O)OCCCc1cc(-c2ccc(-c3ccc(C4CCC(CCCCC)CC4)cc3)cc2CC)ccc1OCCC(CC)(CO)CO]
SA-40
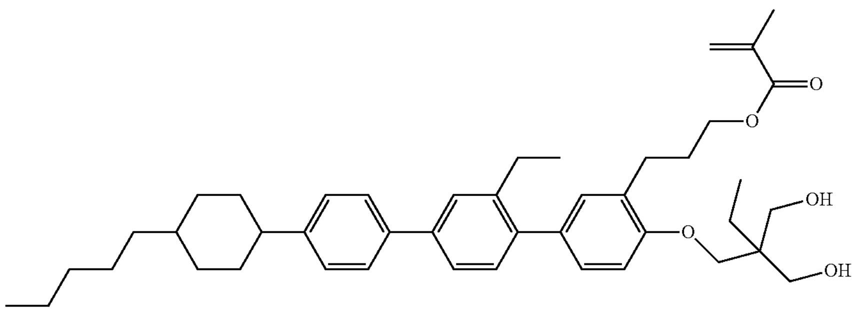 [SMILES: C=C(C)C(=O)OCCCc1cc(-c2ccc(-c3ccc(C4CCC(CCCCC)CC4)cc3)cc2CC)ccc1OCC(CC)(CO)CO]
SA-41
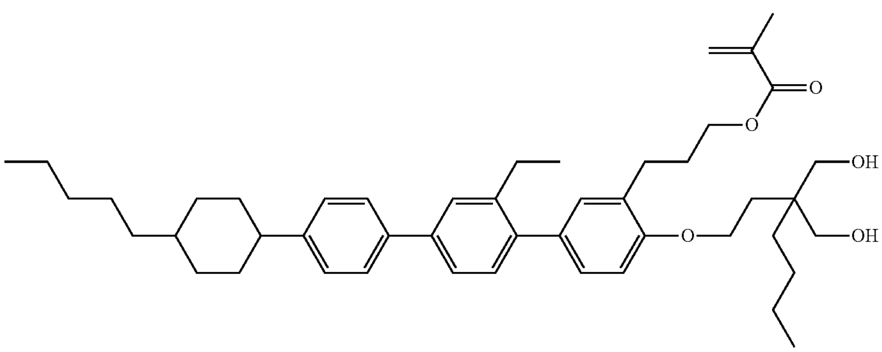 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-42
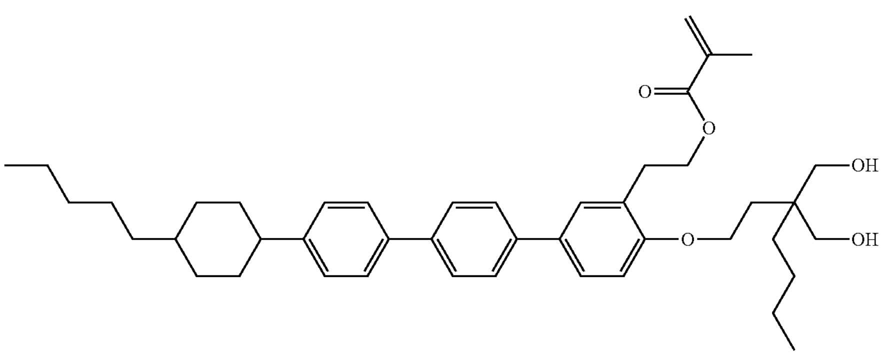 [SMILES: C=C(C)C(=O)OCCc1cc(-c2ccc(-c3ccc(C4CCC(CCCCC)CC4)cc3)cc2)ccc1OCCC(CO)(CO)CCCC]

TABLE F-continued
SA-43
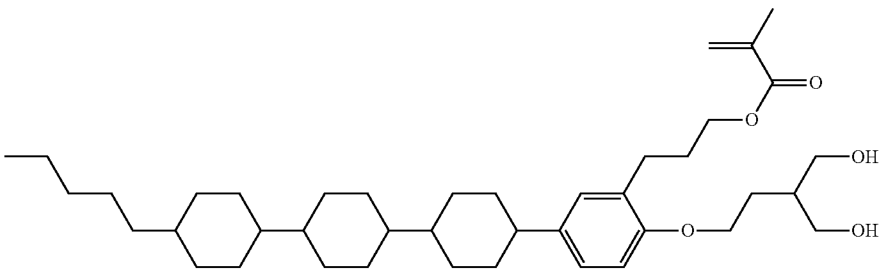 [SMILES: C=C(C)C(=O)OCCCc1cc(C2CCC(C3CCC(C4CCC(CCCCC)CC4)CC3)CC2)ccc1OCCC(CO)CO]
SA-44
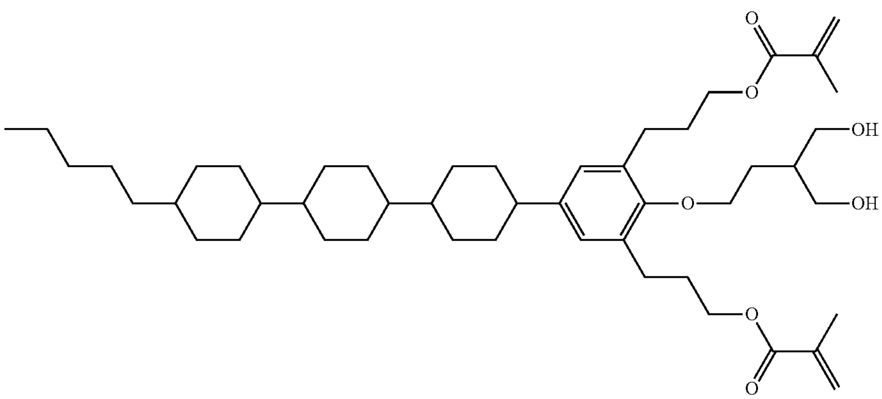 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO]
SA-45
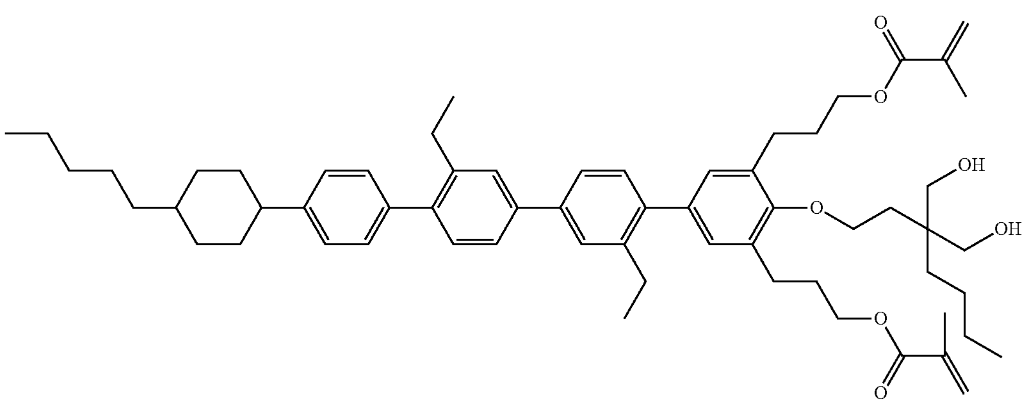 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]
SA-46
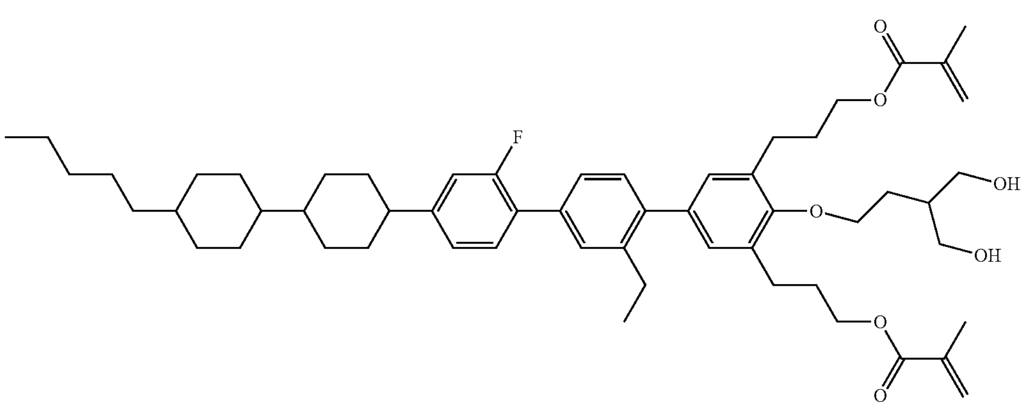 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO]

TABLE F-continued

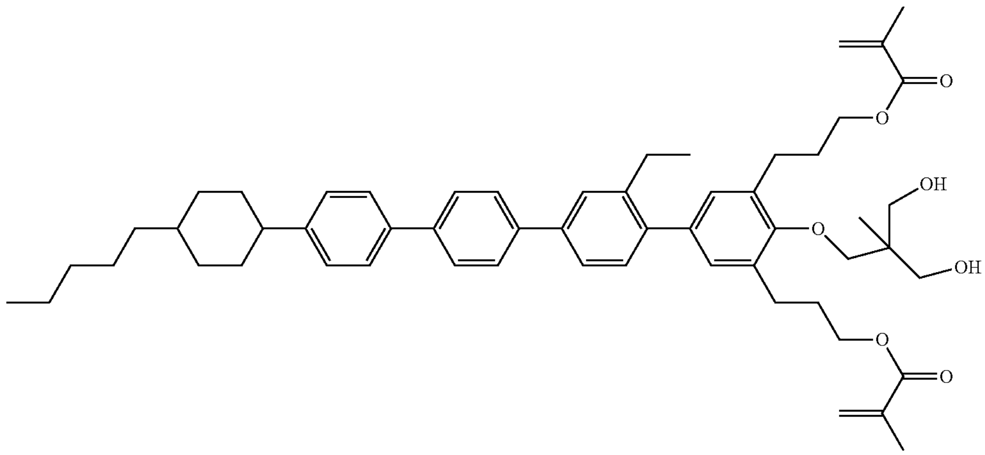 [SMILES: C=C(C)C(=O)OCCCc1cc(-c2ccc(-c3ccc(-c4ccc(C5CCC(CCCCC)CC5)cc4)cc3)cc2CC)cc(CCCOC(=O)C(=C)C)c1OCC(C)(CO)CO]

SA-47

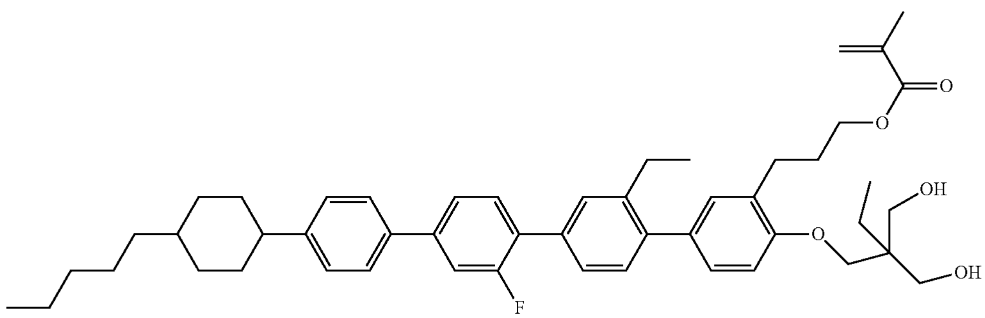 [SMILES: C=C(C)C(=O)OCCCc1cc(-c2ccc(-c3ccc(-c4ccc(C5CCC(CCCCC)CC5)cc4)cc3F)cc2CC)ccc1OCC(CC)(CO)CO]

SA-48

Table F shows self-alignment additives for vertical alignment which can be used in LC media for SA-VA and SA-FFS displays according to the present invention together with the polymerizable compounds:

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C., $n_e$ extraordinary refractive index at 20° C. and 589 nm, $n_o$ ordinary refractive index at 20° C. and 589 nm, $\Delta n$ optical anisotropy at 20° C. and 589 nm, $\varepsilon_\perp$ dielectric permittivity perpendicular to the director at 20° C. and 1 kHz, $\varepsilon_\parallel$ dielectric permittivity parallel to the director at 20° C. and 1 kHz, $\Delta\varepsilon$ dielectric anisotropy at 20° C. and 1 kHz, cl.p., T(N,I) clearing point [° C.], $\gamma_1$ rotational viscosity at 20° C. [mPa·s], $K_1$ elastic constant, "splay" deformation at 20° C. [pN], $K_2$ elastic constant, "twist" deformation at 20° C. [pN], $K_3$ elastic constant, "bend" deformation at 20° C. [pN]

$K_{av}$ average elastic constant at 20° C. [pN] defined here as $K_{av} \equiv (3/2K_1+K_3)/3 \approx (K_1+K_2+K_3)/3$, LTS low-temperature stability of the phase, determined in test cells, VHR voltage holding ratio.

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

A PSVA display or PSVA test cell used for photopolymerization and measurement of the tilt angles etc. consists of two plane-parallel glass outer plates at a separation of 3-4 μm unless stated otherwise, each of which has on the inside an electrode layer and a polyimide alignment layer on top, where the two polyimide layers are rubbed antiparallel to one another and effect a homeotropic edge alignment of the liquid-crystal molecules. The SAVA display or test cell has the same structure but wherein one or both polyimide layers are omitted.

The polymerizable compounds are polymerized in the display or test cell by irradiation with UV light of defined intensity for a prespecified time, with a voltage simultaneously being applied to the display (usually 10 V to 30 V alternating current, 1 kHz).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Example 1

The nematic LC mixture N1 is formulated as follows.

| | | | |
|---|---|---|---|
| CC-3-V1 | 9.0 | Cl.p. [° C.]: | 75.5 |
| CC-4-V1 | 22.0 | Δn [589 nm, 20° C.]: | 0.1131 |
| CCH-301 | 6.0 | $\varepsilon_{\parallel}$ [1 kHz, 20° C.]: | 3.5 |
| CY-3-O2 | 15.0 | $\varepsilon_{\perp}$ [1 kHz, 20° C.]: | 7.0 |
| CY-3-O4 | 4.5 | Δε [1 kHz, 20° C.]: | −3.4 |
| PP-1-2V1 | 8.0 | $K_1$ [pN, 20° C.]: | 16.3 |
| B(S)-2O-O4 | 4.0 | $K_3$ [pN, 20° C.]: | 17.1 |
| B(S)-2O-O5 | 5.0 | $K_{avg}$ [pN, 20° C.]: | 13.9 |
| CCP-3-1 | 5.0 | $V_0$ [V, 20° C.]: | 2.35 |
| CLY-3-O2 | 4.5 | $\gamma_1$ [mPa s, 20° C.]: | 107 |
| CPY-3-O2 | 10.0 | LTS bulk [h, −10° C.]: | |
| PYP-2-3 | 3.0 | LTS bulk [h, −20° C.]: | |
| CLY-(c5)-O2 | 4.0 | LTS bulk [h, −30° C.]: | |
| Σ | 100.0 | | |

The mixture N1 contains a compound of formula IA1 and shows a reduced viscosity.

IA1

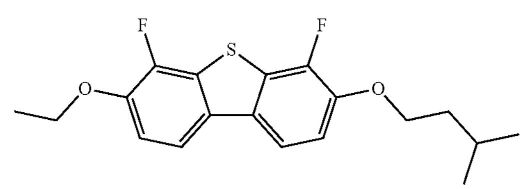

To the mixture N1 are added 100 ppm of the stabiliser H-1-1-1.

H-1-1-1

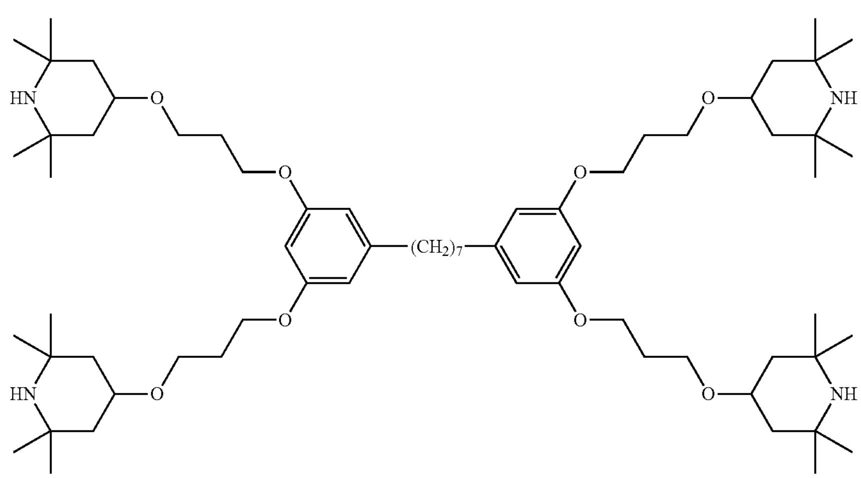

Example 2

The nematic LC mixture N2 is formulated as follows.

| | | | |
|---|---|---|---|
| CC-3-V1 | 9.0 | Cl.p. [° C.]: | 77 |
| CC-4-V1 | 22.0 | Δn [589 nm, 20° C.]: | 0.1168 |
| CCH-301 | 6.0 | $\varepsilon_{\parallel}$ [1 kHz, 20° C.]: | 3.5 |
| CY-3-O2 | 7.0 | $\varepsilon_{\perp}$ [1 kHz, 20° C.]: | 7.0 |
| CY-3-O4 | 4.5 | Δε [1 kHz, 20° C.]: | −3.5 |
| PP-1-2V1 | 8.0 | $K_1$ [pN, 20° C.]: | 17.7 |
| B(S)-2O-O4 | 4.0 | $K_3$ [pN, 20° C.]: | 17.7 |
| B(S)-2O-O5 | 5.0 | $K_{avg}$ [pN, 20° C.]: | 14.8 |
| CCP-3-1 | 5.0 | $V_0$ [V, 20° C.]: | 2.38 |
| CLY-3-O2 | 8.5 | $\gamma_1$ [mPa s, 20° C.]: | 116 |
| CPY-3-O2 | 10.0 | LTS bulk [h, −10° C.]: | |
| PYP-2-3 | 3.0 | LTS bulk [h, −20° C.]: | 408 |
| LY-(c5)-O2 | 8.0 | LTS bulk [h, −30° C.]: | 456 |
| Σ | 100.0 | | |

To the mixture N2 are added 150 ppm of the stabiliser ST-3a-1.

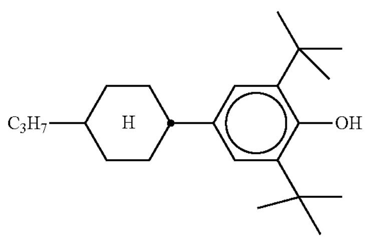

ST-3a-1

Example 3

The nematic LC mixture N3 is formulated as follows.

| | | | |
|---|---|---|---|
| CC-3-V1 | 9.0 | Cl.p. [° C.]: | 78 |
| CC-4-V1 | 22.0 | Δn [589 nm, 20° C.]: | 0.1169 |
| CCH-301 | 6.0 | $\varepsilon_{\parallel}$ [1 kHz, 20° C.]: | 3.5 |
| CY-3-O2 | 3.0 | $\varepsilon_{\perp}$ [1 kHz, 20° C.]: | 7.0 |
| CY-3-O4 | 4.5 | Δε [1 kHz, 20° C.]: | −3.5 |
| PP-1-2V1 | 8.0 | $K_1$ [pN, 20° C.]: | 18.8 |
| B(S)-2O-O4 | 4.0 | $K_3$ [pN, 20° C.]: | 18.0 |
| B(S)-2O-O5 | 5.0 | $K_{avg}$ [pN, 20° C.]: | 15.4 |
| CCP-3-1 | 5.0 | $V_0$ [V, 20° C.]: | 2.40 |
| CLY-3-O2 | 8.5 | $\gamma_1$ [mPa s, 20° C.]: | 121 |
| CPY-3-O2 | 10.0 | LTS bulk [h, −10° C.]: | |
| PYP-2-3 | 3.0 | LTS bulk [h, −20° C.]: | |
| LY-(c5)-O2 | 12.0 | LTS bulk [h, −30° C.]: | |
| Σ | 100.0 | | |

To the mixture N5 are added 150 ppm of the stabiliser ST-3b-1.

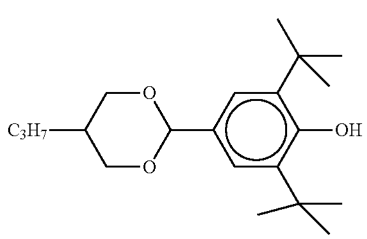

ST-3b-1

Example 4

The nematic LC mixture N4 is formulated as follows.

| | | | |
|---|---|---|---|
| CC-3-V1 | 9.0 | Cl.p. [° C.]: | 75.0 |
| CC-4-V1 | 22.0 | Δn [589 nm, 20° C.]: | 0.1125 |
| CCH-301 | 6.0 | $\varepsilon_{\parallel}$ [1 kHz, 20° C.]: | −3.5 |
| CY-3-O2 | 15.0 | $\varepsilon_{\perp}$ [1 kHz, 20° C.]: | 6.9 |
| CY-3-O4 | 4.5 | Δε [1 kHz, 20° C.]: | 3.4 |
| PP-1-2V1 | 8.0 | $K_1$ [pN, 20° C.]: | 16.2 |
| B(S)-(c5)1O-O2 | 4.0 | $K_3$ [pN, 20° C.]: | 17.0 |
| B(S)-2O-O5 | 5.0 | $K_{avg}$ [pN, 20° C.]: | 13.8 |
| CCP-3-1 | 5.0 | $V_0$ [V, 20° C.]: | |
| CLY-3-O2 | 4.5 | $\gamma_1$ [mPa s, 20° C.]: | 110 |
| CPY-3-O2 | 10.0 | LTS bulk [h, −10° C.]: | |
| PYP-2-3 | 3.0 | LTS bulk [h, −20° C.]: | |
| CLY-(c5)-O2 | 4.0 | LTS bulk [h, −30° C.]: | |
| Σ | 100.0 | | |

To the mixture N4 are added 50 ppm of the stabiliser H-2-1-1.

H-2-1-1

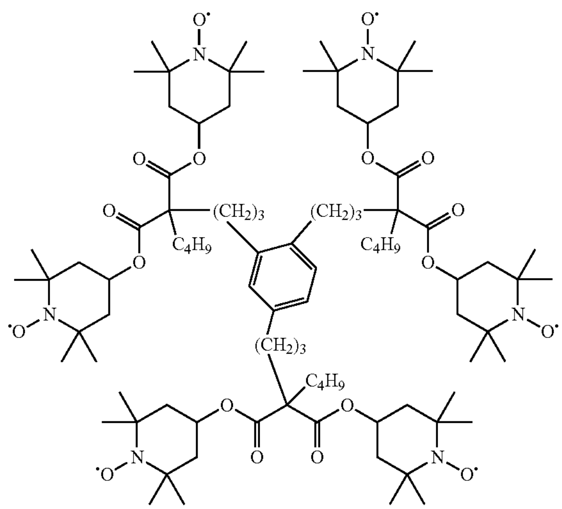

Example 5

The nematic LC mixture N5 is formulated as follows.

| | | | |
|---|---|---|---|
| CC-3-V1 | 9.0 | Cl.p. [° C.]: | 74.5 |
| CC-4-V1 | 22.0 | Δn [589 nm, 20° C.]: | 0.1120 |
| CCH-301 | 6.0 | $\varepsilon_{\parallel}$ [1 kHz, 20° C.]: | 3.5 |
| CY-3-O2 | 15.0 | $\varepsilon_{\perp}$ [1 kHz, 20° C.]: | 6.8 |
| CY-3-O4 | 4.5 | Δε [1 kHz, 20° C.]: | −3.3 |
| PP-1-2V1 | 8.0 | $K_1$ [pN, 20° C.]: | 16.3 |
| B(S)-(c5)1O-O2 | 4.0 | $K_3$ [pN, 20° C.]: | 16.7 |
| B(S)-(c5)1O-O4 | 5.0 | $K_{avg}$ [pN, 20° C.]: | 13.7 |
| CCP-3-1 | 5.0 | $V_0$ [V, 20° C.]: | |
| CLY-3-O2 | 4.5 | $\gamma_1$ [mPa s, 20° C.]: | 114 |
| CPY-3-O2 | 10.0 | LTS bulk [h, −10° C.]: | |
| PYP-2-3 | 3.0 | LTS bulk [h, −20° C.]: | |
| CLY-(c5)-O2 | 4.0 | LTS bulk [h, −30° C.]: | |
| Σ | 100.0 | | |

To the mixture N5 are added 100 ppm of the stabiliser ST-8-1.

ST-8-1

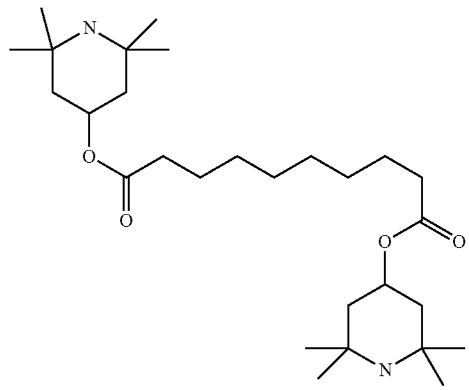

Example 6

The nematic LC mixture N6 is formulated as follows.

| | | | |
|---|---|---|---|
| CC-3-V1 | 9.0 | Cl.p. [° C.]: | 76.5 |
| CC-4-V1 | 22.0 | Δn [589 nm, 20° C.]: | 0.1162 |
| CCH-301 | 6.0 | $\varepsilon_{\parallel}$ [1 kHz, 20° C.]: | 3.5 |
| CY-3-O2 | 15.0 | $\varepsilon_{\perp}$ [1 kHz, 20° C.]: | 7.0 |
| CY-3-O4 | 4.5 | Δε [1 kHz, 20° C.]: | −3.5 |
| PP-1-2V1 | 8.0 | $K_1$ [pN, 20° C.]: | 17.7 |
| B(S)-(c5)1O-O2 | 4.0 | $K_3$ [pN, 20° C.]: | 17.6 |
| B(S)-2O-O5 | 5.0 | $K_{avg}$ [pN, 20° C.]: | 14.7 |
| CCP-3-1 | 5.0 | $V_0$ [V, 20° C.]: | |
| CLY-3-O2 | 4.5 | $\gamma_1$ [mPa s, 20° C.]: | 119 |
| CPY-3-O2 | 10.0 | LTS bulk [h, −10° C.]: | |
| PYP-2-3 | 3.0 | LTS bulk [h, −20° C.]: | |
| LY-(c5)-O2 | 4.0 | LTS bulk [h, −30° C.]: | |
| Σ | 100.0 | | |

To the mixture N6 are added 50 ppm of the stabiliser ST-9-1.

ST-9-1

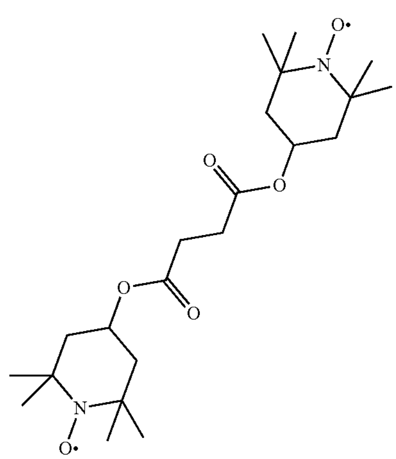

Example 7

The nematic LC mixture N7 is formulated as follows.

| | | | |
|---|---|---|---|
| CC-3-V1 | 9.0 | Cl.p. [° C.]: | 76 |
| CC-4-V1 | 22.0 | Δn [589 nm, 20° C.]: | 0.1158 |
| CCH-301 | 6.0 | $\varepsilon_{\parallel}$ [1 kHz, 20° C.]: | 3.5 |
| CY-3-O2 | 7.0 | $\varepsilon_{\perp}$ [1 kHz, 20° C.]: | 6.9 |
| CY-3-O4 | 4.5 | Δε [1 kHz, 20° C.]: | −3.4 |
| PP-1-2V1 | 8.0 | $K_1$ [pN, 20° C.]: | 17.8 |
| B(S)-(c5)1O-O2 | 4.0 | $K_3$ [pN, 20° C.]: | 17.2 |
| B(S)-(c5)1O-O4 | 5.0 | $K_{avg}$ [pN, 20° C.]: | 14.6 |
| CCP-3-1 | 5.0 | $V_0$ [V, 20° C.]: | |
| CLY-3-O2 | 8.5 | $\gamma_1$ [mPa s, 20° C.]: | 123 |
| CPY-3-O2 | 10.0 | LTS bulk [h, −10° C.]: | |
| PYP-2-3 | 3.0 | LTS bulk [h, −20° C.]: | |
| LY-(c5)-O2 | 8.0 | LTS bulk [h, −30° C.]: | |
| Σ | 100.0 | | |

To the mixture N7 are added 50 ppm of the stabiliser ST-12.

ST-12

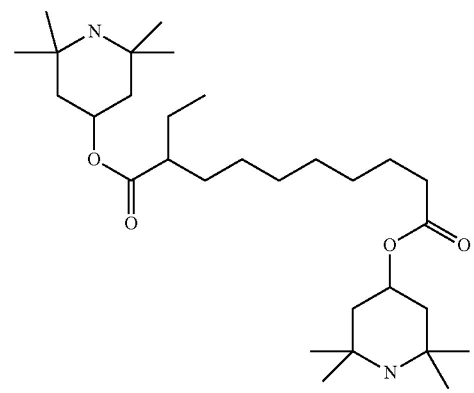

Example 8

A polymerizable mixture is prepared by adding 0.3% of the polymerizable compound RM-171 and 100 ppm of the stabiliser ST-3a-1 to the mixture of Example 1.

RM-171

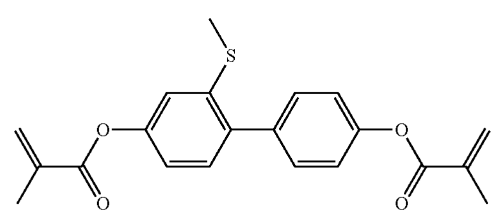

Example 9

A polymerizable mixture is prepared by adding 0.3% of the polymerizable compound RM-171 and 100 ppm of the stabiliser ST-3a-1 to the mixture of Example 2.

Example 10

A polymerizable mixture is prepared by adding 0.3% of the polymerizable compound RM-1 and 100 ppm of the stabiliser ST-3b-1 to the mixture of Example 1.

RM-1

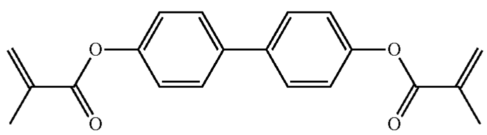

Example 11

A polymerizable mixture is prepared by adding 0.3% of the polymerizable compound RM-35 and 50 ppm of the stabiliser H-1-1-1 to the mixture of Example 3.

RM-35

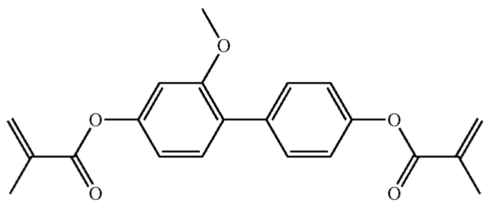

Example 12

A polymerizable mixture is prepared by adding 0.3% of the polymerizable compound RM-120 and 150 ppm of the stabiliser ST-9-1 to the mixture of Example 4.

RM-120

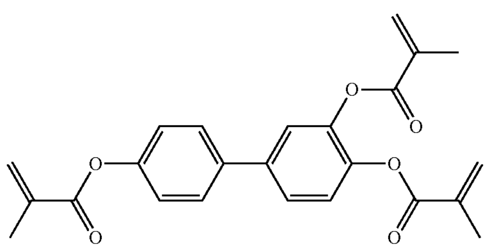

Example 13

A polymerizable mixture is prepared by adding 0.3% of the polymerizable compound RM-142 and 150 ppm of the stabiliser ST-8-1 to the mixture of Example 5.

RM-142

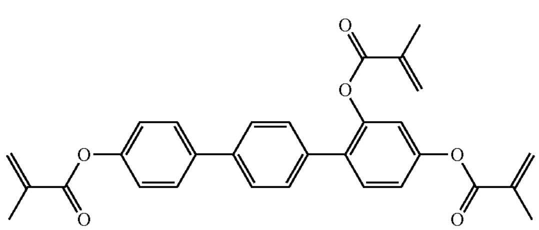

Example 14

A polymerizable mixture is prepared by adding 0.3% of the polymerizable compound RM-143 and 150 ppm of the stabiliser ST-3a-1 to the mixture of Example 7.

RM-143

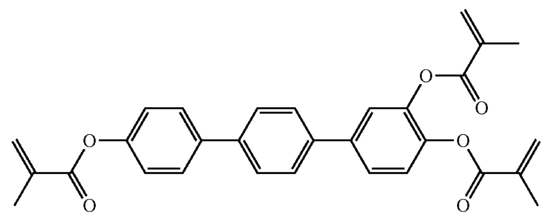

Example 15

A polymerizable mixture is prepared by adding 0.3% of the polymerizable compound RM-172 and 50 ppm of the stabiliser H-2-1-1 to the mixture of Example 6.

RM-172

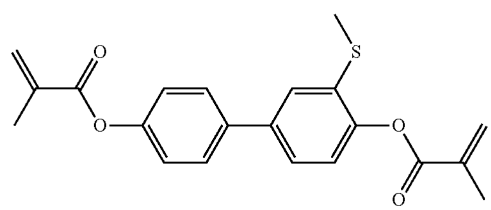

Example 16

A polymerizable mixture is prepared by adding 0.3% of the polymerizable compound RM-159 and 50 ppm of the stabiliser H-2-1-1 to the mixture of Example 2.

RM-159

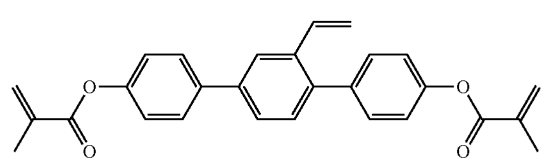

Example 17

A polymerizable mixture is prepared by adding 0.3% of the polymerizable compound RM-145 to the mixture of Example 1.

RM-145

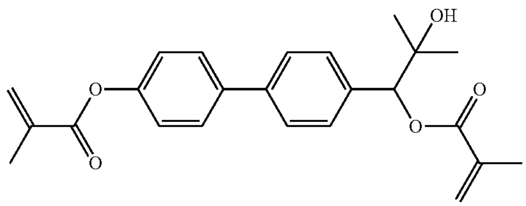

Example 18

A polymerizable mixture is prepared by adding 0.3% of the polymerizable compound RM-156 and 150 ppm of the stabiliser ST-8-1 to the mixture of Example 2.

RM-156

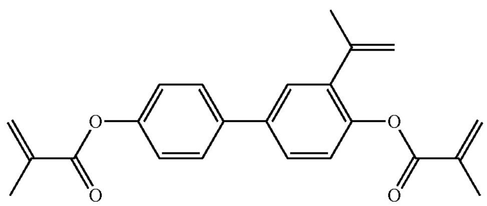

Example 19

A polymerizable mixture is prepared by adding 0.35% of the polymerizable compound RM-162 and 50 ppm of the stabiliser H-2-1-1 to the mixture of Example 1.

RM-162

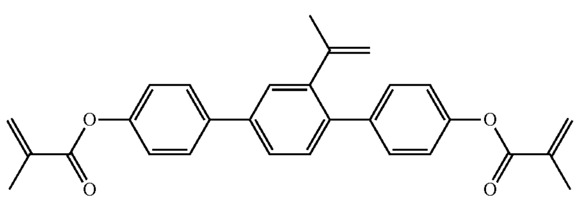

Example 20

A polymerizable mixture is prepared by adding 0.4% of the polymerizable compound RM-58 and 150 ppm of the stabiliser ST-3b-1 to the mixture of Example 7.

RM-58

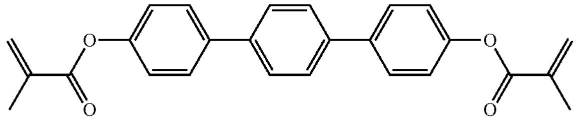

Example 21

A polymerizable mixture is prepared by adding 0.3% of the polymerizable compound RM-160 and 150 ppm of the stabiliser ST-8-1 to the mixture of Example 6.

RM-160

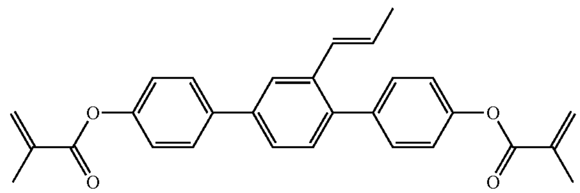

Example 22

A polymerizable mixture is prepared by adding 0.4% of the polymerizable compound RM-163 and 100 ppm of the stabiliser ST-9-1 to the mixture of Example 2.

RM-163

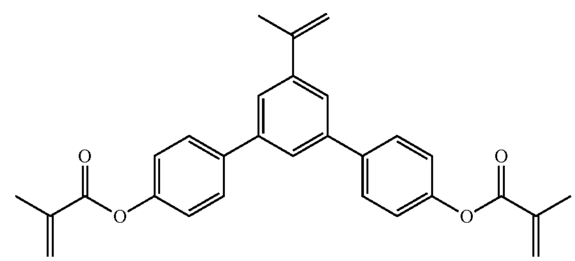

Example 23

A polymerizable mixture is prepared by adding 0.4% of the polymerizable compound RM-64 and 150 ppm of the stabiliser ST-3b-1 to the mixture of Example 3.

RM-64

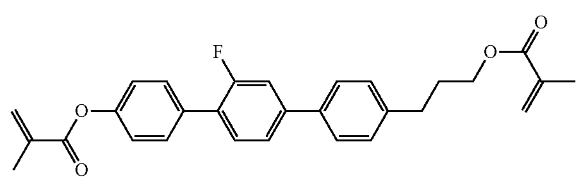

Example 24

A polymerizable mixture is prepared by adding 0.4% of the polymerizable compound RM-169 and 100 ppm of the stabiliser ST-8-1 to the mixture of Example 2.

RM-169

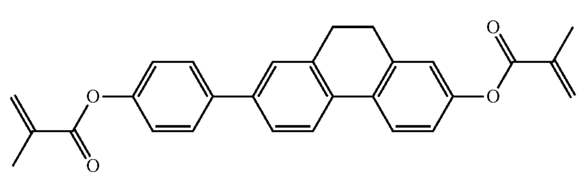

Example 25

A polymerizable mixture is prepared by adding 0.4% of the polymerizable compound RM-157 and 150 ppm of the stabiliser H-2-1-1 to the mixture of Example 4.

RM-157

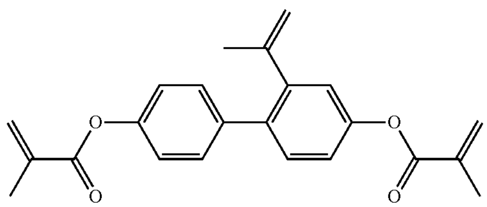

Example 26

A polymerizable mixture is prepared by adding 0.3% of the polymerizable compound RM-171, 0.1% of the polymerizable compound RM-1 and 150 ppm of the stabiliser ST-3a-1 to the mixture of Example 1.

Example 27

A polymerizable mixture is prepared by adding 0.2% of the polymerizable compound RM-35, 0.2% of the polymerizable compound RM-1 and 100 ppm of the stabiliser ST-3b-1 to the mixture of Example 3.

Example 28

A polymerizable mixture is prepared by adding 0.3% of the polymerizable compound RM-171, 0.1% of the polymerizable compound RM-64 and 100 ppm of the stabiliser H-2-1-1 to the mixture of Example 4.

Example 29

A polymerizable mixture is prepared by adding 0.1% of the polymerizable compound RM-120, 0.3% of the polymerizable compound RM-1 and 150 ppm of the stabiliser H-1-1-1 to the mixture of Example 3.

Example 30

A polymerizable mixture is prepared by adding 0.1% of the polymerizable compound RM-143, 0.3% of the polymerizable compound RM-1 and 150 ppm of the stabiliser ST-3a-1 to the mixture of Example 1.

Example 30

A polymerizable mixture is prepared by adding 0.2% of the polymerizable compound RM-171, 0.2% of the polymerizable compound RM-120 and 150 ppm of the stabiliser ST-8-1 to the mixture of Example 4.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding EP application No. 22176907.8, filed Jun. 2, 2022, are incorporated by reference herein.

The invention claimed is:

1. An LC medium having negative dielectric anisotropy and comprising one or more compounds of formula IA

IA

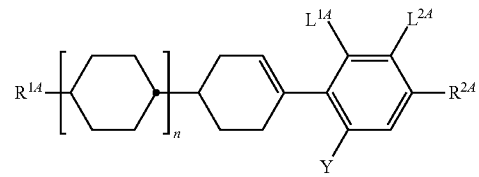

in which the individual radicals, on each occurrence identically or differently, and each, independently of one another, have the following meaning:

$R^{1A}$ is an alkyl or alkoxy group having 1 to 12, wherein one or more non-adjacent $CH_2$-groups are replaced by cyclopropyl, cyclobutyl or cyclopentyl, $R^{2A}$ is a straight chain alkyl having 1 to 25 C atoms or a branched or cyclic alkyl having 3 to 25 C atoms, wherein one or more non-adjacent $CH_2$-groups are optionally replaced by —O—, —S—, —CO—, —CO—O—, —O—CO—, —O—CO—O—, $CR^0$ $=CR^{00}$—, —C≡C—,

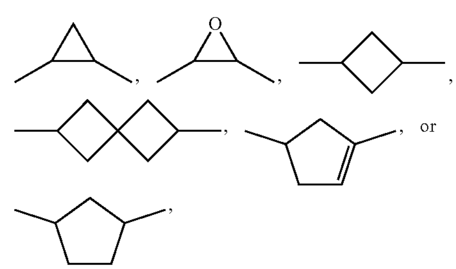

in such a manner that O- and/or S-atoms are not directly connected with each other, and wherein one or more H atoms are each optionally replaced by F or Cl, $L^{1A}$, $L^{2A}$ are F, Cl, $CF_3$ or $CHF_2$, Y is H, F, Cl, $CF_3$, $CHF_2$ or $CH_3$, and n 0 or 1, and at least one compound selected from the group of compounds of formulae IID-4, IID-10, PH-1 and Q

IID-4

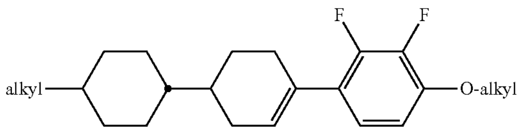

IID-10

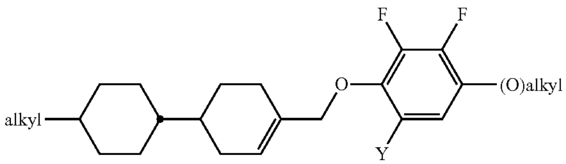

wherein alkyl each, independently of one another, denotes a straight-chain alkyl radical having 1-6 C atoms, Y denotes, for formula IID-10, H or $CH_3$, and (O) denotes an oxygen atom or a single bond,

PH-1

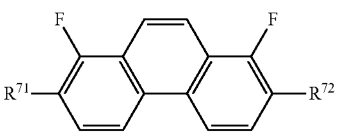

wherein $R^{71}$, $R^{72}$ are H, an alkyl or alkoxy radical having 1 to 15 C atoms or an or alkenyl radical having 2 to 15 C atoms, each of which is unsubstituted or monosubstituted by F, Cl, CN or $CF_3$ and in which one or more $CH_2$ groups may be replaced by —O—, —S—, —C≡C—, —$CF_2$O—, —O$CF_2$—, —OC—O—, —O—CO—

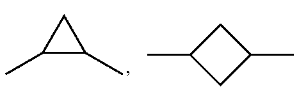

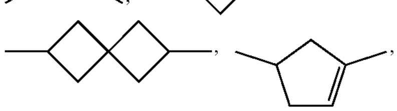 or,

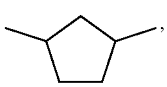

in such a way that O- and/or S-atoms are not linked directly to one another,

Q

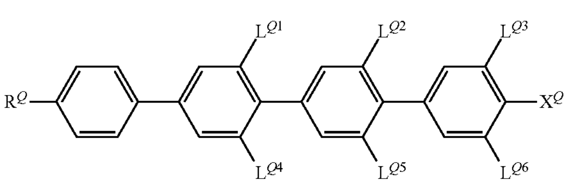

wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, and $L^{Q1}$ to $L^{Q6}$ independently of each other are H or F, with at least one of $L^{Q1}$ to $L^{Q6}$ being F.

2. The LC medium according to claim 1, wherein the one or more compounds of formula IA are selected from the following formulae:

IA1

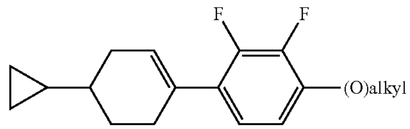

IA2

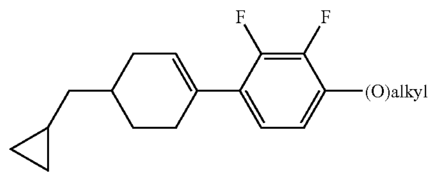

IA3

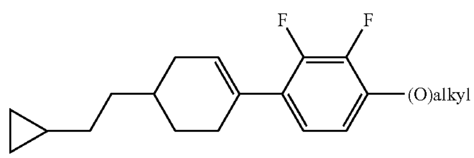

IA4

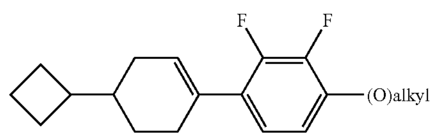

IA5

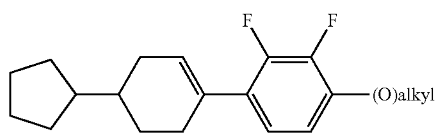

IA6

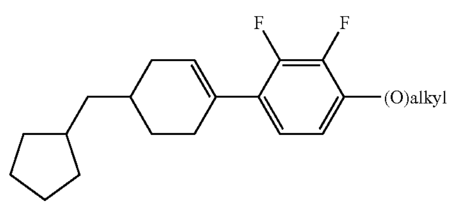

IA7

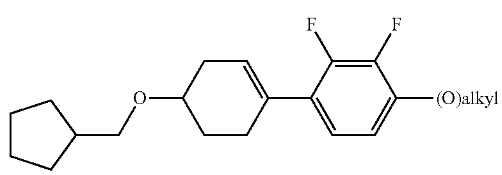

IA8

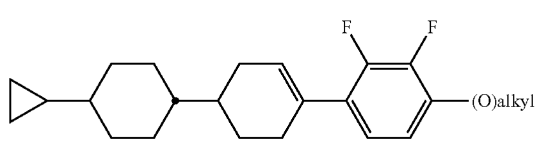

-continued

IA9

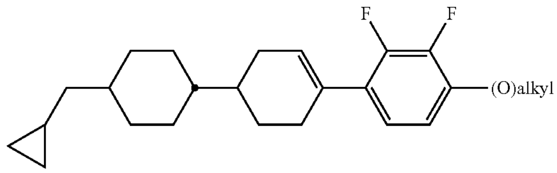

IA10

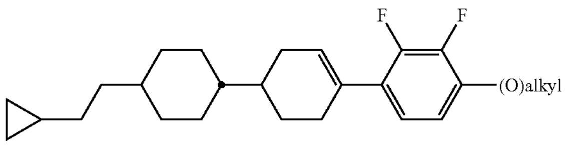

IA11

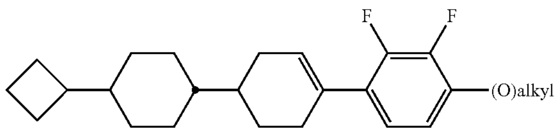

IA12

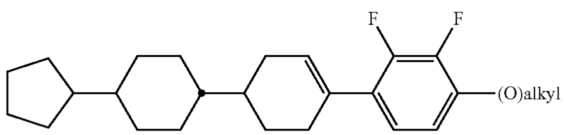

IA13

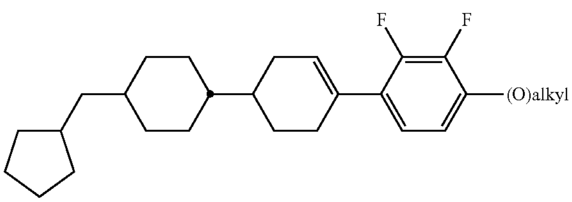

IA14

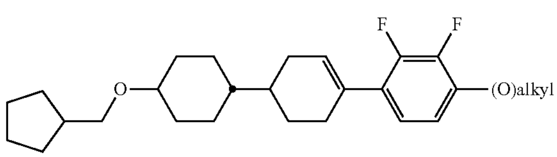

wherein "(O)" denotes an oxygen atom or a single bond and "alkyl" denotes an alkyl group with 1 to 6 C atoms.

3. The LC medium according to claim 1, further comprising one or more compounds selected from the group consisting of compounds of formulae IIA, IIB, IIC and IID, wherein the compounds of formulae IID-4 and IID-10 are excluded from the compounds of formula IID,

IIA

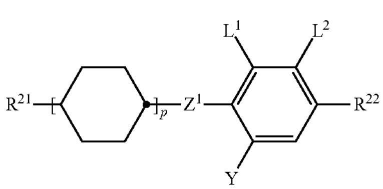

-continued

IIB

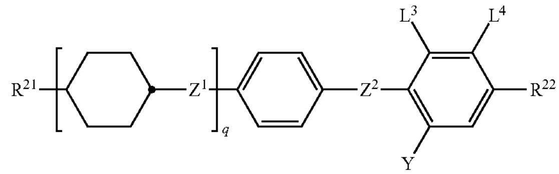

IIC

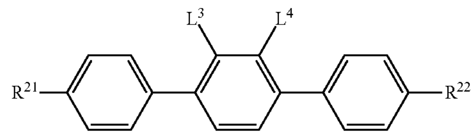

IID

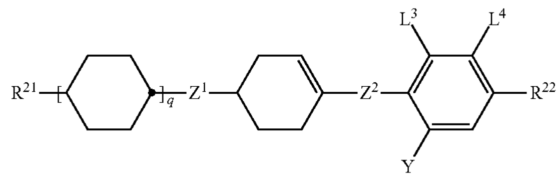

in which the individual radicals, on each occurrence identically or differently, and each, independently of one another, have the following meaning:

$R^{21}$, $R^{22}$ are H, an alkyl or alkoxy radical having 1 to 15 C atoms or an or alkenyl radical having 2 to 15 C atoms, each of which is unsubstituted or monosubstituted by F, Cl, CN or $CF_3$ and in which one or more $CH_2$ groups may be replaced by —O—, —S—, —C≡C—, —$CF_2$O—, —O$CF_2$—, —OC—O—, —O—CO—

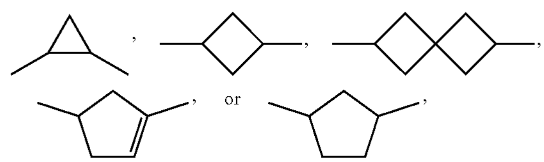

in such a way that O- and/or S-atoms are not linked directly to one another, $L^1$ to $L^4$ are F, Cl, $CF_3$ or $CHF_2$, Y is H, F, Cl, $CF_3$, $CHF_2$ or $CH_3$, $Z^1$, $Z^2$ are a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF—, or —CH═CH$CH_2$O, p is 0, 1 or 2, and q is 0 or 1, wherein in formula IID, if $Z^1$ and $Z^2$ denote a single bond, then $R^{21}$ is different from cyclic alkyl or alkoxy.

4. The LC medium according to claim 1, additionally comprising one or more compounds selected from the group of compounds of formulae IV-1 to IV-4,

IV-1

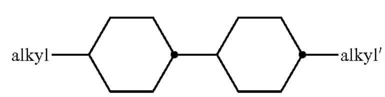

-continued

IV-2

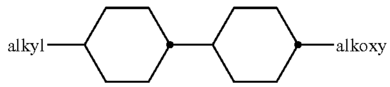

IV-3

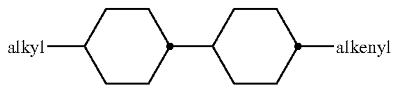

IV-4

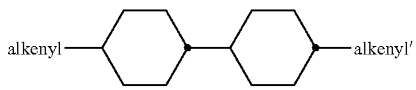

in which alkyl and alkyl' denote, independently of one another, alkyl having 1 to 7 C atoms, alkenyl denotes an alkenyl radical having 2 to 5 C atoms, alkenyl' denotes an alkenyl radical having 2 to 5 C atoms, and alkoxy denotes alkoxy having 1 to 5 C atoms.

5. The LC medium according to claim 1, additionally comprising one or more compounds of formula V

V

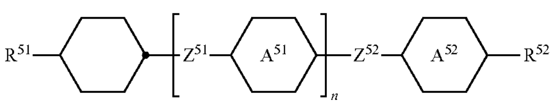

in which $R^{51}$, $R^{52}$ denote, independently of one another, H, an alkyl or alkoxy radical having 1 to 15 C atoms or an alkenyl radical having 2 to 15 C atoms, each of which is unsubstituted, monosubstituted by F, Cl, CN or $CF_3$ or at least monosubstituted by halogen, and in which one or more $CH_2$ groups may be replaced by —O—, —S—, —C≡C—, —$CF_2$O—, —O$CF_2$—, —OC—O—, —O—CO—

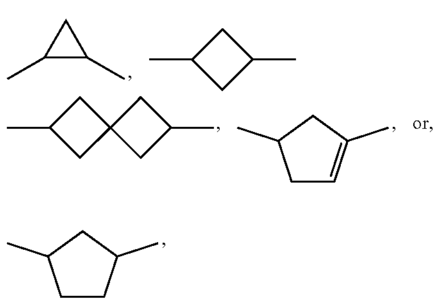

in such a way that O atoms are not linked directly to one another,

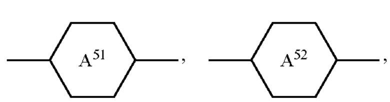

identically or differently, denote

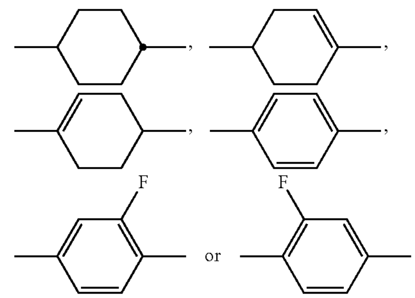

$Z^{51}$, $Z^{52}$ each, independently of one another, denote —$CH_2$—$CH_2$—, —$CH_2$—O—, —CH═CH—, —C≡C—, —COO— or a single bond, and n is 1 or 2.

6. The LC medium according to claim 1, additionally comprising one or more additives selected from the group consisting of polymerizable compounds, stabilisers, chiral dopants, polymerization initiators and self alignment additives.

7. A process for preparing the LC medium according to claim 1, comprising mixing one or more compounds of formula IA with at least one compound selected from the group of compounds of formulae IID-4, IID-10, PH-1 and Q and optionally with one or more additives.

8. An LC display comprising the LC medium as defined in claim 1.

9. The LC display of claim 8, which is an LC display of the VA, IPS, FFS, UB-FFS or UV$^2$A mode.

10. An energy-saving LC display comprising the LC medium as defined in claim 1.

11. The LC medium according to claim 1, which comprises a compound of formula IID-4.

12. The LC medium according to claim 1, which comprises a compound of formula IID-10.

13. The LC medium according to claim 1, which further comprises a compound of formula BC

BC

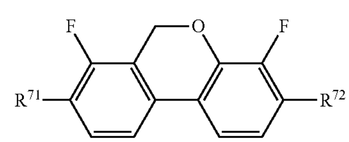

wherein $R^{71}$, $R^{72}$ are H, an alkyl or alkoxy radical having 1 to 15 C atoms or an or alkenyl radical having 2 to 15 C atoms, each of which is unsubstituted or monosubstituted by F, Cl, CN or $CF_3$ and in which one or more $CH_2$ groups may be replaced by —O—, —S—, —C≡C—, —$CF_2$O—, —O$CF_2$—, —OC—O—, —O—CO—

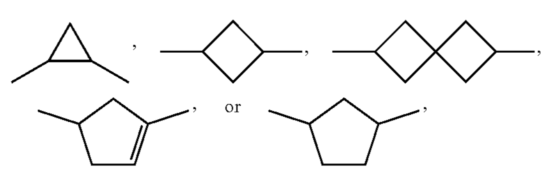

in such a way that O- and/or S-atoms are not linked directly to one another.

14. The LC medium according to claim 1, which comprises a compound of formula PH-1.

15. The LC medium according to claim 1, which comprises a compound of formula Q.

16. The LC medium according to claim 1, which comprises at least three compounds selected from the group of compounds of formulae IID-4, IID-10, PH-1 and Q.

17. The LC medium according to claim 1, which has a dielectric anisotropy Δε of −1.5 to −8.0.

18. The LC medium according to claim 1, which has a dielectric anisotropy Δε of −2.0 to −4.0.

19. The LC medium according to claim 1, which has a dielectric anisotropy Δε of −2.5 to −3.6.

* * * * *